United States Patent
Winston et al.

(10) Patent No.: US 6,671,452 B2
(45) Date of Patent: *Dec. 30, 2003

(54) LUMINAIRE DEVICE

(75) Inventors: Roland Winston, Chicago, IL (US); Robert L. Holman, Evanston, IL (US); Benjamin A. Jacobson, Chicago, IL (US); Robert M. Emmons, Woodbury, MN (US); Philip Gleckman, Eindhoven (NL)

(73) Assignee: 3M Innovative Properties Company, Saint Paul, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 09/995,497

(22) Filed: Nov. 27, 2001

(65) Prior Publication Data

US 2002/0061178 A1 May 23, 2002

Related U.S. Application Data

(63) Continuation of application No. 09/533,043, filed on Mar. 22, 2000, now Pat. No. 6,335,999, which is a continuation of application No. 08/999,149, filed on Dec. 29, 1997, now Pat. No. 6,044,196, which is a continuation of application No. 08/783,212, filed on Jan. 13, 1997, now Pat. No. 6,002,829, which is a continuation of application No. 08/486,784, filed on Jun. 7, 1995, now Pat. No. 5,594,830, which is a continuation of application No. 08/216,016, filed on Apr. 11, 1994, now Pat. No. 5,528,720, which is a continuation-in-part of application No. 08/029,883, filed on Mar. 11, 1993, now Pat. No. 5,303,322, which is a continuation-in-part of application No. 07/855,838, filed on Mar. 23, 1992, now Pat. No. 5,237,641.

(51) Int. Cl.[7] .................................................. G02B 6/10
(52) U.S. Cl. .................... 385/146; 385/43; 385/901; 385/129; 359/559; 362/558
(58) Field of Search ......................... 385/43, 129–131, 385/146, 901; 359/559; 362/558, 559, 560; 349/61, 159

(56) References Cited

U.S. PATENT DOCUMENTS

| 1,535,985 A | 4/1925 | Clark .......................... 359/459 |
| 2,347,665 A | 5/1944 | Christensen et al. .......... 362/31 |

(List continued on next page.)

FOREIGN PATENT DOCUMENTS

| CN | 81107927 | 10/1992 |

(List continued on next page.)

OTHER PUBLICATIONS

"New Backlighting Technologies for LCSs", Hathaway, K.J. et al., *Soc. For Information Display International Symposium*, vol. XXII., May 6–10, 1991.

"Parts That Glow," Blumenfeld, A.M. and Jones, S.E., *Machine Design*, Jul. 1985.

(List continued on next page.)

*Primary Examiner*—Phan T. H. Palmer
(74) *Attorney, Agent, or Firm*—Stephen W. Buckingham

(57) ABSTRACT

An optical device for collecting light and selectively outputting or concentrating the light. A layer has an optical index of refraction $n_1$, and top, bottom and side surfaces defining an angel of inclination $\phi$. A back surface spans the top, bottom and side surface. A first layer is coupled to the bottom surface of the layer and has an index of refraction $n_2$. The first layer index $n_2$ causes light input through the back surface of the layer to be preferentially output into the first layer. A second layer is coupled to the bottom of the first layer and selectively causes output of light into ambient. Additional layers, such as alight polarization layer, a polarization converting layer and a post LCD diffuser layer can be used to make preferential use of polarized light of diffuse light having passed through the LCD layer to enhance viewing of the output light.

20 Claims, 57 Drawing Sheets

U.S. PATENT DOCUMENTS

| | | |
|---|---|---|
| 2,712,593 A | 7/1955 | Merchant ...................... 362/27 |
| 2,855,523 A | 10/1958 | Berger ........................ 250/216 |
| 3,308,709 A | 3/1967 | Harrick ...................... 385/146 |
| 3,386,787 A | 6/1968 | Kaplan ....................... 385/129 |
| 3,535,016 A | 10/1970 | Malifaud ..................... 385/146 |
| 3,617,109 A | 11/1971 | Tien ............................ 350/96 |
| 3,729,626 A | 4/1973 | Thurlow et al. .............. 362/31 |
| 3,740,119 A | 6/1973 | Sakurai et al. ............. 359/628 |
| 3,752,974 A | 8/1973 | Baker et al. .................... 240/1 |
| 3,799,647 A | 3/1974 | Luft ............................ 359/247 |
| 3,832,028 A | 8/1974 | Kapron ........................ 385/43 |
| 3,840,695 A | 10/1974 | Fischer ...................... 348/761 |
| 3,864,019 A | 2/1975 | Smolinsky et al. ........... 385/49 |
| 3,871,747 A | 3/1975 | Andrews ..................... 385/147 |
| 3,980,392 A | 9/1976 | Auracher ...................... 385/43 |
| 4,043,636 A | 8/1977 | Eberhardt et al. .......... 350/160 |
| 4,052,120 A | 10/1977 | Sick et al. ...................... 350/6 |
| 4,059,916 A | 11/1977 | Tachihara et al. ............. 40/448 |
| 4,111,538 A | 9/1978 | Sheridon .................... 353/122 |
| 4,114,592 A | 9/1978 | Winston ..................... 126/683 |
| 4,126,383 A | 11/1978 | Doriguzzi et al. ............ 359/48 |
| 4,161,015 A | 7/1979 | Dey et al. ................... 362/263 |
| 4,171,874 A | 10/1979 | Biegelow et al. ............. 359/49 |
| 4,176,908 A | 12/1979 | Wagner ....................... 385/47 |
| 4,190,315 A | 2/1980 | Brettle et al. ............... 385/129 |
| 4,212,048 A | 7/1980 | Castleberry ................. 362/19 |
| 4,240,692 A | 12/1980 | Winston ..................... 385/146 |
| 4,257,084 A | 3/1981 | Reynolds ..................... 362/31 |
| 4,277,817 A | 7/1981 | Hehr ............................ 362/31 |
| 4,323,951 A | 4/1982 | Pasco .......................... 362/27 |
| 4,373,282 A | 2/1983 | Wragg ........................ 40/546 |
| 4,420,796 A | 12/1983 | Mori ........................... 362/32 |
| 4,453,200 A | 6/1984 | Trcka et al. .................. 362/31 |
| 4,528,617 A | 7/1985 | Blackington ................. 362/32 |
| 4,547,043 A | 10/1985 | Penz ............................ 362/32 |
| 4,573,766 A | 3/1986 | Bournay, Jr. et al. ......... 359/48 |
| 4,618,216 A | 10/1986 | Suzawa ....................... 359/49 |
| 4,627,690 A | 12/1986 | Fantone ...................... 350/421 |
| 4,648,690 A | 3/1987 | Ohne .......................... 359/599 |
| 4,649,462 A | 3/1987 | Dobrowlski et al. ........... 362/2 |
| 4,660,936 A | 4/1987 | Nosker ........................ 359/40 |
| 4,683,359 A | 7/1987 | Wojtanek .................... 200/314 |
| 4,691,982 A | 9/1987 | Nishimura et al. ........... 385/37 |
| 4,706,173 A | 11/1987 | Hamada et al. ............. 362/341 |
| 4,714,983 A | 12/1987 | Lang ........................... 362/27 |
| 4,721,366 A | 1/1988 | Nosker ........................ 359/48 |
| 4,726,662 A | 2/1988 | Cromack ..................... 359/40 |
| 4,729,068 A | 3/1988 | Ohe ............................. 362/31 |
| 4,735,495 A | 4/1988 | Henkes ...................... 362/310 |
| 4,737,896 A | 4/1988 | Mochizuki et al. .......... 362/301 |
| 4,747,223 A | 5/1988 | Borda ......................... 40/219 |
| 4,756,604 A | 7/1988 | Nakatsuka et al. ........... 359/41 |
| 4,765,718 A | 8/1988 | Henkes ........................ 359/49 |
| 4,798,448 A | 1/1989 | van Raalte ................. 350/345 |
| 4,799,050 A | 1/1989 | Prince et al. ................ 362/309 |
| 4,799,137 A | 1/1989 | Aho ............................ 362/309 |
| 4,813,765 A | 3/1989 | Negishi ...................... 350/286 |
| 4,832,458 A | 5/1989 | Ferguson et al. ............. 40/448 |
| 4,838,661 A | 6/1989 | McKee et al. ................ 359/48 |
| 4,842,378 A | 6/1989 | Flasck et al. ................. 359/48 |
| 4,850,665 A | 7/1989 | Whitehead .................. 385/133 |
| 4,907,044 A | 3/1990 | Schellhorn et al. .......... 257/98 |
| 4,907,132 A | 3/1990 | Parker ........................ 362/31 |
| 4,914,553 A | 4/1990 | Hamada et al. ............ 362/232 |
| 4,915,479 A | 4/1990 | Clarke ........................ 362/32 |
| 4,917,465 A | 4/1990 | Conner et al. ............... 359/41 |
| 4,930,867 A | 6/1990 | Negishi ..................... 359/834 |
| 4,936,659 A | 6/1990 | Anderson et al. ............. 359/54 |
| 4,950,059 A | 8/1990 | Roberts ....................... 359/48 |
| 4,958,911 A | 9/1990 | Beiswenger et al. .......... 359/48 |
| 4,958,915 A | 9/1990 | Okada et al. .................. 345/97 |
| 4,965,876 A | 10/1990 | Foldi et al. ................. 359/869 |
| 4,974,122 A | 11/1990 | Shaw ........................... 362/31 |
| 4,974,353 A | 12/1990 | Norfolk ....................... 40/447 |
| 4,975,808 A | 12/1990 | Bond et al. ................... 362/31 |
| 4,976,536 A | 12/1990 | Vogeley et al. ................ 353/77 |
| 4,978,183 A | 12/1990 | Vick ......................... 350/2.67 |
| 4,984,872 A | 1/1991 | Vick ........................... 350/321 |
| 4,985,809 A | 1/1991 | Matsui et al. ................. 362/31 |
| 4,989,933 A | 2/1991 | Duguay et al. ............ 350/96.1 |
| 4,991,918 A | 2/1991 | Owen et al. ................. 385/146 |
| 4,992,916 A | 2/1991 | Henkes |
| 4,998,188 A | 3/1991 | Degelmann |
| 5,019,808 A | 5/1991 | Prince et al. ................ 340/765 |
| 5,029,045 A | 7/1991 | Sanai et al. ................... 362/26 |
| 5,037,172 A | 8/1991 | Hekman et al. .............. 385/31 |
| 5,039,207 A | 8/1991 | Green ......................... 359/49 |
| 5,040,098 A | 8/1991 | Tanaka et al. ................ 362/31 |
| 5,040,878 A | 8/1991 | Eichenlaub .................. 362/31 |
| 5,044,734 A | 9/1991 | Sperl et al. ................... 359/49 |
| 5,046,805 A | 9/1991 | Simon ......................... 385/31 |
| 5,046,829 A | 9/1991 | Worp ........................... 359/49 |
| 5,050,946 A | 9/1991 | Hathaway et al. ............ 385/33 |
| 5,051,551 A | 9/1991 | Doyle ......................... 250/341 |
| 5,053,765 A | 10/1991 | Sonehara et al. ....... 340/815.31 |
| 5,078,476 A | 1/1992 | Shin ............................ 359/48 |
| 5,083,120 A | 1/1992 | Nelson ...................... 345/102 |
| 5,101,325 A | 3/1992 | Davenport et al. ........... 362/31 |
| 5,101,454 A | 3/1992 | Blonder et al. ............... 385/14 |
| 5,117,472 A | 5/1992 | Blyler, Jr. et al. ............ 385/28 |
| 5,123,077 A | 6/1992 | Endo et al. .................. 385/129 |
| 5,126,882 A | 6/1992 | Oe et al. ..................... 359/619 |
| 5,128,783 A | 7/1992 | Abileah et al. ............... 359/49 |
| 5,128,787 A | 7/1992 | Blonder ....................... 359/70 |
| 5,128,846 A | 7/1992 | Mills et al. ................. 362/224 |
| 5,132,830 A | 7/1992 | Fukutani et al. ............. 359/67 |
| 5,134,548 A | 7/1992 | Turner ........................ 362/29 |
| 5,146,354 A | 9/1992 | Plesinger .................... 359/49 |
| 5,159,478 A | 10/1992 | Akiyama et al. ............. 359/69 |
| 5,170,448 A | 12/1992 | Ackley et al. ................ 385/31 |
| 5,202,938 A | 4/1993 | Man et al. ................... 385/11 |
| 5,202,950 A | 4/1993 | Arego et al. ................ 385/146 |
| 5,208,882 A | 5/1993 | Strasser et al. ............... 385/37 |
| 5,233,679 A | 8/1993 | Oyama ...................... 385/146 |
| 5,237,641 A | 8/1993 | Jacobson et al. ........... 385/146 |
| 5,253,089 A | 10/1993 | Imai ............................ 359/49 |
| 5,253,151 A | 10/1993 | Mepham et al. ............ 362/126 |
| 5,255,029 A | 10/1993 | Vogeley et al. .............. 353/122 |
| 5,262,880 A | 11/1993 | Abileah ....................... 359/40 |
| 5,268,985 A | 12/1993 | Ando et al. ................. 385/129 |
| 5,272,601 A | 12/1993 | McKillip ...................... 362/27 |
| 5,291,184 A | 3/1994 | Iino .............................. 345/7 |
| 5,295,048 A | 3/1994 | Park et al. .................... 362/26 |
| 5,303,322 A | 4/1994 | Winston et al. ............. 385/146 |
| 5,309,544 A | 5/1994 | Saxe ........................... 385/149 |
| 5,333,073 A | 7/1994 | Suzuki ......................... 359/50 |
| 5,339,178 A | 8/1994 | Phelps, III et al. ........... 359/42 |
| 5,339,179 A | 8/1994 | Rudisill et al. ............... 359/49 |
| 5,339,382 A | 8/1994 | Whitehead .................. 385/133 |
| 5,343,542 A | 8/1994 | Kash et al. .................. 382/31 |
| 5,357,405 A | 10/1994 | Park ............................ 362/31 |
| 5,359,691 A | 10/1994 | Tai et al. ..................... 385/46 |
| 5,363,294 A | 11/1994 | Yamamoto et al. ......... 362/330 |
| 5,390,276 A | 2/1995 | Tai et al. .................... 385/146 |
| 5,394,308 A | 2/1995 | Watanabe et al. ............ 362/31 |
| 5,396,350 A | 3/1995 | Beeson et al. ................ 359/40 |
| 5,418,883 A | 5/1995 | Eda ........................... 385/131 |
| 5,452,385 A | 9/1995 | Izuma et al. ................. 385/37 |
| 5,455,883 A | 10/1995 | Shiegeta et al. ............ 385/129 |

| | | | |
|---|---|---|---|
| 5,467,208 A | 11/1995 | Kokawa et al. | 359/49 |
| 5,467,417 A | 11/1995 | Nakamura et al. | 385/36 |
| 5,475,513 A | 12/1995 | Nakanishi et al. | 359/40 |
| 5,479,275 A | 12/1995 | Abileah | 359/48 |
| 5,481,385 A | 1/1996 | Zimmerman et al. | 359/40 |
| 5,485,291 A | 1/1996 | Qiao et al. | 359/49 |
| 5,506,924 A | 4/1996 | Inoue | 385/129 |
| 5,506,929 A | 4/1996 | Tai et al. | 385/146 |
| 5,521,725 A | 5/1996 | Beeson et al. | 359/40 |
| 5,521,726 A | 5/1996 | Zimmerman et al. | 359/42 |
| 5,528,720 A | 6/1996 | Winston et al. | 385/146 |
| 5,594,830 A | 1/1997 | Winston et al. | 385/146 |
| 6,002,829 A | 12/1999 | Winston et al. | 385/146 |
| 6,335,999 B1 * | 1/2002 | Winston et al. | 385/146 |

FOREIGN PATENT DOCUMENTS

| | | | | |
|---|---|---|---|---|
| CN | 218041 | | 12/1993 | |
| DE | 56843 | | 8/1982 | |
| EP | 056843 | A2 | 4/1982 | |
| EP | 167721 | A1 | 11/1985 | |
| EP | 0597261 | A1 | 10/1993 | G03F/1/1335 |
| EP | 0632229 | A1 | 1/1995 | F21V/8/00 |
| FR | 1363539 | | 10/1964 | |
| GB | 2124403 | A | 7/1984 | G02B/5/14 |
| JP | 52-21261 | | 2/1977 | B21D/53/26 |
| JP | 57-207204 | | 12/1979 | |
| JP | 58-159517 | | 3/1982 | |
| JP | 61-241712 | | 10/1986 | G02B/6/34 |
| JP | 61-245104 | | 10/1986 | |
| JP | 63-55503 | | 3/1988 | |
| JP | 63-75704 | | 4/1988 | G02B/6/10 |
| JP | 63-168604 | | 7/1988 | G02B/6/00 |
| JP | 63-180905 | | 7/1988 | G02B/6/00 |
| JP | 63-208001 | | 8/1988 | G02B/6/00 |
| JP | 01-11203 | | 1/1989 | |
| JP | 64-11203 | | 1/1989 | G02B/6/00 |
| JP | 3-111819 | | 5/1991 | G02F/1/1335 |
| JP | 7-248495 | | 3/1994 | |
| JP | 7-64085 | | 3/1995 | |
| JP | 7-270792 | | 10/1995 | G02F/1/1335 |
| NL | 162481 | | 8/1969 | G02B/5/14 |
| NL | 6912153 | | 12/1979 | |
| NL | 342747 | | 12/1989 | |
| WO | WO 94/12898 | | 6/1994 | G02B/5/02 |
| WO | WO 95/06889 | | 3/1995 | G02B/6/00 |
| WO | WO 95/07435 | | 3/1995 | F21V/8/00 |

OTHER PUBLICATIONS

"Optimum Excitation of Optical Surface Waves," R. Ulrich, *Journal of the Optical Society of America*, vol. 61, No. 11, Nov. 1971, pp. 1467–1476.

"Formation of Light–Guiding Interconnection in an Integrated Optical Circuit by Composite Tapered Film Coupling," Tien et al., *Applied Optics*, Aug. 1973, vol. 12, No. 8, pp. 1909–1916.

"Parts That Glow," A. Blumenfeld, and S. Jones, S.E., *Machine Design*, Jul. 1985, pp. 1–11.

"Dielectric Totally Internally Reflecting concentrators," Xiaohui, Ning, Roland Winston and Joseph O'Gallagher, *Applied Optics*, vol. 26, Jan. 15, 1987, pp. 300–305.

"Backlighting For Liquid crystal Display," *IBM Technical disclosure Bulletin*, vol. 29, No. 11, Apr. 1987, pp. 4848–4839.

"Optics of Two–Stage Photovoltaic Concentrators With Dielectric Second Stages," Xiaohui, Ning, Roland Winston and Joseph O'Gallagher, *Applied Optics*, vol. 26, Apr. 1987, pp. 1207–1212.

"flat panel Backlight Reflecting Device," R.L. Garwin and R.T, Hodgson, *IBM Technical Disclosure Bulletin*, vol. 31, No. 2, Jul. 1988, pp. 190–191.

"New Backlighting Technologies for LCDs," Hathaway et al., *Society for Information Display Digest*, vol. 22, May 1991, pp. 751–754.

"Directional Diffuser Lens Array for Backlit LCDs," R.I. McCartney and D. Syroid, *Japan Display*, 1992, pp. 259–262.

Retroflecting Sheet Polarizer, M.F. Weber, *SID 92 Digest*, May 1992, pp. 427–429.

"Flat–Panel Fluorescent Lamp Backlights with Reduced Illumination Angle: Backlighting optics at The Thermo–Dynamic Limit," Jacobson et al., *Society for Information Display, International Symposium Digest*, May 1992.

"Collimated Fluorescent Backlight," Biles, *Society for Photonic Instr. Displays*, vol. 1911, Feb. 1993, pp. 169–174.

"Flat Collimator: A Backlighting Assembly Utilizing Microprisms for High Energy Efficiency," Tai et al., *SID 94 Applications Digest*, Jun. 14, 1994, pp. 10–13.

"New Backlighting Technologies for LCDs," Hathaway, et al., *Society for Information Display Digest*, vol. 22, May 1991, pp. 751–754.

"A Non–Imaging CCFT Courier for LCD Backlighting," F. Lin, *SID 94 Applications Digest*, 1994, pp. 14–15.

"Optical Read–Only Memory," H.R. Foglia, *IBM Technical Disclosure Bulletin*, vol. 4, No. 4, Sep. 1961, p. 45.

* cited by examiner

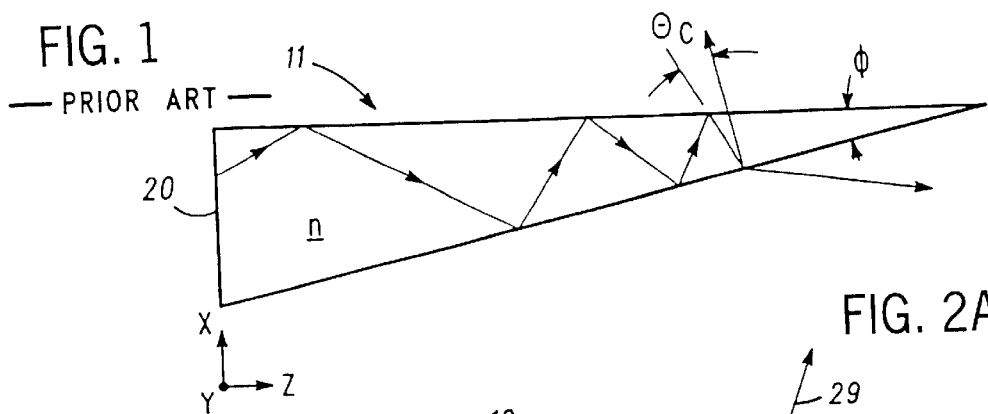
FIG. 1 -PRIOR ART-
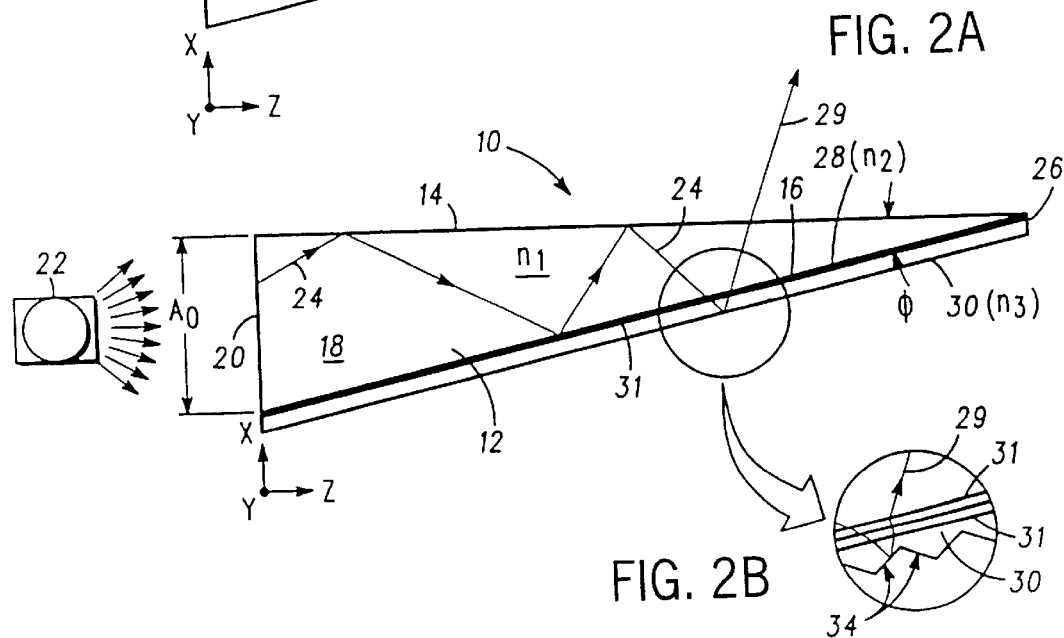
FIG. 2A
FIG. 2B
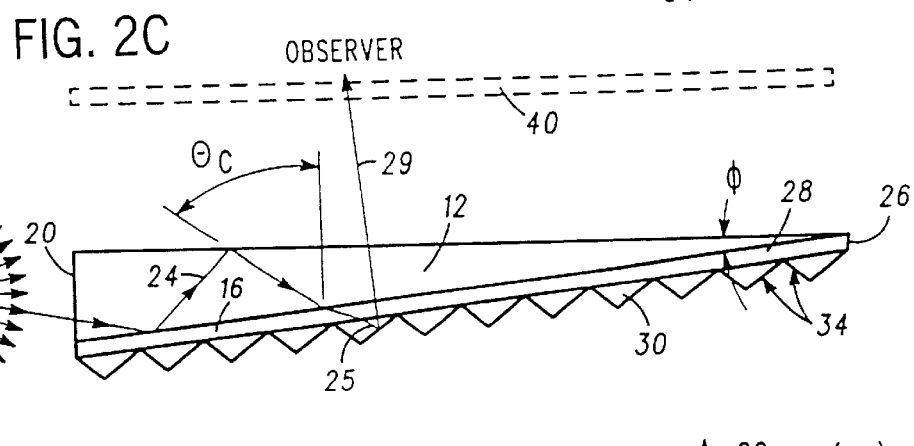
FIG. 2C
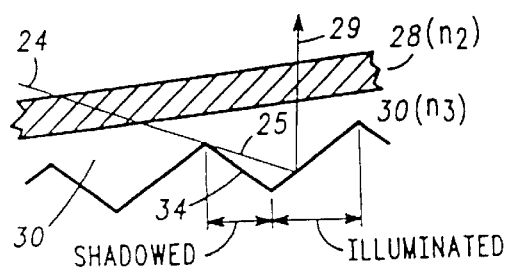
FIG. 2D

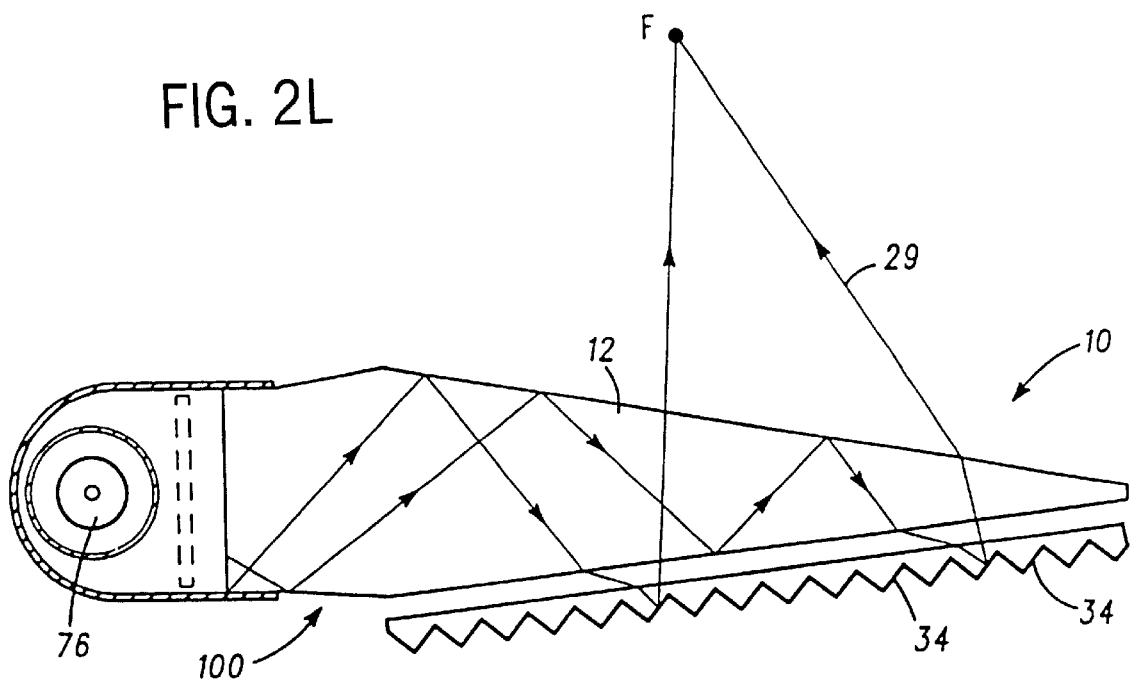
FIG. 2L
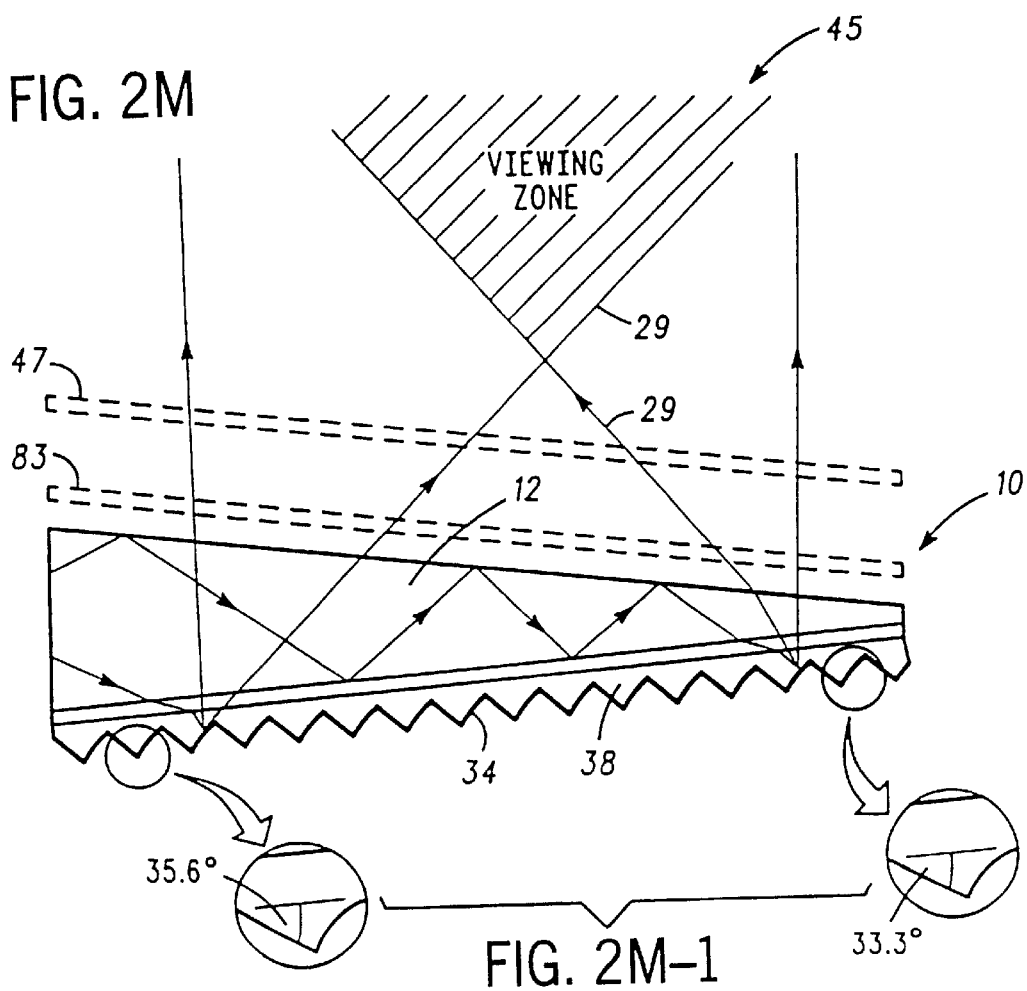
FIG. 2M
FIG. 2M-1

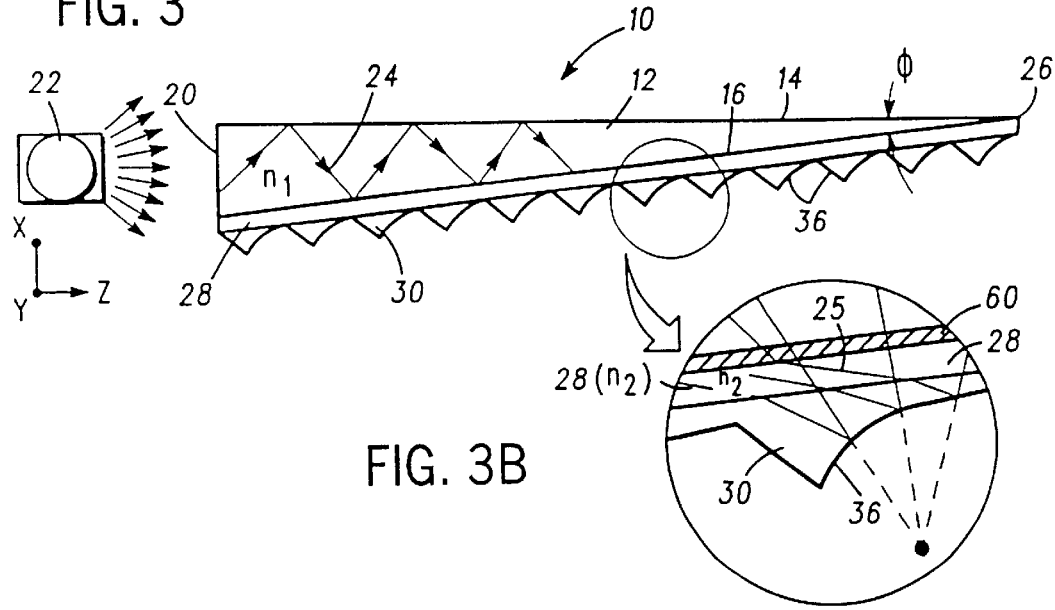
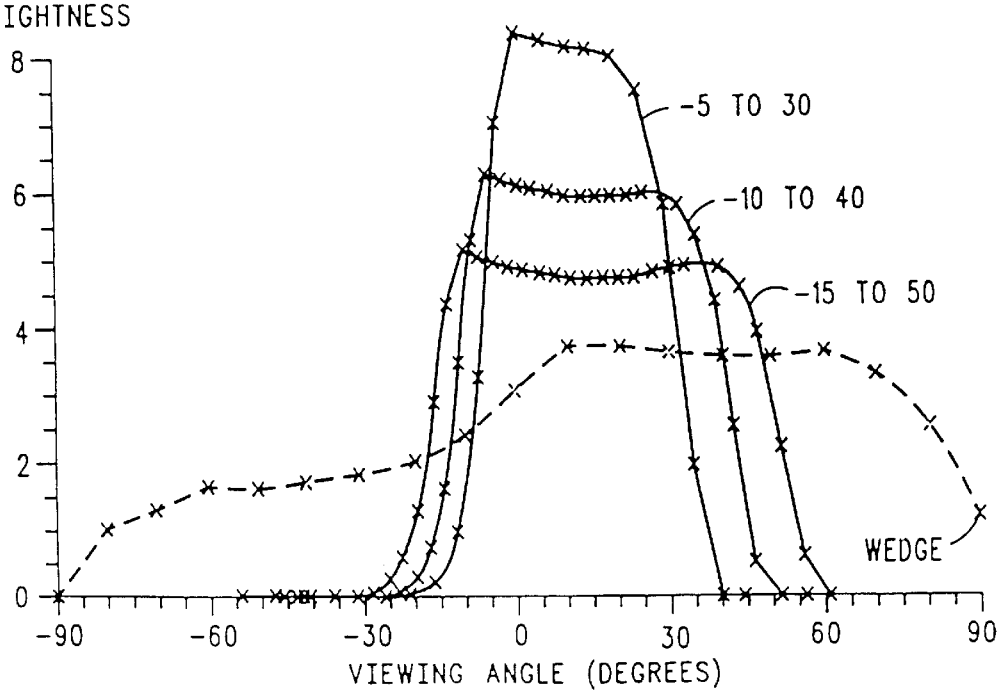

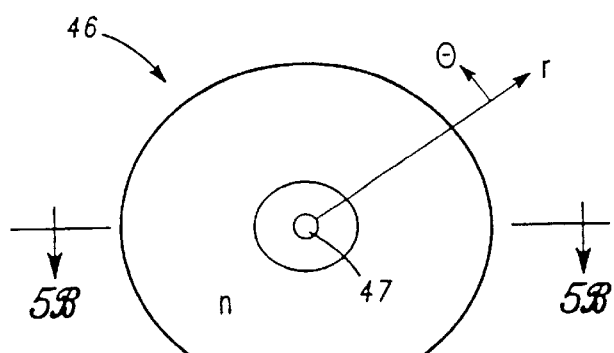
FIG. 5A
FIG. 5B
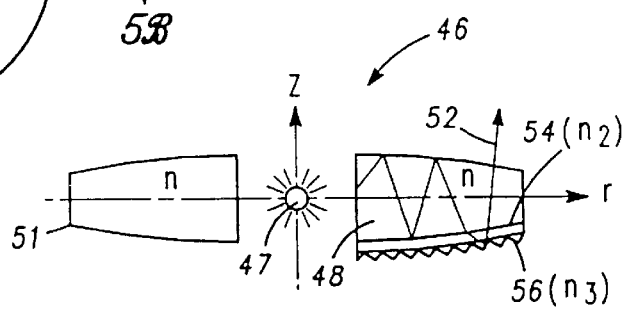
FIG. 6A
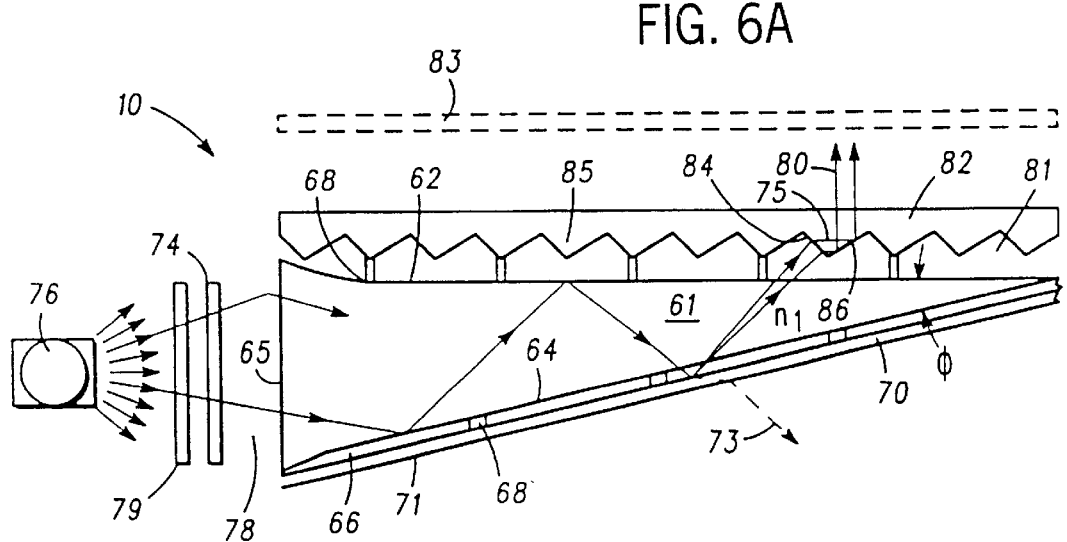
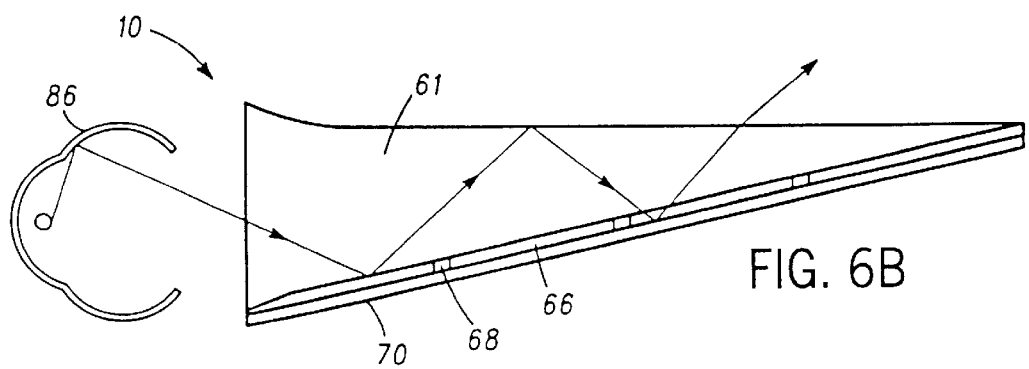
FIG. 6B

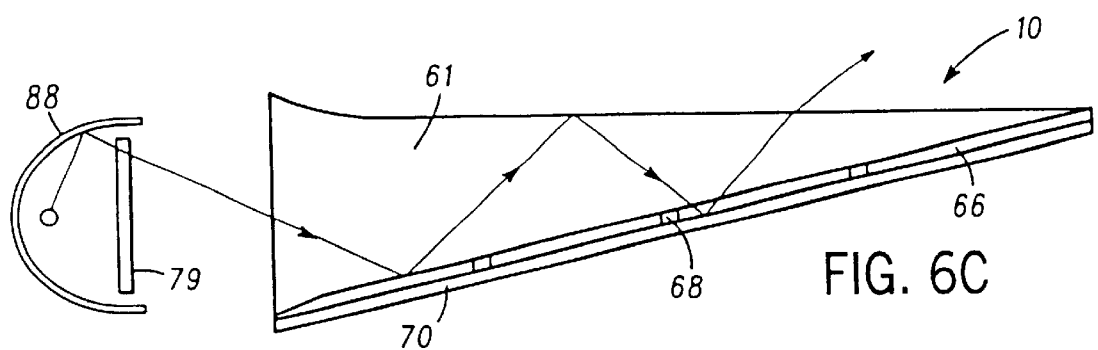
FIG. 6C
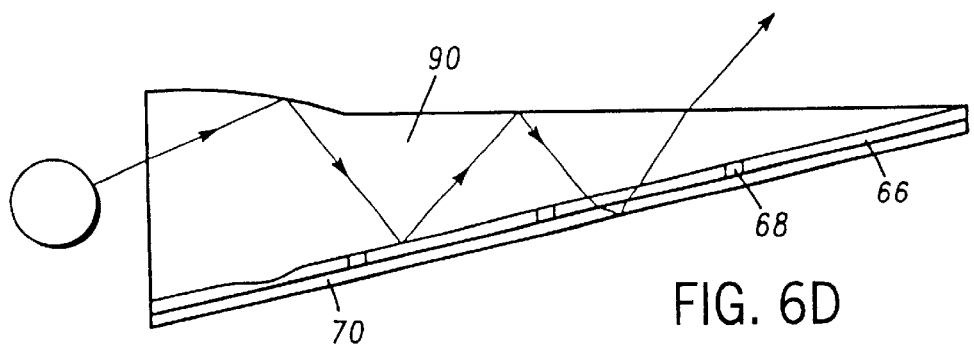
FIG. 6D
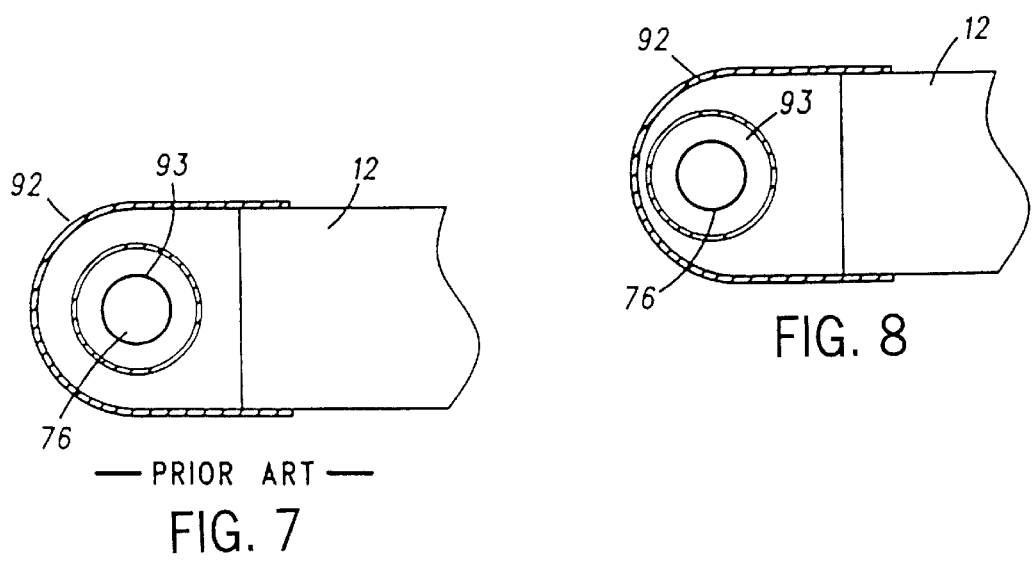
— PRIOR ART —
FIG. 7
FIG. 8

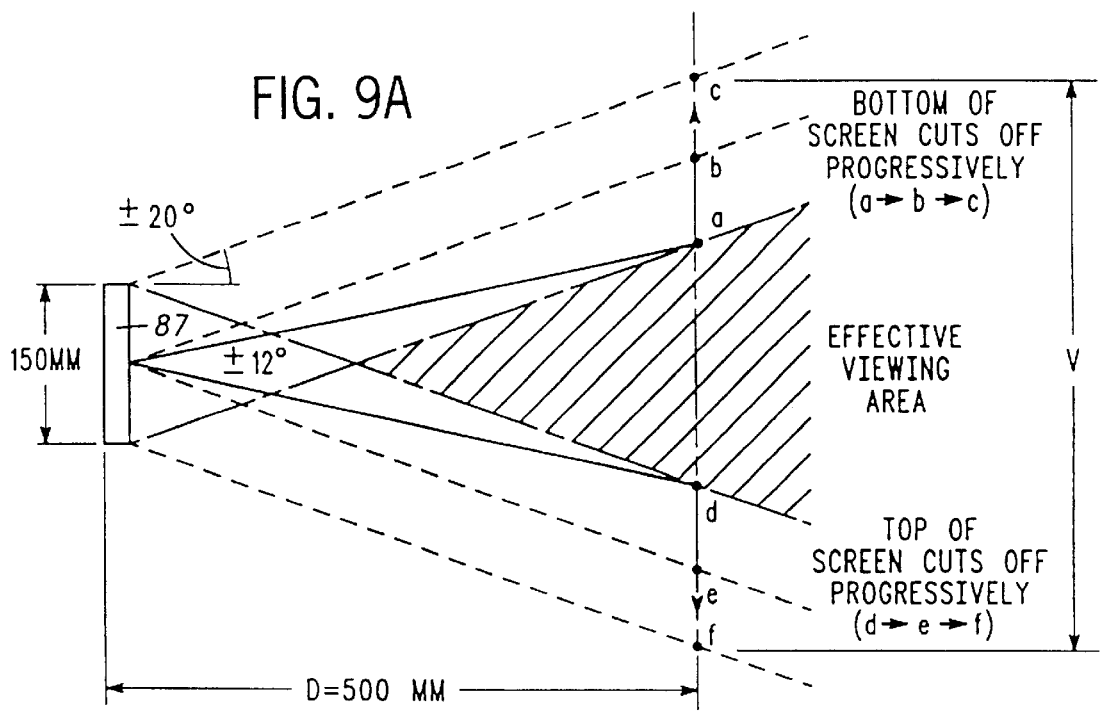
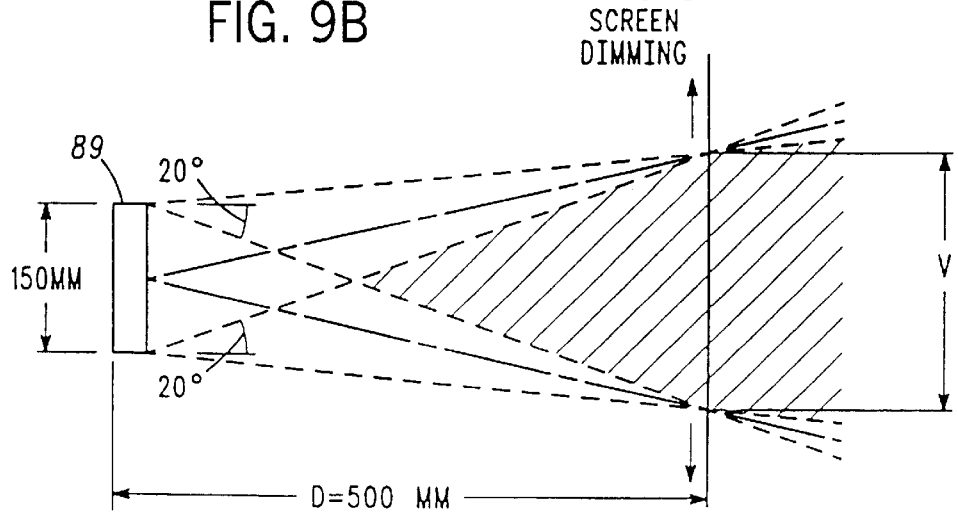

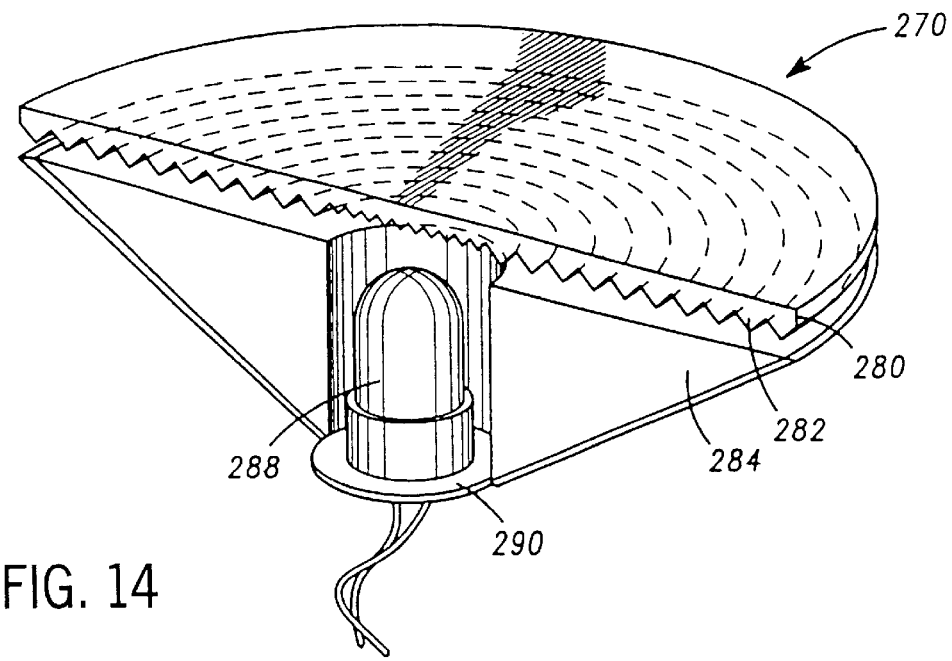
FIG. 14
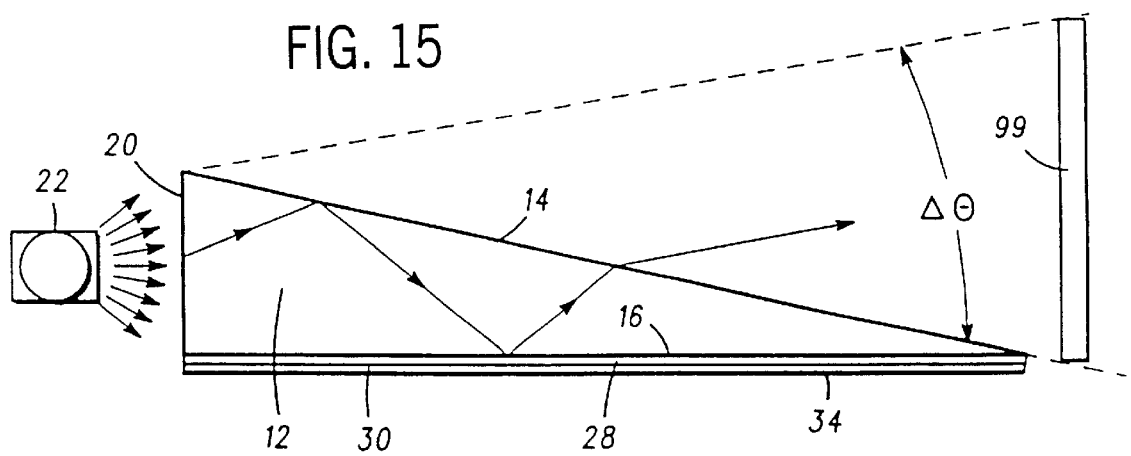
FIG. 15
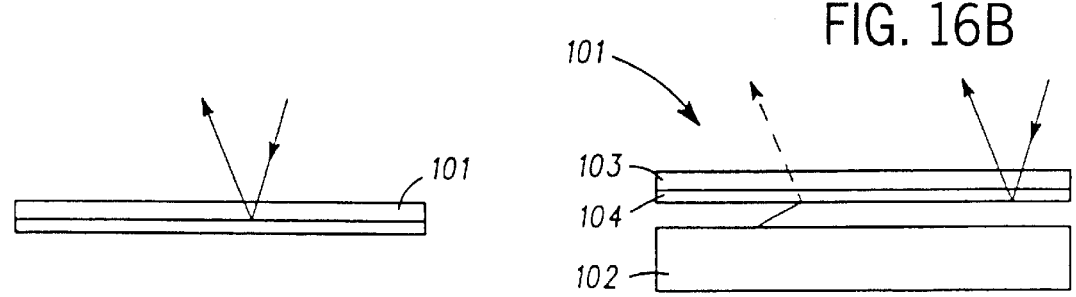
FIG. 16A
FIG. 16B

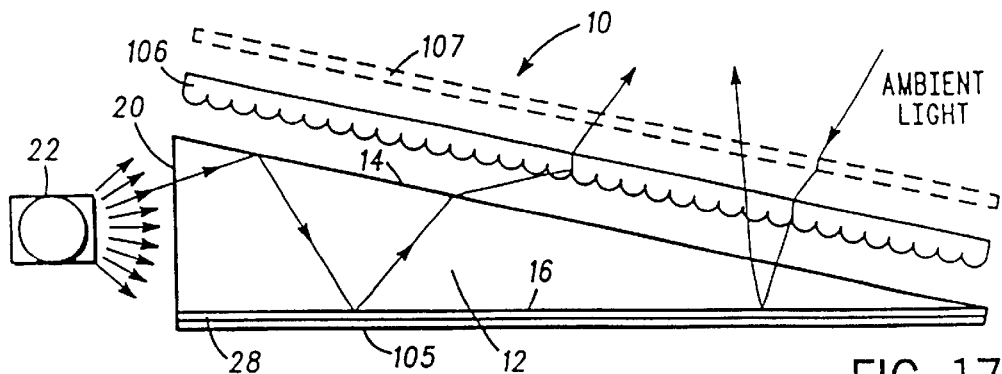
FIG. 17
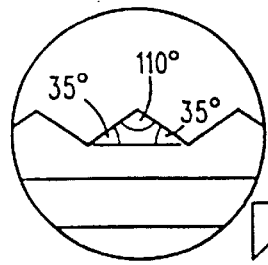
FIG. 18A-1
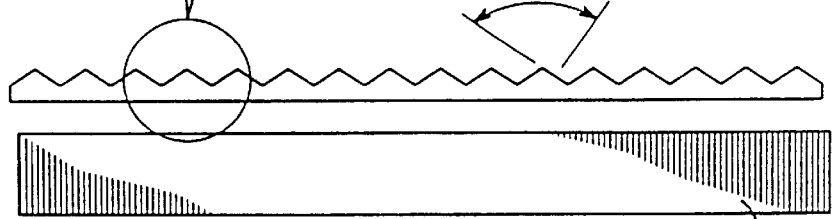
FIG. 18A
$\psi_1 = 35° - (0.133 \text{ DEG/MIN}) \cdot X$
$\psi_2 = 35° + (0.133 \text{ DEG/MIN}) \cdot X$
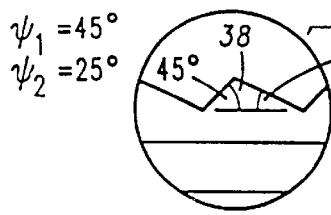
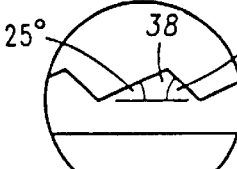
FIG. 18B-1
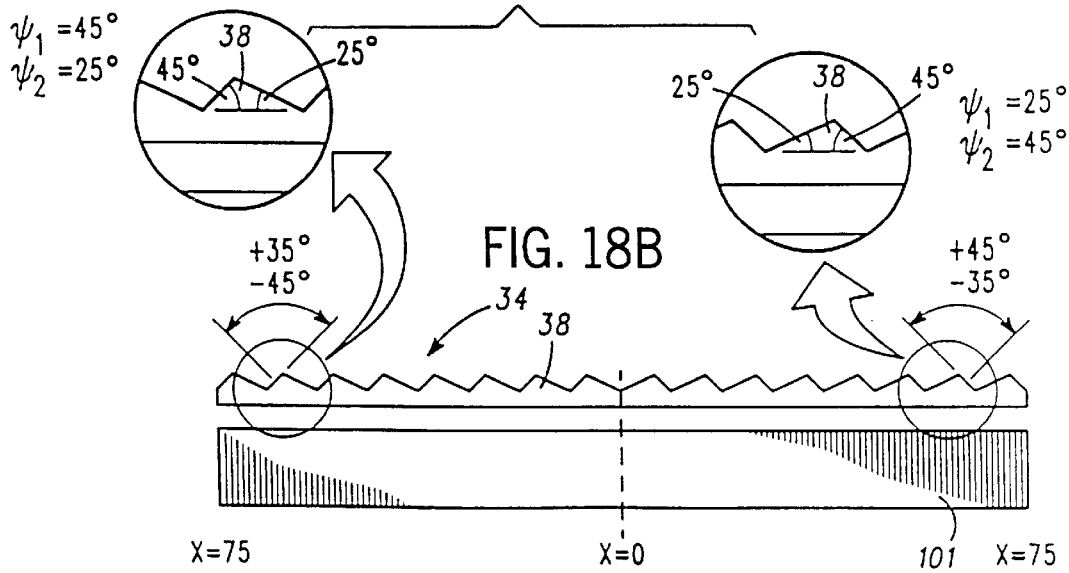
FIG. 18B

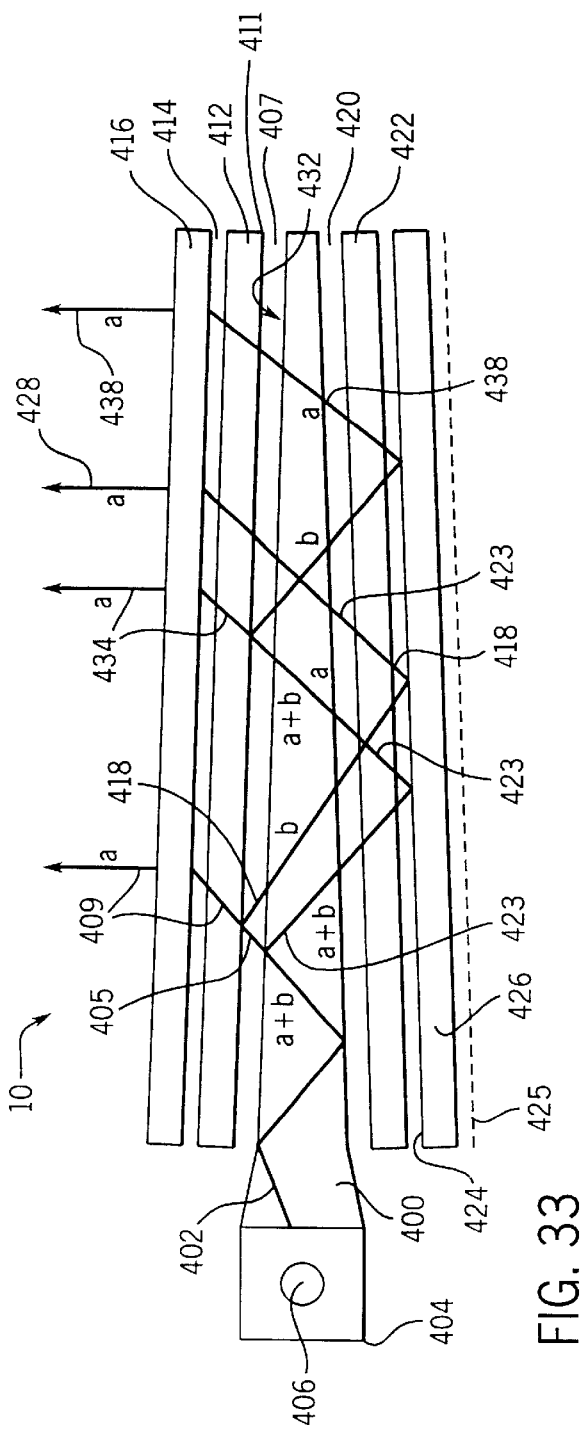

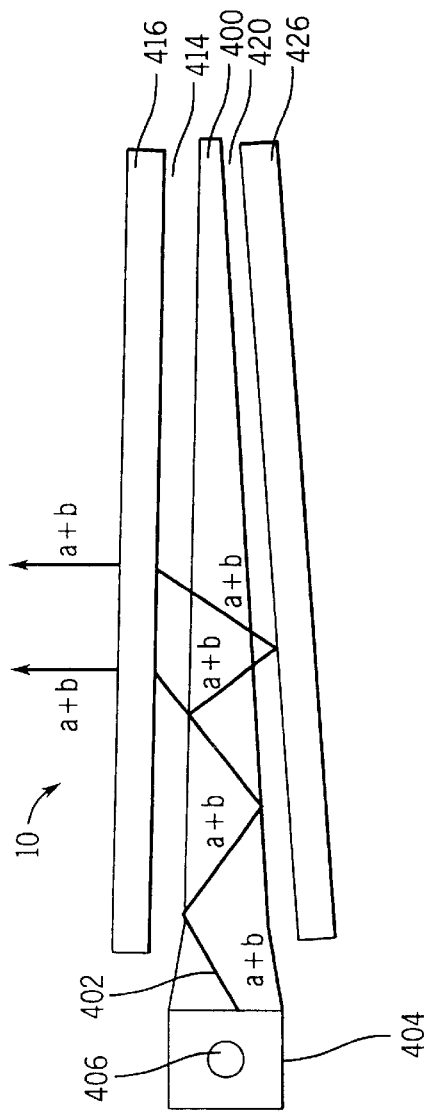
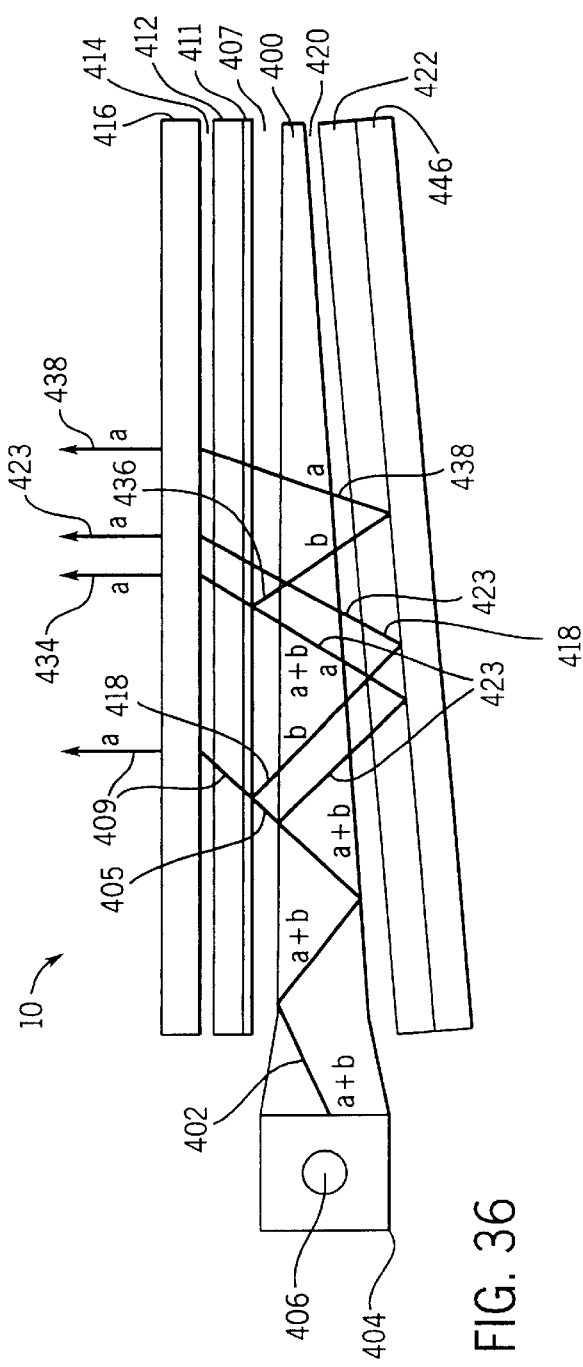
FIG. 35
FIG. 36

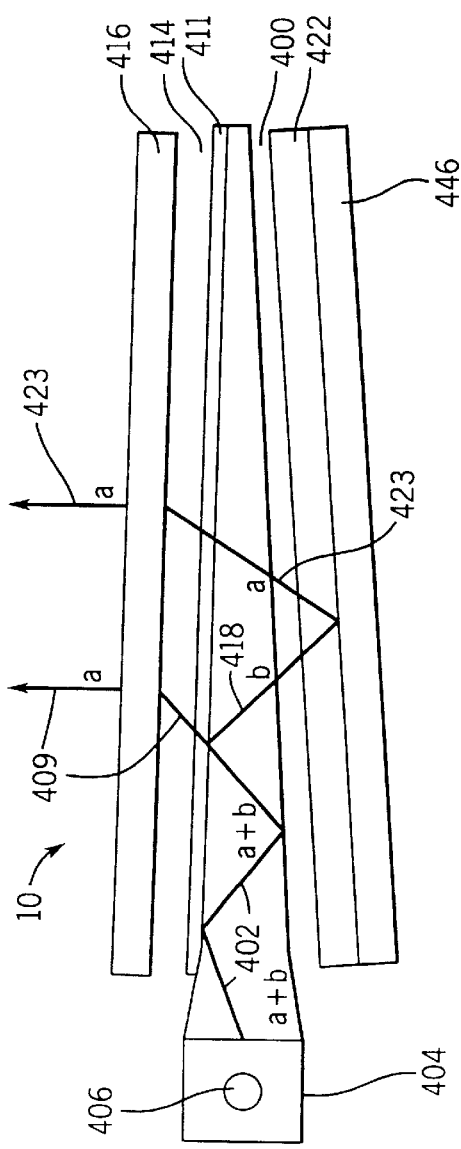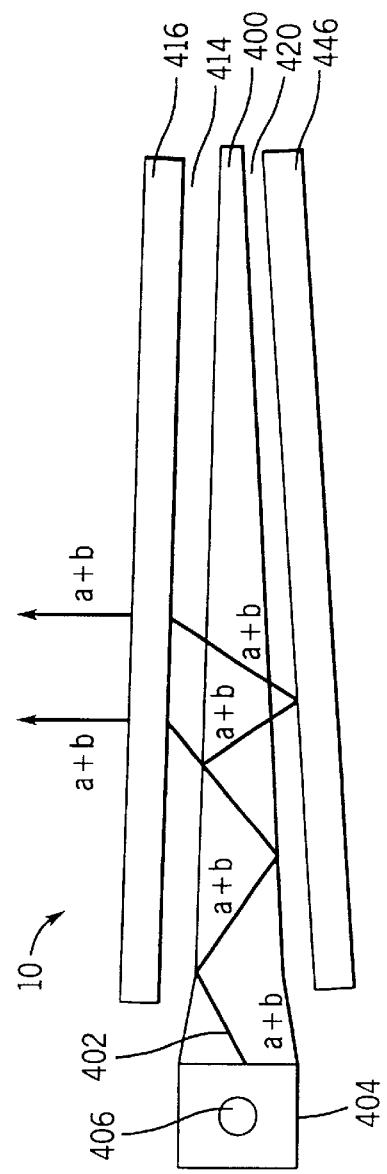

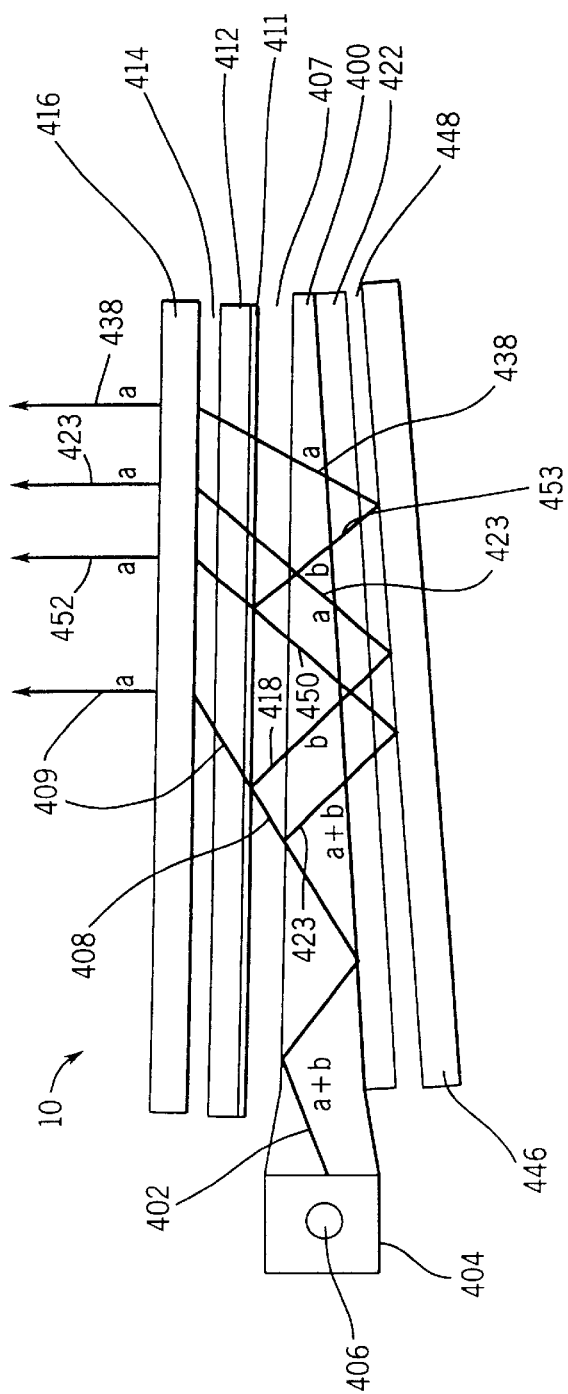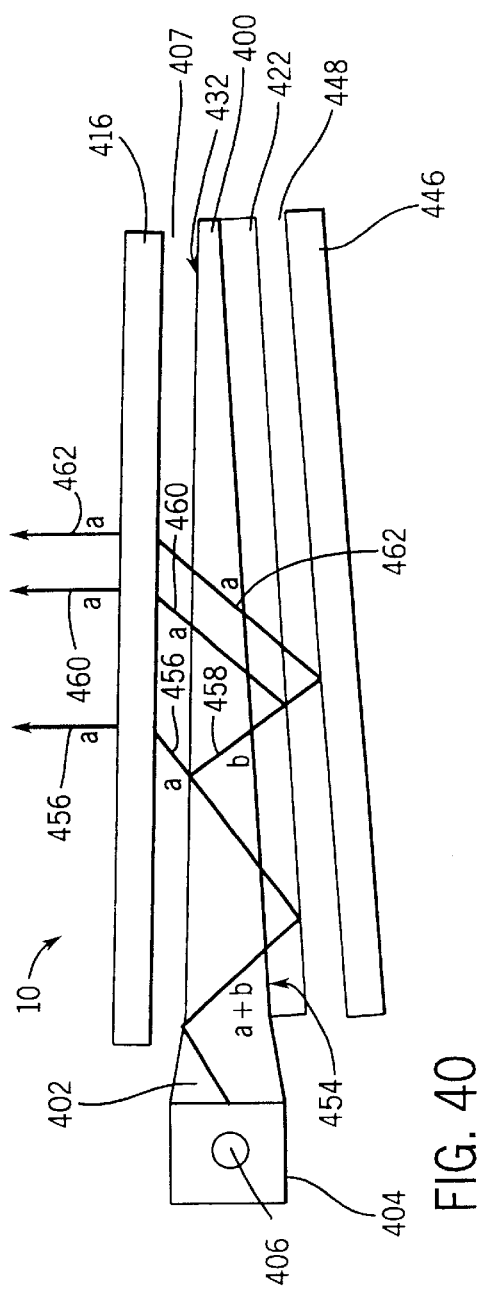
FIG. 39
FIG. 40

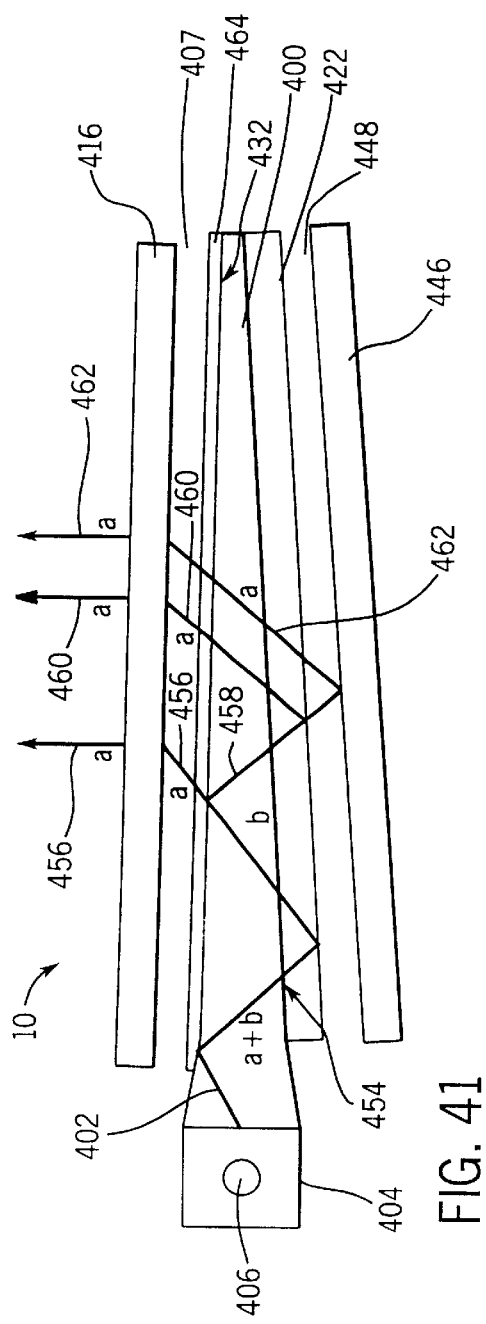
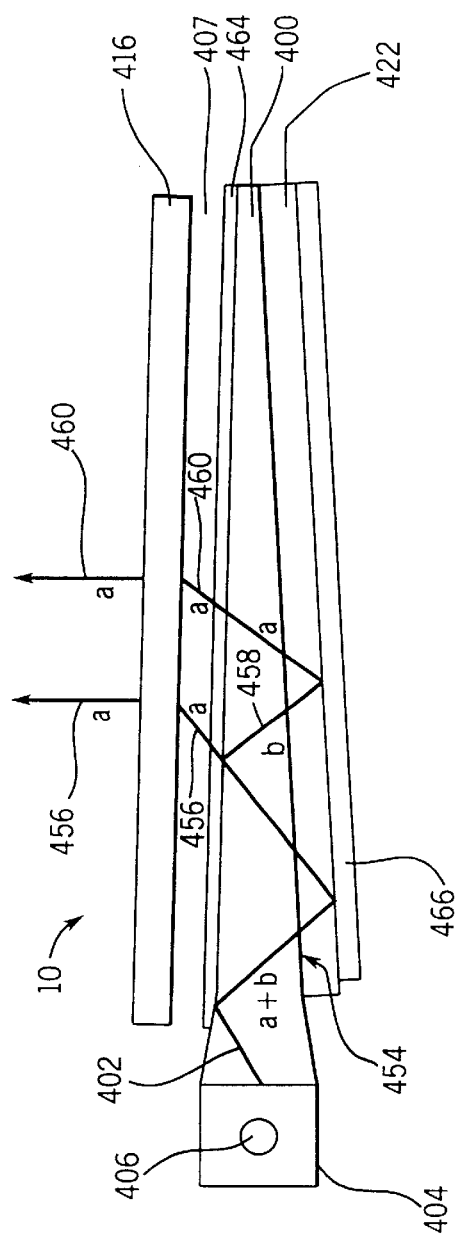
FIG. 41
FIG. 42

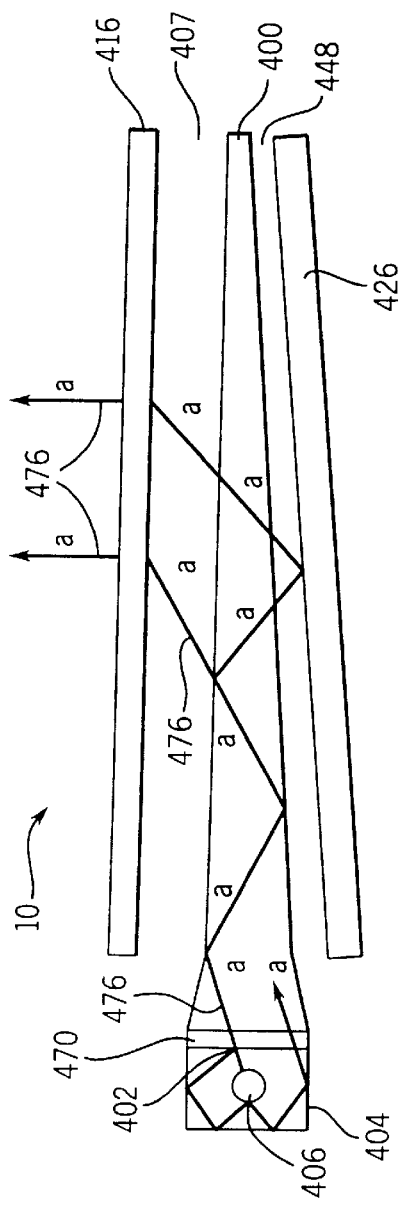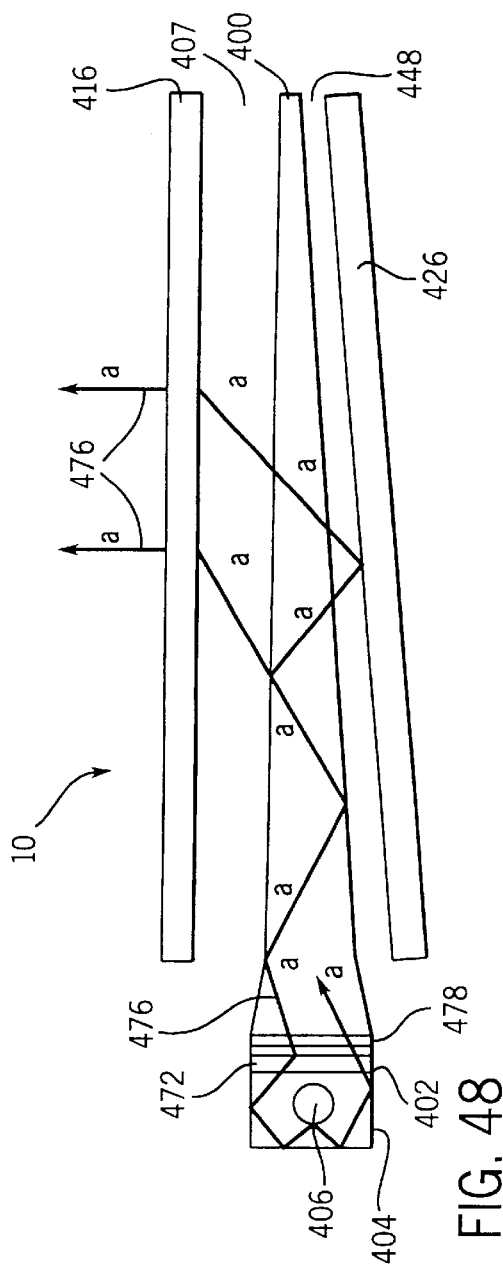
FIG. 47
FIG. 48

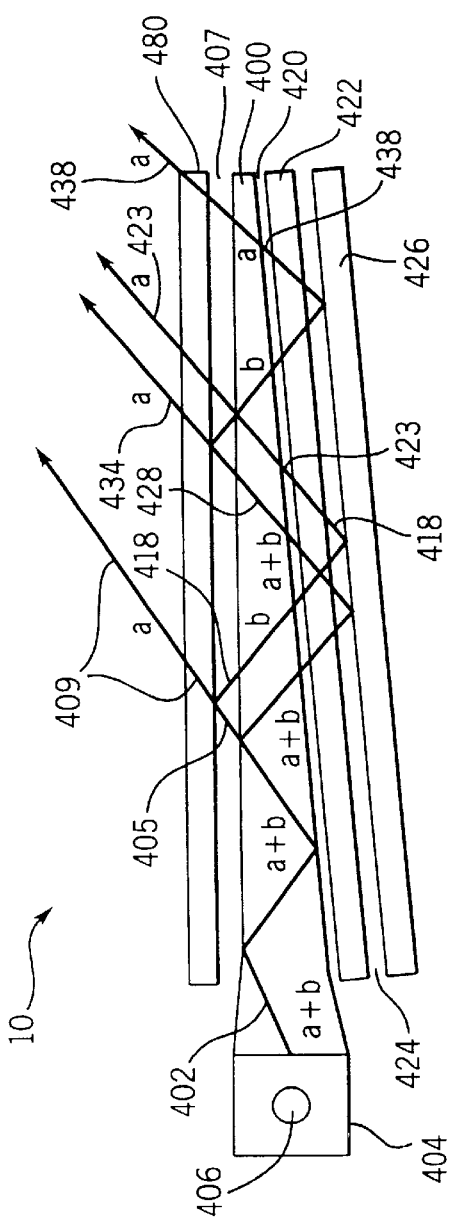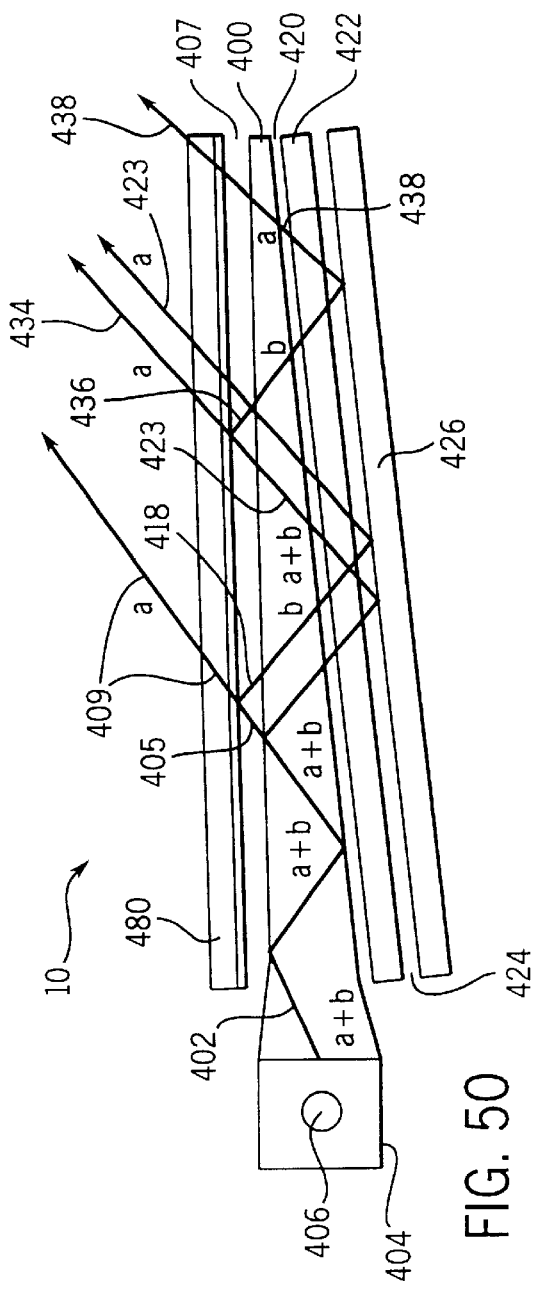
FIG. 49
FIG. 50

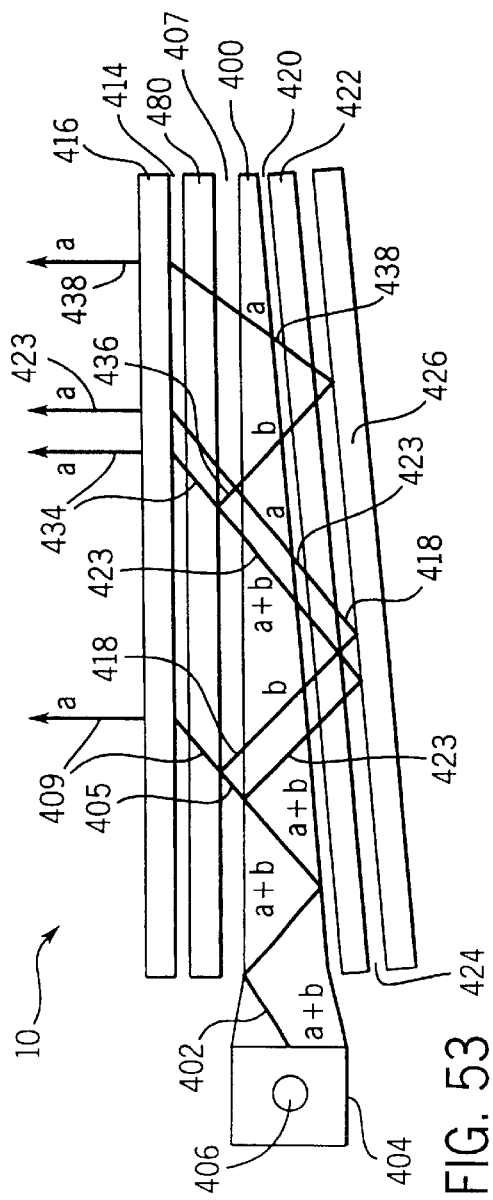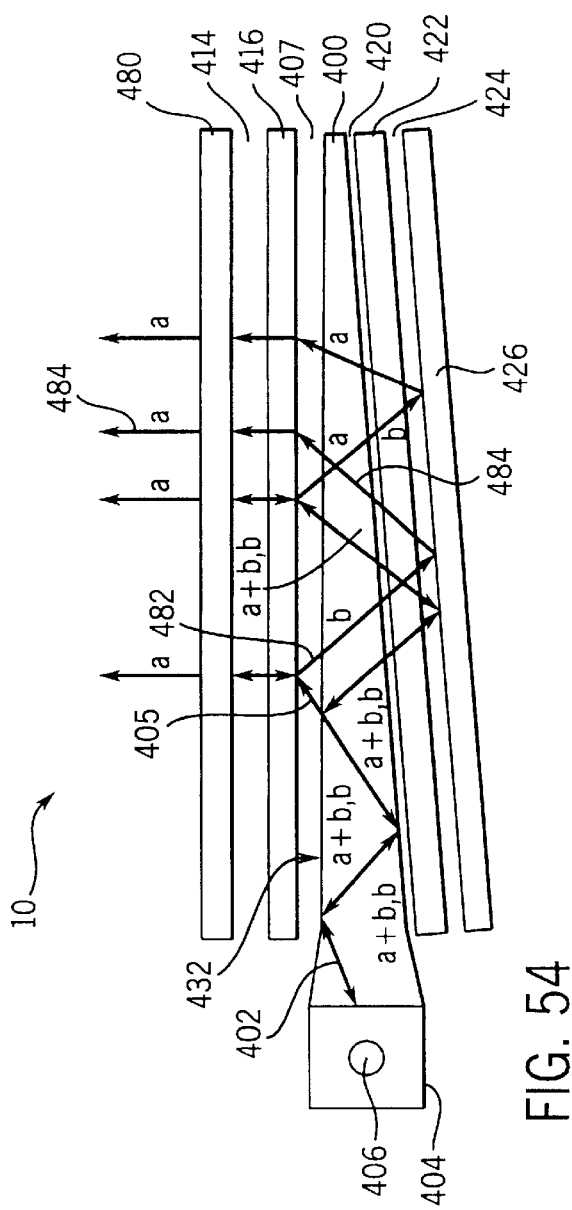

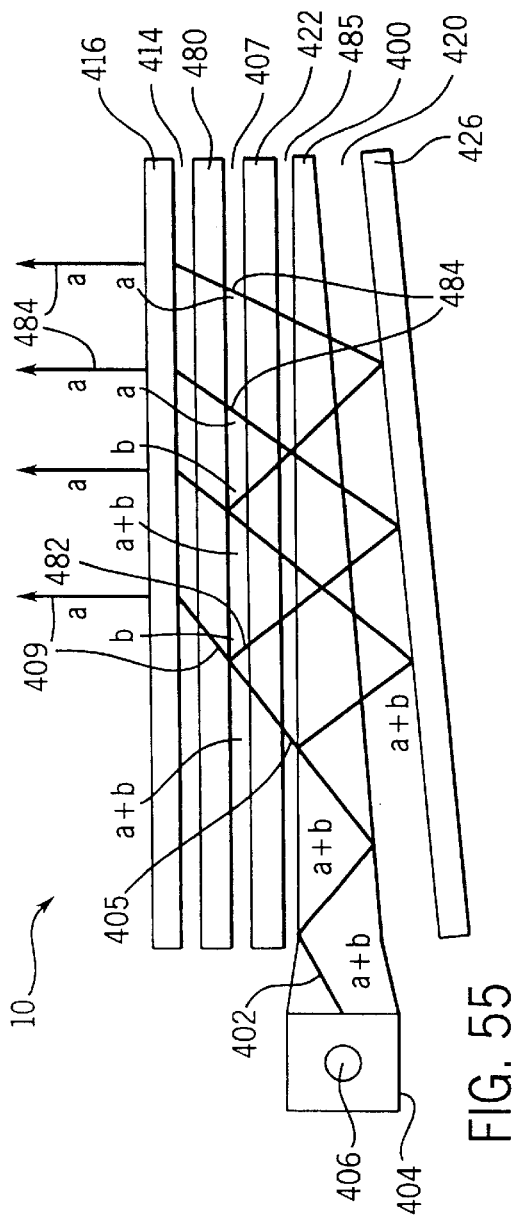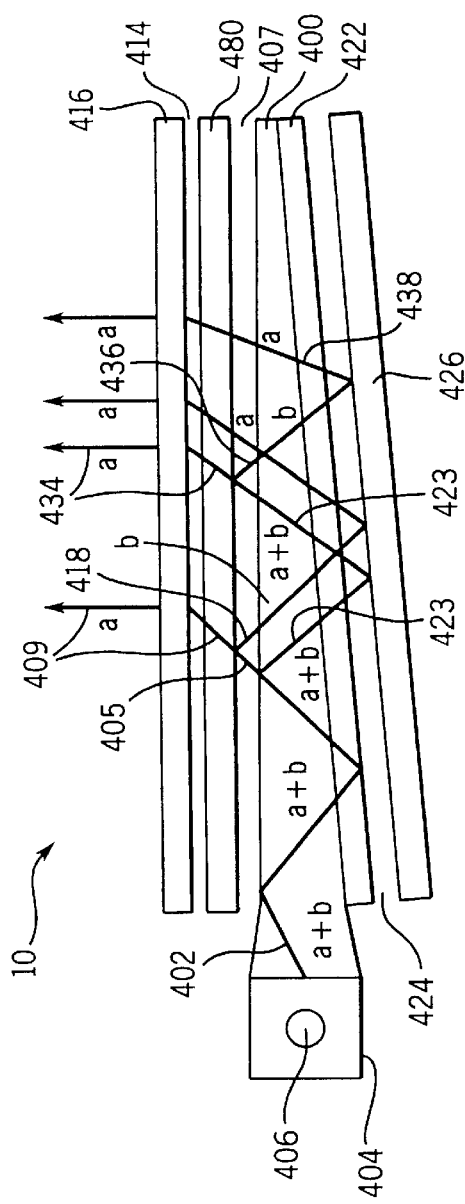
FIG. 55
FIG. 56

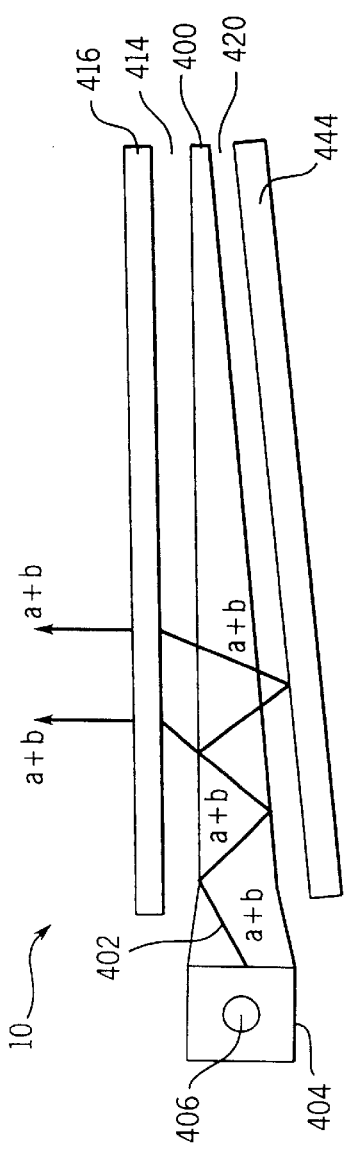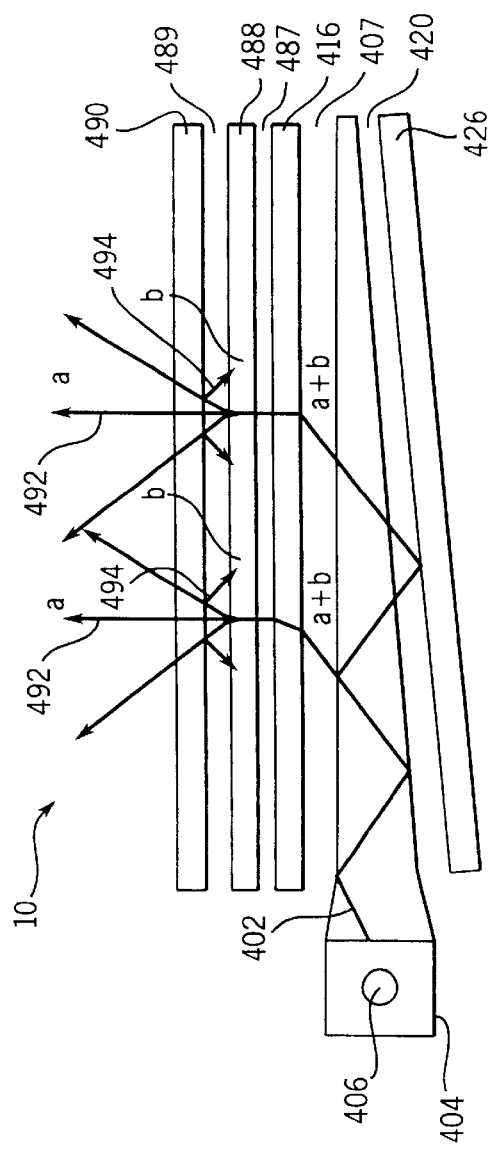

LUMINAIRE DEVICE

This application is a continuation of application Ser. No. 09/533,043 filed on Mar. 22, 2000 now U.S. Pat. No. 6,335,999; which is a continuation of application Ser. No. 08/999,149 filed on Dec. 29, 1997 now U.S. Pat. No. 6,044,196, which is a continuation of application Ser. No. 08/783,212 filed on Jan. 13, 1997 now U.S. Pat. No. 6,002,829; which is a continuation of application Ser. No. 08/486,784 filed on Jun. 7, 1995 now U.S. Pat. No. 5,594,830; which is a continuation of application Ser. No. 08/216,016 filed on Apr. 11, 1994 now U.S. Pat. No. 5,528,720; which is a continuation-in-part of application Ser. No. 08/029,883 filed on Mar. 11, 1993 now U.S. Pat. No. 5,303,322; and a continuation-in-part of application Ser. No. 07/855,838 filed on Mar. 23, 1992 now U.S. Pat. No. 5,237,641.

The present invention is concerned generally with a luminaire device for providing selected light illumination. More particularly, the invention is concerned with luminaires, such as a wedge, for backlighting by light output from a liquid crystal display layer and also by manipulating light polarization, recycling light of selected polarization and filtering selected light polarizations to enhance light illumination and image output.

A variety of applications exist for luminaire devices, such as, for liquid crystal displays. For flat panel liquid crystal displays, it is important to provide adequate backlighting while maintaining a compact lighting source. It is known to use wedge shaped optical devices for general illumination purposes. Light is input to such devices at the larger end; and light is then internally reflected off the wedge surfaces until the critical angle of the reflecting interface is reached, after which light is output from the wedge device. Such devices, however, have only been used to generally deliver an uncollimated lighting output and often have undesirable spatial and angular output distributions. For example, some of these devices use white painted layers as diffuse reflectors to generate uncollimated output light.

It is therefore an object of the invention to provide an improved optical device and method of manufacture.

It is another object of the invention to provide a novel three dimensional luminaire.

It is a further object of the invention to provide an improved multilayer tapered luminaire for optical purposes, such as for controlled utilization of light polarization.

It is still another object of the invention to provide a novel tapered luminaire device for controlled transmission or concentration of light.

It is an additional object of the invention to provide a novel optical device for providing collimated polarized light illumination from the device.

It is yet a further object of the invention to provide an improved tapered luminaire having a polarization filter layer.

It is still another object of the invention to provide a novel luminaire allowing conversion of polarized light to enhance illumination output from the invention.

It is yet a further object of the invention to provide an improved illumination system wherein a combination of a polarization filter layer and a light redirecting layer are utilized to provide improved light illumination over a controlled angular range of output to the viewer.

It is still a further object of the invention to provide a novel luminaire optical device wherein a combination of a polarization filter, polarization converting layer and a post LCD diffuser layer are used to enhance light illumination from the optical device.

It is yet a further object of the invention to provide an improved luminaire optical device wherein an LCD layer is disposed adjacent an overlying post LCD diffuser layer to enable control of light distribution over broader angles to viewers without loss of light output or image qualities.

It is also another object of the invention to provide an improved luminaire optical device having an internal polarization cavity for converting luminaire light to one polarization state for enhanced illumination gain.

It is yet an additional object of the invention to provide a novel luminaire optical device having a selected arrangement of a structured back reflector layer with a polarization beam splitter to enhance illumination efficiency.

It is still another object of the invention to provide an improved luminaire optical device having a polarization converting layer interacting with a structural back reflector layer to provide enhanced illumination efficiency.

It is also a further object of the invention to provide a novel luminaire optical device having a polarization beam splitter, a quarter wave converting layer and a microstructural back reflector layer to provide enhanced illumination gain.

It is yet another object of the invention to provide an improved luminaire optical device having a selectable arrangements of polarization splitting layers including one of (a) the splitting layer evaporated directly onto a base layer of the luminaire, and (b) evaporation of the splitting layer onto a separate glass plate.

It is also an additional object of tie invention to provide a novel luminaire optical device including a quarter plate polarization converting element in one of a set of selectable arrangements of (a) disposed between a back reflector and luminaire base layer with air layers between, (b) coupled directly to a back reflector with an air layer between the luminaire base layer and the directly coupled layers, (c) coupled directly to the luminaire base layer with an air layer between the converting element and a metallic back reflector layer or a BEF type of back reflector, (d) coupled directly to the luminaire base layer on one side and a high efficiency mirror on the other side, and (e) coupled directly to the luminaire base layer on one side thereof and an air layer and back reflector on the other side of the base layer.

It is yet a further object of the invention to provide an improved luminaire optical device having a textured base layer for enhancing illumination properties.

It is still another object of the invention to provide a novel luminaire optical device utilizing a film based reflective polarizer in combination with a converter layer and BEF type back reflector.

It is also a further object of the invention to provide an improved luminaire optical device having a base layer separated by various air layers with polarized splitter, redirecting, converter, and back reflector layers disposed above and/or below the base layer.

It is yet an additional object of the invention to provide a novel luminaire optical device including a back reflector below a base layer and a redirecting layer adjacent the top surface of the base layer and a reflective polarizer and redirecting/diffuser layer positioned above the redirecting layer.

Other objects, features and advantages of the present invention will be readily apparent from the following description of the preferred embodiments thereof, taken in conjunction with the accompanying drawings described below.

BRIEF DESCRIPTION OF THE DRAWINGS

FIG. 2A illustrates a multilayer tapered luminaire device constructed in accordance with the invention; FIG. 2B is a magnified partial view of the junction of the wedge layer, the first layer and the second faceted layer; FIG. 2C is an exaggerated form of FIG. 2A showing a greatly enlarged second faceted layer; FIG. 2D is a partial view of the junction of the three layers illustrating the geometry for brightness determinations; FIG. 2L shows a reflecting faceted layer coupled to a wedge device; FIG. 2M shows a reflecting faceted layer with curved facet angles and coupled to a wedge device.

FIG. 3 is a composite Figure including FIGS. 3A and 3B and FIG. 3A illustrates a multilayer wedge device with curved facets on the ambient side of the second layer and FIG. 3B shows a magnified partial view of the junction of the various layers of the device;

FIG. 4A shows calculated brightness performance over angle for an asymmetric range of angles of illumination.

FIG. 5A shows a top view of a disc shaped light guide and FIG. 5B illustrates a cross section taken along 5B—5B in FIG. 5A;

FIG. 6A shows a cross sectional view of a multilayer tapered luminaire device with an air gap layer included; FIG. 6B shows another tapered luminaire in cross section with a compound parabolic light source/concentrator; FIG. 6C illustrates another tapered luminaire in cross section with a variable parametric profile light source and a lenticular diffuser; and FIG. 6D shows another tapered luminaire in cross section with non-monotonic wedge layer thickness;

FIG. 7 illustrates a reflective element disposed concentrically about a light source;

FIG. 8 illustrates a reflective element disposed about a light source with maximum displacement between the reflector center of curvature and the center of the light source;

FIG. 9A illustrates use of a redirecting layer to provide a substantially similar angular distribution emanating from all portions of the device and FIG. 9B illustrates use of a redirecting layer to vary angular distribution emanating from different portions of the device, and specifically to focus the various angular distributions to enhance their overlap at a selected target distance;

FIG. 14 shows a tapered disk luminaire including a faceted redirecting layer;

FIG. 15 illustrates a luminaire operating to provide a collimated light output distribution;

FIG. 16A shows a prior art ambient mode LCD and FIG. 16B illustrates a prior art transflective LCD unit;

FIG. 17 shows a luminaire operative in ambient and active modes with a faceted redirecting layer and a lenticular diffuser;

FIG. 18A illustrates a luminaire with an array of microprisms for a faceted surface disposed over a diffuse backlight and with the microprisms having equal angles on both sides, but each microprism having progressively changing facet angles across the face; FIG. 18B shows a microprism array as in FIG. 18A with the sides of each microprism having different angles varying again across the faceted surface;

FIG. 33 illustrates a luminaire system including a quarter wave converting layer and BEF based type of back reflector below the base layer and polarization splitter and redirecting layer above the base layer;

FIG. 34 illustrates another form of FIG. 33 without the converting layer;

FIG. 35 illustrates a luminaire system including a BEF based type of back reflector below the base layer and a light redirecting layer above the base layer;

FIG. 36 illustrates another form of FIG. 33 substituting a metallic back reflector for the BEF based type of back reflector layer;

FIG. 37 illustrates another form of FIG. 36 except the polarization splitting layer is directly disposed onto the base layer;

FIG. 38 illustrates another form of FIG. 35 except the back reflector layer is a metallic back reflector layer;

FIG. 39 illustrates another form of FIG. 36 except the quarter wave plate converting layer is laminated to the base layer;

FIG. 40 illustrates a luminaire system with a polarization cavity formed by the base layer and a laminated converting layer;

FIG. 41 illustrates another form of FIG. 40 but a polarization splitting layer is directly disposed onto the top surface of the base layer;

FIG. 42 illustrates a variation on FIGS. 40 and 41 with a back reflector layer directly coupled to the converting layer laminated to the bottom surface layer of the base layer;

FIG. 47 illustrates a luminaire system having a polarization splitting layer disposed at the input to the base layer;

FIG. 48 illustrates a variation on FIG. 47 with a polarization converting layer on the lamp cavity side of the polarization splitting layer;

FIG. 49 illustrates a variation on FIG. 33, not including a redirecting layer, the base layer being textured and a film based reflective polarizer substituted for the interference layer;

FIG. 50 illustrates a variation on FIG. 49, not having the textured base layer;

FIG. 53 illustrates a variation on FIG. 33 with the reflective polarizer layer substituted for the interference layer and the base layer is textured;

FIG. 54 illustrates a variation on FIG. 53 except the redirecting layer is switched with the reflective polarizer layer;

FIG. 55 illustrates a variation on FIG. 53 with the converting layer positioned above the base layer;

FIG. 56 illustrates a variation on FIG. 53 with the converting layer laminated to the base layer;

FIG. 57 illustrates a variation on FIG. 35 using a textured form of the base layer;

FIG. 58 illustrates a polarized luminaire system operated without use of a separate converter layer;

DETAILED DESCRIPTION OF PREFERRED EMBODIMENTS

Figure 2E:
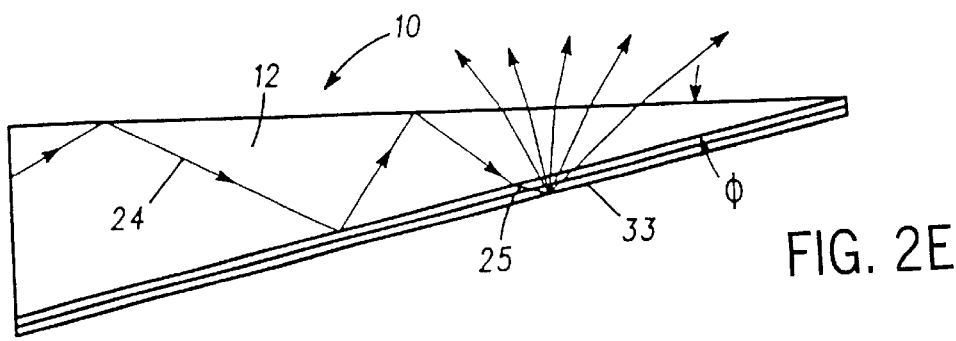
FIG. 2E is a multilayer wedge device with a light redirecting, internally transmitting layer on the bottom.

A multilayer luminaire device constructed in accordance with one form of the invention is illustrated in FIG. 2 and indicated generally at 10. A prior art wedge 11 is shown generally in FIG. 1. In this wedge 11 the light rays within the wedge 11 reflect from the surfaces until the angle of incidence is less than the critical angle ($\sin^{-1} 1/n$) where n is the index of refraction of the wedge 11. The light can exit equally from both top and bottom surfaces of the wedge 11, as well as exiting at grazing angles.

The multilayer luminaire device 10 (hereinafter "device 10") shown in FIG. 2A includes a base or wedge layer 12 which has a characteristic optical index of refraction of $n_1$. The term "wedge layer" shall be used herein to include all geometries having converging top and bottom surfaces with wedge shaped cross sectional areas. The x, y and z axes are indicated within FIGS. 2A and 2C with the "y" axis perpendicular to the paper. Typical useful materials for the wedge layer 12 include almost any transparent material, such as glass, polymethyl methacrylate, polystyrene, polycarbonate, polyvinyl chloride, methyl methacrylate/styrene copolymer (NAS) and styrene/acrylonitrile. The wedge layer 12 in FIG. 2A further includes a top surface 14, a bottom surface 16, side surfaces 18, edge 26 and a back surface 20 of thickness to spanning the top, bottom and side surfaces. A light source, such as a tubular fluorescent light 22, injects light 24 through the back surface 20 into the wedge layer 12. The light 24 is internally reflected from the various wedge layer surfaces and is directed along the wedge layer 12 toward the edge 26. Other possible light sources can be used and will be described hereinafter. Generally, conventional light sources provide substantially incoherent, uncollimated light; but coherent, collimated light can also be processed by the inventions herein.

For the case where the surfaces 14 and 16 are flat, a single angle of inclination ϕ for a linear wedge is defined by the top surface 14 and the bottom surface 16. In the case of nonlinear wedges, a continuum of angles ϕ are definable; and the nonlinear wedge can be designed to provide the desired control of light output or concentration. Such a nonlinear wedge will be described in more detail later.

In the embodiment of FIG. 2A a first layer 28 is coupled to the wedge layer 12 without any intervening air gap, and the first layer 28 has an optical index of refraction $n_2$ and is optically coupled to the bottom surface 16. The first layer 28 can range in thickness from a few light wavelengths to much greater thicknesses and accomplish the desired functionality. The resulting dielectric interface between the wedge layer 12 and the first layer 28 has a higher critical angle than at the interface between the wedge layer 12 and ambient. As will be apparent hereinafter, this feature can enable preferential angular output and collimation of the light 24 from the device 10.

Coupled to the first layer 28 is a second layer 30 (best seen in FIG. 2B) having an optical index of refraction $n_3$ which is greater than $n_2$, and in some embodiments preferably greater than $n_1$. This configuration then allows the light 24 to leave the first layer 28 and enter the second layer 30. In the embodiment of FIG. 2A there are substantially no intervening air gaps between the first layer 28 and the second layer 30. In the preferred form of the invention illustrated in FIG. 2A, $n_1$ is about 1.5, $n_2 < 1.5$ and $n_3 \geq n_1$. Most preferably, $n_1 = 1.5$, $n_2 < 1.5$ (such as about one) and $n_3 \geq n_1$.

In such a multilayer configuration for the device 10 shown in FIG. 2, the wedge layer 12 causes the angle of incidence for each cyclic time of reflection from the top surface 14 to decrease by the angle of inclination 2ϕ (relative to the normal to the plane of the bottom surface 16). When the angle of incidence with the bottom surface 16 is less than the critical angle characteristic of the interface between the wedge layer 12 and the first layer 28, the light 24 is coupled into the first layer 28. Therefore, the first layer 28 and the associated optical interface properties form an angular filter allowing the light 24 to pass when the condition is satisfied: $\theta < \theta_c = \sin^{-1}(n_2/n_1)$. That is, the described critical angle is higher than for the interface between air and the wedge layer 12. Therefore, if the two critical angles differ by more than 6ϕ, nearly all of the light 24 will cross into the interface between the wedge layer 12 and the first layer 28 before it can exit the wedge layer 12 through the top surface 14. Consequently, if the two critical angles differ by less than ϕ, a substantial fraction, but less than half, of the light can exit the top surface 14. If the two angles differ by more than ϕ and less than 6ϕ, then substantially more than half but less than all the light will cross into the wedge layer 12 and the first layer 28 before it can exit the wedge layer 12 through the top surface 14. The device 10 can thus be constructed such that the condition $\theta < \theta_c$ is satisfied first for the bottom surface 16. The escaping light 24 (light which has entered the layer 28) will then enter the second layer 30 as long as $n_3 > n_2$, for example. The light 24 then becomes a collimated light 25 in the second layer 30 provided by virtue of the first layer 28 being coupled to the wedge layer 12 and having the proper relationship between the indices of refraction.

In order to generate an output of the light 24 from the device 10, the second layer 30 includes means for scattering light, such as a paint layer 33 shown in FIG. 2E or a faceted surface 34 shown in both FIGS. 2B and 2C. The paint layer 33 can be used to preferentially project an image or other visual information. The paint layer 33 can comprise, for example, a controllable distribution of particles having characteristic indices of refraction.

Figure 2F:
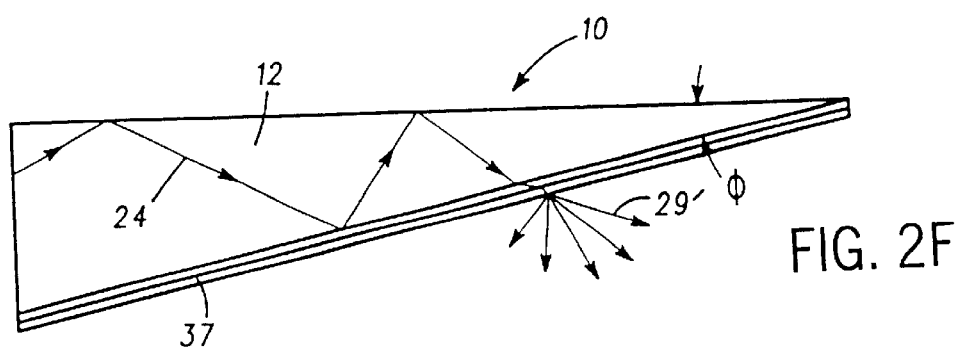
FIG. 2F shows a wedge device with a lower surface translucent layer.

By appropriate choice, light can also be redirected back through the wedge layer 12 and into ambient (see light 29 in FIGS. 2A and 2C) or output directly into ambient from the second layer 30 (see light 29' in FIG. 2F).

In other forms of the invention a further plurality of layers with associated "n" values can exist. In one preferred form of the invention the index of the lowest index layer can replace $n_2$ in equations for numerical aperture and output angle (to be provided hereinafter). Such further layers can, for example, be intervening between the wedge layer 12 and the first layer 28, intervening between the first layer 28 and the second layer 30 or be overlayers of the wedge layer 12 or the second layer 30.

Figure 2G:
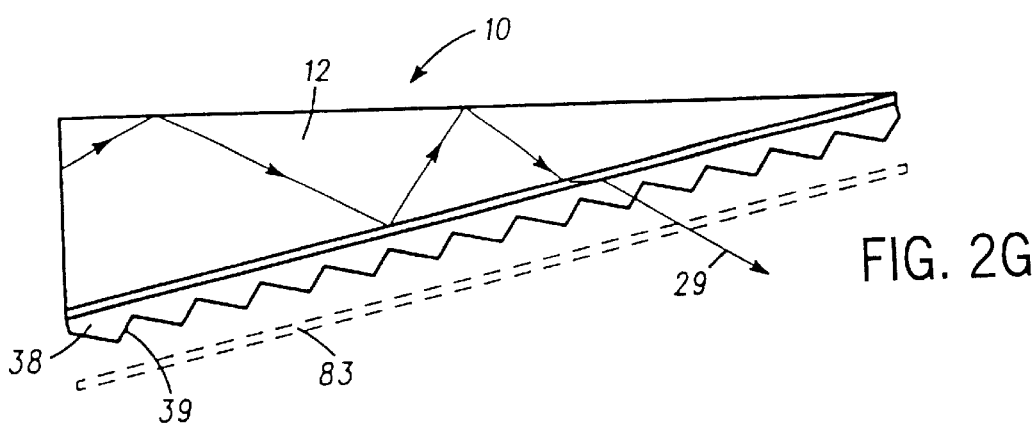
FIG. 2G shows a wedge layer with a lower surface refracting faceted layer.

In certain embodiments the preferred geometries result in output of light into ambient without being reflected back through the wedge layer 12. For example, in FIG. 2F the device 10 can include a translucent layer 37. In another form of this embodiment shown in FIG. 2G, a refracting layer 38 is shown. The refracting layer 38 can include flat facets 39 for providing a collimated output. Also shown in phantom in FIG. 2G is a transverse lenticular diffuser 83 which will be described in more detail hereinafter. The diffuser layer 83 can be used with any of the invention geometries, including above the wedge layer 12 as in FIG. 6A.

Figure 2H:
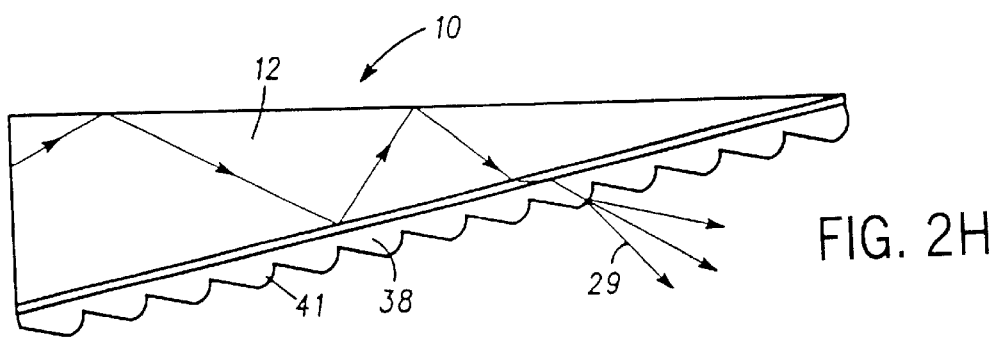
FIG. 2H shows a wedge layer with a lower surface refracting layer and curved facets thereon.
Figure 2I:
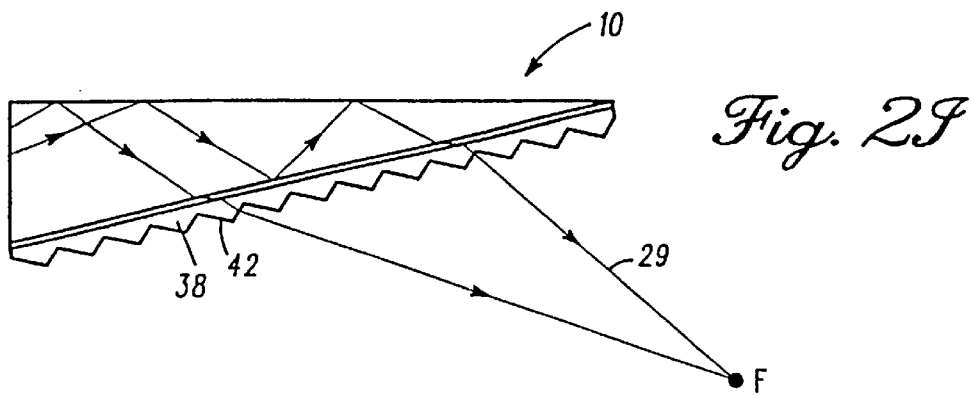
FIG. 2I shows a wedge layer with a refracting layer of facets having variable facet angles.
Figure 2J:
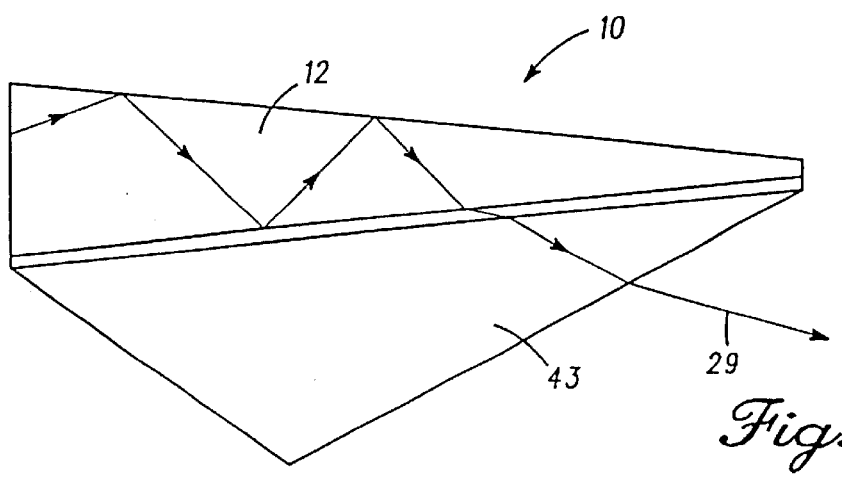
FIG. 2J shows a single refracting prism coupled to a wedge layer.
Figure 2K:
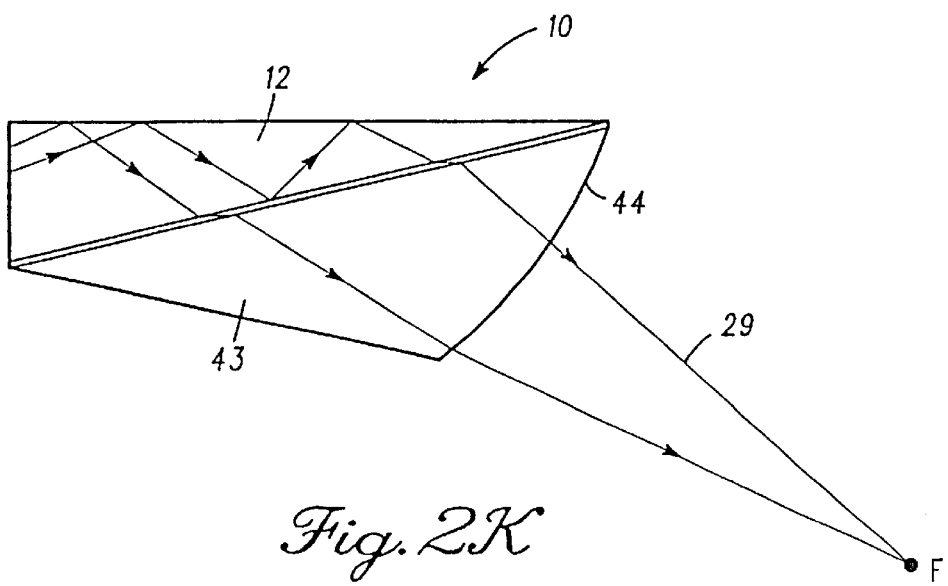
FIG. 2K shows a single refracting prism coupled to a wedge layer and with an integral lens.
Figure 2N:
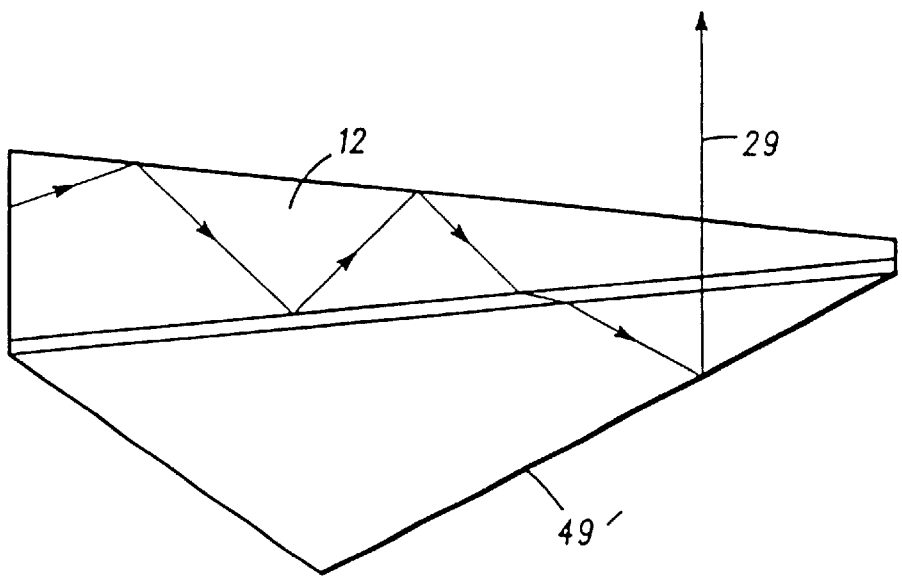
FIG. 2N shows a flat reflecting facet on a wedge layer and FIG. 2O shows a curved reflecting facet on a wedge layer.
Figure 2O:
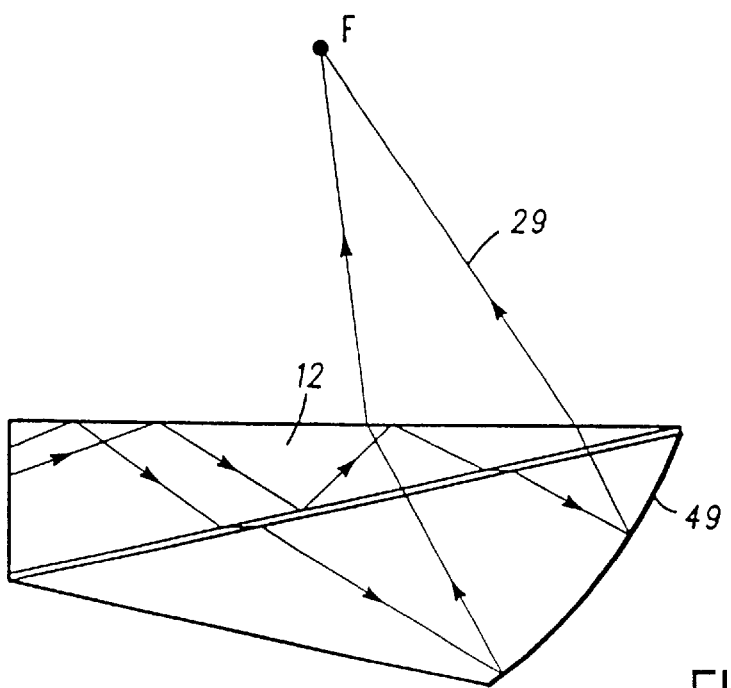

In yet another example shown in FIG. 2H, the refracting layer 38 can include curved facets 41 for providing a smoothly broadened output over a desired angular distribution. In a further example shown in FIG. 2I, the refracting layer 38 includes variable angle facets 42. These facets 42 have facet angles and/or curvature which are varied with position across the facet array to focus output light in a desired manner. Curved facets would enable producing a softly focused region within which the entire viewing screen appears to be illuminated. Examples of the application to computer screen illumination will be described hereinafter. In FIGS. 2J and 2K are shown, respectively, a single refracting prism element 43 and the prism element 43 with an integral lens 44 to focus the output light. FIGS. 2L and M show the faceted surface 34 with the facets angularly disposed to control the output distribution of light. In FIGS. 2K and 2L the light is output to a focal point "F", while in FIG. 2M the output is over an approximate viewing range 45. FIGS. 2N and 2O illustrate flat reflecting facets 48 and curved reflecting facet 49 for providing a collimated light output or focused light output, respectively.

As shown in FIGS. 2A and C the faceted surface 34 optically reflects and redirects light 29 through the second layer 30, the first layer 28 and then through the wedge layer 12 into ambient. Only a fraction of each facet is illuminated, causing the output to appear alternately light and dark when viewed on a sufficiently small scale. Since this pattern is typically undesirable, for the preferred embodiment shown in FIG. 2B the period of spacing between each of the faceted surfaces 34 is preferably large enough to avoid diffraction effects, but small enough that the individual facets are not detected by the intended observing means. The spacing is also chosen to avoid forming Moiré interference patterns with any features of the device to be illuminated, such as a liquid crystal display or CCD (charge coupled device) arrays. Some irregularity in the spacing can mitigate undesirable diffraction Moiré effects. For typical backlighting displays, a spacing period of roughly 0.001–0.003 inches can accomplish the desired purpose.

The faceted surface 34 in FIGS. 2B and 2C, for example, can be generally prepared to control the angular range over which the redirected light 29 is output from the device 10. The minimum distribution of output angle in the layer 30 has a width which is approximately equal to:

$$\Delta\theta = 2\phi[(n_1^2 - n_2^2)/(n_3^2 - n_2^2)]^{1/2}$$

Thus, since $\phi$ can be quite small, the device 10 can be quite an effective collimator. Therefore, for the linear faceted surface 34, the exiting redirected light 29 has a minimum angular width in air of approximately:

$$\Delta\theta\text{air} = n_3 \Delta\theta = 2\phi(n_1^2 - n_2^2)/[1 - (n_2/n_3)^2]^{1/2}$$

As described hereinbefore, and as shown in FIGS. 2H, 2I, 2K, 2L, 2M, and FIG. 3, the facet geometry can be used to control angular output in excess of the minimum angle and also focus and control the direction of the output light.

Fresnel reflections from the various interfaces can also broaden the output angle beyond the values given above, but this effect can be reduced by applying an anti reflection coating 31 on one or more of the internal interfaces, as shown in FIG. 2B.

The brightness ratio ("BR") for the illustrated embodiment can be determined by reference to FIG. 2D as well as by etendue match, and BR can be expressed as:

$$B.R. = \frac{\text{output brightness}}{\text{source brightness}}$$

or, B.R.=illuminated area/total area
B.R.=$[1-(n_2/n_3)^2]^{1/2}$=0.4–0.65 (for most transparent dielectric materials). For example, the wedge layer 12 can be acrylic ($n_1$=1.49), the first layer 28 can be a fluoropolymer ($n_2$=1.28–1.43) or Sol-gel ($n_2$=1.05–1.35, fluoride salts ($n_2$=1.38–1.43) or silicone based polymer or adhesive ($n_2$=1.4–1.45); and the second layer 30 can be a faceted reflector such as polycarbonate ($n_3$=1.59), polystyrene ($n_3$=1.59) epoxy ($n_3$=1.5–1.55) or acrylic ($n_3$=1.49) which have been metallized at the air interface.

Figure 4B:
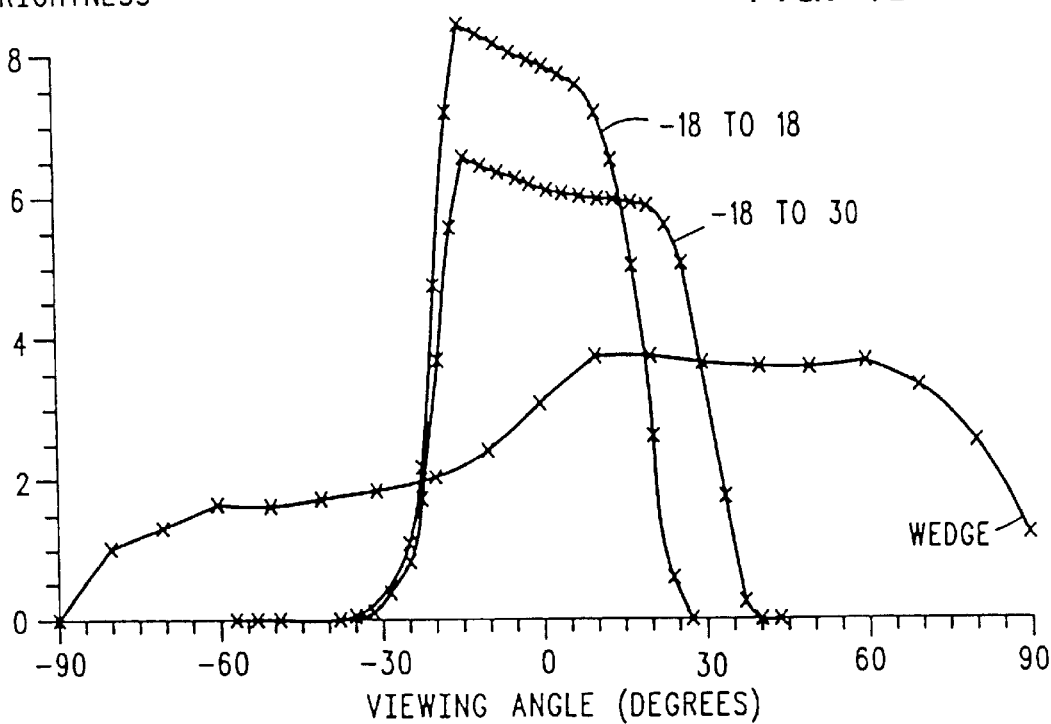
FIG. 4B shows calculated brightness distribution performance over angle for a more symmetric angle range.
Figure 4C:
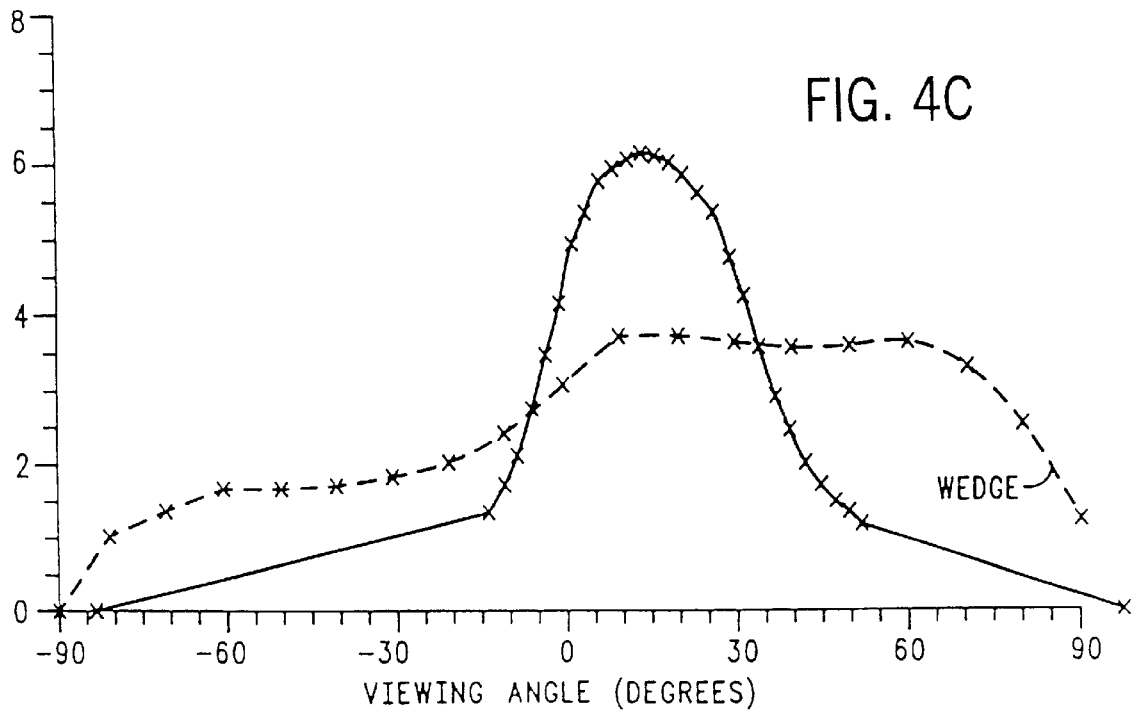
FIG. 4C illustrates calculated brightness performance over angle for the symmetry of FIG. 4B and adding an external diffuser element.
Figure 4D:
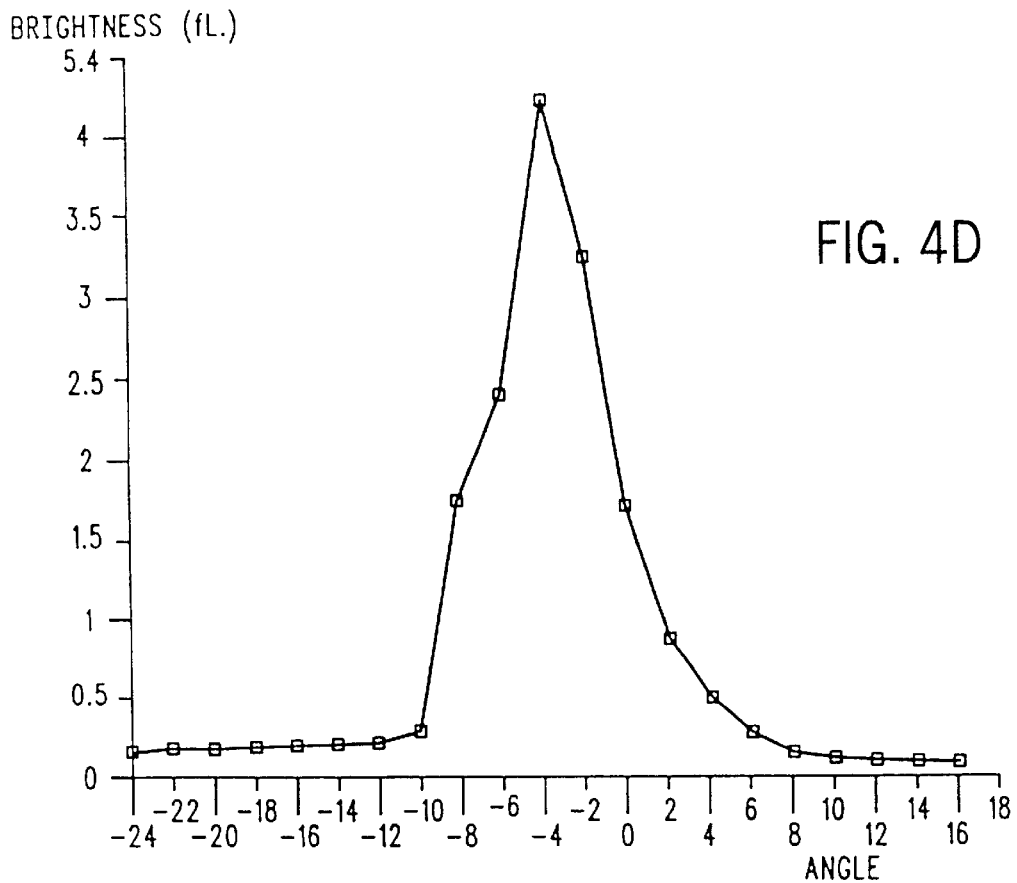
FIG. 4D illustrates an output using flat reflecting facets, no parallel diffuser; full-width at half-maximum brightness (FWHM)=7 degrees.

The flat, or linear, faceted surfaces 34 shown, for example, in FIGS. 2B and 2C can redirect the incident light 24 to control direction of light output and also substantially preserve the angular distribution of light $\Delta\theta$ which is coupled into the second layer 30 by the angle-filtering effect (see, for example, FIG. 4D). For example, in one preferred embodiment shown in FIG. 2L, the faceted surfaces 34 reflect light with the flat facet angles varied with position to focus the output light. In FIG. 2M the faceted surfaces 34 include curved facet angles which vary with position to produce a softly focused viewing zone 45 within which the entire screen appears to be illuminated (see also, for example FIGS. 4F and 4G). Also show in phantom in FIG. 2M is an exemplary liquid crystal display 47 usable in conjunction with the invention. As further shown in FIGS. 3A and B, curved facets 36 also redirect the incident light 24, but the facet curvature increases the resulting range of angular output for the redirected light 29 (see for comparison for flat facets FIG. 2D). For example, it is known that a concave trough can produce a real image, and that a convex trough can produce a virtual image (see, for example, FIG. 3B). In each case the image is equivalent to a line source emitting light uniformly over the desired angular output range. Consequently, an array of such trough shaped facets 36 can redirect the incoming form of collimated light 25 from the first layer 28 (see FIG. 2C), and a plurality of such line source images then form the redirected light 29. By arranging the spacing of the curved facets 36 to less than human eye resolution, the resulting array of line sources will appear very uniform to an observer. As previously mentioned, the choice of about three hundred to five hundred lines/inch or 0.002 to 0.003 inches for the period of facet spacing provides such a result. For a typical LCD display viewing distances of approximately twenty inches or greater are conventional.

Other useful facet shapes can include, for example, parabolic, elliptical, hyperbolic, circular, exponential, polynomial, polygonal, and combinations thereof. The user can thus construct virtually arbitrary distributions of averaged brightness of illumination using different facet designs. For example, polygon shaped facets can be used to produce output angular distributions having multiple peaks.

Figure 4E:
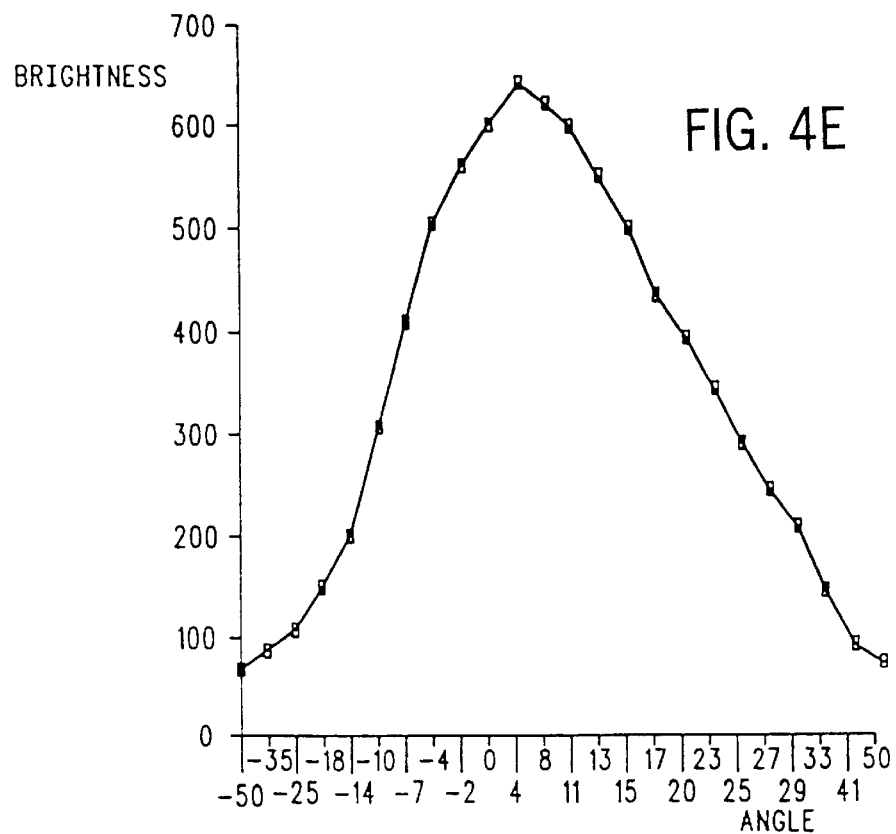
FIG. 4E illustrates an example of nearly symmetrical output distribution, measured using flat facets with parallel lenticular diffuser; FWHM=34 degrees.
Figure 4F:
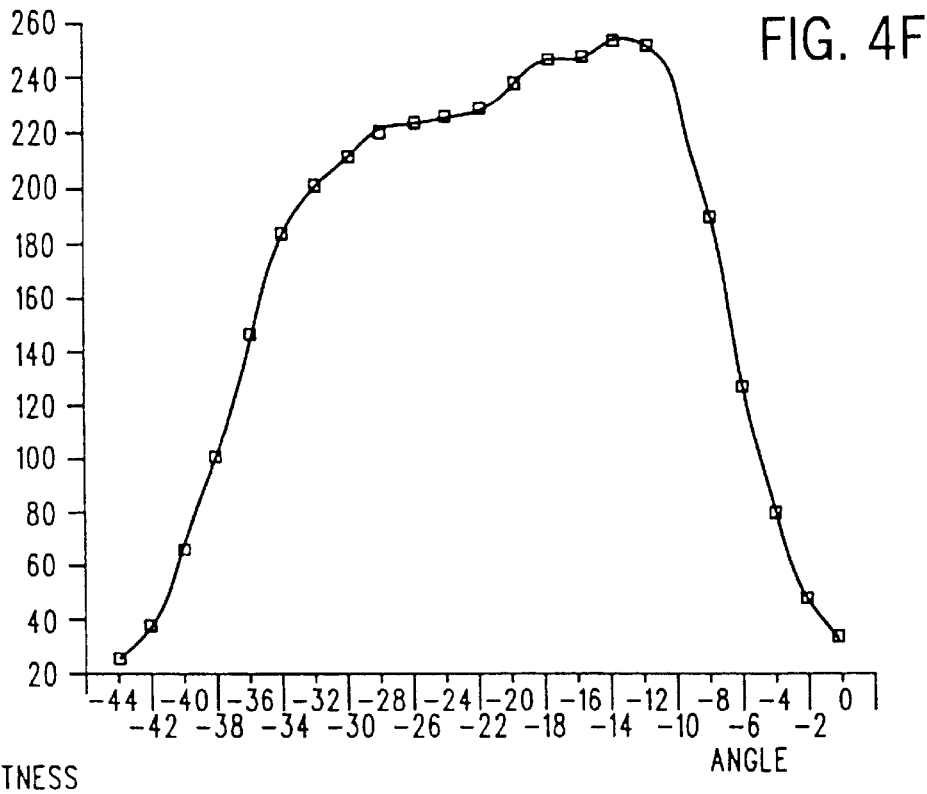
FIG. 4F illustrates an example of asymmetrical output distribution, measured using curved facets; FWHM=32 degrees.
Figure 4G:
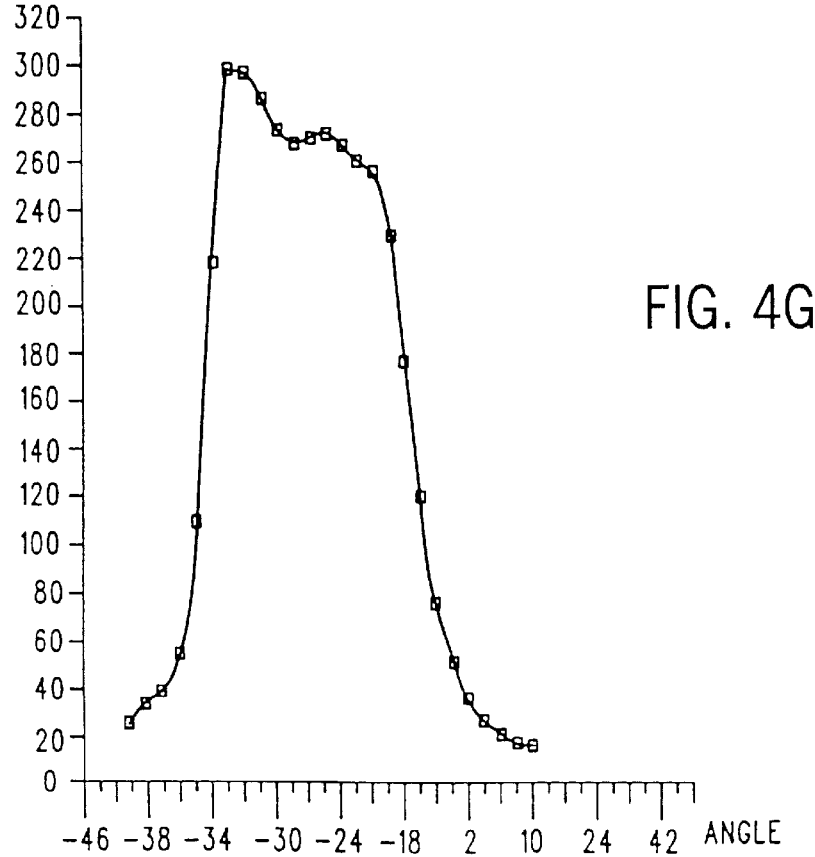
FIG. 4G illustrates an example asymmetrical output distribution, measured using curved facets; FWHM=26 degrees.
Figure 4H:
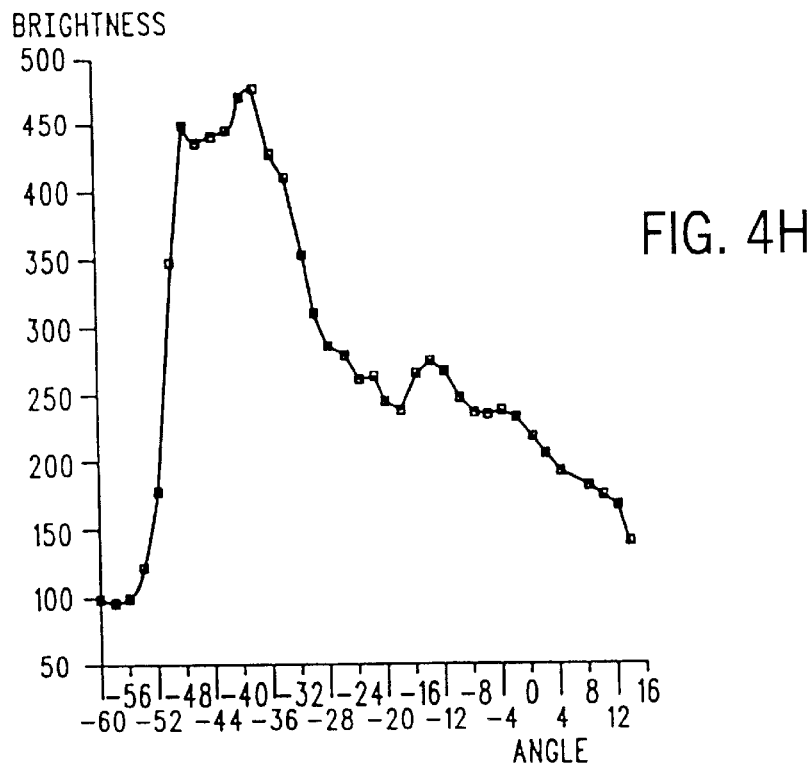
FIG. 4H illustrates an example of a bimodal output distribution, measured using one faceted reflecting layer and one faceted refractive layer.

Examples of brightness distribution over various ranges of angular output using a curved-faceted reflector are illustrated in FIGS. 4A–4C, 4F and 4G. FIG. 4C and 4E shows the brightness distribution in the case of a reflector having linear facets, and further including a diffuser element 40 (shown in phantom in FIG. 2C). The predicted performance output is shown for the various angular ranges (see FIGS. 4A–4C) and compared with the measured angular output of light for a commercially available source (labeled "Wedge"), such as a "Wedge Light" unit, a trademark of Display Engineering. The preferred angular range can readily be modified to accommodate any particular viewing and collimation requirements up to the minimum angle $\Delta\theta$ (air) described hereinbefore by the equation in terms $\phi$, $n_1$, $n_2$ and $n_3$. This modification can be accomplished by progressively changing the curvature of the curved facets 36 in the manner shown in FIG. 2M and discussed hereinbefore. In addition to the illustrated control of the vertical viewing angular range, modification of the horizontal viewing range can also be accomplished by appropriate changes of the shape of the curved facets 36. The above described angular distributions shown in FIGS. 4A–4I are representative when the device 10 is processing the light 24 within the numerical aperture $NA=(n_1^2-n_2^2)^{1/2}$. When light is outside this range, additional techniques can be applied to help control the angular output range.

FIGS. 9A and 9B further illustrate the use of redirecting means to provide a tightly overlapping focused illumination output and a less overlapping focused illumination output, respectively. These concepts can be applied practically by considering that a typical portable computer screen 87 has a vertical extent "V" of about 150 mm, while a typical viewing distance, "D", is 500 mm. A viewer at distance "D", positioned normal to the vertical center of the computer screen 87 will view different areas of the screen 87 at angles ranging from −8.5° measured at the top of the screen 87 to +8.5° measured at the bottom of the screen 87. This variation in viewing angle can, however, cause undesirable effects in use of a system having such screen illumination. Such a limited illumination angle for the screen 87 implies a limited range of positions from which a viewer can see a fully illuminated screen 87 (see FIG. 9A). Defining the viewer position in terms of the angle and distance from the center of the screen 87, then the effective angular range is substantially reduced below the nominal illumination angle. For example, if the nominal illumination range is ±20° measured at each individual facet, then the effective viewing range is reduced to ±12° in the typical flat panel illuminator shown in FIG. 9A. The resulting illumination between 12°–20°, either side of center for the screen 87, will appear to be nonuniform to the viewer.

The invention herein can be used to overcome the above described nonuniformities by controlling the orientation of the faceted surface 34. As illustrated, for example, in FIG. 2M both surfaces of the facets are rotated progressively such that the flat facet surface is varied from 35.6° to 33.3° relative to, or parallel to, the edges of the planes defining the various layers of the device 10. This systematic variation from the top to the bottom of screen 89 (see FIG. 9B) results in the redirected output illustrated. The faceted surface 34 can further be combined with the diffuser 83 and the like to produce a variable, but controllable light illumination output distribution. A flat faceted surface 168 can further be combined with a diffuser 170. Therefore, as shown in FIG. 9B the ability to rotate the angular distributions of light at different points on the screen 89 enable compensation for the variation in viewing angle with position. Systematic variations in the faceted surface 34 can further include variations in to focus the output of any faceted redirecting layer. Examples are shown in FIGS. 2I and 2L.

In another example of overcoming nonuniformities of illumination, an array of micro-prisms for the faceted surface 34 can be laid over a conventional diffuse backlight 101 (see FIG. 18A). This faceted surface 34 operates by a combination of refraction and total internal reflection to permit only a limited angular range to be output through the layer into ambient. This angular range depends on the facet angles. For the case of acrylic film (n=1.49), highest brightness is typically achieved with a prism included angle of 90–100 degrees, resulting in a viewing angle of approximately ±35 degrees. Backlights using such a geometry show a sharp "curtaining" effect which is disconcerting to many viewers. This effect can be ameliorated by rotating the facets 38 from top to bottom of the screen to produce a focusing effect (see FIG. 18B). Simple ray-tracing shows that, for included angles in the range of 100°–110°, a facet rotated by an angle 3 will produce an angular distribution rotated by approximately 3/2. In the embodiment shown in FIG. 18 the progressive variation of facet face angle can vary as position>along the faceted surface 34 wherein, for example:

$$\Psi_1 = 35° - (0.133°/mm)\cdot x$$

$$\Psi_2 = 35° + (0.133°/mm)\cdot x$$

This progressive facet angle change will produce an angular distribution which varies by approximately ten degrees across the screen 89, and satisfies the generic constraints outlined above.

Whatever the desired facet shapes, the faceted surface 34 (see, FIG. 2D) is preferably formed by a conventional process such as molding or other known milling processes. Details of manufacture will be described hereinafter.

Nonlinear Wedges

In another form of the invention the wedge layer 12, which is the primary lightguide, can be other than the linear shape assumed hereinbefore. These shapes allow achievement of a wide variety of selected light distributions. Other shapes can be more generally described in terms of the thickness of the wedge layer 12 as a function of the wedge axis "z" shown in FIGS. 2B and C (the coordinate axis which runs from the light input edge to the small or sharp edge 26). For the linear shaped wedge, $$A(z)=A_o-C \cdot z \qquad (1)$$

$A_o$=maximum wedge thickness (see FIG. 2A)
C=constant=tan θ

A large range of desired spatial and angular distributions can be achieved for the light output power (power coupled to the second layer 30). This light output power is thus the light available for output to the ambient by the appropriately faceted surfaces 34 or 36, or even by the diffuse reflector 33 (see FIG. 2E) or other means.

For example, if L and M are direction cosines along the x and y axes, respectively, then $L_o$ and $M_o$ are the values of L and M at the thick edge (z=0). This initial distribution is Lambertian within some well-defined angular range, with little or no light outside that range. This distribution is especially important because ideal non-imaging optical elements have limited Lambertian output distributions. The key relationship is the adiabatic invariant, $A(z)\cos(\theta_c)$ which is approximately equal to $A_0 L_0$ and which implicitly gives the position (z) of escape. To illustrate this concept, suppose we desire uniform irradiance so that dP/dz=constant. Suppose further that the initial phase space uniformly fills an elliptical area described by the following expression:

$$L_o^2/\sigma^2+M_o^2/\tau^2=1 \qquad (2)$$

where τ is the dimension of an ellipse along the M axis and σ is the dimension of the ellipse along the L axis.

Then, $dP/dL=\text{const} \cdot [1-L^2/\tau^2]^{1/2}$ but $dA/dz=[A_o/L_c] dL_o/dZ$ where $L_c=\cos \theta_c$. Therefore, $[1-(L_c A)^2/(A_o \sigma)^2]^{1/2} dA=\text{constant}$ times $dz$. Suppose $\sigma=L_c$ in the preferred embodiment. This result can be interpreted by the substitution $A/A_0=\sin u$, so that $A=A_0 \sin u$ and $u+\frac{1}{2}\sin(2u)=(\pi/2)(1-z/D)$ where D is the length of the wedge layer 12.

If the desired power per unit length is dP/dz, more generally, then the desired shape of the wedge layer 12 is determined by the differential equation:

$$dA(z)/dz = \frac{-dP/dz \left(A_0 / [1-(n_2/n_1)^2]^{\frac{1}{2}}\right)}{dP/dL_0} \qquad (3)$$

Note that in all these cases the output distribution has only approximately the desired form because it is modified by Fresnel reflections. Note also that even when the wedge device 10 is curved, if the curvature is not too large, it may still be useful to define an average angle φ which qualitatively characterizes the system.

In another aspect of the invention the geometry of the above examples has an x,y interface between two refractive media with indices $n_1$ and $n_2$. The components nM,nN are conserved across the interface so that $n_1 M_1=n_2 M_2$, $n_1 N_1=n_2 M_2$. The angle of incidence projected in the x,z plane is given by $\sin \theta_{eff}=N/(L^2-N^2)^{1/2}$. Then using the above relations, $\sin \theta_{2eff}/\sin \theta_{1\ eff}=(n_1/n_2)[1-M_1^2]^{1/2}/[1-(n_1/n_2)^2 M_1^2]^{1/2}=(n_1/n_2)_{eff}$. For example, for $n_1=1.49$, $n_2=1.35$, $M_1=0.5$, the effective index ratio is $1.035(n_1/n_2)$, which is only slightly larger than the actual index ratio.

Variation of Index of Refraction Over Spatial Parameters

In the general case of tapered light guides, the wedge layer 12 is generally along the z axis with the narrow dimension along the x axis (see, for example, FIG. 2A). If we introduce optical direction cosines (nL,nM,nM) where L,M,N are geometric direction cosines along x,y,z, then n is the refractive index which may vary with spatial position. For guided rays in the wedge layer 12, the motion in x is almost periodic, and the quantity φnLdx for one period is almost constant as the ray propagates along z. This property is called adiabatic invariance and provides a useful framework for analyzing the lightguide properties.

In a first example the wedge device 10 shown in FIG. 2A has a uniform index in the wedge layer 12 and is linearly tapered in z with width $A(z)=A_0-C \cdot z$. Then, along the zigzag ray path, L(z)A(z) is approximately equal to a constant by adiabatic invariance. If a ray starts at z=0 with $L=L_0$, then $(A_0-C \cdot z)L(z)$ is approximately equal to $L_0 A_0$. The ray will leak out of the wedge layer 12 when $L=\cos \theta_c$ where $\theta_c$ is the critical angle=$[1-(n_2/n_1)^2]^{1/2}$. Thus, the condition for leaving the wedge layer 12 is $A_0-C \cdot z=L_0 A_0/\cos \theta_c$. This will occur at $z=(A_0/C)(1-L_0/\cos \theta_c)$. Consequently, the density of rays emerging in z is proportional to the density of rays in the initial direction cosine $L_0$. For example, the density will be uniform if the initial distribution in $L_0$ is uniform.

In a second example, the index profile is no longer uniform but falls off both in x and in z. If the fall-off in z is much slower than in x, the light ray path is still almost periodic, and the above adiabatic invariance still applies. Then, as the light ray 24 propagates in z, the path in x,nL space is almost periodic. Therefore the maximum value of L(z) increases and at some z may reach the critical value for escape. The z value for escape depends on the details of the index (n) profile. When this is specified, the analysis proceeds as in example one above. Thus, for a parabolic index profile, the index profile has the form $n^2(x)=n^2_0[1-2\Delta(x/\rho)^2]$ for $-\rho<x\rho$, $=n_1^2=n^2_0[1-2\Delta]$ for $|x|>\rho$. Then, the critical angle at x=0 is still given by $\sin^2 \theta_c=2\Delta=1-(n_1/n_0)^2$. Then, if we have $n_0$ a slowly decreasing function of z, the slope θ at x=0 will slowly increase by the adiabatic invariance of φnLdx, while $\theta_c$ decreases so that light rays will escape. The details of the light ray distributions will depend on how the index (n) varies with z.

Nonwedge Tapered Geometries

In the most general case the light can be input into any shape layer (e.g., parallelepiped, cylinder or non-uniform wedge), and the principles described herein apply in the same manner, In addition, the index of refraction can be varied as desired in (x,y,z) to achieve the appropriate end result when coupled to means to output light to ambient.

For example, consider a disc-shaped light guide 46 which is tapered in the radial direction r shown in FIG. 5. The direction cosines in cylindrical polar coordinates are $k_r$, $k_\theta$, $k_z$. Light 48 propagating in this guide 46 satisfies the relationship:

$$\phi n k_z dz \sim \text{constant.(adiabatic invariance)} \qquad (4)$$

$$nrk_\theta=\text{constant.(angular momentum conservation)} \qquad (5)$$

The adiabatic invariance condition is identical with that for the wedge device 10, and the previous discussions pertinent to the wedge device 10 also thus apply to the light guide 46. The angular momentum conservation condition requires that as the light streams outward from source 47 with increasing radius, the $k_\theta$ value decreases. Therefore, the light becomes collimated in the increasing radial direction. This makes the properties fundamentally like the wedge device 10, and the light 48 can be made to emerge as light 52 at a selected angle to face 51, collimated along the z direction.

For purposes of illustration we take the guide material to have a constant index of refraction n. For such geometries the light rays 48 along the two-dimensional cross sectional plane taken along 5B—5B behave just as in the case of the wedge device 10 counterpart described hereinbefore. Similarly, various additional layers 54 and 56 and other means can be used to achieve the desired light handling features. For example, for the disc light guide 46 a preferred facet array 56 is a series of circles, concentric with the disk 46. Thus, if the facets 56 are linear in cross section, the light rays 52 will emerge in a direction collimated within a full angle of 2 $\phi$ times a function of the indices of refraction as in the device 10 described hereinbefore.

Tapered Luminaires with Two Low-index Layers

In another form of the invention shown in FIG. 6A, the device 10 includes a first layer 61 having an optical index of refraction $n_1$ and a first or top layer surface 62 and a second or bottom layer surface 64 converging to establish at least one angle of inclination $\phi$. The first layer 61 also includes a back surface 65 spanning the top layer surface 62 and the bottom layer surface 64.

Adjacent the first layer 61 is layer means, such as a bottom transparent layer means, like a first intermediate layer 66 of index $n_2$ disposed adjacent to, or underlying, the bottom layer surface 64. In addition, the layer means can embody a top transparent layer means, second intermediate layer 81 of index $n_2$ disposed adjacent to the top layer surface 62. At least one of the layers 66 and 81 can be an air gap, or other gas or a transparent dielectric gap.

An air gap can be established by conventional means, such as by external supports, such as suspending the layers under tension (not shown) or by positioning spacers 68 between the first layer 61 and the adjacent light redirecting layer 70. Likewise, the spacers 68 can be positioned between the first layer 61 and the second light redirecting layer 82. Alternatively, solid materials can be used for the transparent dielectric to constitute layers 66 and 81 and can improve structural integrity, robustness and ease of assembly. Such solid materials can include, for example, sol-gels ($n_2$=1.05–1.35), fluoropolymers ($n_2$=1.28–1.43), fluoride salts ($n_2$=1.38–1.43), or silicone-based polymers and adhesives ($n_2$=1.40–1.45). Such solid materials for the transparent dielectric need no separate means to support or maintain it, but can result in lower N.A. acceptance since the index is higher than for an air gap.

The layers 66 and 81 allow transmission of light received from the first layer 61. In this embodiment, part of the light will achieve $\theta_c$ first relative to the top layer surface 62, and light will enter the layer 81 for further processing by the light redirecting layer 82. The remaining light will thereby achieve $\theta_c$ first relative to the bottom layer surface 64, thus entering the layer 66 for further processing by the light redirecting layer 70.

In one preferred form of the invention (see FIG. 6A) both the layers 66 and 81 are present and can have similar, but significantly different indices $n_{2a}$ and $n_{2b}$, respectively. The indices are considered similar when they establish critical angles at the interfaces 62 and 64 which are similar in magnitude to the wedge angle $\phi$, for example:

$$|\arcsin(n_{2a}/n_1) - \arcsin(n_{2b}/n_1)| < 6\phi \quad (6)$$

In this case significant, but unequal, fractions of light will enter each of the layers 66 and 81 for further processing by redirecting layers 70 and 82, respectively. The larger fraction will enter the layer having the higher of the two indices $n_{2a}$ and $n_{2b}$. The redirecting layer 70 processes only the fraction which enters the layer 66. Therefore, the influence of the redirecting layer 70 on the output angular distribution of light can be changed by varying the relationship between the indices $n_{2a}$ and $n_{2b}$.

In another preferred form of the invention the layers 66 and 81 can be the same transparent material of index $n_2 < n_1$. In general, lower values of $n_2$ will enhance the efficiency of the device 10 by increasing the numerical aperture at the light input surface 65. Therefore, collection efficiency can be maximized when the layers 66 and 81 are gaps filled with air or other gases (with $n_2$=1–1.01).

Figure 12A:
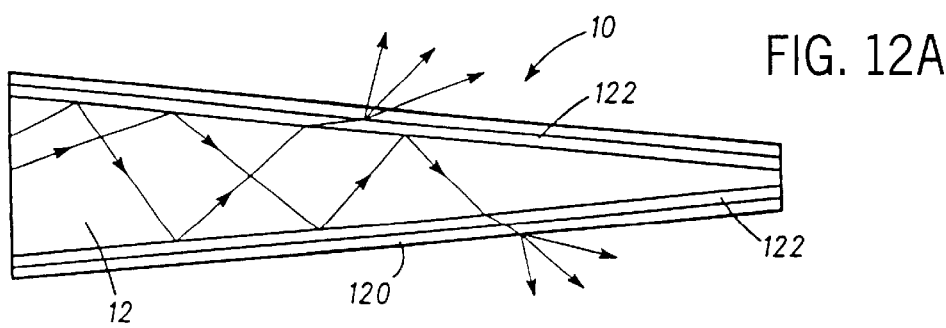
FIG. 12A illustrates a wedge shaped luminaire having a pair of diffraction gratings or hologram layers.
Figure 12B:
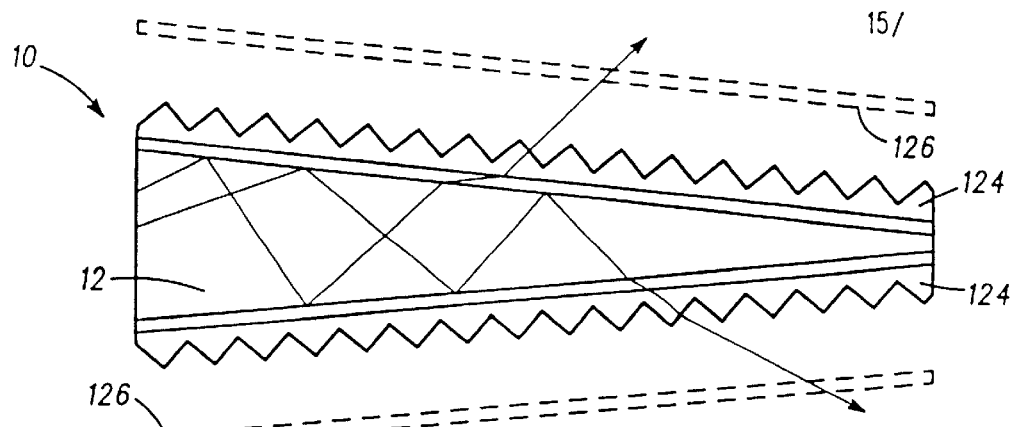
FIG. 12B shows a wedge shaped luminaire with a pair of refracting facet layers and diffusers.
Figure 12C:
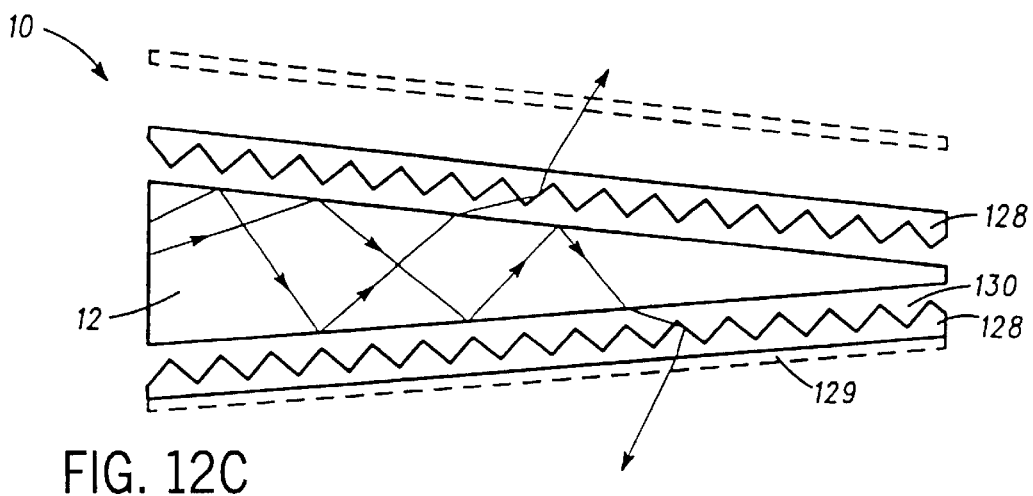
FIG. 12C illustrates a wedge shaped luminaire with a pair of faceted layers.
Figure 12D:
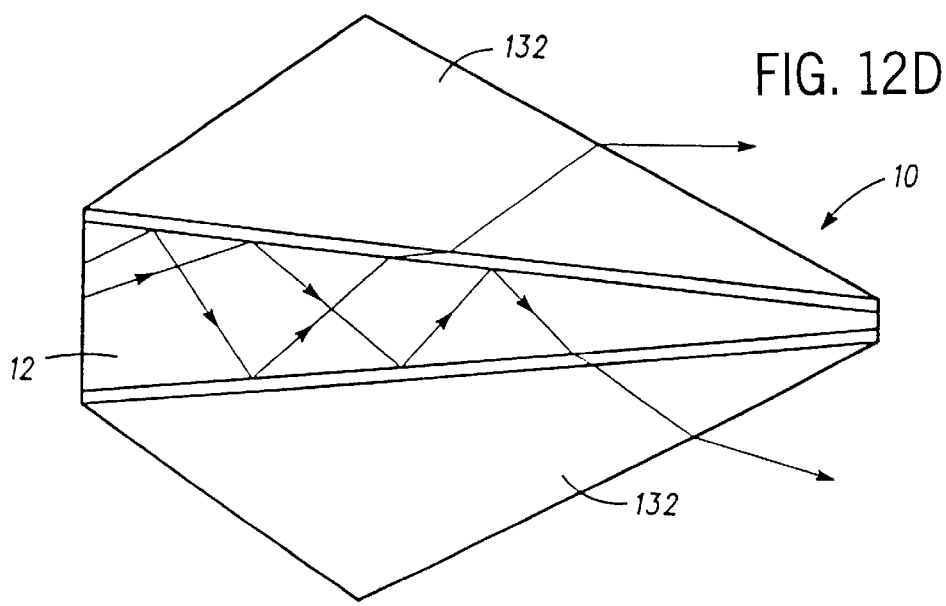
FIG. 12D shows a wedge shaped luminaire with two refracting single facet layers.

The thickness of the layers 66 and 81 can be selectively varied to control the output power spatial distribution of the device 10 or to enhance its visual uniformity. For example, increasing the thickness of the layer 81 by 0.002"–0.030" sharply reduces non-uniformities which tend to appear at the thicker end of the device 10. The thickness of layers 66 and 81 can also be smoothly varied with position to influence a desired spatial distribution of the light being output (see FIG. 12L).

In one preferred form of the invention shown in FIG. 6A, the light redirecting layer 70 includes a reflective layer 71 which reflects the light back through the layer 66 and the first layer 61. The light is then output into the first layer 61 through the top layer surface 62, and ultimately through the light redirecting layer 82 for further processing. The reflective layer 71 can, for example, be any combination of a planar specular reflector, a partially or completely diffuse reflector, or a faceted reflector.

Use of a planar specular reflector leads to the narrowest angular distribution within the layer 81. Therefore, the reflector can simplify design of the light redirecting layer 82 when the desired output angular distribution is unimodal. Diffuse or faceted reflectors can also be used for the layer 71 in order to achieve a large range of angular distributions (see FIGS. 4H and I) or to increase uniformity (see FIG. 4N). Diffuse reflectors are preferred if the desired angular distribution has large "tails" (see, in particular, FIG. 4I). Faceted reflectors can produce a bimodal angular distribution within the layer 81(see FIG. 4H). Therefore, such faceted reflectors are preferred if the desired output angular distribution is bimodal. For example, a bimodal "batwing" distribution is preferred from luminaires for room illumination because it reduces glare.

In general each facet of the layer 71 can be shaped to control the angular distribution of the light reflected back through the layer 66 and the first layer 61 for further processing by the redirecting layer 82. The angular distribution within the device 10 will in turn influence the angular distribution of the light output into ambient from the redirecting layer 82. For example, curved facets can be used to smoothly broaden the angular distribution, as well as providing a diffusing effect to improve uniformity. The reflective layer 71 can also influence the output power spatial distribution as well as the angular distribution. The reflectivity, specularity, or geometry of the reflective layer 71 can be varied with position to achieve a desired output distribution. For example, as described hereinbefore, small variations in the slope (see FIG. 12L) of each element of the reflective layer 71 as a function of position significantly change the light output distribution.

The light redirecting layer 82 has an index $n_3 > n_2$, and is substantially transparent or translucent. The light in the low-index layer 81 enters the layer 82 and is redirected into ambient. The transmissive redirecting layer 82 also redirects the light which has been processed by reflection from the redirecting layer 71 then transmitted back through the low-index layer 66 and the first layer 61. The transparency or geometry of the layer 82 can be varied with position to further influence the output spatial distribution of the device 10. In one preferred form of the invention the redirecting layer 82 includes a faceted surface at the interface with the low-index layer 81, as shown in FIG. 6A. Light entering the layer 82 is refracted by one side 84 of each facet 85 as it enters, and then is totally internally reflected by second side 86 of each of the facets 85. In one form of the invention the redirecting layer 82 can be a "Transparent Right-Angle Film" (hereinafter, TRAF), which is a trademark of 3M Corp., and this product is commercially available from 3M Corp. This TRAF operates by refraction and total internal reflection to turn incident light through approximately a ninety degree angle, as would be desired in a typical LCD backlighting application. The acceptance angle of the prior art TRAF is about twenty-one degrees, which is large enough to redirect a large fraction of light 75 which enters the low-index layer 81. In a more preferred form of the invention, the facet angles are chosen to redirect more of the light 75 which enters the low-index layer 81 by the described mechanism of refraction plus total internal reflection. Either one or both of the facet surfaces 84 and 86 can be shaped to control the output angular distribution. For example, the use of curved facets smoothly broadens the distribution, as well as providing a light diffusing effect which can improve uniformity.

Figure 12E:
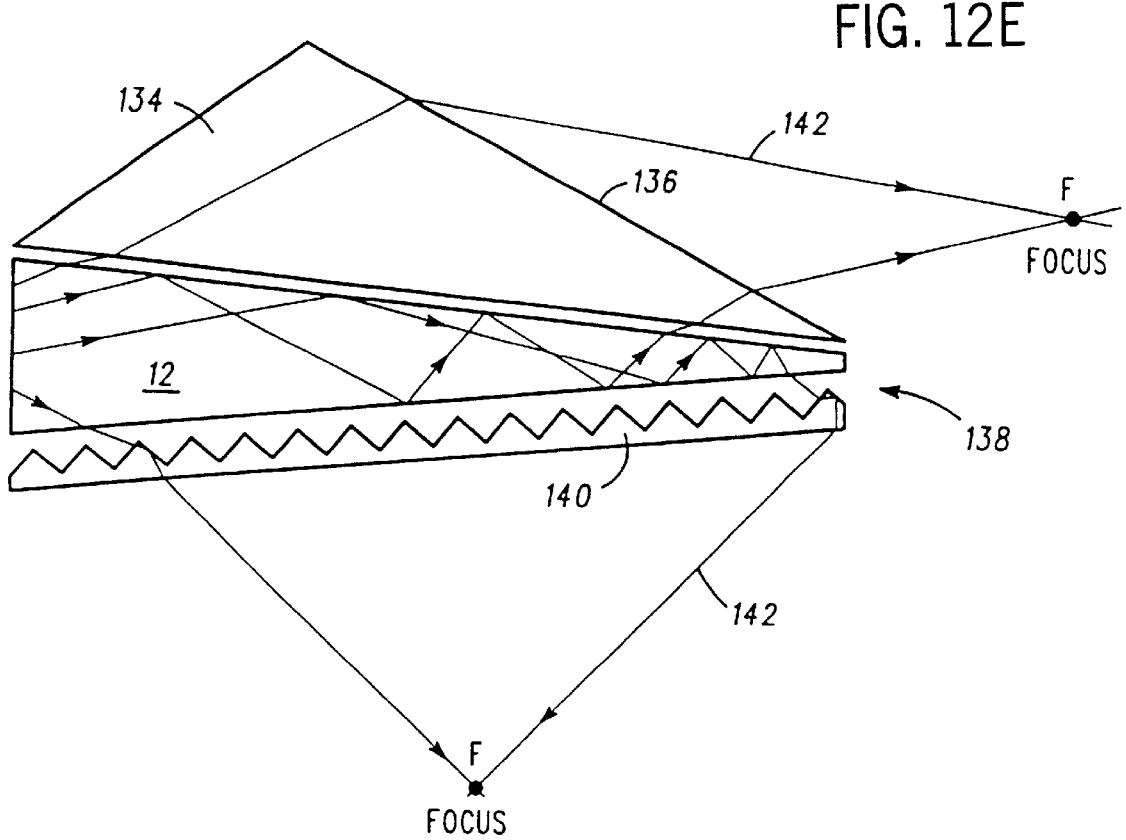
FIG. 12E illustrates a wedge shaped luminaire with a refracting single facet layer and a bottom surface redirecting layer.
Figure 12F:
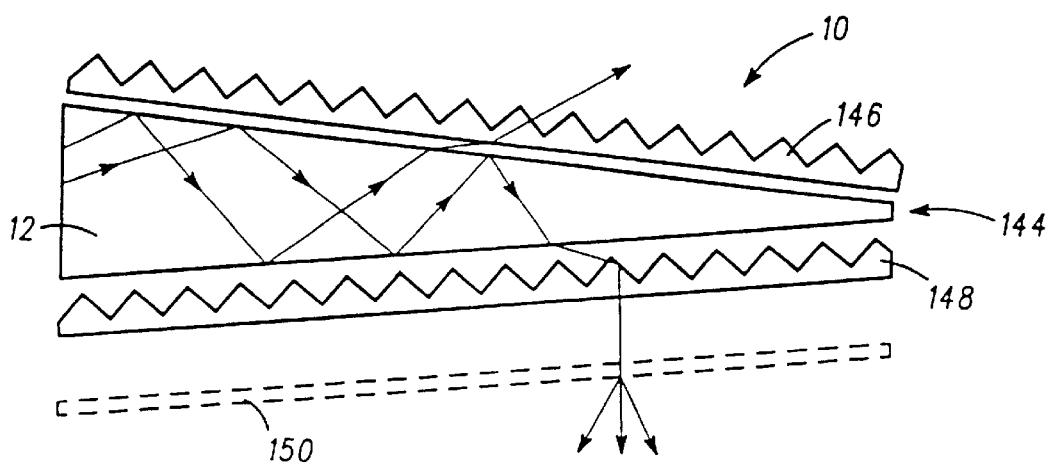
FIG. 12F shows a luminaire with a top surface redirecting layer of a refracting faceted layer and a bottom surface refracting and internally reflecting layer.
Figure 12G:
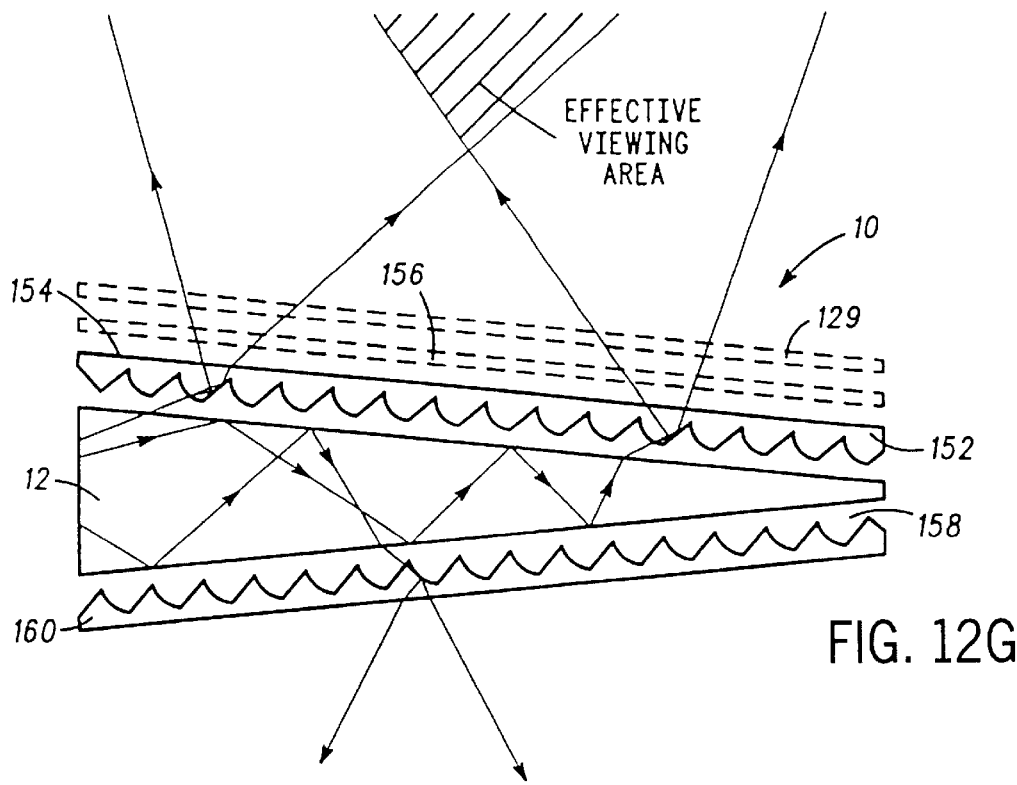
FIG. 12G illustrates a luminaire with a top surface refracting/internally reflecting faceted layer and a bottom surface refracting/internally reflecting faceted layer.

In another preferred embodiment, the facet angle surfaces of the redirecting layer 82 can be varied progressively to compensate for the variation in viewing angle with position, when viewed from typical viewing distances. The details of such a compensation effect were described earlier in reference to the design of the reflecting facet layer in the embodiment shown in FIG. 2M. Similar principles can be applied to the design of any faceted redirecting layer, including refracting layers and refracting/internally-reflecting layers. Examples of embodiments which can, for example, make use of such progressively varied faceted layers are shown in FIGS. 12E (layer 140), 12G (layer 152), 12H (layer 166), 12K (layer 186), 12N (layer 210), 120 (layer 228), and 12P (layer 246).

In another form of invention the layers 66 and 81 can have similar but slightly different indices $n_2$ and $n_2'$, respectively. The operating principles of the device 10 will be substantially similar as long as the critical angles associated with interfaces between the first layer 61 and the two layers 66 and 81 do not differ by more than the first layer convergence angle:

$$|\arcsin(n_2/n_1) - \arcsin(n_2/n_1)| < \phi \qquad (7)$$

Therefore, in this case approximately equal fractions of the light will enter layers 66 and 81, for further processing by the redirecting layers 70 and 82, respectively.

All forms of the invention can further include an output diffuser layer 40, shown in phantom in FIG. 2C or transmissive or translucent diffuser layer 83 shown in FIG. 6A. In general this diffuser layer 40 can be a surface diffuser, a volume diffuser, or at least one array of micro lenses having at least a section of a cylinder (known as a "lenticular array"). These layers 40 and 83 can increase light uniformity or broaden the angular distribution into ambient. Lenticular arrays are advantageous because they have low backscattering in comparison to surface or volume diffusers, and because they have sharper output angle cut-offs when illuminated by collimated light. Lenticular arrays also preferentially diffuse only those features which would otherwise run in the general direction of the axis of each cylindrical micro lens.

Figure 10:
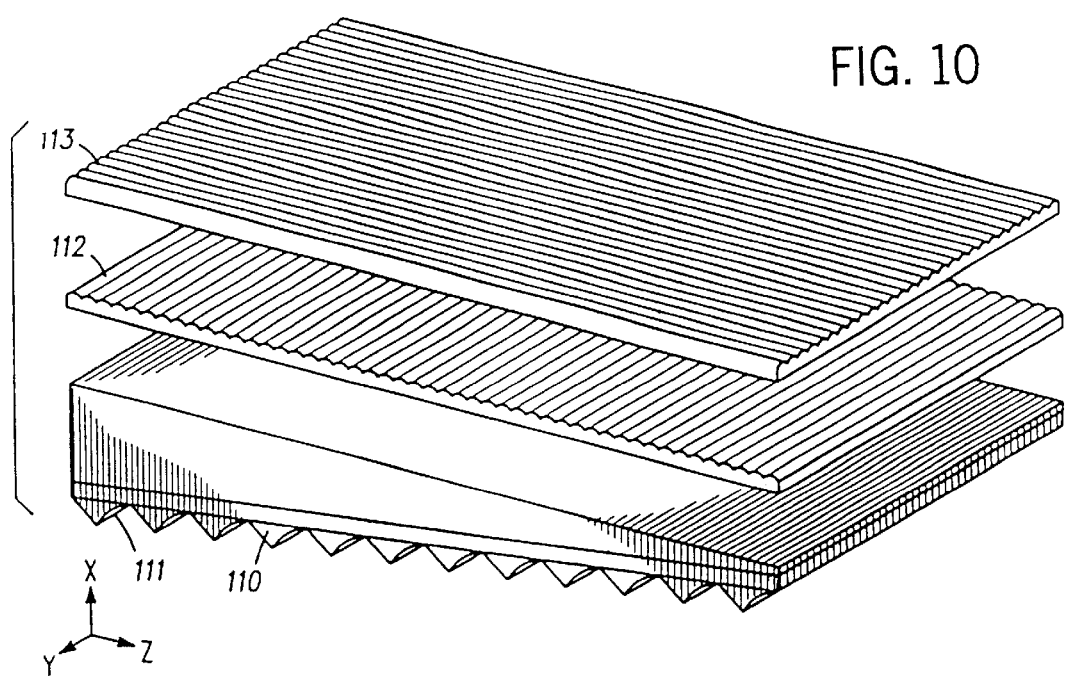
FIG. 10 illustrates one form of pair of lenticular arrays of a luminaire.

In one preferred embodiment shown in FIG. 10, the light redirecting layer 10 makes use of flat facets 111 such that the output light is highly collimated. The desired output angular distribution is further controlled by including a lenticular diffuser 112 having an appropriate focal ratio, with its cylindrical micro lenses running approximately parallel to the y-axis. The lenticular diffuser 112 also diffuses non-uniformities which would otherwise appear to be running in the general direction of the y-axis. In this embodiment a second lenticular diffuser 113 can be included to diffuse non-uniformities which would otherwise appear running in the general direction of the z-axis. This second lenticular diffuser's micro lenses run approximately parallel to the z-axis (see FIG. 12H and 12N). Note that the order of positioning of the diffusers 112 and 113 can be interchanged without loss of optical advantage. Similarly, the lenticular diffuser 112 and 113 can be inverted and can have concave contours rather than convex contours shown in FIG. 10. While such changes can affect the details of the performance, the diffuser layers 112 and 113 can still provide the general advantages described.

Figure 11:
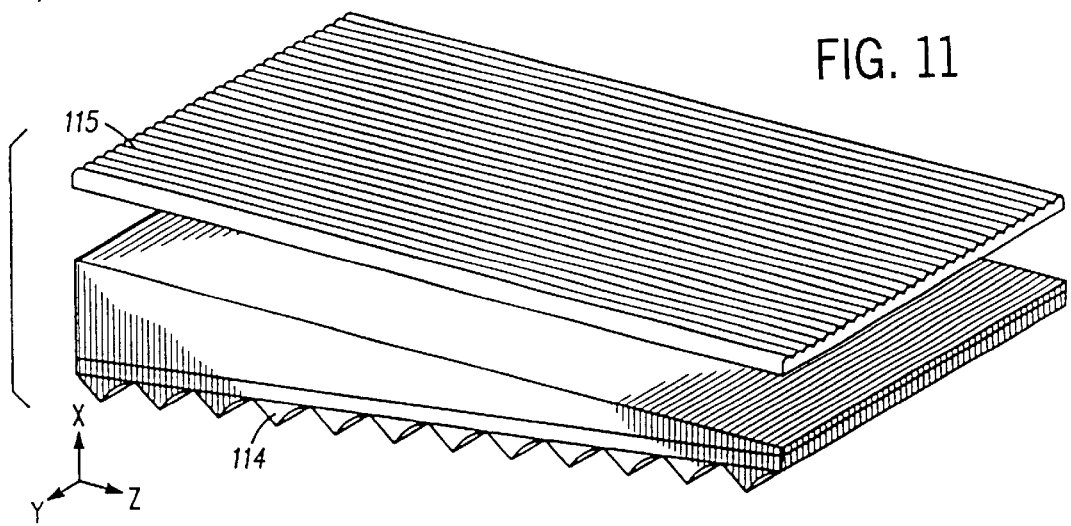
FIG. 11 illustrates a lenticular diffuser array and curved facet layer of a luminaire.

In another preferred embodiment shown in FIG. 11, the functions of the flat-faceted light redirecting layer 110 and the parallel lenticular diffuser 112 in FIG. 10 can both be performed by a light redirecting layer 114 having curved facets (see also, for example, FIGS. 2H, 2M and 3A illustrating curved facets). These curved-facet layers redirect the light, control the angular output by having an appropriate facet curvature, and act as a diffuser for non-uniformities running in the general direction of the y-axis. By combining these functions in a single-layer the number of components is reduced, which improves thickness, cost, and manufacturability. In this embodiment, a single lenticular diffuser 115 can be included to diffuse the remaining non-uniformities which would otherwise appear running in the general direction of the z-axis. This type of lenticular diffuser micro lens runs approximately parallel to the z-axis. Note that the lenticular diffuser 115 can be inverted and can have concave contours rather than the convex contours shown in FIG. 10. Again, such changes can affect performance details, but the layers in 114 and 115 perform as intended.

In all embodiments using multiple micro-structured layers, the facet or lenslet spacings of these layers described hereinbefore can be chosen to have non-rational ratios, in order to avoid undesirable Moiré interaction between layers or with a liquid crystal display.

Similar lenticular diffusers can be used with non-wedge geometries having wedge shaped cross-actions, with similar advantages if the diffuser cross-sections are approximately as shown in FIGS. 10 and 11. One example is the tapered disk illustrated in FIG. 5. In this case the lenticular diffuser analogous to layer 112 in FIG. 10 would have micro lenses whose axes run in concentric circles about the disk's axis of rotations. A diffuser analogous to the layer 113 in FIG. 10 and 115 in FIG. 11 would have micro lenses whose axes emanate radially from the disk's central axis.

Light Sources and Couplers

In a more preferred form of the invention shown in FIGS. 2A and B, a faceted layer 30 has been included for optically redirecting the light. The facets 34 can be integral to the layer 30 or a separate facet layer. Details of operation of such a faceted layer have been discussed hereinbefore. As shown further in FIG. 6A an input faceted layer 74 can also be disposed between a light source 76 and the first layer 61. The faceted layer 74 can be a prismatic facet array which provides a collimating effect for input light 78 which provides brighter or more uniform output light 80 into ambient.

Linear prisms parallel to the y-axis can improve uniformity by adjusting the input angular distribution to match more closely the input numerical aperture. Linear prisms parallel to the x-axis can limit the output transverse angular distribution, and also improve output brightness when used with a fluorescent lamp light source. In other forms of the invention, diffusion of input light is desirable wherein a diffuser 79 is used to diffuse the light distribution to spread out the light to improve light uniformity. The diffuser 79 is preferably a lenticular array, with cylindrical lenslets parallel to the y-axis. The diffuser 79 can also be a standard surface or volume diffuser, and can be a discrete film or coupled integrally to the wedge layer 61. Multiple prismatic or diffuser films can be used in combination. Such a film form of the diffuser 79 and the faceted film 74 can be interchanged in position to vary their effects.

Figure 12H:
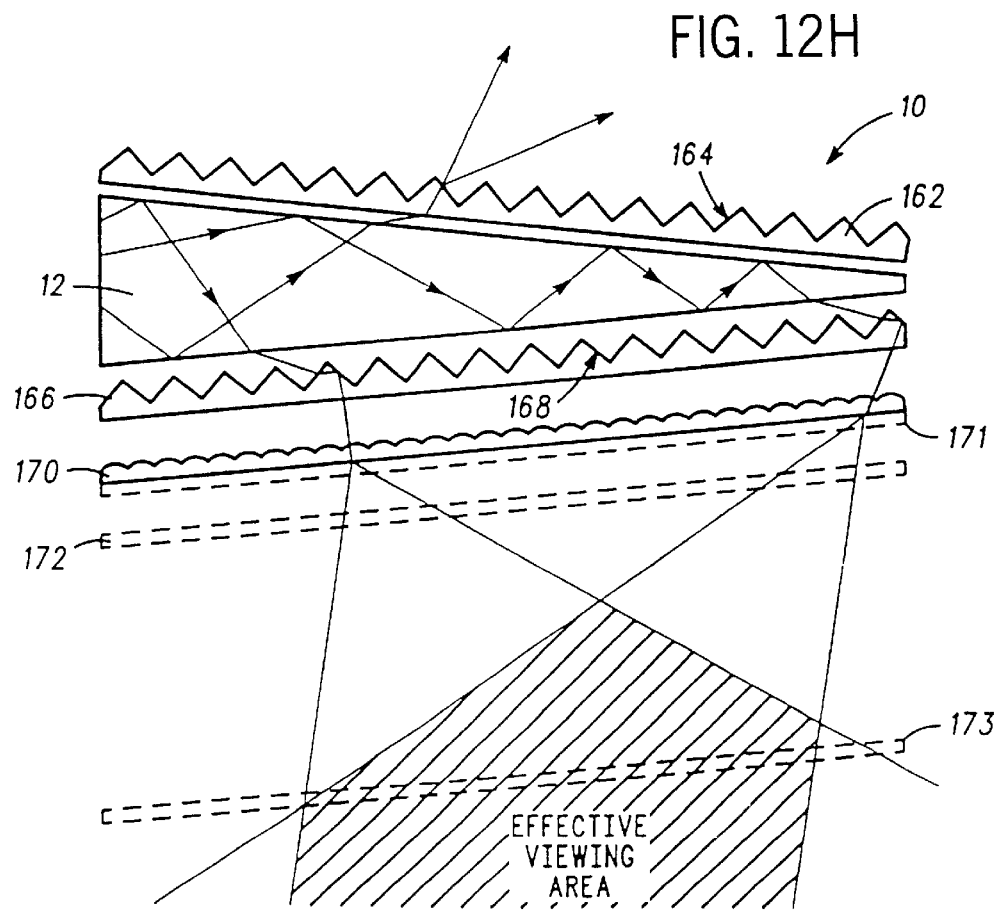
FIG. 12H shows a luminaire with a top surface refracting faceted layer and a bottom surface refracting/internally reflecting faceted layer.
Figure 12I:
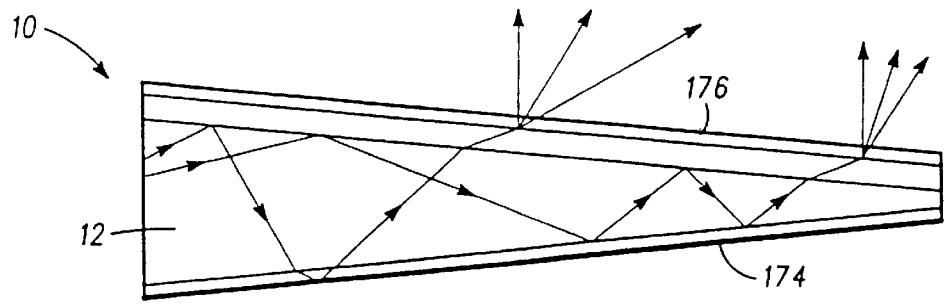
FIG. 12I illustrates a luminaire with a bottom surface specular reflector and a top layer transmission diffraction grating or transmission hologram.
Figure 12J:
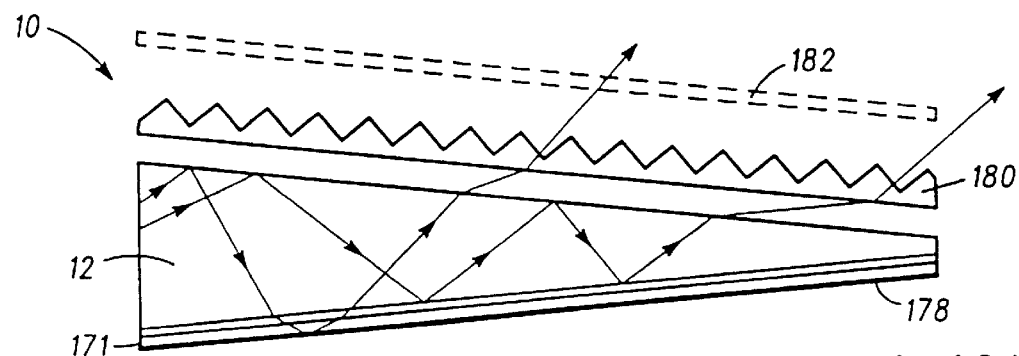
FIG. 12J shows a luminaire with a bottom surface specular reflector and a top surface refracting faceted layer and diffuser.
Figure 12K:
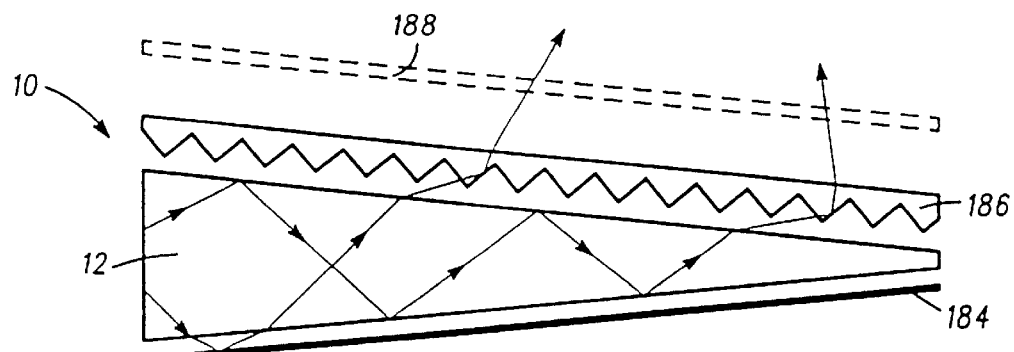
FIG. 12K illustrates a luminaire with a bottom layer specular reflector and a top layer refracting/internally reflecting faceted layer.
Figure 12L:
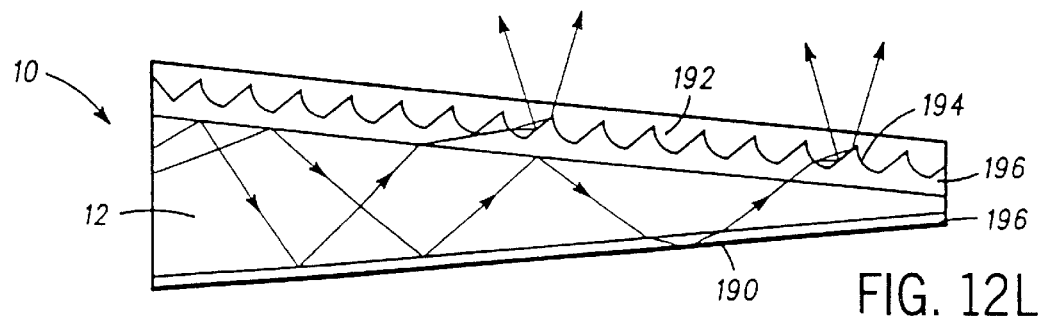
FIG. 12L shows a luminaire with a bottom specular reflector and a top layer refracting/internally reflecting faceted layer.
Figure 12M:
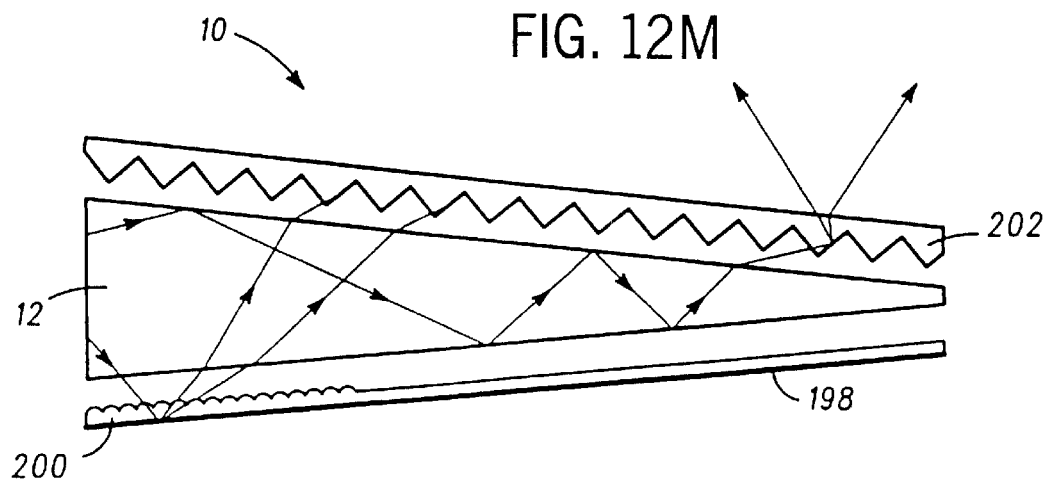
FIG. 12M illustrates a luminaire with an initial reflector section including an integral lenticular diffuser.
Figure 12N:
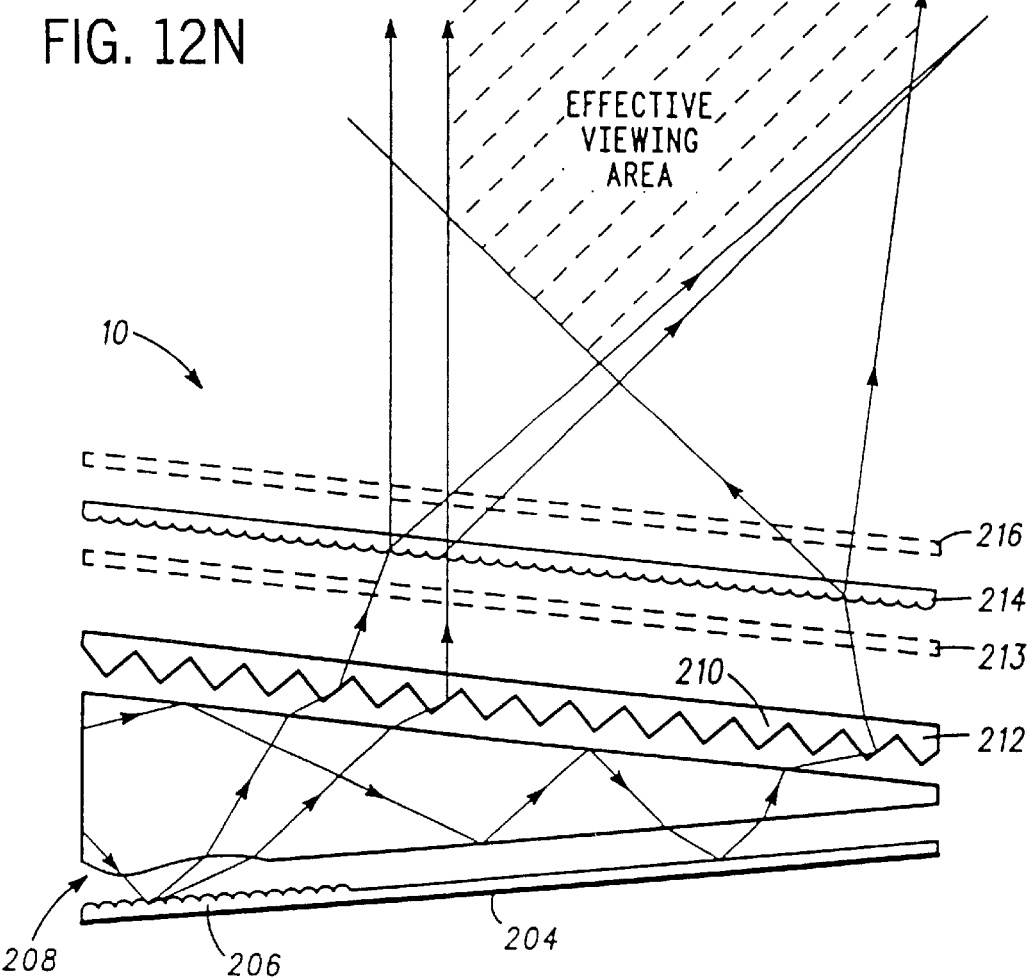
FIG. 12N shows a luminaire with a roughened initial reflector section of a layer.
Figure 12O:
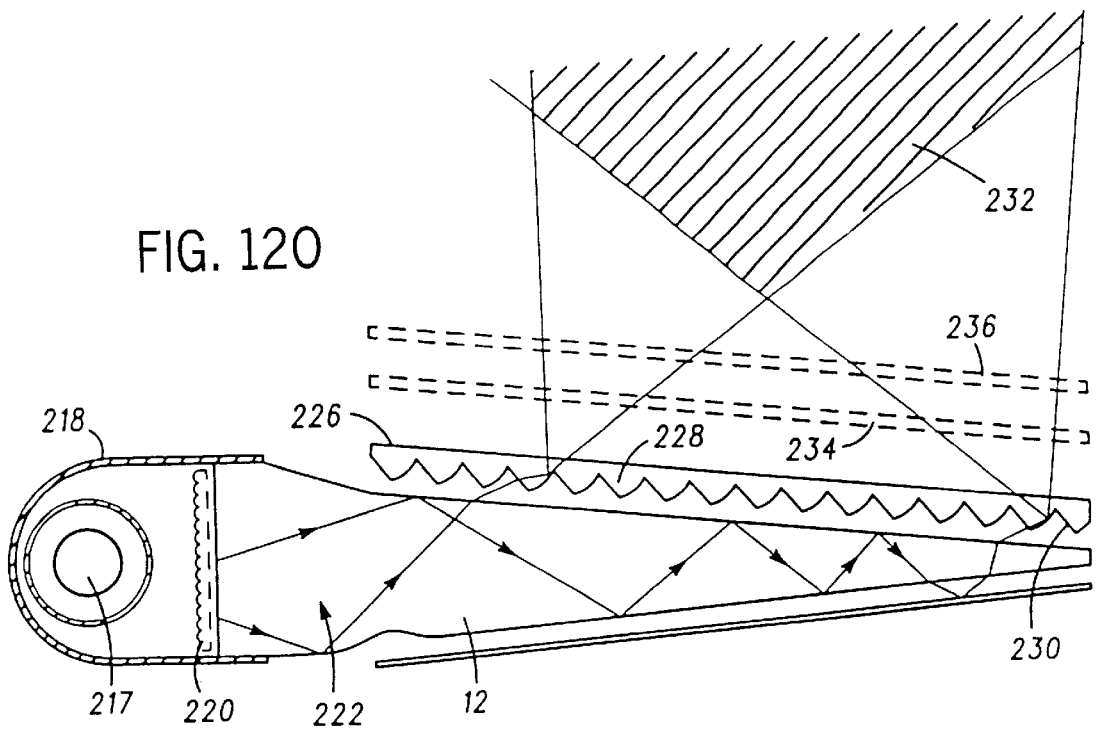
FIG. 12O illustrates a luminaire with an eccentric light coupler and converging to the wedge shaped section.
Figure 12P:
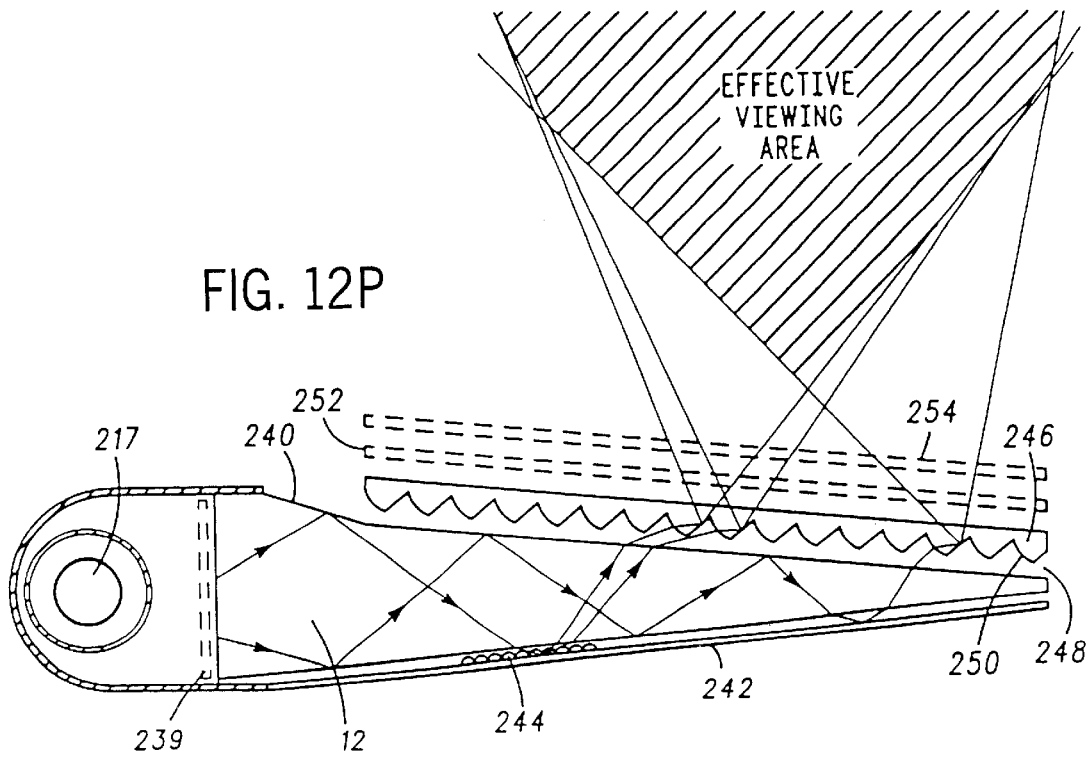
FIG. 12P shows a luminaire with an eccentric light coupler and a diffuser and roughened or lenticular reflector.
Figure 12Q:
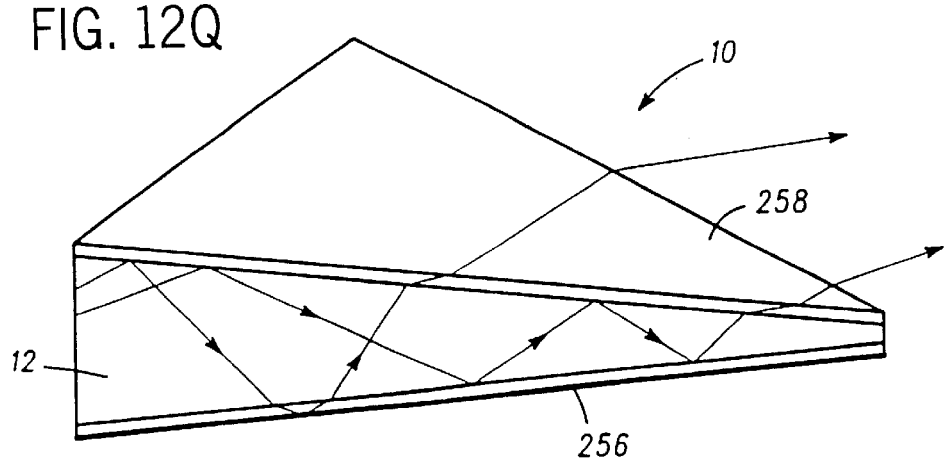
FIG. 12Q illustrates a luminaire with a bottom specular or diffusely reflecting layer and a top refracting layer and FIG. 12R shows a luminaire for generating a "bat wing" light output.

In another preferred form of the invention, a portion of a dielectric total internally reflecting CPC portion 100 (compound parabolic concentrator) can be interposed between the light source 76 and the first layer 61 (see FIGS. 2L, 120 and 12P). The CPC portion 100 adjusts the input light to match more closely the input numerical aperture. The CPC portion 100 is preferably formed integrally with the first layer 61.

Reflector elements 92 and 94 shown in FIGS. 7 and 8, respectively, can be shaped and positioned to maximize the throughput of light from the light source 76 to the light-pipe aperture. This is equivalent to minimizing the reflection of light back to the light source 76, which partially absorbs any returned light. The light source 76 is typically cylindrical and is surrounded by a transparent glass envelope 93, each having circular cross-sections as shown in FIGS. 7 and 8. Typical examples of such light sources include fluorescent tubes and long-filament incandescent lamps. The outer diameter of the light source 76 can be less than or equal to the inner diameter of the glass envelope 93. FIG. 7 shows a prior art U-shaped reflector 92 formed by wrapping a specular reflectorized polymer film around the light source 76 and making contact with the wedge layer 12 at each end of the film. The reflector element 92 typically is formed into a shape which is approximately an arc of a circle on the side of the light source 76 opposite the wedge layer 12, with approximately straight sections connecting each end-point of the arc with the wedge layer 12. This manner of coupling the reflector element 92 to the wedge layer 12 is most easily accomplished when the reflector element cross-section lacks sharp corners. In general the light source 76 is not permitted to touch either the wedge layer 12 or the reflectorized film, in order to minimize thermal and electrical coupling which can reduce lamp efficiency.

In one form of the present invention shown in FIG. 8, the reflector element 94 is advantageously designed and the light source 76 is advantageously placed to minimize the fraction of light returned to the light source 76, and thereby increases efficiency. In one preferred embodiment, at least a section of the reflector element 94 is shaped such that a line drawn normal to the surface of the reflector element 94 at each point is tangent to the circular cross-section of the light source 76. The resulting reflector shape is known as an involute of the light source 76.

While an involute provides maximum efficiency, other shapes can generally be more easily manufactured. Polymer films can be readily bent into smooth curves which include almost semicircular arcs, as described above. It can be shown that when the cross-section of the light source 76 and semicircular section of the reflector element 92 are concentric as shown in FIG. 7, then the semicircular section of the reflector element 92 will return all incident rays to the light source 76, leading to poor efficiency. Such inefficiency is a general property of self-absorbing circular sources and concentric semicircular reflectors. This general property can be derived from simple ray-tracing or the principal of skew invariance. Even if the reflector element 92 is not perfectly circular, each portion of the reflector element 92 will tend to return light to the light source 76 if the cross-section of the light source 76 is centered near the center of curvature of that reflector section.

In another preferred embodiment, the cross-section of the reflector element 94 in FIG. 8 includes one or more almost semicircular arcs, and efficiency is increased by displacing the center of the light source 76 away from the center of curvature of the reflector element 94. Ray-tracing and experiments have shown that such preferred embodiments can be determined using the following design rules:

1. The cross-section of the reflector element 94 has a maximum extent in the x-dimension equal to the maximum thickness of the wedge layer 12 (or light pipe);
2. The cross-section of the reflector element 94 has no optically sharp corners;
3. The radius of curvature of the reflector element 94 is as large as possible; and
4. The light source 76 is as far as possible from the wedge layer 12, but is far enough from the reflector element 94 to avoid contact with worst-case manufacturing variations.

FIG. 8 shows an example of a coupler which satisfies these above described design rules for the light source 76 with inner diameter=2 mm, outer diameter=3 mm, thickness of the wedge layer 12 (or light pipe)=5 mm, and manufacturing tolerances which permit a 0.25 mm spacing between the reflector element 94 and the outer diameter of the glass envelope 93. In this example of a preferred embodiment the radius of curvature of the reflector element 94 is 2.5 mm, and the center of the light source 76 is displaced by 0.75 mm away from the aperture of the wedge layer 12. A coupler constructed according to this design was found to be 10–15% brighter than the comparable concentric coupler shown in FIG. 7.

The involute and the U-shaped reflector elements 92 and 94 previously described are designed to output light to the aperture of the wedge layer 12 with angles approaching ±90 degrees relative to the aperture surface normal. In another preferred embodiment, the reflector element 94 is shaped to output light with an angular distribution which is closer to the N.A. of the device 10. As shown in FIGS. 6B and 6C, such shapes as the reflector element 94 can include other geometries, such as, a compound parabolic source reflector 86 and a nonimaging illumination source reflector 88. An example of the source reflector 88 is described in copending Ser. No. 07/732,982 assigned to the assignee of record of the instant application, and this application is incorporated by reference herein.

In another embodiment of the invention shown in FIGS. 6D, 12L, 12N, and 12O, the wedge layer 90 has a nonmonotonic varying wedge cross sectional thickness over various selected portions of the wedge shaped cross section. It has been determined that one can exert control over the light distribution being output by control of this cross section. Further, it has been determined that optical boundary effects, as well as intrinsic light source effects, can combine to give an output light distribution with unwanted anomalies. One can therefore also compensate for these anomalies, by providing a wedge cross section with nonlinear changes in the actual dimensions of the wedge layer 90, for example, near the thicker end which typically receives the input light. By control of these dimensions one can thus have another degree of freedom to exert control over the light distribution, as well as provide virtually any design to compensate for any boundary effect or light source artifact. Furthermore, one can vary the index of refraction within the wedge layer 90 in the manner described hereinbefore to modify the distribution of light and also compensate for light input anomalies to provide a desired light distribution output.

Manufacture of Luminaire Devices

In one form of the invention, manufacture of the device 10 can be accomplished by careful use of selected adhesives and lamination procedures. For example, the wedge layer 12 having index $n_1$ can be adhesively bonded to the first layer 28 having index $n_2$. An adhesive layer 60 (see FIG. 3B) can be applied in liquid form to the top surface of the first layer 28, and the layer 28 is adhesively coupled to the bottom surface 16 of the wedge layer 12. In general, the order of coupling the various layers can be in any given order.

In applying the layer 12 to the layer 28 and other such layers, the process of manufacture preferably accommodates the formation of internal layer interfaces which are substantially smooth interfacial surfaces. If not properly prepared such internal layers can detrimentally affect performance because each interface between layers of different indices can act as a reflecting surface with its own characteristic critical angle. If the interfacial surfaces are substantially smooth, then the detrimental effect of uneven surfaces is negligible. Therefore in effectuating the lamination of the various layers of the device 10, the methodology should utilize adhesives and/or joining techniques which provide the above described smooth interfacial layers. Examples of lamination processes include, without limitation, joining without additional adhesive layers, coatings applied to one layer and then joined to a second layer with an adhesive and applying a film layer with two adhesive layers (one on each layer surface to be joined to the other).

In a preferred embodiment lamination of layers is done without any additional internal layer whose potential interfacial roughness will distort the light distribution. An example of such a geometry for the device 10 can be a liquid layer between the wedge layer 12 and the second layer 30. This method works best if the first layer 29 (such as the liquid layer) acts as an adhesive. One can choose to cure the adhesive either before, partially or completely, or after joining together the various layers of the device 10. The optical interface is thus defined by the bottom surface of the wedge layer 12 and the top surface of the second layer 30.

In another embodiment wherein a coating is used with an adhesive layer, the first layer 28 can be the coating applied to the second layer 30. Then, the coated film can be laminated to the wedge layer 12 in a second step by applying an adhesive between the coated film and the wedge layer 12. It is preferable to apply the low index coating to the second layer 30 rather than directly to the wedge layer 12 since the second layer 30 is typically supplied in the form of continuous film rolls. In practice it is more cost effective to coat such continuous rolls than to coat discrete pieces. With this methodology it is more convenient to control thickness of the applied low index layer.

In another embodiment, the second layer 30 is manufactured in such a way that it adheres to the first layer 28 directly without use of additional adhesives. For example, the second layer 30 can be manufactured by applying a layer of polymer material to the first layer 28, and then casting this material to have the desired second layer geometry. In another example, the first layer 28 can serve as a carrier film during the embossing of the second layer 30. By use of appropriate temperatures during the embossing process, the second layer 30 can be heat-fused to the first layer 28. Such heat-fusing can be accomplished using a conventional FEP first-layer film by embossing at almost five hundred degrees F or higher.

In a further embodiment using a film and two adhesives, the first layer 28 can be an extruded or cast film which is then laminated to the wedge layer 12, or between the wedge layer 12 and the second layer 30 using adhesive between the two types of interfaces. In order to minimize the detrimental light scattering described hereinbefore, the adhesive layer should be flat and smooth. The film can be obtained as a low index material in commercially available, inexpensive forms. Such additional adhesive layers can increase the strength by virtue of the multi-layer construction having adhesive between each of the layers.

In the use of adhesive generally, the performance of the device 10 is optimized when the index of the adhesive between the wedge layer and the first layer is as close as possible to the index of the first layer 28. When the critical angle at the wedge/adhesive interface is as low as possible, then the light undergoes a minimal number of reflections off the lower quality film interface before exiting the device 10. In addition, the index change at the surface of the first layer film is minimized which decreases the effects of film surface roughness.

Manufacture of faceted surfaces can be accomplished by micro-machining a mold using a master tool. Machining can be carried out by ruling with an appropriately shaped diamond tool. The master tool can be replicated by known techniques, such as electroforming or casting. Each replication step inverts the shape of the desired surface. The resulting mold or replicates thereof can then be used to emboss the desired shape in the second layer 30. A directly ruled surface can also be used, but the above described embossing method is preferred. Known "milling" processes can include chemical etching techniques, ion beam etching and laser beam milling.

In yet another method of mechanical manufacture, the faceted surface 34 (see FIGS. 2B and 2M, for example) is manufactured by a welding process, such as embossing or casting, using a hard tool which has on one surface the inverse of the profile of the desired faceted surface 34. Therefore, the manufacturing problem reduces to the matter of machining an appropriate tool. Usually the machined tool is used as a template to form the tools actually used in the casting or embossing process. Tools are typically replicated by electroforming. Since electroforming inverts the surface profile, and electroforms may be made from other electroforms, any number of such inversions can be accomplished and the directly machined "master" can have the shape of the faceted surfaces 3A or its inverse.

The tooling for the faceted surface 34 can be manufactured by single-point diamond machining, wherein the distance between cutting tool and the work is varied to trace out the desired profile. The diamond cutting tool must be very sharp, but in principle nearly arbitrary profiles can be created. A given design can also require specific adaptations to accommodate the non-zero radius of the cutting tool. If curved facet surfaces are required, then circular arcs are preferred to facilitate fabrication. The cutting tool is moved through the cutting substrate and cuts a groove having the approximate shape of the tool. It is desirable to machine the entire piece using a single diamond tool. When this method is used for making a "focusing" type of the faceted surface 34, the variable groove profile therefore should be designed such that the various groove profiles can be machined by the same tool. The required shape variations can still be accomplished by varying the angle of the tool, as well as the groove spacing and depth.

Design of the faceted surface 34 preferably satisfies a few general constraints:

1. Approximately linear variation in the center of the illumination angular distribution as a function of position. A variation of 11 degrees (±5.5°) from top to bottom of typical computer screens is effective;
2. The width of the variable angular distribution of light output should be approximately proportional to the local illuminance in order to achieve approximately uniform brightness to an observer. Examples given below show the spatial distribution is approximately uniform, so the angular cones have approximately uniform width; and
3. Spacing between grooves of the facets 38 should be large enough or irregular enough to avoid diffraction effects, but also be chosen to avoid Moiré patterns when used with an LCD panel. In practice these requirements limit the allowed spatial variations.

In the manufacture of the device 10, for example, the viewing angle depends on the tilt and curvature of each of the facets 38. Focusing is accomplished by rotating the facet structure as a function of position. Using the example of a 150 mm screen viewed from 500 mm away, the illumination cone can be varied by 17 degrees (i.e., ±8.5 degrees) from top to bottom. For typical materials, acrylic and FEP, this requires the facet structure to rotate by approximately 5.7 degrees from top to bottom of the screen 89 (see FIG. 9B).

Design constraints can result when limitations (1)–(3) are combined with the need to machine variable curved grooves with a single tool. For example, maintaining a constant angular width (Constraint #1) at a constant cutting depth requires a compensating variation in groove spacing or groove depth. Specifically, a linear change in groove spacing can reduce the brightness variation to a negligible level when the form tool which cuts the groove is shaped so that portions of each curved reflector facets (see FIG. 2M) are shadowed by the top edge of the adjacent facets. This spacing variation can be small enough to satisfy Constraint #3.

Further methods of manufacture can include vapor deposition, sputtering or ion beam deposition of the first layer 28 since this layer can be quite thin as described hereinbefore. Likewise, the second layer 30 can be controllably applied to form the faceted layer 30 shown in FIG. 2B (such as by masking and layer deposition).

Wedge Light Pipe as a Simple Collimator Device

In the most general embodiment the wedge layer 12 can function in the context of the combination as a simple collimating optical element. The substantially transparent wedge layer 12 has an optical index of refraction $n_1$ and the top surface 14 and the bottom surface 16 converge to establish at least one angle of inclination φ (see FIG. 15). The wedge layer 12 also includes the back surface 20 spanning the top surface 14 and the bottom surface 16. Adjacent to the wedge layer 12 is the transparent first layer 28 having index of refraction $n_2$ including an air gap. Adjacent to the first layer 28 is a specular reflective layer, such as the faceted surface 34 of the second layer 30.

Substantially uncollimated light is introduced through the back surface 20 by the source 22. The light propagates within the wedge layer 12, with each ray decreasing its incident angle with respect to the top and bottom surfaces 14 and 16 until the incident angle is less than the critical angle $\theta_c$. Once the angle is less than $\theta_c$, the ray emerges into ambient. Rays which emerge through the bottom surface 16 are reflected back into the wedge layer 12 and then output into ambient. By virtue of the angle-filtering effect previously described, the output light is collimated within a cone of angular width approximately:

$$\Delta\theta \approx 2\phi^{1/2}(n^2-1)^{1/4} \tag{8}$$

An area 99 to be illuminated lies beyond the end of the wedge layer 12 and substantially within the above-defined cone of width Δθ.

In another preferred embodiment a light-redirecting means can be positioned beyond the end of the wedge layer 12 and substantially within the above-defined cone of width Δθ. The light-redirecting means can be a lens, planar specular reflector, or curved reflector. The light-redirecting means reflects or refracts the light to the area to be illuminated. Further details and uses of such redirecting means, such as lenticular diffusers, will be described hereinafter.

In the embodiments of FIG. 6 having two air gaps or transparent dielectric layers, the light redirecting layers are independent, and thus one can construct devices having layers of different types. For example, the use of two transmissive redirecting layers is preferred when light is to be emitted from both sides of the device 10 or whenever maximum collimation is desired. Examples of the redirecting layer 82 in general for all inventions for two redirecting layers can include the examples in FIG. 12 where the letter in parenthesis corresponds to the appropriate figure of FIG. 12: (a) diffraction gratings 120 or a hologram 122 in FIG. 12A, (b) two refracting facet layers 124 with diffusers 126 in FIG. 12B, (c) two faceted layers 128 with facets 130 designed to refract and internally reflect light output from the wedge layer 12; such facets 130 are capable of turning the light output through a larger angle than is possible by refraction alone; (d) two refracting single facet layers 132 (prisms); (e) a top surface redirecting layer for the wedge layer 12 having a refracting single facet layer 134 with a curved output surface 136 for focusing. A bottom surface 138 includes a redirecting layer for refracting and internally reflecting light using a faceted layer 140; facet angles are varied with position to focus output light 142 at F; (f) a top surface redirecting layer 144 comprised of a refracting faceted layer 146 and a bottom redirecting layer comprised of a refracting/internally reflecting layer 148 with narrow angle output for the light, and a diffuser layer 150 can be added to smoothly broaden the light output angular distribution; (g) a top surface redirecting layer of refracting/internally reflecting faceted layer 152 with refracting surfaces 154 convexly curved to broaden the output angular distribution; the facet angles can be varied with position and thereby selectively direct the light output angular cones to create a preferred viewing region at a finite distance; this arrangement can further include a transverse lenticular diffuser 156 to diffuse nonuniformities not removed by the curved facet layer 152; the bottom redirecting layer comprises a refracting/internally reflecting faceted layer 158 with a reflecting surface 160 being concavely curved to broaden the light output angular distribution in a controlled manner; (h) a top redirecting layer, including a refracting faceted layer 162 with curved facets 164 to broaden the output angular distribution in a controlled manner and to improve uniformity; a bottom redirecting layer, including a refracting/internally-reflecting faceted layer 166 with flat facets 168 for narrow-angle output, with facet geometry varied with position to focus output light at a finite distance; a parallel lenticular diffuser 170 can be used to smoothly broaden the output angular distribution in a controlled manner and to improve uniformity; the transparent image shown in phantom can be printed on or adhesively based to a lenticular diffuser; a transverse lenticular diffuser 172 is used to diffuse non-uniformities not removed by the parallel lenticular diffuser 170. The combination of a focused flat-faceted layer 166 and the diffuser 170 cooperate to create a preferred viewing zone at a finite distance, similar to using focused curved facets. Also shown is an LCD component 173 (in phantom) usable with this and any other form of the device 10 for illumination purposes.

In other architectures, one transmissive and one reflective redirecting layer can be combined. These are combinations of reflective redirecting layers with the various types of transmissive redirecting layers discussed above. Reflective redirecting layers can be specular, partially diffuse, diffuse, faceted or any combination thereof. These architectures are preferred when light emission is desired from one side only, or in some cases when minimum cost is paramount. Examples of such architectures are in FIG. 12: (i) a bottom surface specular reflector 174 combined with a top layer transmission diffraction grating or transmission hologram 176; (j) a bottom surface specular reflector 178 combined with a top surface refracting faceted layer 180, with a diffuser 182 (shown in phantom in FIG. 12J and an intervening image-forming layer 171; (k) a bottom layer specular reflector 184 with a top layer refracting/internally-reflecting faceted layer 186, with facet geometry being varied with position to focus output light at a finite distance; a diffuser 188 is shown in phantom; (l) a bottom layer specular reflector 190 with a top layer refracting/internally-reflecting faceted layer 192, and curved facets 194 are used to smoothly broaden the angular output of light in a controlled manner and to improve uniformity. The thickness of the wedge layer 12 and of both top and bottom surface low-index layers 196 (e.g., air gaps) are varied to influence the light output spatial distribution; (m) a bottom reflector 198 is partially specular, partially diffuse to improve uniformity; FIG. 12M shows the initial reflector section made controllably diffuse by addition of an integral lenticular diffuser 200; the diffuser 200 is designed to selectively reduce nonuniformities which would otherwise appear in the output near the thicker end, and running in the general direction of the y-axis; also included is a top redirecting layer 202 which is refracting/internally-reflecting and has a reflecting surface which is curved; and (n) a bottom reflector layer 204 which is partially specular, partially diffuse to improve uniformity; FIG. 12N shows the initial reflector section 206 which is slightly roughened to reduce specularity, and thereby selectively reduces nonuniformities which would otherwise appear in the output near thicker end 208; a top redirecting layer 210 is used which is refracting/internally-reflecting with a flat-faceted layer 212, and the facet geometry is varied to redirect light from each facet to a common focus at finite distance; a transverse lenticular diffuser 213 is shown in phantom; a parallel lenticular diffuser 214 is used to smoothly broaden the output angular distribution in a controlled manner, converting the focal zone of the flat-faceted layer 212 to a wider preferred viewing zone; the lenticular diffuser 213 also improves uniformity; an LCD display 216 or other transparent image is show in phantom; (o) in a preferred embodiment an eccentric coupler 218 uses a uniformity-enhancing lenticular diffuser 220 shown in phantom in FIG. 12O. A converging tapered section 222 or CPC (integral to the wedge layer) transforms the output angular distribution to match more closely the input N.A. of the wedge layer 12. The wedge layer 12 thickness is smoothly varied to influence output spatial distribution and improve uniformity; a bottom redirecting layer 224 is a specular or partially diffuse reflector; a top redirecting layer 226 is a refracting/internally-reflecting faceted layer 228 with reflecting surfaces 230 convexly curved to smoothly broaden output angle in a controllable manner; facet geometry is varied with position to selectively direct the angular cone of light from each face to create a preferred viewing zone 232 at a finite distance; a transverse lenticular diffuser 234 is shown in phantom; an LCD display 236 or other transparent image is also shown in phantom; the more converging N.A.—matching section is advantageous in combination with the faceted redirecting layers, because the redirecting and low-index layers do not need to overly the more converging section; therefore, the input aperture (and thus efficiency) of the device 10 is increased with minimum increase in total thickness of the device; (p) another preferred embodiment for LCD backlighting uses an eccentric coupler with a uniformity-enhancing diffuser shown in phantom in FIG. 12P; a converging half-tapered section 240 or half-CPC (integral to the wedge layer 12) transforms a coupler output angular distribution to match more closely the input N.A. of the wedge layer 12. A diffuser 239 (in phantom) can also be interposed between light source 217 and the wedge layer 12. The sufficiently truncated half-CPC 240 is just a simple tapered section. A bottom reflector 242 which is partially specular, partially diffuse is used to improve uniformity; FIG. 12P further shows an initial reflector section 244 which is slightly roughened to reduce specularity, or alternatively shaped into a series of parallel reflective grooves, which thereby selectively reduces non-uniformities which would otherwise appear in the output near the thicker end; a top redirecting layer 246 is a refracting/internally-reflecting faceted layer 248, with refracting surfaces 250 convexly curved to smoothly broaden output angle in a controllable manner; facet geometry is varied with position to selectively direct angular cones of light from each facet to create a preferred viewing zone at a finite distance; a transverse lenticular diffuser 252 is shown in phantom. Also included is an LCD display 254 or other transparent image shown in phantom.

Figure 12R:
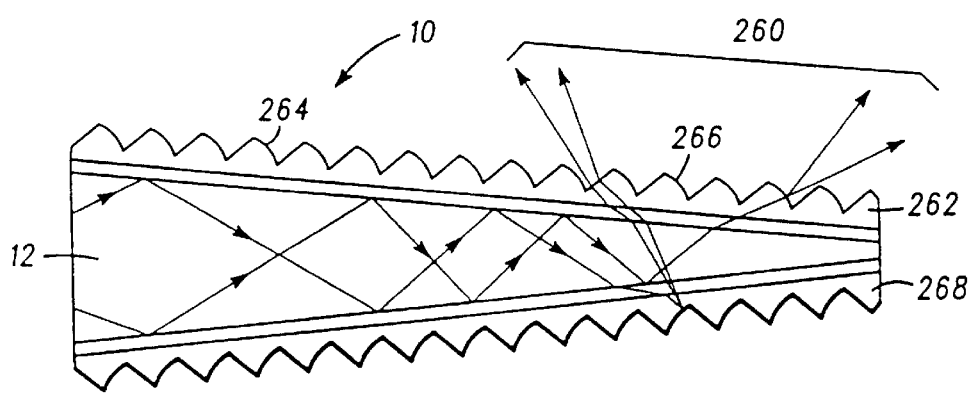

The more converging N.A.—matching section (such as half tapered section 240) is advantageous in combination with the faceted redirecting layers, because the redirecting and low-index layers do not need to overly the more converging section; therefore, the light-accepting aperture of the device 10 is increased without increasing the total thickness. The advantage is also conferred by the fully-tapered section 222 shown in FIG. 12O; but in comparison the half-tapered section 240 in FIG. 12P provides greater thickness reduction on one side, at the expense of being longer in the direction of taper for equivalent N.A.—matching effect. It can be desirable to concentrate the thickness reduction to one side as shown, because the top surface low-index layer can be made thicker to improve uniformity. This configuration can be more easily manufactured because the bottom reflector layer can be integral to the coupler reflector cavity, without need to bend a reflective film around a corner; (q) a bottom specular or diffusely reflecting layer 256 can be combined with single-facet refracting top layer 258 in yet another embodiment (see FIG. 12Q); and (r) in cases for interior lighting usage, a bimodal "bat-wing" angular light distribution 260 is preferred; in FIG. 12R is shown a top refracting layer 262 with facets 264 and has a curved front surface 266 to smoothly broaden angular output and improve uniformity, with output light directed primarily into a forward quadrant; a bottom reflecting layer 268 reflects light primarily through a back surface of a top redirecting layer, with output directed substantially into a backwards quadrant.

Figure 13:
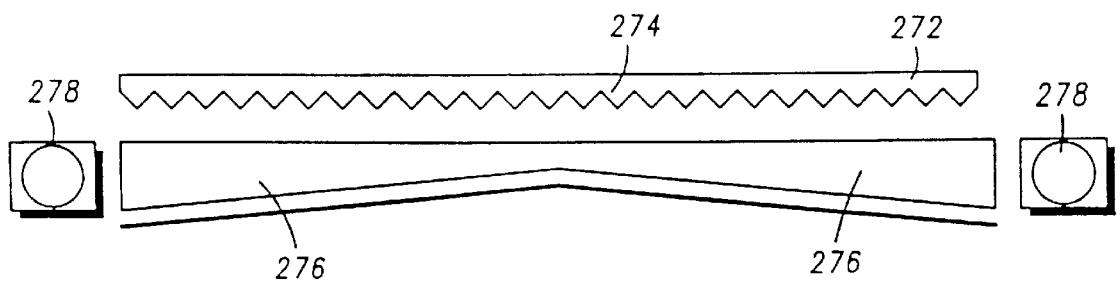
FIG. 13 illustrates a combination of two wedge shaped sections formed integrally and using two light sources.

As understood in the art the various elements shown in the figures can be utilized with combinations of elements in tapered luminaire devices. Examples of two such combination geometries are shown in FIGS. 13 and 14, each figure also including features specific to the geometry shown. As illustrated in FIG. 13, two wedges 276 can be combined and formed integrally. This combination can provide higher brightness than a single wedge having the same extent because it permits two light sources to supply light to the same total area. While brightness is increased for this device, efficiency is similar because two sources also require twice as much power as one source. A redirecting film 272 with facets 274 can be a single, symmetric design which accepts light from both directions as shown. Alternatively, the redirecting film 272 can have a different design for each wing of the butterfly.

In FIG. 14 is shown a three dimensional rendition of a tapered disk 270, such as shown in FIG. 5, and is sectioned to show the appearance of the various layers. A faceted redirecting layer 280 comprises concentric circular facets 282 overlying a tapered light-pipe portion 284. Directly over a light source 288, overlying the gap at the axis of the light-pipe portion 284, the redirecting layer 280 takes the form of a lens (a Fresnel lens 280 is shown, for example). Directly below the light source 288 is a reflector 290 positioned to prevent light from escaping and to redirect the light into the light-pipe portion 284 or through the lens. At least one opening is provided in the reflector to permit passage of elements, such as wires or light-pipes.

Use of Imaging or Colored Layers

All embodiments of the invention can incorporate one or more layers which have variable transmission to form an image, or which impart color to at least a portion of the angular output. The image-forming layer can include a static image, such as a conventional transparent display, or a selectively controlled image, such as a liquid crystal display. The image-forming or color-imparting layer can overlay one of the redirecting layers, or alternatively it can comprise an intermediate layer between one of the low-index layers and the associated redirecting layer, or an internal component of a redirecting layer. For example, overlying image-forming layers 129 are shown in phantom in FIGS. 12C and 12G. Examples of an internal image-forming layer 171 are shown in FIGS. 12H and 12J.

In one preferred embodiment, the image-forming layer (such as 129 and 170) is a polymer-dispersed liquid crystal (PDLC) layer. By proper arrangement of the layers, the image or color may be projected from the device within selected portions of the output angular distribution. The image or selected color can be substantially absent in the remaining portions of the output angular distribution.

Bi-modal Reflective Wedge for LCD Panel Illumination

In some applications it is desired to illuminate a single LCD panel selectively with either ambient light or by active back-lighting. In these applications ambient illumination is selected in well-lit environments in order to minimize power consumption by the display. When available environmental illumination is too low to provide adequate display quality, then active backlighting is selected. This selective bi-modal operating mode requires a back-illumination unit which can efficiently backlight the LCD in active mode, and efficiently reflect ambient light in the alternative ambient mode.

The most widespread prior art bi-modal liquid crystal display is the "transflective display" 101, such as is shown in FIG. 16B. This approach uses a conventional backlight 102 and a transmissive LCD panel 103, with an intervening layer 104 which is partially reflective and partially transmissive. In order to achieve adequate ambient mode performance, it is typically necessary for the intervening layer 104 to be 80–90% reflective. The resulting low transmissivity makes the transflective display 101 inefficient in the active mode of operation.

Another embodiment of the invention is shown in FIG. 17. This embodiment outperforms prior art transflective displays in the active mode, and demonstrates comparable performance in the ambient mode. In this embodiment the wedge layer 12 (index=$n_1$) having the bottom surface 16 is coupled to a transparent layer 28 of index $n_2 < n_1$, which can be an air gap. The $n_2$ layer is coupled to a partially diffuse reflector layer 105. This reflector layer 105 is, for example, preferably similar to the reflectors used in conventional LCD panels used in ambient mode only, as shown in FIG. 16A. Overlaying the wedge layer top surface 14 is a faceted redirecting layer 106, such as a lenticular diffuser with micro lenses approximately parallel to the y-axis. A liquid crystal display panel 107 overlays the faceted redirecting layer 106. The back surface 20 of the wedge layer 12 is coupled to the light source 22.

The lenticular redirecting layer 106 and the wedge-layer 12 are substantially transparent to the incident and reflective light, so that in ambient mode the device 10 operates in a manner similar to conventional ambient-mode-only displays. When an active mode is selected, the light source 22 is activated, and the multiple layers act to spread the light substantially uniformly over the device 10 by virtue of the relationship between the indices of refraction and convergence angles of the layers, as described before. The resulting uniform illumination is emitted through the top surface 14 of the wedge layer 12. In a preferred embodiment, the reflector layer 105 is nearly specular in order to maximize ambient-mode performance. In this preferred embodiment the light emitted from the top surface is emitted largely at grazing angles, unsuitable for transmission by the LCD display panel 107. The redirecting layer 106 redirects a fraction of this light by a combination of refraction and total internal reflection, as described hereinbefore. The redirecting layer 106 is preferably designed such that at least 10–20% of the light is redirected into angles less than 30 degrees from the LCD normal, because typically the LCD transmission is highest in this angular range. It is sufficient to direct only a fraction of the back-illumination into suitable angles, because the prior art transflective display is quite inefficient in the active mode of operation.

Processing Polarized Light

In another aspect of the invention, the light being processed by the optical device 10 has an inherent polarization (such as, linear, circular and elliptical) that can be used to advantage in improving the illumination from a liquid crystal display ("LCD") system or other output which depends on using polarized light. In a system which employs an LCD, it is necessary to remove one type of polarized light 308 and pass to the LCD layer only the other type of polarized light. For example in FIG. 30 a conventional polarization layer 312 preferentially absorbs one polarization of light amounting to about one-half the input light from light source 306, with the preferred polarization light being transmitted to LCD layer 316. The polarized light of the proper polarization is processed by the liquid crystals and a second polarizer 314 in the desired manner to provide the displayed feature of interest. In such a conventional system about half the light from the light source is "unwanted" and thus is lost for purposes of providing an LCD output of interest. Consequently, if a means could be found to utilize both types of polarized light (not removing light of an unwanted polarization), a substantial gain in efficiency and brightness can result for the liquid crystal display. The subject invention is directed in part to that end, and the following embodiments are preferred structures and methods for accomplishing that goal.

Figure 30A:
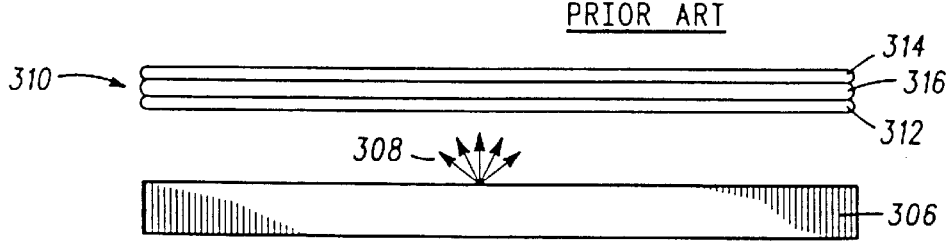
FIG. 30A illustrates a conventional LCD display system.
Figure 30B:
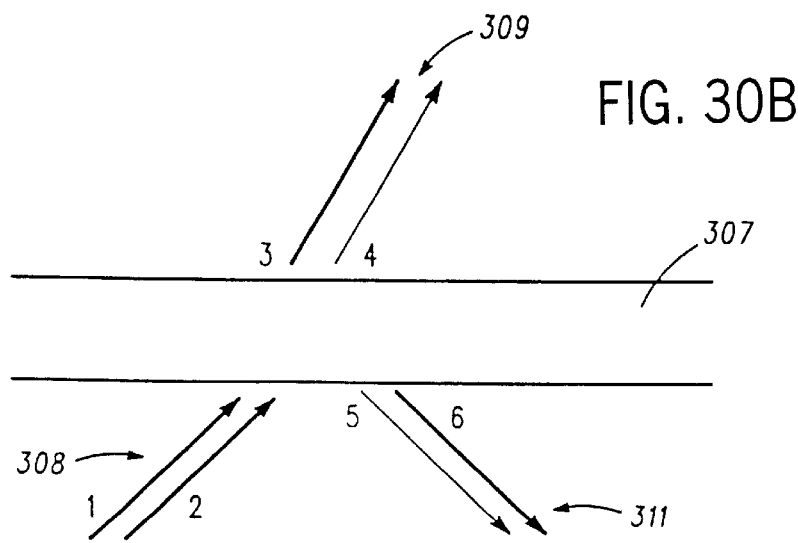
FIG. 30B shows a polarization filter layer.

In the most general explanation of a polarization filter, referring to FIG. 30B, the function of a polarization filter layer 307 is to take the input light 308 consisting of two polarization states of type 1 and 2 and create transmitted light 309 consisting of polarization states 3 and 4 and reflected light 311 consisting of polarization states 5 and 6. This can be related to our specific references hereinafter to a "first" and "second" state as "states" 1,3 and 5 as the "first polarization light 218" and 2,4 and 6 as the "second polarization" light 220. Thus, we assume that the form of states 3 and 5 are chosen so that they alone specify the light that is transmitted and reflected due to the light portion incident in polarization state 1, and let states 4 and 6 be associated with polarization state 2. However, the form of the polarization states need not be related in any more specific way. For some range of incident angles over some spectral wavelength range and for some specific selection of input polarization states, the polarization filter layer 307 processes the input light 308 and produces output light 309 with a specific total power relationship. If we define the powers ($P_i$) in each of the polarization states (i, where i=1,2,3,4,5,6), the condition is:

$$\frac{P_3}{P_1} > \frac{P_4}{P_2}$$

By definition, any layer which exhibits the above characteristics over a suitable angular and spectral range is a form of the polarization filter layer 307. Generally, the polarization states considered can be of arbitrary type such as linear, circular, or elliptical. In later sections we will quantify the performance of the polarization filter layer 307 by a degree of polarization ($P_T$) defined as:

$$P_T = \frac{T_{31} - T_{42}}{T_{31} + T_{42}}$$

where $$T_{31} = \frac{P_3}{P_1}, T_{42} = \frac{P_4}{P_2}$$

For lossless layers, the transmittance is related to the reflectance, R, by $$T_{31} = 1 - R_{51}, T_{42} = 1 - R_{62}$$

where $$R_{51} = P_5/P_1 \text{ and } R_{62} = P_6/P_2$$

There are a variety of implementations of a layer medium which has the properties described above for the polarization filter layer 307. These include, but are not restricted to, implementations containing one or more of the following types of layers: (1) thin-film layers produced by coating, extrusion, or some other process which are either non-birefringent or birefringent and are designed to operate as optical interference coatings; (2) "thick" film layers which are more than a single quarter wavelength optically thick somewhere in the spectral band of interest and may be produced by stacking, coating, extrusion, lamination, or some other process and are designed to operate as a Brewster Stack even when the angles and indexes do not exactly match the Brewster angle conditions; (3) a combination of the thin-film and thick film approaches; (4) correlated, partially correlated, or uncorrelated surface roughness or profile which results in polarization dependent scattering and produced by any method including etching, embossing, micro-machining, or other method; (5) and layers based on dichroic material. In general, an aggregate layer formed by one or more the above layer types is a suitable form of the polarization filter layer 307 layer if it satisfies the general functional specifications described above for polarization filter layers.

The implementations of the polarization filter layer 307 can consist of either thin-film or thick-film birefringent or non-birefringent layers. Particular examples and discussion of birefringent layers will be provided in a labeled subsection presented hereinafter.

Figure 30C:
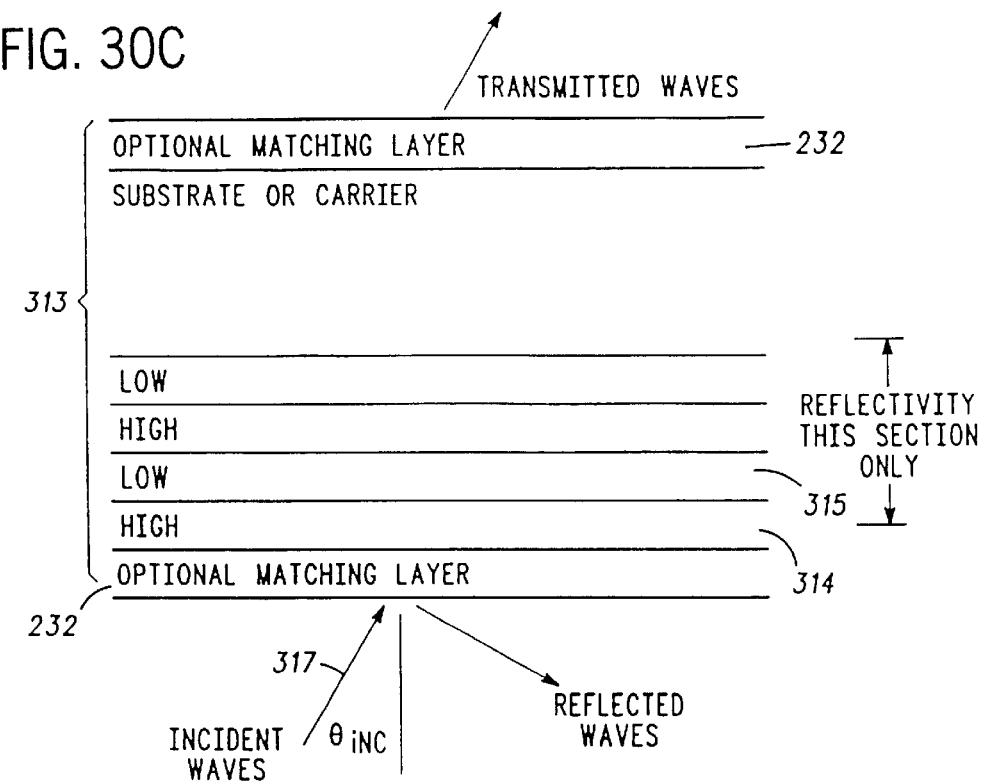
FIG. 30C illustrates a multilayer thin film form of polarization filter.
Figure 30D:
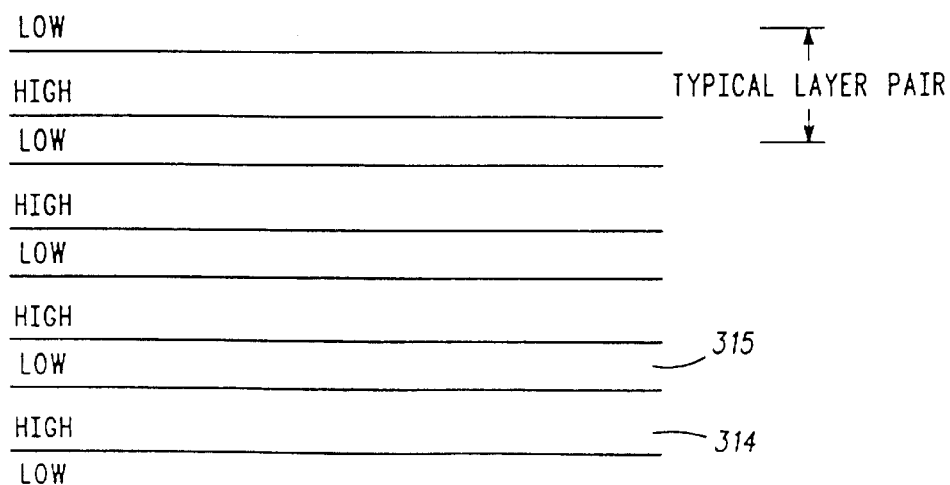
FIG. 30D shows a Brewster Stack form of polarization filter.

One example embodiment of a thick film form of the polarization filter layer 307 is based on a specific design center wavelength ($6_o$) and a specific design operating angle ($3_{inc}$) as shown in FIG. 30C and based on isotropic planar layers. Layers 313 in this design example consist of two types of alternating layers, called high (H) layer 314 and low (L) layer 315 of optical refractive index $n_H$ and $n_L$ respectively. From Snell's law, we know the angle with respect to the surface normals ($3_L, 3_H$) at which the light 317 are traveling in any of the layer 313 in terms of the refractive indexes of the layers ($n_{inc}$, $n_L$, $n_H$) if we know the incidence angle. This implies:

$$n_{inc} \sin \theta_{inc} = n_L \sin \theta_L$$

$$n_{inc} \sin \theta_{inc} = n_H \sin \theta_H$$

For p-polarized form of the light 317 incident on an interface between two optically isotropic regions, there is an angle called the Brewster's Angle at which the reflectivity of the interface is zero. This angle measured to the surface normal ($\theta_{H/L}$, $\theta_{L/H}$) is:

$$\tan\theta_{H/L} = \frac{n_L}{n_H}$$

$$\tan\theta_{L/H} = \frac{n_H}{n_L}$$

The reflectivity of the interfaces to s-polarized light at Brewster's Angle can be significant. The layers 313 which preferentially transmits the p-polarization state is designed by spacing these interfaces by quarter-wave optical thicknesses. Such quarter wavelength thicknesses ($t_L$, $t_H$) are given by:

$$t_L = \frac{\lambda_o}{4n_L \cos\theta_L}$$

$$t_H = \frac{\lambda_o}{4n_H \cos\theta_H}$$

One can show that the H and L indexes of refraction are related by the design equation:

$$\left(\frac{n_L}{n_H}\right)^2 = \frac{\left(\frac{n_{inc}}{n_H}\right)^2 \sin^2\theta_{inc}}{1 - \left(\frac{n_{inc}}{n_H}\right)^2 \sin^2\theta_{inc}}$$

As an example, consider the specific case of:

$n_H=1.5, n_{inc}=1.0, \theta_{inc}=80°, \lambda_o=500$ nm

This implies that the design index of refraction of the low index layer and the physical thicknesses of the low and high index layers 314 and 315 should be respectively $n_L=1.31$, $t_L=145$ nm, $t_H=110$ nm. These can be achieved by using sputtered glass and vacuum deposited lithium chloride for $n_H=1.5$ and $n_L=1.31$, respectively. Assuming that the design is a matched design as in FIG. 30C, with the layers 313 surrounded by an index of refraction of 1.5, the reflectivity can be easily calculated with the well-known Rouard's Method. This matching assumption is quite general as the outer surfaces could always be anti-reflection coated. The reflectivity for a variety of basic layer counts for the layers 313 is shown in Table 1 below:

TABLE 1

Performance data for the polarization filter layer 307

| Layer Count | s-Reflectivity | $P_T$ |
|---|---|---|
| 1 | 0.069 | 0.036 |
| 5 | 0.45 | 0.29 |
| 11 | 0.85 | 0.75 |
| 15 | 0.95 | 0.90 |
| 21 | 0.99 | 0.98 |

There are a variety of similar alternative designs. More than a single refractive index may be used as part of the thin-film structure of the layers 313. The surrounding layers need not be air and the exact number of low and high index layers is variable. The carrier or substrate could have other refractive index values. The layers 313 can be varied from their quarter-wave thickness at the design angle and the wavelength so as to improve spectral and angular bandwidths. In fact, the operability of the layers 313 can be quite broad band and the Brewster angle design does not have to be followed with great precision in index and angle. For example, you can trade off s-reflectivity with p-transmission by changing refractive indexes. The whole system can be flipped without changing its function.

A variety of preferred embodiments include at least two layers of different indices. Such arrangements have the $n_H$ and $n_L$ such that $n_H/n_L>1.15$ in order to minimize the number of layers required for high polarization selectivity. Further, optical interference is most preferably used to enhance performance by using at least one layer with index n and thickness t such that $50$ nm$/(n^2-1)^{1/2}<t<350$ nm$/(n^2-1)^{1/2}$. This relationship derives from the equations provided hereinbefore regarding $t_L$ and $t_H$, by noting that the wavelength is in the visible light range 400 nm to 700 nm, that the incident light is near the critical angle so that n sin θ≈1 and optical interference effects are promoted by layers with an optical thickness between ⅛ and ½ of the light wavelength. Materials and methods for fabricating such layers are well-known in the art of multi-layer dielectric coatings.

The Brewster Stack approach is similar to the thin-film approach described above except that the layers are many wavelengths thick and tend to function largely on the basis of the incoherent addition of the waves rather than the coherent effect that occurs in optical interference coatings. The design of this form of the polarization filter layer 307 is the same as the design of the thin-film polarized described above except that layer thicknesses are not important as long as they are at least several wavelengths thick optically. The lack of optical thickness effects suggests that the performance of the Brewster Stack implementation should generally be less sensitive to spectral wavelength and angular variations. The transmission ratio defined in terms of the transmission of the s and p polarized light ($T_s,T_p$) of the set of N layer pairs in the geometry of FIG. 30D can be estimated using the approximate formula:

$$\frac{T_s}{T_p} \approx \left[\frac{4(n_H^2 - 1)}{n_H^4}\right]^{2N}$$

The results of applying this formula to a geometry with varying numbers of layer pairs is shown in Table 2 below:

TABLE 2

Performance data for a Brewster Stack Form of the Filter Layer 307

| Layer Pairs | $T_s/T_p$ | $P_T$ |
|---|---|---|
| 1 | 0.9755 | — |
| 20 | 0.61 | — |
| 50 | 0.29 | 0.55 |
| 100 | 0.08 | 0.85 |

Generally speaking, this type of the polarization filter layer 307 requires much larger index differences and many more layers for the same reflectivities. There is no sharp dividing line between the thin-film design and the Brewster stack approach. As thickness increases, coherence effects slowly decrease and beyond some point which is dependent on the spectral bandwidth of the light signal, the coherence effects become small compared to incoherent effects. These examples described herein are simply the extreme of cases of the coherent and incoherent situations.

Figure 19A:
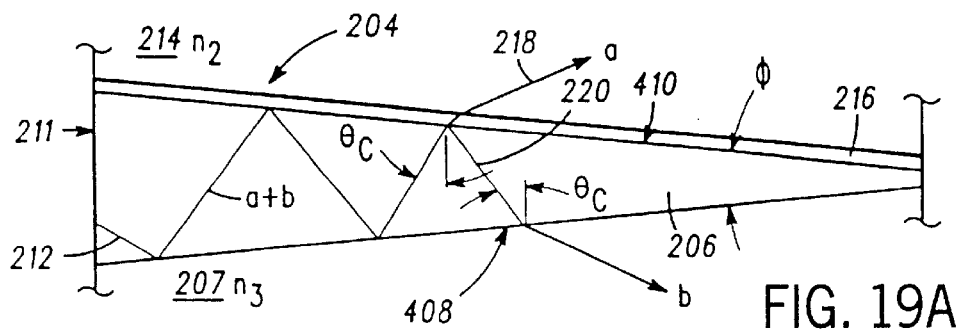
FIG. 19A illustrates a luminaire having a polarization filter layer.
Figure 19B:
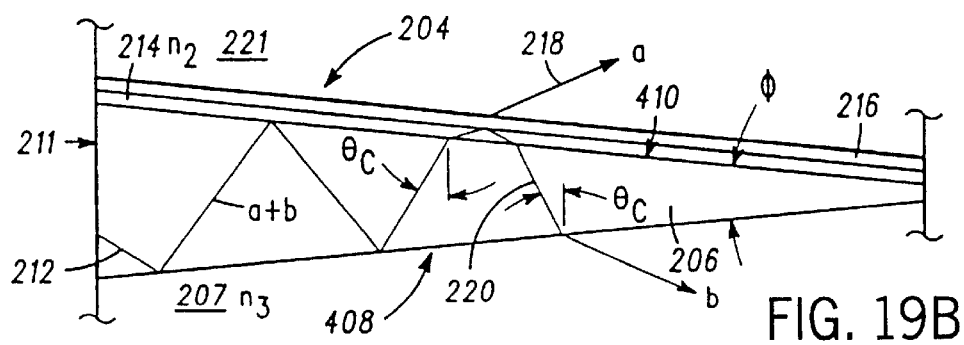
FIG. 19B shows a luminaire with a plurality of layers including a polarization filter layer.

In FIG. 19 are shown variations on one form of a polarized light luminaire system 204. In particular, in FIG. 19B, the system 204 includes a base layer 206 having a wedge-shaped, cross-sectional area with optical index of refraction $n_1$, and a first surface 208 and second surface 210 converging to define at least one angle of inclination Φ. The base layer 206 further includes a back surface 211 spanning the first surface 208 and the second surface 210. Light 212 injected by a source (not shown) through the back surface 211 reflects from the first and second surfaces and exits the base layer 206 when the light 212 decreases its angle of incidence relative to a normal to the first and second surfaces with each reflection from the surfaces 208 and 210 until the angle is less than a critical angle $3_c$ characteristic of an interface between the base layer 206 and a first layer means, such as a layer 214. This layer 214 includes at least a layer portion having index $n_2$ less than $n_1$ disposed beyond the second surface 210 relative to the base layer 206. The first layer 214 enables the light 212 to enter the first layer 214 after output from the base layer 206 when the light 212 in the base layer 206 achieves the angle of incidence less than the critical angle $3_c$ characteristic of an interface between the base layer 206 and the layer portion having index $n_2$ in the layer 214.

The system 204 also includes a layer means for preferential processing of polarized light of one state relative to another state, such as a polarization filter layer 216 (see previous generic description of the polarization filter layer 307). In addition to the samples described for the filter layer 307, a further example of the polarization filter layer 216 is a birefringent material which will be described hereinafter in the context of particular embodiments in a separate subsection. In FIG. 19, the injected light 212 includes light 218 of a first polarization and light 220 of a second polarization. The filter layer 216 then interacts with the light 212 to preferably output the light 218 of a first polarization state compared to the light 220 of a second polarization state. This filter layer 216 is disposed beyond the second surface 210 relative to the base layer 206, and this filter layer 216 is also able to reflect at least part of the light 220. This reflected light 220 is then transmitted through both the first layer 214 and the base layer 206 and into a medium 207 having index $n_3$ (such as air). The light 218 on the other hand is output from the system 204 on the side of the base layer 206 having the polarization filter layer 216. In FIG. 19B, the light 218 is shown being output into a media 221 having index $n_4$. In this embodiment in FIG. 19B, the relationship among indices is:

$$n_4 \geq n_2$$

and $$\arcsin(n_2/n_1) - 2\Phi < \arcsin(n_3/n_1) < \arcsin(n_2/n_1) + 2\Phi \quad (9)$$

In this preferred embodiment $n_2$ and $n_3$ can be air layers with "n" being approximately one.

This same index relationship can apply to FIG. 19A which is a variation on FIG. 19B, but the first layer 214 of index $n_2$ is disposed further from the base layer 206 than the polarization filter layer 216. In the embodiment of FIG. 19B, the first layer 214 is closer to the base layer 206 than the polarization filter layer 216.

Figure 19C:
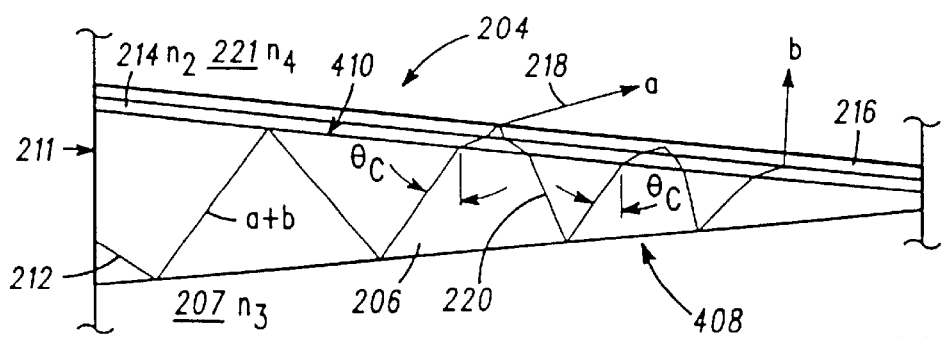
FIG. 19C shows a variation on FIG. 19B with layer indices enabling output of both polarizations of light on one side of the luminaire.

In another embodiment shown in FIG. 19C, the indices are such that Equation (10) below is followed and this results in the light 220 of second polarization state continuing to undergo internal reflection, rather than exiting through the first surface 208 as shown in FIGS. 19A and 19B. The angle of incidence made relative to the polarization filter layer 216 decreases with each cyclic reflection. The index $n_3$ can thus be made small enough such that the light 220 will decrease its angle beyond the range where the filter layer 216 exhibits its preferred reflectivity of the light 220. Consequently, at least part of the light 220 can pass through the second surface 210, but is separated in angle of output relative to the light 218 of first polarization state. In the embodiment of FIG. 19C the indices have the following relationship:

$$n_4 \geq n_2 \text{ and } \arcsin(n_3/n_1) < \arcsin(n_2/n_1) - 4\Phi \quad (10)$$

The polarization filter layer 216 most preferably outputs the light 218 and reflects the light 220 when the angle of incidence is greater than:

$$\theta_p = \arcsin[1 - 4\Phi((n_1/n_2)^2 - 1)^{1/2}] \quad (11)$$

When light is incident at angles less than $3p$, the filter layer 216 can therefore be substantially transparent to light of both polarization states (i.e., the light 218 and the light 220).

Figure 20A:
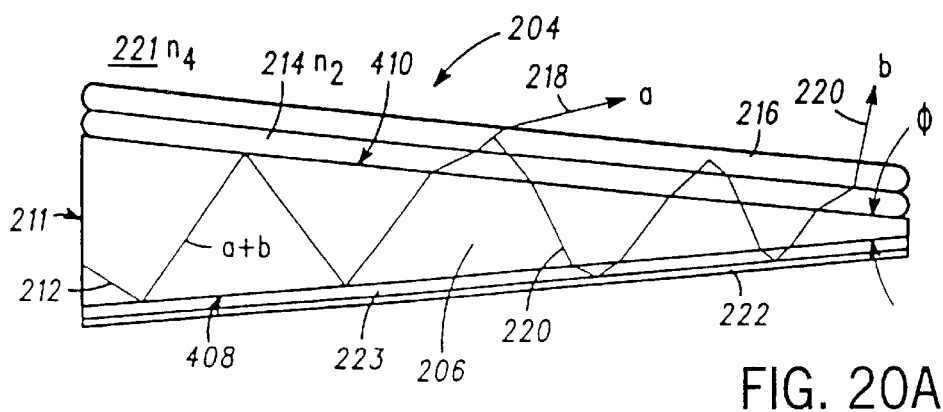
FIG. 20A illustrates a luminaire similar to FIG. 19B but further includes a reflector layer.
Figure 20B:
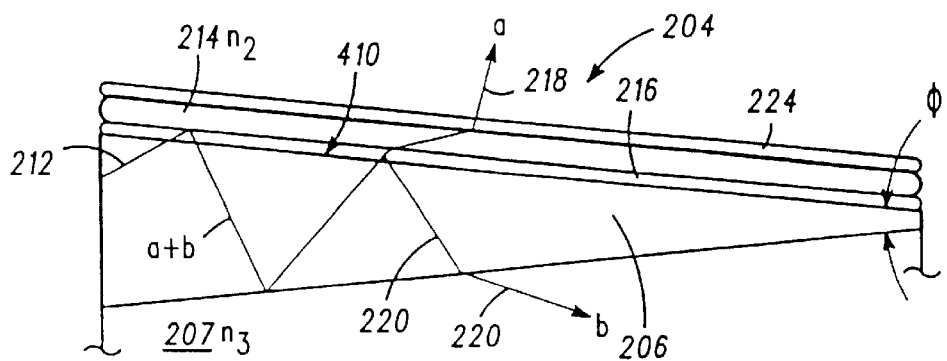
FIG. 20B illustrates a luminaire as in FIG. 20A but a redirecting layer is disposed on the same side of the base layer and the polarization filter.
Figure 20C:
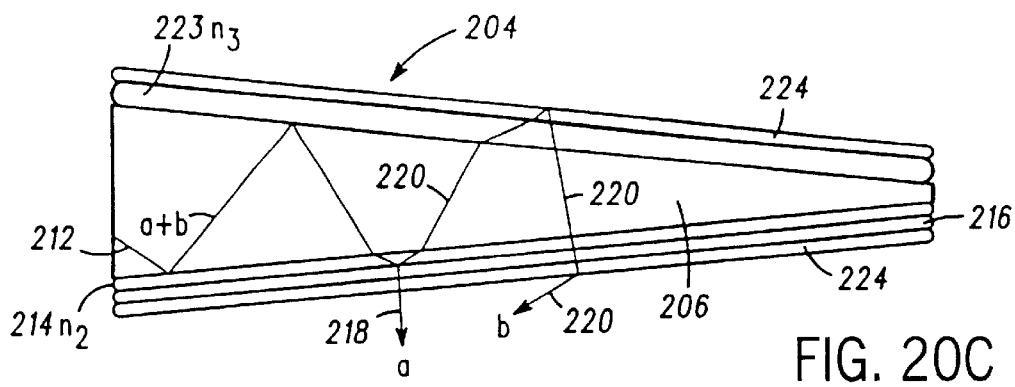
FIG. 20C is a variation on FIG. 20B with an additional redirecting layer and rearranged $n_2$/filter/redirecting layers.

In another embodiment of the invention shown in, for example, FIGS. 20A–C, the system 204 includes light redirecting means, such as a light reflector layer 222 in FIG. 20A, or more generically, a light redirecting layer 224 as shown in FIGS. 20B and 20C. In general for the inventions of the device 10 (system 204 in FIG. 20), we can define light redirecting means in terms of the propagation directions of light rays incident on, and departing from, the light redirecting layer 224. Consider the case of a light ray propagating parallel to a unit vector $\bar{r}_i$ in an optical medium having an index of refraction $n_i$. If $\bar{u}$ is a unit vector perpendicular to the redirecting layer 224 at the point of light ray incidence and directed away from the redirecting layer 224 toward the side from which the incident light ray originates, then the incident light ray interacts with the light redirecting layer 224 to produce light rays which depart from the region of interaction. If the departing light rays propagate parallel to a distribution of unit vectors $\bar{r}_c$ in an optical medium having index of refraction $n_c$, then light redirecting means includes any layer which processes the incident light ray such that the departing light ray has one of the following properties with respect to incident light rays throughout the operative angular range:

$$(1)\ n_c(\bar{r}_c x \bar{u}) \text{ is not equal to } n_i(\bar{r}_i x \bar{u}) \quad (12)$$

for at least 25% of the departing light rays;

$$(2)\ \bar{r}_c = \bar{r}_i - 2(\bar{u} \cdot \bar{r}_i)\bar{u} \text{ for at least 90\% of the departing lightrays.} \quad (13)$$

The light redirecting layer 224 can redirect light according to condition (1) in Equation (12) if (a) the light interacts with optical surfaces which are rough, (b) if the light interacts with optical surfaces which have a different slope from the incident surface, or (c) if the redirecting layer 224 diffracts the light into appropriate angles. For example, light redirecting means according to condition (1) may be any combination of transmissive or reflective, diffusive or non-diffusive, and prismatic or textured layer. In addition, the light redirecting means can be a diffraction grating, a hologram, or a binary optics layer.

A light redirecting means which redirects light in accordance with condition (2) of Equation (13) is a specular reflector. Examples of such a specular reflector can be a metallic coating (e.g., the light reflector layer 222 in FIG. 20A can be a metallic coating), a multi-layer dielectric coating or a combination of these. In each case, the internal and external surfaces are preferably smooth and mutually parallel.

In FIG. 20A one of the preferred embodiments includes light reflecting, redirecting means in the form of the reflector layer 222 which reflects the light 220. The reflector layer 222 is disposed beyond, or underlying, the first surface 208 of the base layer 206 and preferably is a flat, specular reflector, such as a metallic coating. Also shown is an intervening layer 223 of index $n_3$ disposed between the base layer 206 and the reflector layer 222. This intervening layer 223 can be considered to be part of the base layer 206, or a separate layer, depending on the functional interaction between the base layer 206 and the intervening layer 223. The index of refraction $n_3$ of this intervening layer 223 can be adjusted to controllably affect the resulting spatial and angular distribution of the light 212 after encountering the layer 223.

As can be seen, for example, in FIGS. 20B and 20C the light redirecting layer 224 can be positioned at different locations, and each layer 224 can also have different characteristics enabling achievement of different light output characteristics as needed for a particular application. Further examples of light redirecting means and uses, as well as specific embodiments, are illustrated in the remaining figures and will be described in detail hereinafter.

In another embodiment of the polarized light luminaire system 204, light converting means is included and is illustrated as a polarization converting layer 226 in FIGS. 21 and 22, for example. In these illustrated embodiments, the indices have $n_4 \geq n_2$ and the conditions of Equation (9) must in general be met. In these embodiments, a light converting means includes a layer which changes at least part of one polarization state (such as the light 220) to another polarization state (such as the light 218, or even light 227 of a third polarization state, which can be, for example, a combination of the first and second state).

The polarization converting layer 226 has the function of changing the polarization state to another state, such as rotating polarization by 90° ($\pi/2$). Moreover, such conversion is most preferably done for oblique incidence. As one example we describe the nature of such conversion for a uniaxial birefringent material where the index of refraction perpendicular to the optic axis is independent of direction. Many preferred materials, such as stretched fluoropolymer films are of this type. More general birefringent materials where the index of refraction is different in all directions can also be used following the general methods described herein. To understand the polarization conversion process, we first review the case for normal incidence.

Figure 30E:
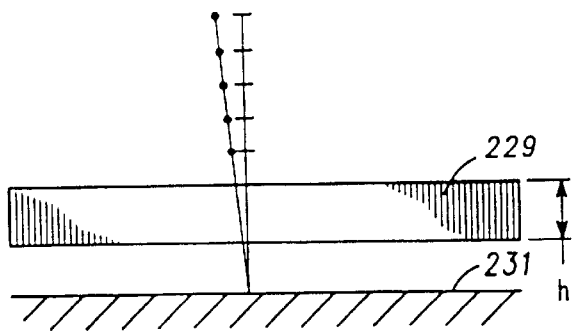
FIG. 30E illustrates a birefringent plate and interacting polarized light.
Figure 30F:
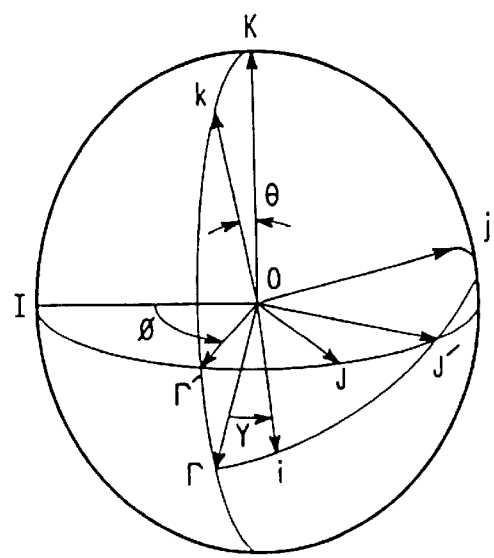
FIG. 30F shows Eulerian angles and optical vectors.
Figure 30H:
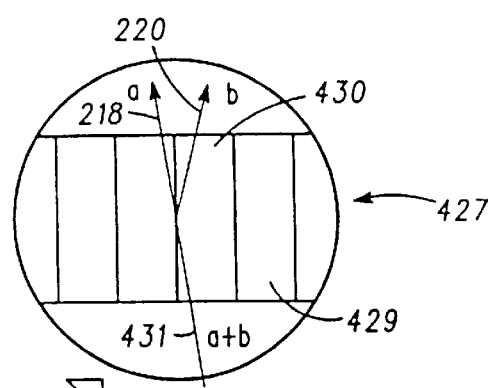
FIG. 30G shows a backlight providing collimated light in the xz plane and FIG. 30H shows a detailed enlargement of a zone from FIG. 30G.

As shown in FIG. 30E, a plate 229 of birefringent material has its transverse axis along vector K and the optic axis is along vector I (see vectors in FIG. 30F). For a stretched birefringent film, the direction of stretch would be along vector I. Vectors I, J, K are an orthogonal triad of unit vectors along the x,y,z axes. For normal incidence, the wave normal is along vector K. We can describe the polarization of the electromagnetic wave by its displacement vector D. Let D' be the polarization of the ordinary ray, and D" the polarization of the extraordinary ray. Let n' be the ordinary index of refraction, and let n" be the extraordinary index of refraction. We can orient the optic axis of the birefringent plate 229 so that it makes an angle of 45° ($\pi/4$) to the incident polarization vector $D_0$. This vector has two components $D_0 x = (1/\sqrt{2}) D_0 \cos \omega t$ and $D_0 y = (1/\sqrt{2}) D_0 \cos \omega t$. Upon emerging from the birefringent plate 229, the D vector has components $D_0 x = (1/\sqrt{2}) D_0 \cos(\omega t - \delta")$ and $D_0 y = (1/\sqrt{2}) D_0 \cos(\omega t - \delta')$, where $\delta' = (2\pi/\lambda) n' h$ and $\delta" = (2\pi/\lambda) n" h$, where h is the plate thickness. Hence the phase difference introduced is $\delta' - \delta" = |(2\pi/\lambda)(n" - n')|h$. In particular, if the emergent light has polarization vector D at right angles to the initial polarization vector D', we need $\delta' - \delta" = \pi$ (or more generally $\delta' - \delta" = (2m+1)\pi$, where m is any integer). This means the thickness h should be chosen as $h = |(2m+1)/(n" - n')|\lambda/2$.

In summary, we choose the thickness h in accordance with the above relation and orient the optic axis at 45° to the incident polarization. In a preferred form of the invention such as in FIG. 26B, the light traverses the converting layer 226 birefringent plate 229 twice, so that the actual thickness should be one-half of that specified above. In other words, the thickness is the well known $\lambda/4$ plate. Any reflections from a metallic mirror 231 introduces an additional phase shift of approximately $\pi$ to both components and does not change the conclusions.

In an embodiment wherein the light has oblique incidence with the converting layer 226 (see FIG. 26B), it is first necessary to show that splitting of the incident beam into two beams (the well-known birefringent effect) does not cause difficulties. The reason this is not a problem is that the two beams emerge parallel to the initial direction, but slightly displaced from one another. The two beams are coherent with each other and the displacement is $<\lambda$. The angular splitting is $\Delta\theta \approx \tan\theta_c \Delta n/n$ where $\theta_c$ is the critical angle and $\Delta n = (n" - n'), n = (n" + n')/2$. The displacement is $\approx h\Delta\theta/\cos\theta_c = h\Delta n/n \tan\theta_c/\cos\theta_c$. But, we will choose $h\Delta n/\cos\theta \approx \lambda/4$, so automatically the displacement is $<\lambda$ and the two light beams can be treated as one.

The geometry of oblique incidence on a uniaxial form of the birefringent plate 229 is somewhat complicated, and thus to simplify matters, we introduce the Eulerian angles as shown in FIG. 30F. The relations between the (i,j,k) vector triad and the (I,J,K) ventor triad can be read from Table 3.

TABLE 3

| | I | J | K |
|---|---|---|---|
| i | $-\sin\phi \sin\psi +$ $\cos\theta \cos\phi \cos\psi$ | $\cos\phi \sin\psi$ $\cos\theta \sin\phi \cos\psi$ | $\sin\theta \cos\psi +$ |
| j | $-\sin\phi \cos\psi -$ $\cos\phi \cos\theta \sin\psi$ | $\cos\phi \cos\psi - \cos\theta \sin\phi$ $\sin\psi$ | $\sin\theta \sin\psi$ |
| k | $\sin\theta \cos\phi$ | $\sin\theta \sin\phi$ | $\cos\theta$ |

Let the normal to the air/plate interface=K, the direction of the incident wave normal=k, and the optic axis of the plate 229=I. We wish to rotate the incident polarization $D_0$ by 90°. Since the incident polarization $D_0$ is in the interface plane, it is consistent to let $D_0$ be along $i_0$ so that $\psi_0 = \pi/2$. The polarization D' of the ordinary ray is perpendicular to both I and k. Therefore, let D' be along i'. Now $i'_x = 0$. From Table 3 we conclude that $\tan\psi' = \cot\phi \cos\theta$. The polarization of the extraordinary ray D" is perpendicular to both D' and k. Therefore, $\psi" = \psi' \pm \pi/2$. We choose $\psi" = \psi' - \pi/2$, and then $\tan\psi" = \tan\phi/\cos\theta$. To achieve the desired output, we can appropriately orient the birefringent plate 229. Just as in the normal incidence case, we let $\psi_0$ to be at 45° to the D' and D" directions. Therefore, we chose $\psi' = \pi/2$, and then $\tan\phi = \cos\theta$. For a typical case, where $\theta$ is close to $\theta_c \approx 40°$, $\phi \approx 37°$. In practice, for a range of incidence angles and wavelengths one would readily adjust $\phi$ experimentally to get the most complete polarization conversion, using the above formulae as a starting point and guide. We next determine the thickness, h, of the birefringent plate 229. As in the case of normal incidence, the condition is: $h = |(2m+1)/(n" - n')|\lambda/2$. However, the extraordinary index of refraction n" now depends on the angle of incidence $\theta$ and must be read off the index ellipsoid: $(1n")^2 = (1n_0)^2 \sin^2\theta + (1n_e)^2 \cos^2\theta$ where $n_0$ is the ordinary index of refraction and $n_e$ is the extraordinary index of refraction. Also note that $n' = n_0$. Typically, the index of refraction differences are small, $<0.1$ and approximately, $(n" - n') \approx (n_e - n_0) \cos^2\theta$. In addition, the light path length for oblique incidence is greater than that for normal incidence. The length h for oblique incidence is greater than the thickness of the plate 229 by a factor of $1/\cos\theta$. Therefore, since the effective index difference is reduced by $\cos^2\theta$, but the path length is increased by $1/\cos\theta$, it follows that the thickness required for oblique incidence is larger than for normal incidence by $\approx 1/\cos\theta$. In practice, for a range of incidence angles and wavelengths one would adjust h experimentally to obtain the most complete polarization conversion. In practice, for a range of incidence angels and wavelengths, one can adjust $\phi$ experimentally to obtain the most complete polarization conversion, using the above formulae as a starting point and guide.

In another example embodiment, the conversion of light of one polarization into another polarization state can be considered as involving three steps: (1) separation of different polarization states into substantially distinct beams at every point on the system 204, (2) polarization conversion without affecting the desired polarization and (3) light diffusion into an appropriate angular distribution without depolarization of the light output.

As described herein, a variety of methods can be used to separate the different polarization states in the system 204.

Figure 31A:
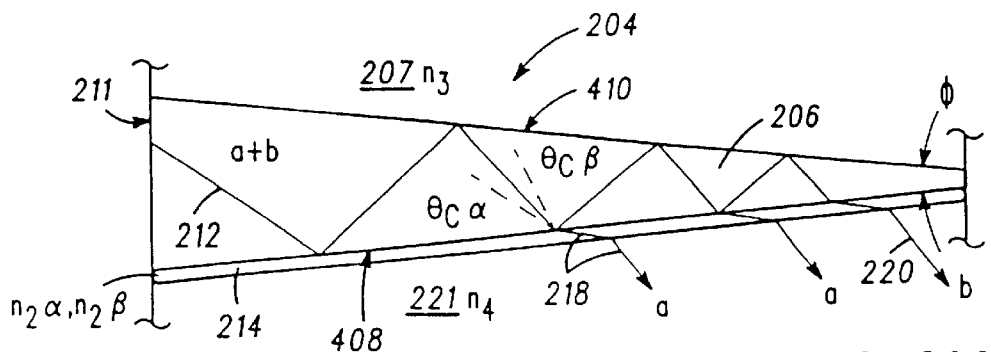
FIG. 31A illustrates a luminaire with a coupled birefringent layer.
Figure 31B:
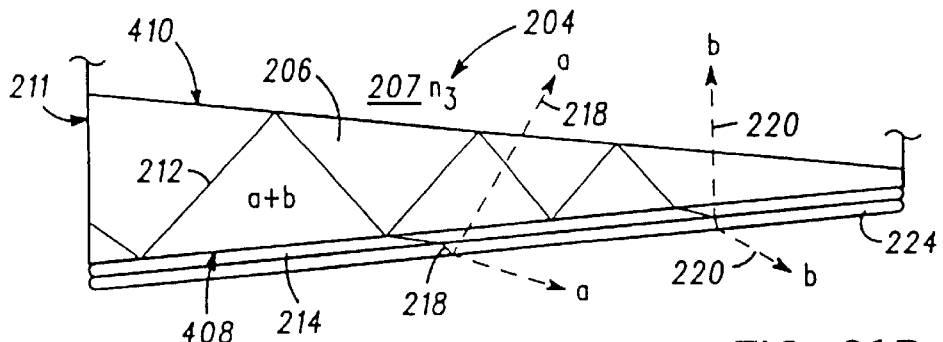
FIG. 31B shows a luminaire and birefringent layer and an added light redirecting layer.
Figure 31C:
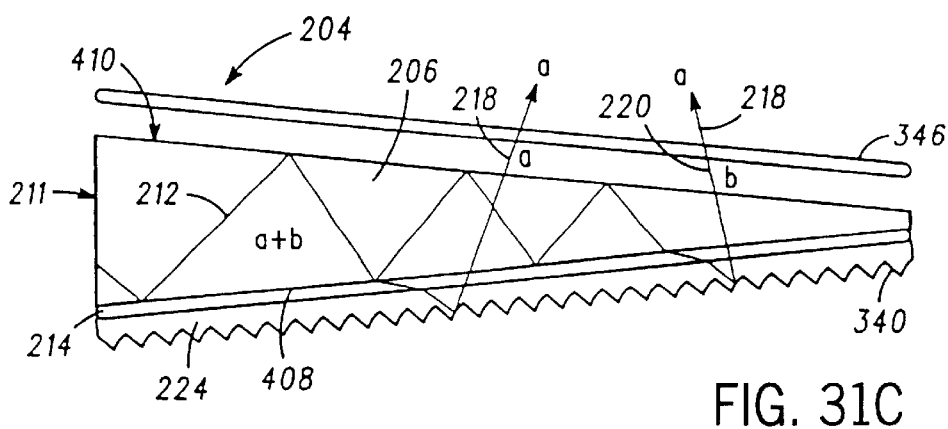
FIG. 31C illustrates a luminaire system similar to FIG. 31B with an added light polarization converting layer.

For example, the low index layer 214 can be birefringent, as shown, for example, in FIGS. 31A–C. The layer 214 can be, for example, an oriented fluoropolymer convertor layer which creates two light beams 218 and 220 of orthogonal polarization emerging from every point along the system 204. This can be used provided two conditions are met. The first condition requires that the birefringence of the layer 214 is large enough to significantly prevent substantial overlap between the two polarized beams 218 and 220. This condition is summarized by Equations (15)–(17) where C is at least 1 and preferably greater than 4. The second condition is that the direction of birefringence orientation (direction of stretch) of the first layer 214 is substantially parallel to the y axis.

For $\phi=1-1.5$ degrees, the birefringence must be at least 0.03–0.05 to satisfy Equations (15)–(17). Measurements of the birefringence of various commercial fluoropolymer films yielded the following data (average index, birefringence):

Tefzel 250 zh: (1.3961,0.054)
Tefzel 150 zm: (1.3979,0.046)
Teflon PFA 200 pm: (1.347,0.030)

The wedge layer 206 laminated with the 250 zh material produced just-separated polarized beams where even the Fresnel reflected parts did not overlap.

In another embodiment, one can achieve even greater angular separation of polarization by using a faceted redirecting layer comprised of a highly birefringent material.

Figure 30G:
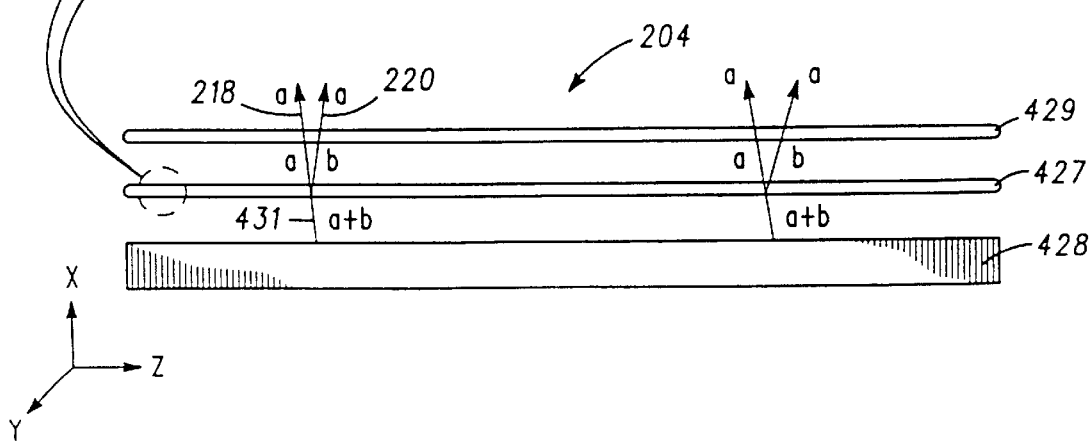

A third approach for separation of polarization states uses a sheet of polymeric beam splitters consisting of an alternating structure of birefringent/transparent layers 427 shown in FIG. 30G and H. Such an array of the layers 427 can rest on top of a collimated backlight 428 and polarizes by selective total internal reflection. The index of the film of polymeric layers 429 parallel to the plane of light incidence is lower than that of a transparent layer 430, and the index perpendicular to the plane of light incidence is closely matched to the transparent layer 430, so that an incoming collimated light beam 431 from the backlight 428 (inclined to the beam splitter layers 427) is split: the parallel polarized beam 431 is totally internally reflected, but the perpendicular component is transmitted.

One example of this arrangement can be Mylar/Lexan layers. Mylar indexes are: (1.62752, 1.6398, 1.486). The Lexan index is: 1.586. The complement of the critical angle is twenty degrees; therefore, the beam splitter layer 427 will function as long as the complement of the incidence angle is less than twenty degrees (in the Lexan). However, at glancing angles, Fresnel reflection causes reduction in the degree of polarization. For example, for thirteen degrees the Fresnel reflected perpendicular component is 9%.

Another example of this arrangement of the layer 427 is uniaxial Nylon/Lexan. Nylon indexes are: (1.568, 1.529, 1.498). Here there are two critical angles, the complements of which are nine and nineteen degrees for perpendicular and parallel, respectively. So, the obliquity must be inside this angular range for polarization to be operative. Taking the same case for Fresnel reflection as for Mylar (thirteen degree angle), the Fresnel reflected perpendicular component is only 5%, because the index matching is better.

For either of these examples, each beam splitter layer 427 needs to have the appropriate aspect ratio such that all rays of the beam 431 have exactly one interaction with the film/Lexan interface.

In one embodiment, once the light of different polarization states is separated into two orthogonally polarized beams at every position along the backlight 428, there must be a means of converting the undesired polarization to the desired one, such as the polarization converting layer, 346 in FIG. 31C and 429 in FIG. 30G.

One method of performing the polarization conversion is by an alternating waveplate combined with a lens or lens array. In the single lens method, a light beam 218 and 220 will fall upon lenses focused to two nonoverlapping strips of light of orthogonal polarization at the focal plane. The alternating wave plate acts to rotate the polarization of only one of the beams (220) by ninety degrees, the emergent light will be completely converted to light 218. This can be effected by the presence of a half-wave retarder placed to capture only the light 220 of one polarization. This has been demonstrated visually with a large lens, a plastic retardation plate, and Polaroid filters (Polaroid is a registered trademark of Polaroid Corporation).

In a second approach using a lenticular array, one uses a thin sheet of lenses and an alternating waveplate structure (with the frequency equal to the lens frequency), where the retardation changes by 180 degrees for each lens. For a lenticular array 1 mm thick, each image can be of the order of 5 thousandth of an inch in size so the registration of the lenticular array with the waveplate would have to be exact enough to prevent stack-up errors of less than one thousandth of an inch.

Another method of performing the polarization conversion is by use of a double Fresnel rhombus ("DFR") which is another embodiment of a converting layer, such as the layer 346 in FIG. 31C and 429 in FIG. 30G. The DFR avoids registration problems by selectively retarding according to angle instead of position. Such a DFR causes the light of first polarization state to suffer from total internal reflection events corresponding to $4 \times 45°=180°$ of phase shift, while the other polarization state light is only transmitted, so that the output light is completely polarized to the light of first polarization in one plane in the end. The DFR can be constructed, for example, by having four acrylic or Lexan films each embossed with 45 degree prisms, all nested. For the DFR to cause retardation the two orthogonal plane polarized beams L and R (by a ¼-wave plate). If the L is transmitted by the DFR then the R beam will get converted to the L beam by the DFR. Finally the L beam is converted to plane polarized by another ¼-wave plate, the orientation of which determines the final plane of polarization.

Figure 21A:
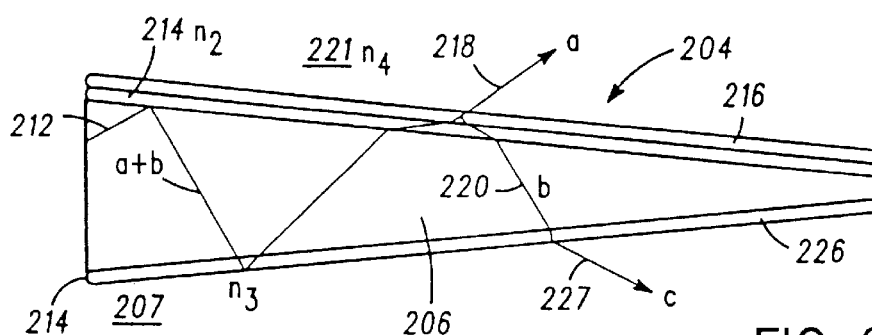
FIG. 21A illustrates a luminaire having a polarization converting layer and polarization filter layer.
Figure 21B:
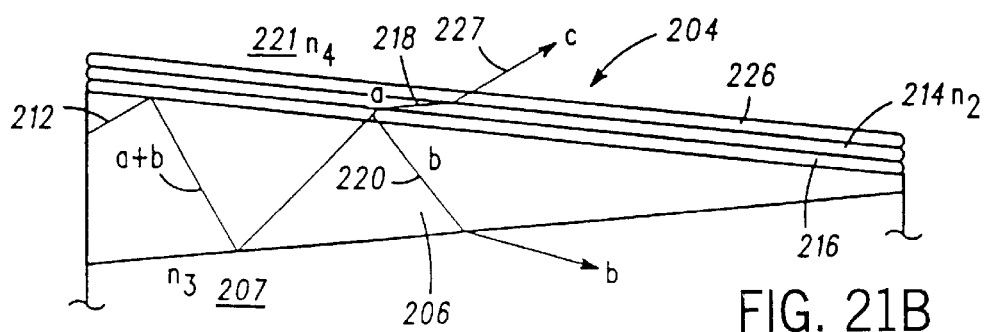
FIG. 21B is a variation on FIG. 21A with the polarization filter layer and polarization converting layer on the same side of the base layer.

In a preferred embodiment shown in FIG. 21A, the converting layer 226 is disposed on the opposite side of the base layer 206 relative to the polarization filter layer 216. In the embodiment of FIG. 21B, the converting layer 226 is disposed on the same side as the polarization filter layer 216. As can be seen by reference to FIGS. 21A and B, the converting layer 226 can even convert the light 218 and 220 to the light of 227 of another third polarization state. This light 227 can be, for example, the light of a third polarization state or even a variation on, or combinations of, the first or second polarization states discussed hereinbefore. The resulting light polarization is dependent on the response characteristics of the converting layer 226. The converting layer 226 can therefore be designed to respond as needed to produce a light of desired output polarization state; and in combination with appropriate positioning of the layer 226, one can produce an output light in the desired direction having the required polarization characteristics.

Figure 22A:
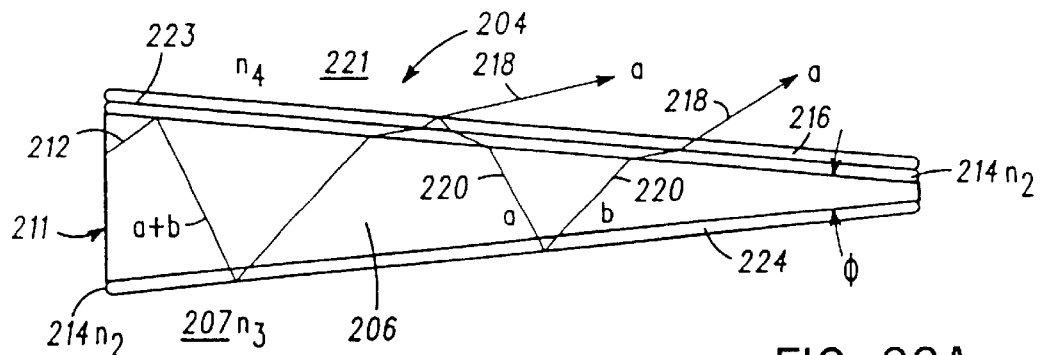
FIG. 22A illustrates a luminaire with a polarization filter layer one side of the base layer and a polarization converting layer on the other side.
Figure 22B:
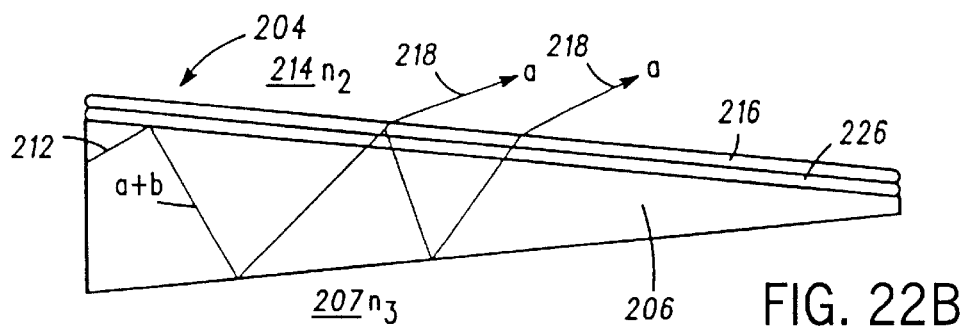
FIG. 22B shows a variation on FIG. 22A with the filter and converting layers adjacent one another on the same side of the base layer.

In another form of the invention illustrated in FIGS. 22A–E, the converting layer 226 is utilized for other optical purposes. FIGS. 22, 23, 24 E–F, 25–27, 28A and C, and 29 all illustrate use of the converting layer 226 to change the light 220 of the second polarization state to the light 218 of the first polarization state. In addition, the elements of the luminaire system 204 are arranged such that the light being processed will pass through, or at least encounter, one or more of the polarization filter layer 216 at least once after passing through the converting layer 226. For example, in the case of processing the light 220, the arrangement of elements enables return of the light 220 to pass through the polarization filter layer 216 after passing through the converting layer 226. In some instances, the light 220 can encounter the polarization filter layer 216 two or more times before being output as the light 218 of the first polarization state. FIGS. 22A–E illustrate examples of a variety of constructions to achieve a desired output. In FIG. 22A, after the light 212 encounters the polarizing filter layer 216, the reflected light 220 passes through the converting layer 226, and is converted to the light 218. The light is then returned to the polarization filter layer 216 via internal reflection. In addition, in FIG. 22B, the light 220 also passes through the converting layer 226, is converted to the light 218, and is then returned again to the filter layer 216 after internal reflection. In these cases, $n_3$ is low enough such that the relationship among $n_1$, $n_2$ and $n_3$ in Equation (10) is met.

Figure 22C:
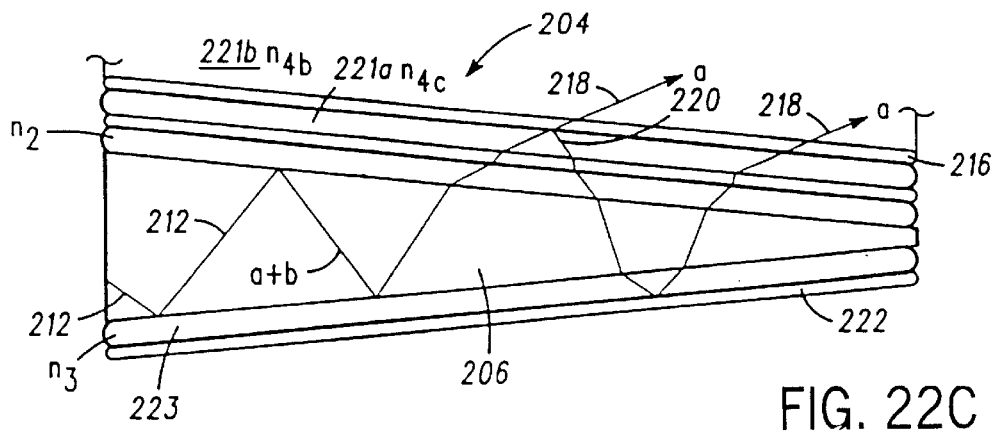
FIG. 22C shows a further variation of FIG. 22A and B and with a reflector layer added.
Figure 22D:
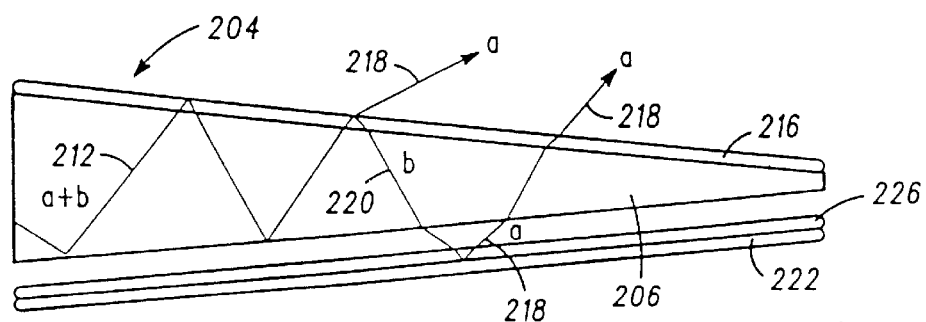
FIG. 22D illustrates a further variation on FIG. 22C with the converting layer moved to the other side of the base layer and FIG. 22E shows another variation on FIG. 22D.
Figure 22E:
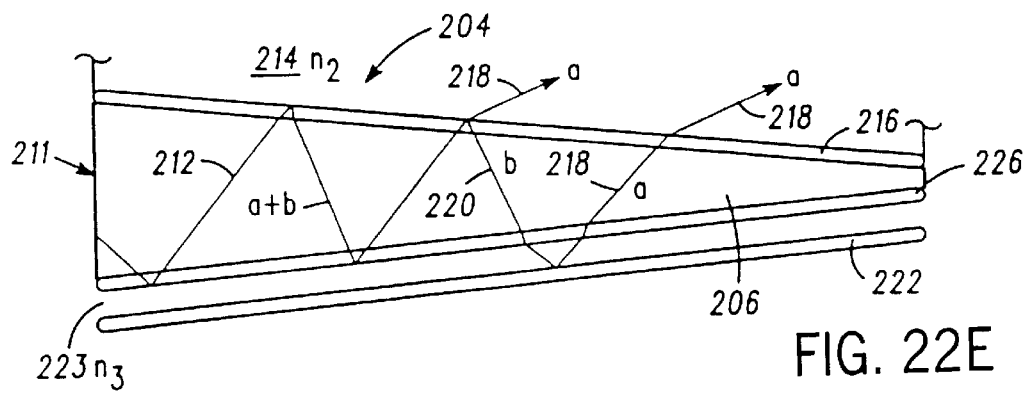

In the embodiments of FIGS. 22C–E, a redirecting means in the form of the light reflector layer 222 is added to return the light 220 to the polarization filter layer 216. As described hereinbefore for the embodiment of FIG. 20A, the intervening layer 223 has an index of refraction $n_3$ which can be adjusted to affect the spatial and angular distribution of light encountering the layer 224. In a preferred form of the invention shown in FIGS. 22C–E, the layers of index $n_2$ and $n_3$ can include air gaps, and in the most preferred form of the invention the layers of index $n_2$ are air gaps.

Figure 24A:
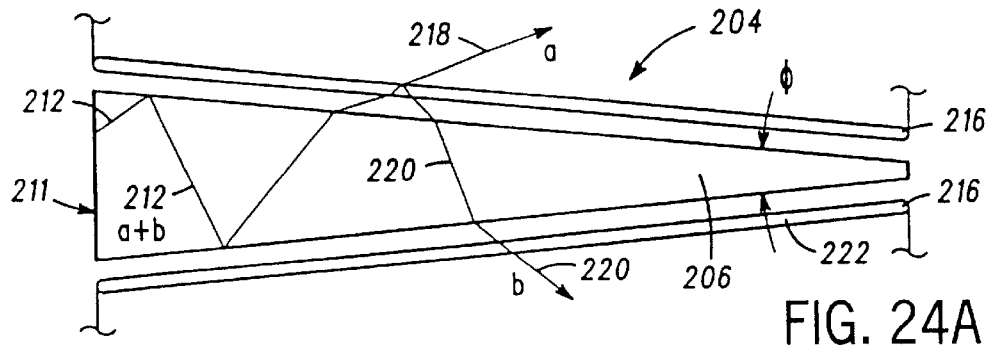
FIG. 24A illustrates a luminaire with two polarization filter layers for two polarization states.
Figure 24B:
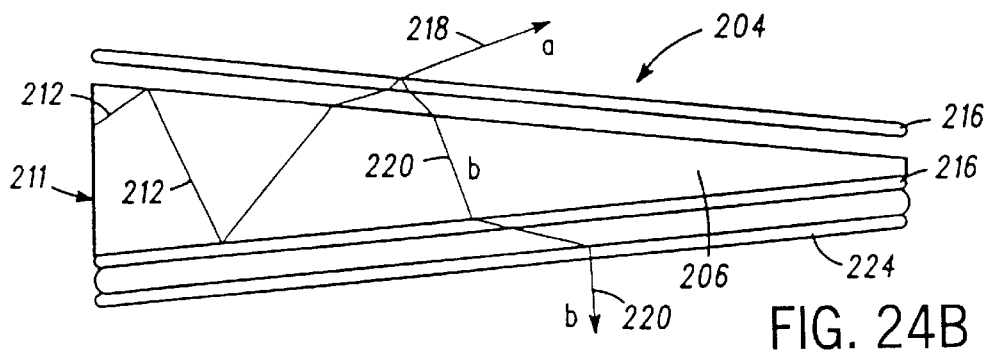
FIG. 24B shows a variation on FIG. 24A plus an added light redirecting layer.
Figure 24C:
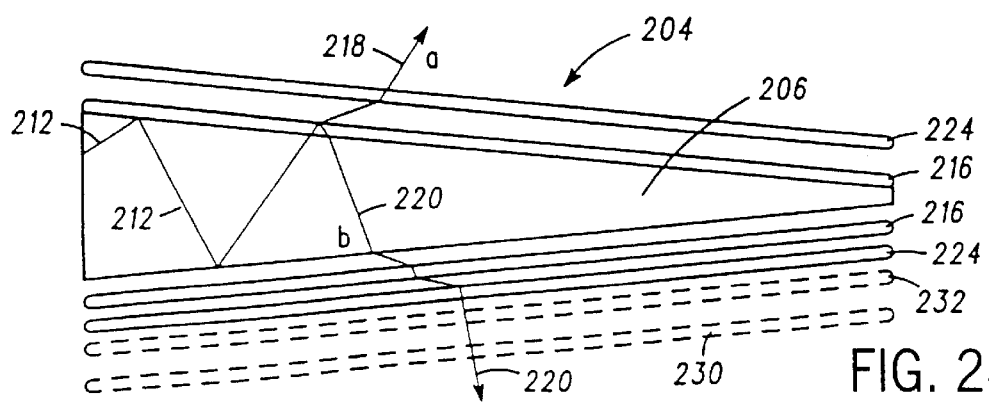
FIG. 24C is a further variation on FIG. 24B with a matching layer, a second redirecting layer and an LCD layer.
Figure 24D:
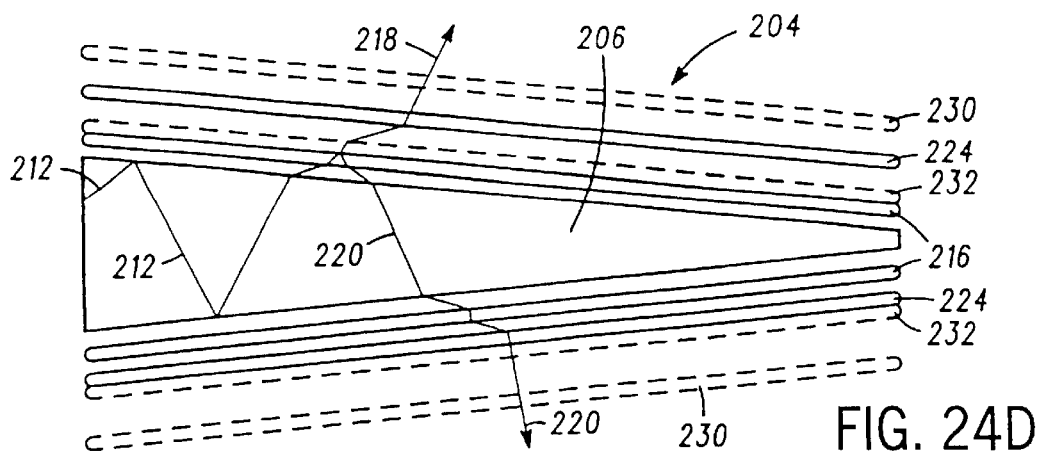
FIG. 24D is yet another variation on FIGS. 24B and C.
Figure 24E:
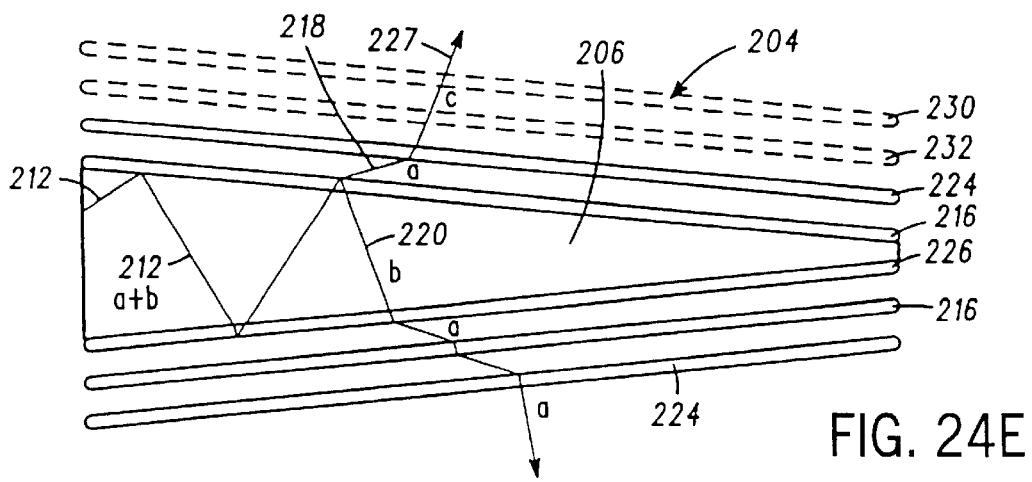
FIG. 24E is a variation on FIG. 24D with an-added converting layer and two polarization filter layers and two redirecting layers and FIG. 24F is still another variation on FIG. 24E with LCD layers on both sides of the base layer.
Figure 24F:
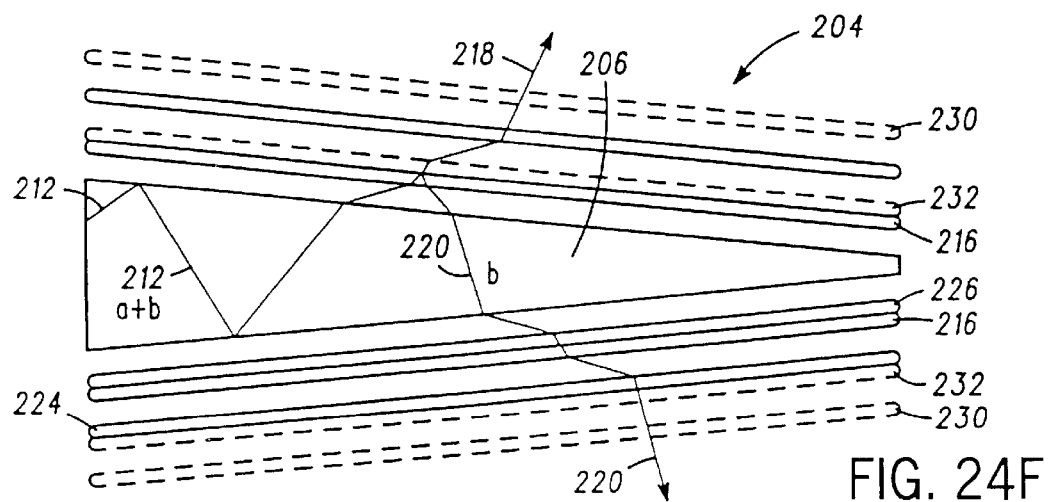
Figure 25A:
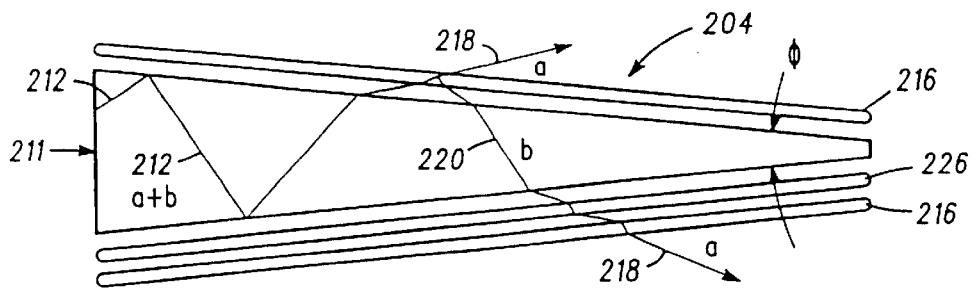
FIG. 25A illustrates a general construction utilizing two polarization filter layers and a polarization converting layer.
Figure 25B:
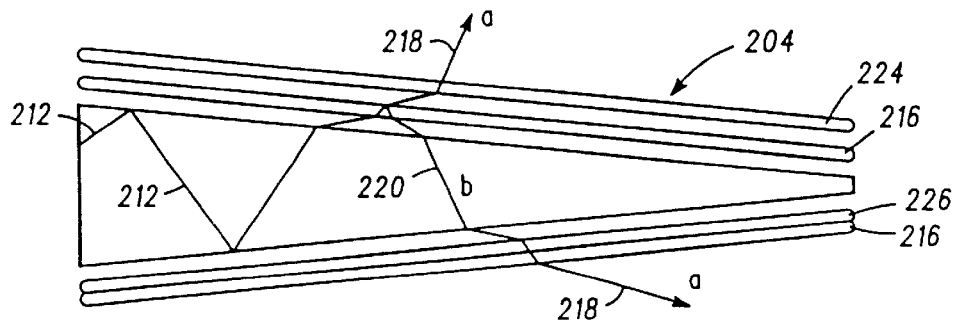
FIG. 25B shows a variation on FIG. 25A with an added redirecting layer.

FIGS. 24A–F illustrate a sequence of constructions starting with use of one of the polarization filter layer 216 in FIG. 24A and continuing construction of more complex forms of the luminaire system 204. In FIGS. 24C–F, there is added one or more of the light redirecting layer 224, at least one liquid crystal display ("LCD") layer 230 and light matching means, such as a matching layer 232. The matching means acts to convert the light output by the assembly of the other layers to a particular polarization state preferred by a target device or additional layer, such as the LCD layer 230. The matching layer 232 is thus a special case of the converting layer 226.

Figure 23A:
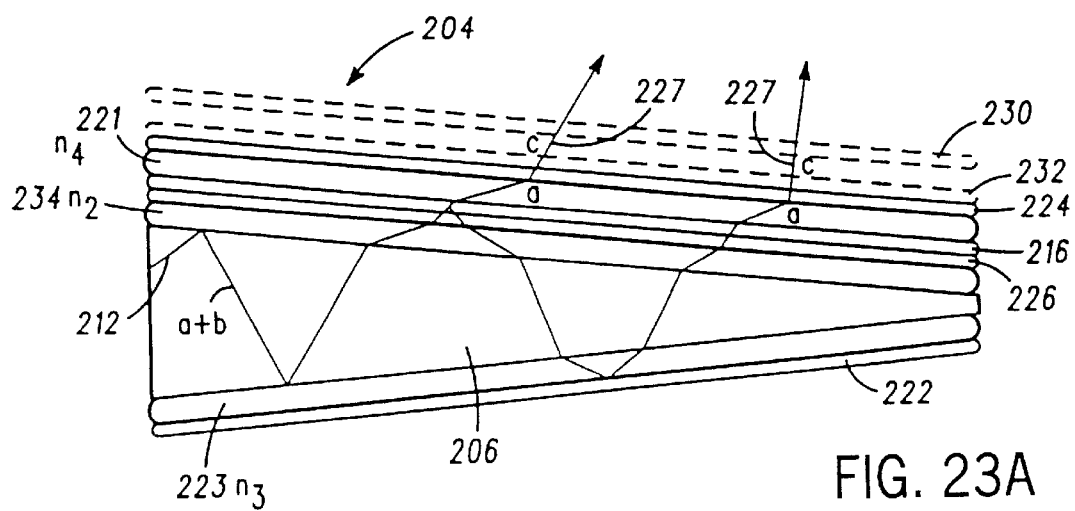
FIG. 23A illustrates a luminaire having plural layers including a polarization filter, a converting, a redirecting, a reflector and an LCD layer.
Figure 23B:
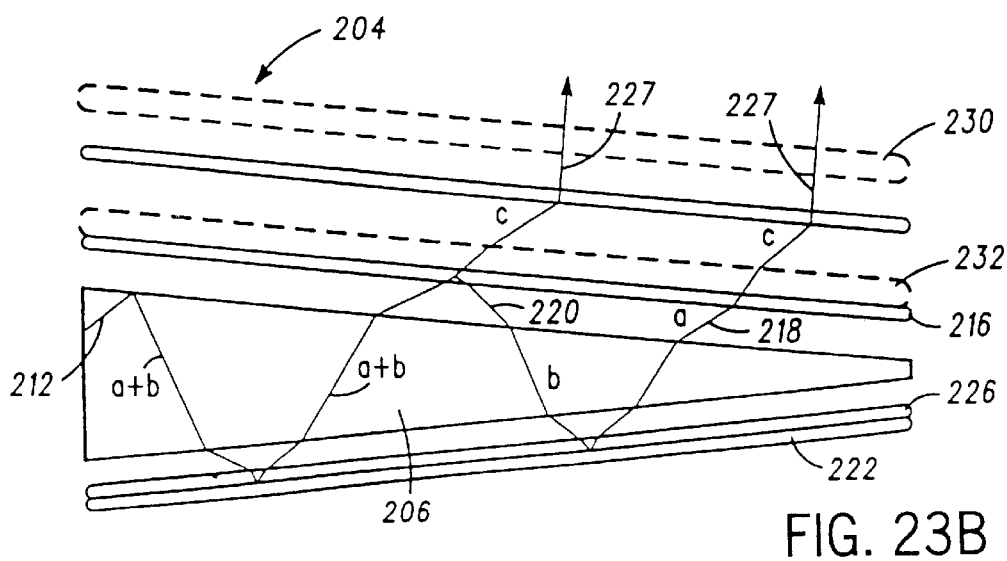
FIG. 23B shows a variation on FIG. 23A.
Figure 23C:
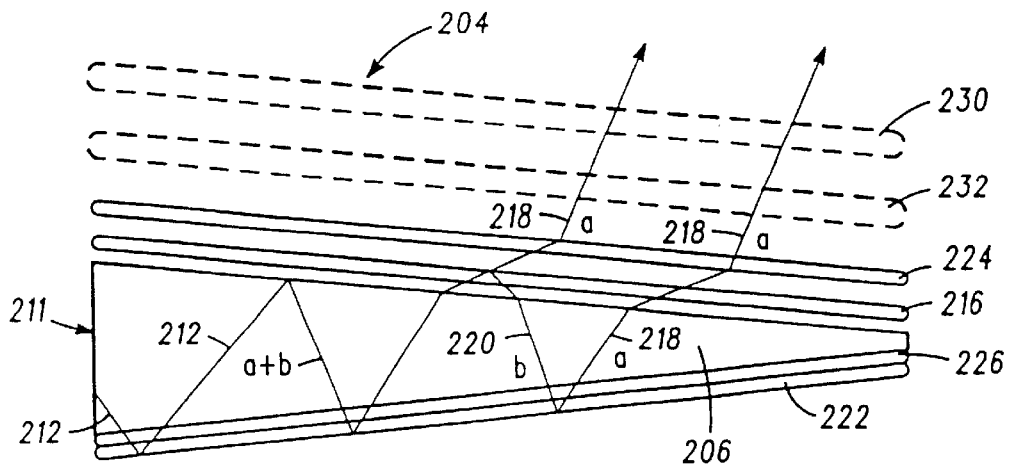
FIG. 23C illustrates yet another variation on FIG. 23A.

In FIGS. 23A–C are illustrated other forms of the polarized light luminaire system 204 in combination with the LCD layer 230. In one general form of the embodiment of FIG. 23A, a layer 234 is included. In more particular forms of the inventions, for example as in FIG. 23, the preferred value of $n_2$ is about 1 (see, for example, FIGS. 23B and C). In certain forms of FIG. 23A, $n_2 > 1$ can also be utilized. Alternatively, preferably choices for the relationship among indices of refraction are set forth in Equation (9) and (10).

Figure 26A:
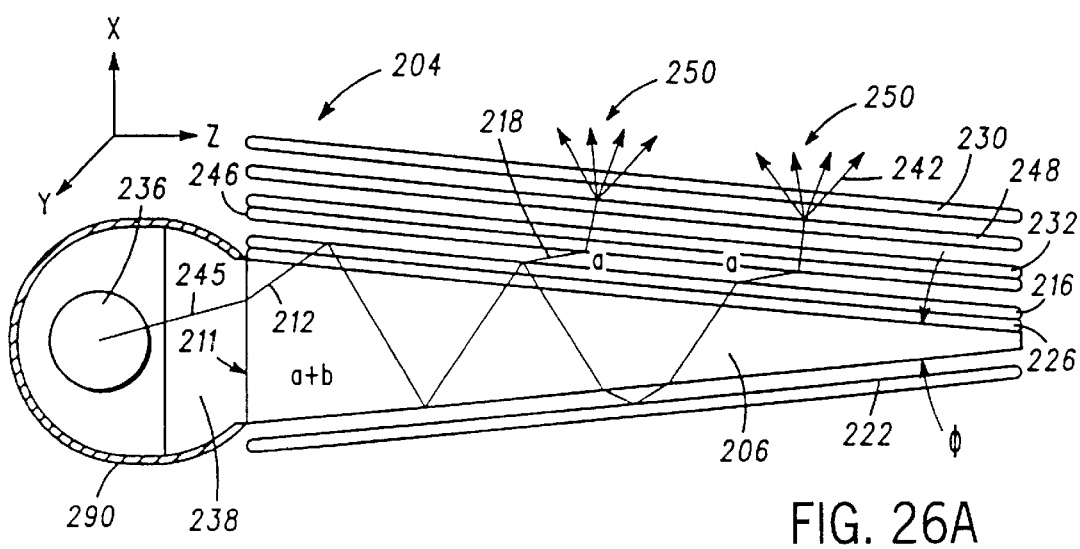
FIG. 26A illustrates a multilayer luminaire with a light source coupled to a light angle transformer to control spatial uniformity of light output from the device.

Further examples of preferred embodiments are shown in FIGS. 26A and B, and in FIG. 26A is included a cold cathode fluorescent tube ("CCFT") light source 236. This embodiment further includes an angle transformer layer 238 which operates to change the angular distribution of the light. This angle transformer layer 238 can, for example, change the distribution in the xz-plane to control the spatial uniformity of light output from the device 10. In the preferred embodiment, the distribution of the output light 250 is substantially uniform in its spatial distribution over at least 90% of the output surface. In addition, the angular distribution of the light 212 in the xz-plane is approximately $\pm\theta_{max}$ with respect to the normal to the back surface 211, where $$\frac{\pi}{2} - \theta_c + 6\Phi \geq \theta_{max} \geq \frac{\pi}{2} - \theta_c \quad (14)$$

and the back surface 211 is about perpendicular to at least one of the first surface 208 and the second surface 210. The angle transformer layer 238 can be a tapered light-pipe section, a compound parabolic concentrator (a "CPC"), a mirco-prismatic film (FIG. 28C) a roughened-surface layer, or a hologram. The angle transformer layer 238 is most preferably optically coupled to the base layer 206 without an intervening air gap. The angle transformer layer 238 can also operate to change, and preferably narrow, the light distribution in the yz-plane to improve brightness, LCD image quality, and viewer privacy as well. In addition, in FIG. 26A, an output diffuser layer 248 has been added before the LCD layer 230 to broaden the angular distribution and enhance uniformity of output light 242 provided to the LCD layer 230.

Figure 26B:
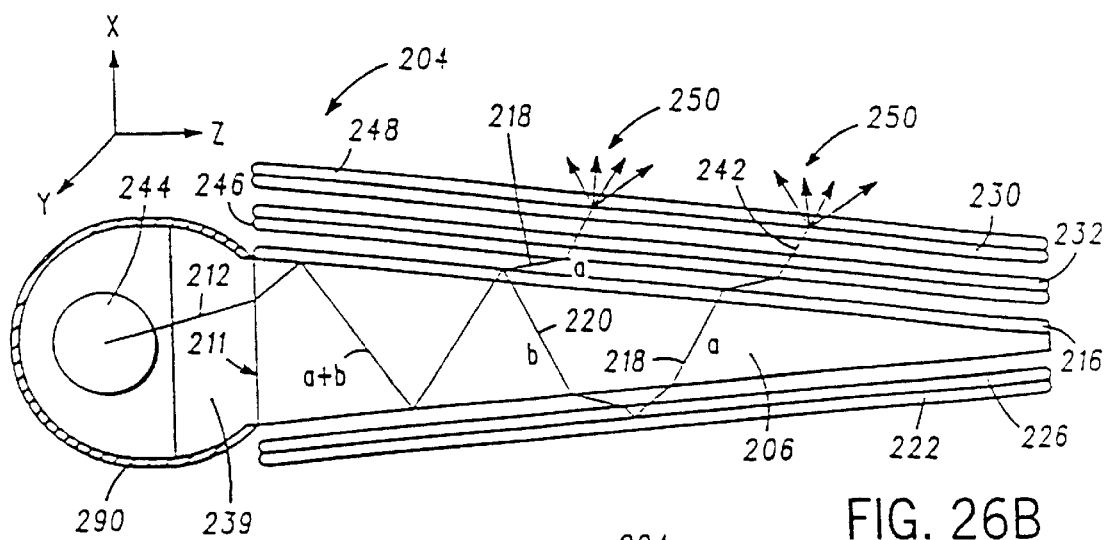
FIG. 26B is a variation on FIG. 26A.
Figure 28A:
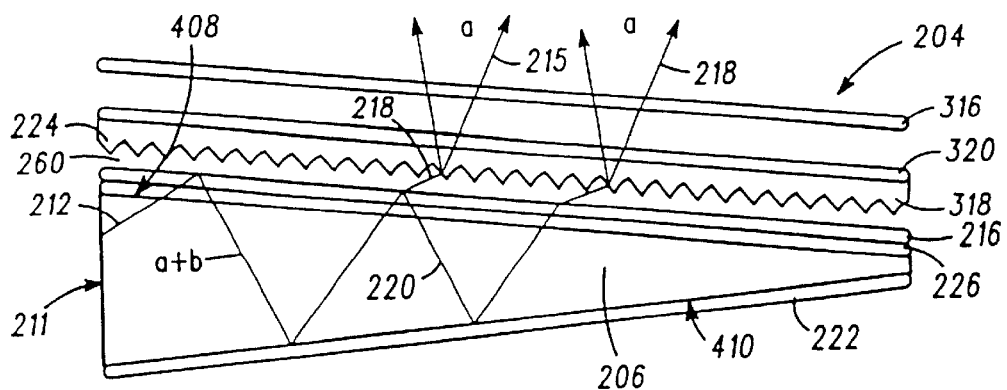
FIG. 28A illustrates a luminaire including a polarization light filter, polarization converter and a faceted redirecting and diffusing layer.
Figure 28B:
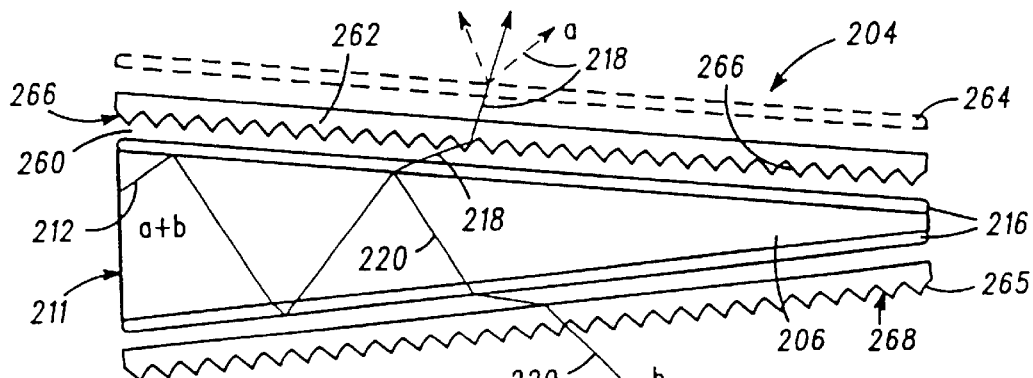
FIG. 28B shows a variation on FIG. 28A with two polarization filter layers and two faceted redirecting layer.
Figure 28C:
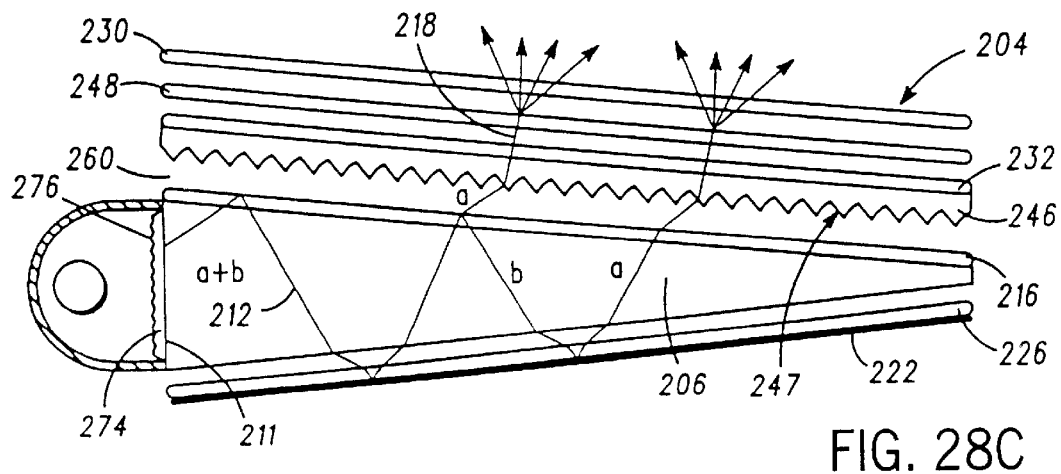
FIG. 28C shows a light source coupled to a luminaire and is a variation on FIG. 28A.

In another preferred embodiment of FIG. 26B, a CPC 239 is coupled to a light source 244 operating to help maintain output light 250 within the proper angular distribution in the xz plane. In addition, one can control the range of angular output by use of a light redirecting means, such as a prismatic redirecting layer, such as the layer 246, using flat prismatic facets, such as the facets 247. See, for example, this type of layer and prismatic facets in FIGS. 28C, D and E and FIGS. 29A and B and the description in detail provided hereinafter. This embodiment as shown in FIG. 28E refers to the prismatic layer 251 and facets 253, and this embodiment also adds after the LCD layer 302 a light diffuser layer 304 for broadening light distribution in a specific plane. In a most preferred form of this embodiment, for example, shown in FIG. 28E, the light 242 is directed to pass through the LCD layer 302 within a narrow angular range in the xz-plane. The elements of the luminaire system 204 are therefore constructed to assist in providing transmission of the light 242 through the LCD layer 302 at an angle where the image forming properties are optimized. With the diffuser layer 304 positioned on the other side of the LCD layer 302 relative to the base layer 206, the diffuser layer 304 can broaden the angular distribution of viewer output light 250 without diffusing the light 250 in the xy-plane. For example, the diffuser layer 304 can be a "parallel" diffuser which can take the form of a holographic diffuser or lenticular diffuser with grooves substantially parallel to the y-axis. Viewers at a wide range of angles can then see the image which is characteristic of the optimal angle for the light 242 which is subsequently transmitted through the LCD layer 302 to form the light 250. Example configurations utilizing this form of general construction are thus shown in FIGS. 28D and E and FIGS. 29A and B. Further, FIGS. 28D and E and FIG. 29A also include a transverse diffuser layer 252 which diffuses the output light 242 provided to the LCD layer 302 only in the xy-plane in order to improve uniformity without broadening the distribution of the light 242 in the xz-plane. For example, the transverse diffuser 252 can be a holographic diffuser or a lenticular diffuser with grooves substantially parallel to the z-axis. Further details will be described hereinafter.

Figure 27A:
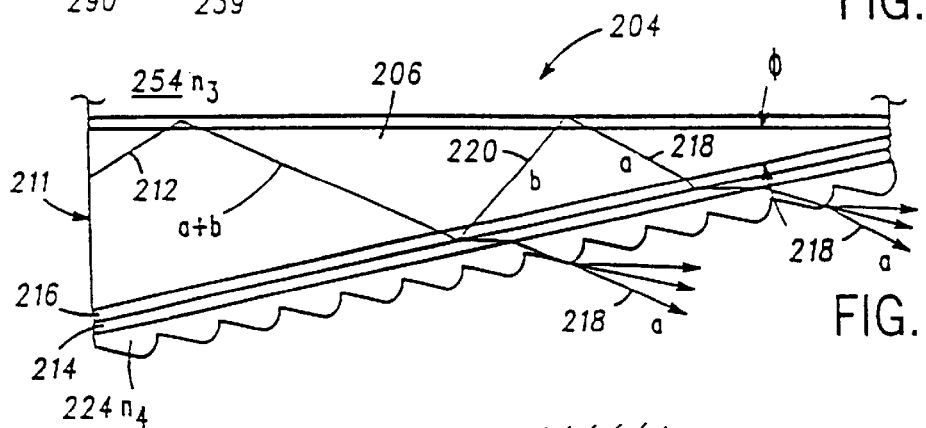
FIG. 27A illustrates a luminaire with a faceted redirecting layer and light polarization and polarization converting layers.
Figure 27B:
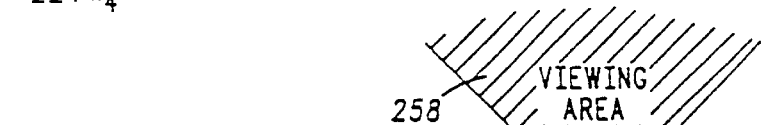
FIG. 27B is a variation on FIG. 27A, wherein the redirecting layers includes a reflecting layer with curved facets for focusing light in a preferred viewing zone.
Figures 1, 27B:
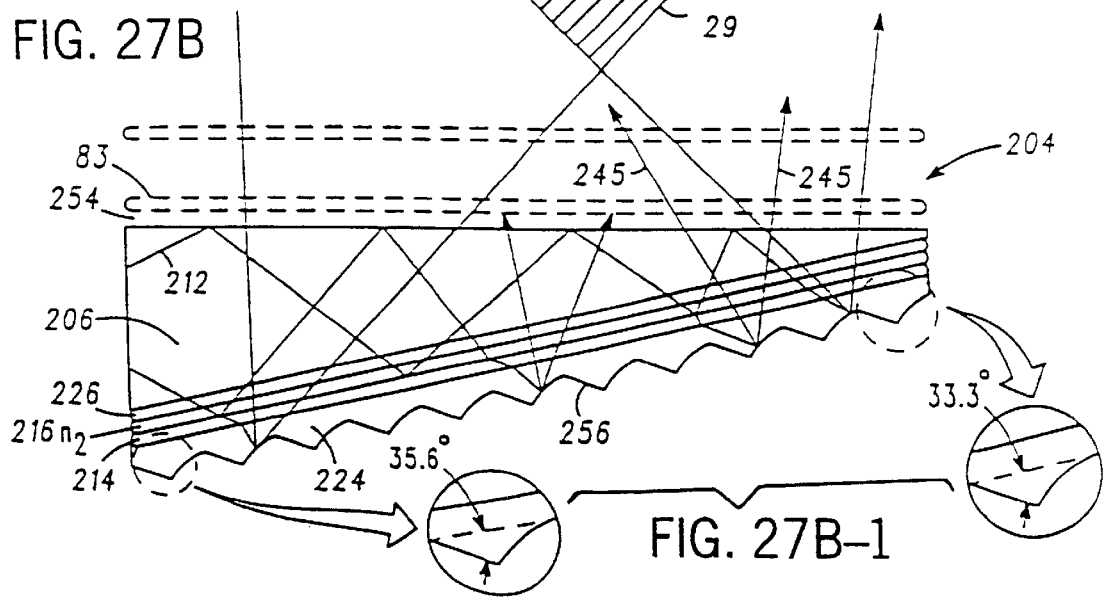
FIG. 1 shows a prior art wedge shaped device.

In FIGS. 27A and B are additional preferred embodiments wherein the first layer means of index of refraction $n_2$ is most preferably not air. These embodiments show different examples of the light redirecting layer 224. Further, in FIG. 27A medium 254 having index $n_3$ need not be air, but the various indices of the system 204 must meet the requirements of Equation (10) to achieve the total internal reflection illustrated. In FIG. 27B the medium 254 is air, the light redirecting layer 224 has curved facets 256, and the light 245 is focused within a preferred viewing zone 258.

The embodiments of FIGS. 28 and 29 preferably utilize an air gap layer 260 as the first layer means. The layer 260 enables light to enter the layer 260 after the light 212 has achieved an angle of incidence less than the critical angle 3c characteristic of an interface between the base layer 206 and the air gap layer 260. The embodiment of FIG. 28B includes a first redirecting layer 262 between the base layer 206 and a diffuser layer 264 and a second redirecting layer 265 on the other side of the base layer 206. This first redirecting layer 262 includes refracting/internally reflecting prisms 266 while the second redirecting layer 265 includes refracting prisms 268. Two of the polarization filter layer 216 are disposed either side of the base layer 206, each transmitting the appropriate light 218 or 220 which is passed through the associated light redirecting layer, 262 and 265, respectively. In FIG. 28C is a more preferred embodiment wherein the light redirecting layer 246 comprises a refracting/internally reflecting layer having the relatively small prisms 247. The surface angles of each of the prisms 247 can vary across the illustrated dimension of the redirecting layer 246 in a manner described hereinbefore. This variation in angle enables focusing different cones of light coming from the prisms 247 onto the preferred viewing zone 258 (see FIG. 27B). The light reflector layer 222 can be a metallic coating as described hereinbefore.

The reflector layer 222 can be applied to the converting layer 226 by conventional vacuum evaporation techniques or other suitable methods. The other layers, such as the redirecting layer 246 can be formed by casting a transparent polymeric material directly onto the matching layer 232 (see FIGS. 24 C–F and 28C and D). The polarization filter layer 216 can likewise be manufactured by conventional methods, such as deposition of multiple thin layers directly onto the base layer 206. Also included is an angle transformer layer 274 coupled to the back surface 211 (see FIG. 28C). This angle transformer 274 includes prisms 276 which broaden the angular distribution of input light 212 to the base layer 206 to help provide a more spatially uniform form of the output light 218 to the LCD layer 230. Other forms of the angle transformer layer 274 can be a roughened layer and a hologram (not shown) coupled to the back surface 211 (or other input surface) without an intervening air gap.

Figure 28D:
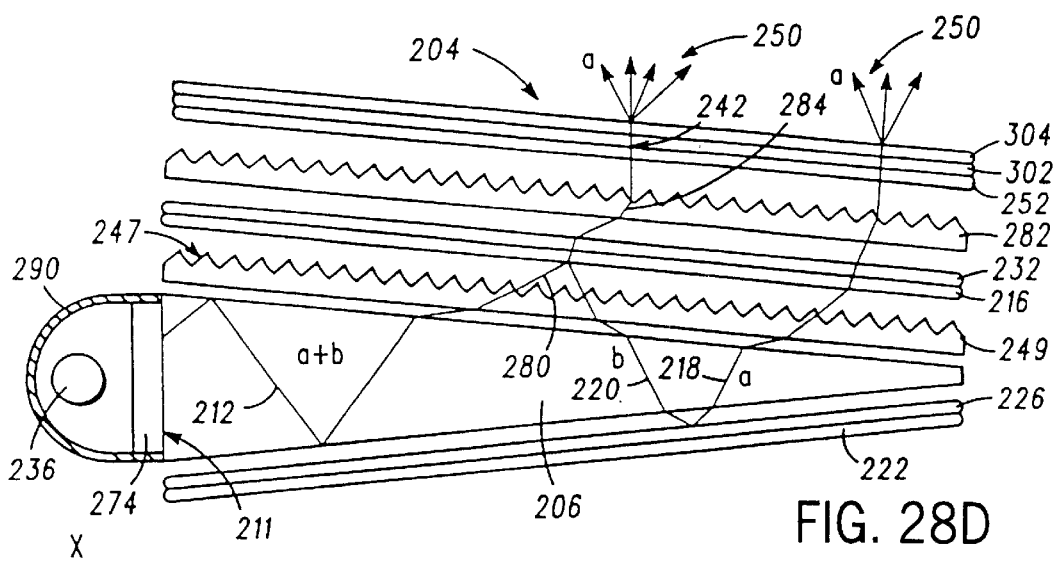
FIG. 28D is a variation on FIG. 28C.
Figure 28E:
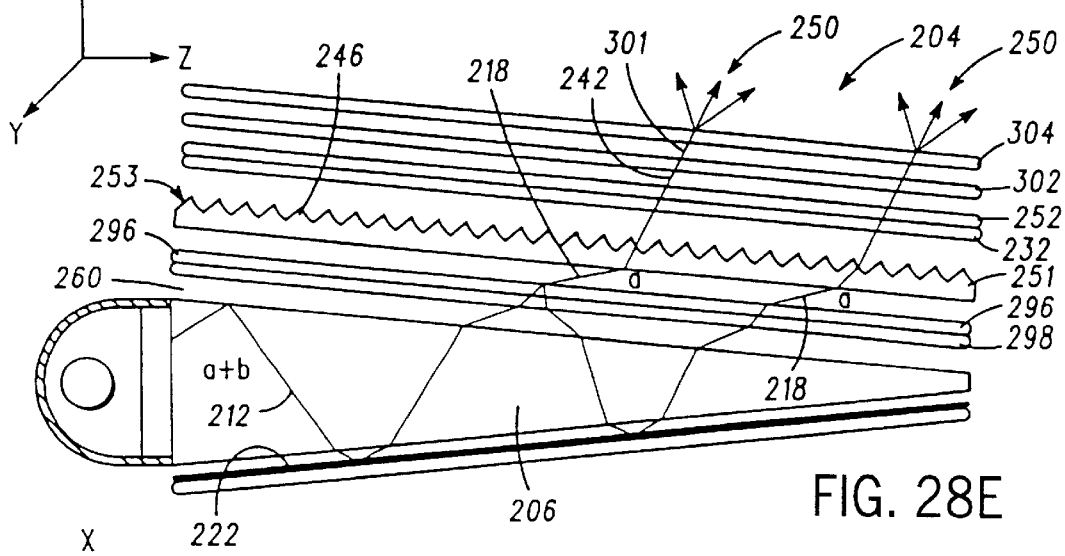
FIG. 28E is yet another variation on FIG. 28C.

In the preferred embodiment of FIG. 28D, a first prismatic light redirecting layer 249 is disposed between the base layer 206 and the polarization filter layer 216. This redirecting layer 249 reduces the angle of incidence of light 280 incident on the polarization filter layer 216. A second prismatic light redirecting layer 282 then redirects light 284 output from the filter layer 216 to an LCD layer 302 with a post diffuser layer 304, operable as a parallel diffuser as described hereinbefore. This embodiment further includes the CCFT light source 236 with a reflector 290 having a position following at least a portion of an involute of the light source 236 inner diameter. Another portion of the reflector 290 directly opposite the back surface 211 is convexly curved or bent.

In the preferred embodiment of FIG. 28E a light redirecting layer 251 comprises refracting micro prisms 253. A polarization filter layer 296 is disposed adjacent a converting layer 298, and the transverse diffuser layer 252 is positioned between the redirecting layer 251 and the LCD layer 302. A parallel diffuser 304 is disposed on the light output side of the LCD layer 302 with the light 242 directed through the LCD layer 302 at a preferred angle to optimize output light 301 for best image-forming quality of the LCD layer 302 (contrast, color fidelity and response time).

Figure 29A:
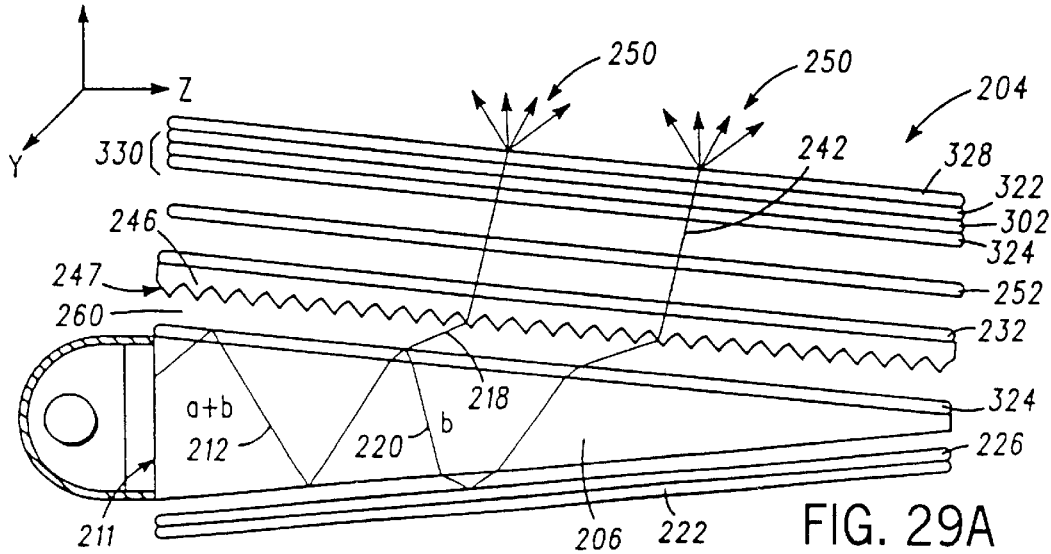
FIG. 29A illustrates a luminaire with polarized light output in combination with an LCD layer and FIG. 29B is a variation on FIG. 29A.

The embodiments of FIGS. 29A and B show some of the advantages of some forms of the invention over a conventional LCD polarizer system 304 shown in FIG. 30A. In FIG. 30A, a prior art backlight 306 emits light 308 of both polarizations in nearly equal proportions. A typical prior art LCD layer arrangement 310 includes a first form of polarization filter 312 and a second form of polarization filter 314 with the liquid crystal layer 316 sandwiched therebetween. In this LCD layer arrangement 310, the first polarization filter 312 must provide a high polarization ratio, that is, it must have an extremely low transmission of light of the second polarization state which is unwanted for input to the liquid crystal layer 316 in order for the LCD layer arrangement 310 to provide adequate LCD contrast. In practice, the polarization filter 312 has a high optical density for the desired light of the first polarization state as well. The resulting losses therefore further degrade the LCD light transmission and image output. In contrast to this prior art arrangement 310, the invention provides a much higher percentage of light which is preferred by the LCD layer arrangement 316 thereby making use of a substantial portion of the light of the unwanted second polarization and also minimizing loss of the desired light of the first polarization state.

In the embodiment of FIG. 28A this advantageous processing of the light 218 and the light 220 for the LCD layer 316 is accomplished by positioning the converting layer 226 adjacent the base layer 206. Disposed adjacent the converting layer 226 is the polarization filter layer 216. The light redirecting layer 224 includes curved microprismatic facets 318 to broaden the angle of light distribution in the xz plane and improve the uniformity of light distribution output from the luminaire system 204. A transverse diffuser 320 is preferably laminated to the light redirecting layer 224 or can be formed on opposite sides of a single polymeric layer (not shown). The polarizing filter layer 216 can be laminated or is disposed directly onto the converting layer 226 which in turn is laminated or deposited directly onto the first surface 208.

In the preferred embodiment of FIG. 29A the advantageous processing of the light 218 and the light 220 for the LCD layer 302 is accomplished by using a first polarization filter layer 324 and a second polarization filter layer 322. The first filter 324 can, however, have a relatively low polarization ratio compared to the prior art polarization filter 312. For example, the polarization filter layer 324 can have a lower dye concentration than the prior art filter 312. This difference enables higher LCD light transmission and improved image-forming properties described hereinbefore. This preferred embodiment utilizes a post diffuser layer 328 which is coupled to an LCD system 330 (the combination of the layer 324, the liquid crystal layer 302 and the layer 322). Preferably the post diffuser layer 328 is laminated to, or integrally formed with, the second polarization filter layer 322.

Figure 29B:
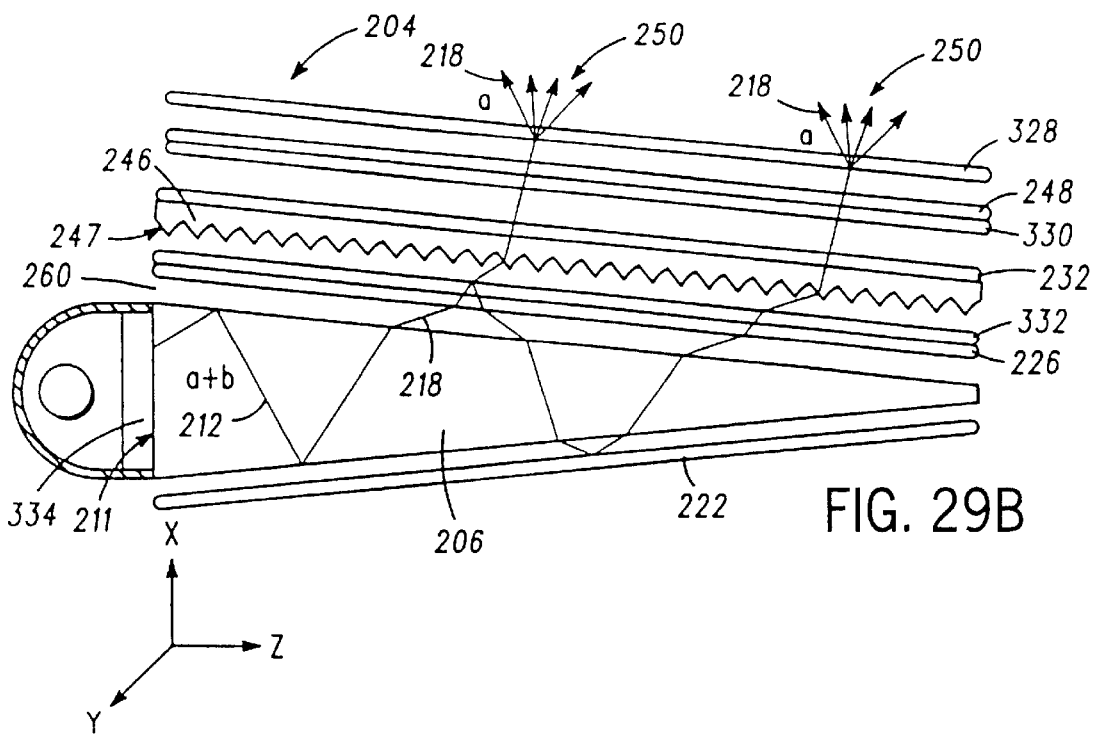

In the preferred embodiment of FIG. 29B, the advantages are achieved by using only one polarization filter layer 248 which results in reduced cost for the luminaire system 204 and increased light transmission. In this embodiment the light output through the matching layer 232 is preferably at least 90% composed of light 218 of the LCD preferred polarization state. A coupled angle transformer 334 coupled to the back surface 211 reduces the angular width of light distribution in the yz plane, and this reduced angular distribution further improves quality of the output light 250 making up the LCD image from the luminaire system 204.

In another preferred form of the invention shown in FIG. 33, the device 10 embodies a base layer 400 for receiving input light 402 from a light cavity 404 having lamp 406. The base layer 400 is most preferably an acrylic wedge as explained hereinbefore. The input light 402 is comprised of two polarization states "a" and "b" as shown in FIG. 33. The general terminology "a" and "b" is used throughout to cover all different polarization combinations, such as linear "s" and "p", left and right circular, and elliptical polarization with the second state being orthogonal to the first. As described hereinafter the "a" and "b" states are preferably operated on by a polarization beam splitter, referred to hereinafter as interference layer 411 or reflective polarizer layer 480. Light 405 is thus output from the base layer 400 into an air layer 407 under selected optical conditions in accordance with requirements explained hereinbefore in detail. Some of the light 405 with polarization "a" is further transmitted as light 409 into and through interference layer 411 disposed on glass plate 412, passes through air layer 414 and is acted upon by redirecting layer 416. Preferably this layer 416 is a prismatic layer described hereinbefore and is used to control the angle of output of the light 409 of polarization state "a". The redirecting layer 416 is designed preferably to act on light centered at about 74° from the normal which is a typical exit angle from the base layer 460, thereby changing the light direction to one substantially perpendicular to the particular exit face of the base layer 400. This layer 416 can also be diffractive in nature such as a hologram layer in other embodiments. The output light 409 from the redirecting layer 416 can be further processed with post diffuser layers (not shown) and other appropriate layers described in great detail hereinbefore.

Regarding polarization splitting, two basic types of polarization splitting layers (the interference layer 411) were used. One type of the layer 411 was based on vacuum deposition of thin inorganic films (for example, an interference layer (or "polarization filter") described hereinbefore as alternating layers of high index $n_H$ and low index $n_L$ material, to create a polarization selective beam splitter which could be used in non-normal incidence, specifically in the neighborhood of seventy-four degrees. Beam splitters of this type were created by vacuum depositing the layers on 1 mm thick glass plate using standard thin film physical vapor deposition techniques.

The second type of the layer 411 used consisted of a multi-layer polymer film. For example, the polymer film can be a well known DBEF (a trademark of 3M Co.) layer manufactured by 3M Co. Details concerning this commercially available product can be found in PCT publication WO95/17303 and WO96/19347. This film has the advantage that it could be used for normal incidence of the light as well as at wide incidence angles, has a film defined polarization axis, and can potentially be produced by high volume continuous manufacturing processes. These attributes allowed us to experiment with additional angles other than normal incidence type systems or a narrowly defined oblique angle, and various orientations of the pass axis of the film.

There are a number of other well known approaches that can produce polarization splitting effects used in these embodiments, including but not limited to scattering (such as dipole scattering), double refraction, reflection from collesteric liquid crystals, and thick film Brewster splitters.

As stated above, some of the light 405 has polarization state "b" and is reflected from the interference layer 411 (the polarization splitter) as light 418, passing through the air layer 411, the base layer 400, air layer 420, a converting layer 422 (for example, a quarter wave plate layer), air layer 424 and is reflected by a reflector that could be a silver film, such as Silverlux (a trademark of 3M Co.) or a dielectric reflector such as a BEF (a trademark of 3M Co.) type back reflector layer 426. This BEF layer 426 can also be disposed against white paper 425 (shown in phantom) to diffusely reflect the small amount of light that has passed through the layer 426. The reflector layer 426 may contribute to the polarization process or behave as a simple reflector. The reflected light 418 returns through the above-recited layers; but instead of being reflected by the interference layer 411, the light 418 has been converted by the converting layer 422 to light 423 of polarization state "a" which is transmitted, and the output angle is controlled by the redirecting layer 416.

As noted above, the preferred polarization converting layer 422 included commercially available quarter-wave stretched, birefringement polymer films and were designed for 550 nm light wavelength at normal incidence. This form of converting medium was not necessarily the design optium, but the materials were readily available; thus, many of the prototypes built used these available films at non-normal incidence and the retardation was not strictly of the quarter-wave type. For example, many of the surfaces of the device 10 show various compensation effects off angle. The optimal compensation film to be paired with these components is not necessarily a quarter-wave type film oriented at 45° to the system symmetry axis as evaluated herein. However, the embodiments illustrate the operability of the basic designs of the devices 10.

These films of the converting layer 422 were used in a number of configurations. Since the film was supplied with adhesive, it was laminated either to triacetate cellulose ("TAC") film which had low birefringence when it was necessary to use it as a free "unlaminated" film. To reduce reflections, improve performance, and stability, many architectures can be constructed where the film was directly laminated to other components of the device 10.

Other light 423 of both polarization states "a" and "b" is reflected by top surface 432 of the base layer 400, then passes through the base layer 400, the air layer 420, the converting layer 422, the air layer 424, and reflected by the BEF back reflector layer 426 back through the layers until striking the interference layer 411. This light 423 therefore acts in a manner similar to the light 405 upon output from the base layer 400 producing an output light 434 of polarization state "a" and reflecting light 436 of polarization state "b". This light 436 also acts in the manner as the light 418 of polarization state "b", resulting in output of light 438 of polarization state "a" (like the light 428). It should be noted that throughout the specification only certain important example light ray paths are shown to illustrate operation of the many embodiments of the device 10. To quantify the performance of the devices 10 studied, a series of gain parameters were developed which reflect increase of efficiency due to brightness and solid angle changes. Therefore, the performance of the embodiment of FIG. 33 is shown in Table 4 (the parameters are defined in the Example), and the measurement system and method are described in detail in the Example and in FIGS. 61–63.

The above-described device 10 therefore includes an assembly of layers which act as a "cavity" containing an internal polarization conversion and recycling mechanism. The term "cavity" can include, for example, a light waveguide wherein the light is moving between layers. Due to the "cavity" or waveguide nature of the device 10, the light ray paths can be numerous in type and combination. The requirement is that there be sufficient polarization conversion in the cavity so that light is converted from the state "b", which preferentially reflects from the interference layer 411, to the state "a" which is transmitted efficiently to avoid substantial internal losses. Consequently, multiple Fresnel reflections and non-ideal conversion mechanisms from "b" to "a" states within the cavity are permissible.

Example architectures chosen to study were either (1) the central rays of the luminaire of TE or TM polarization with respect to the system which makes the base layer 400 and redirecting layer 414 have low conversion and have good

TABLE 4

Comparison of Various Architectures to Basic Tapered Luminare with a Metallic Based Back Reflector

| FIG. | Redirecting Layer Display Side | Diffuser | Base Layer (B. Layer) | Back Reflector | Reflective Polarizer | Rotator | g Luminance (Brightness Gain) | g Range (Range Gain) | g Total (Usable Gain-product of brightness gain and range gain) |
|---|---|---|---|---|---|---|---|---|---|
| 33 | Yes | No | Smooth | Structured | Evaporated | Yes | 1.04 | 1.26 | 1.31 |
| 34 | Yes | No | Smooth | Structured | Evaporated | No | 1.06 | 1.20 | 1.27 |
| 35 | Yes | No | Smooth | Structured | None | No | 1.07 | 1.09 | 1.17 |
| 36 | Yes | No | Smooth | Metallic | Evaporated | Lam to BRefl | 1.12 | 1.21 | 1.35 |
| 37 | Yes | No | Smooth | Metallic | Evap on Pipe | Lam to BRefl | 1.10 | 1.06 | 1.17 |
| 38 | Yes | No | Smooth | Metallic | None | None | 1.00 | 1.00 | 1.00 |
| 39 | Yes | No | Smooth | Metallic | Evaporated | Lam to Pipe | 1.16 | 1.12 | 1.30 |
| 40 | Yes | No | Smooth | Metallic | None | Lam to Pipe | 0.97 | 1.02 | .99 |
| 45 | Yes | No | Smooth | Structured | Evaporated | Lam to Pipe | 1.13 | 1.19 | 1.35 |
| 46 | Yes | No | Smooth | Structured | None | Lam to Pipe | 1.06 | 1.11 | 1.18 |
| 47 | Yes | No | Smooth | Structured | At Pipe Input | None | 1.16 | 0.99 | 1.15 |
| 48 | Yes | No | Smooth | Structured | At Pipe Input | At Pipe Input | 1.08 | 1.01 | 1.09 |

To investigate the polarization conversion mechanisms in the device 10, a variety of components were evaluated regarding converting light in TE(s) and TM(p) states, and 45° incident linear polarization of the light into the orthogonal linear polarization state. To make this measurement a 623.8 nm laser and a polarizer analyzer pair were used. Each sample was illuminated at seventy-four degrees incidence which is near the center of the ray distribution leaving the base layer 400. For the prismatic form of the redirecting film 414, transmitted light was measured, and for all other parts reflected light was measured. The results in Table 5 illustrate these conversion effects.

TABLE 5

| System | TE | TM | 45° |
|---|---|---|---|
| BEF Only | 17% | 18% | 30% |
| BEF and Separate Converter | 27% | 35% | 56% |
| BEF with Laminated Converter | 29% | 39% | 42% |
| Metallic Reflector Only | 0% | 0% | 29% |
| Metallic Reflector with Separate Converter | 35% | 37% | 49% |
| Metallic Reflector with Laminated Converter | 52% | 59% | 33% |
| Light Pipe, Specular | 1% | 6% | 69% |
| Prismatic Redirecting Film | 2% | 5% | 54% |

Generally, conversion of light in a light pipe type of geometry can originate from a number of mechanisms and that the effect of the various interactions in the system depends on the specific polarization state at that point, for example, TE, TM, 45°, circular, etc. Hence, the polarization conversion effect can result, for example, from total internal reflection, reflection beyond the Brewster's angle from dielectric interfaces, and material birefringence.

Since every transmission or reflection has the potential of changing polarization depending on the exact circumstances, there are a variety of ways that compensation/polarization conversion films can be used to advantageously improve performance by increasing the conversion and specifically control polarization beyond the natural effect of various elements. In addition, the angle of the polarization splitting layer can be used as an important parameter to enhance polarization conversion in the manner intended.

control over the polarization, or (2) at 45° where nearly every interaction converts polarization, and the net effect of all of the separate conversions is some total amount of conversion or depolarization of the light recycles through the polarization cavity. It also should be readily understood that one can control the light polarization conversion process in the 45° architecture, as is done in other cases.

In an additional embodiment of the invention shown in FIG. 34, the layer structure is like that of the embodiment of FIG. 33 except the converting layer 422 is removed. The polarization recycling cavity is still substantially formed by the combination of the interference layer 411 and the back reflector layer 426. As a result of removing the converting layer 422, the light 418 of polarization "b" is transmitted through the base layer 400, the air layer 420 and is reflected as light 440 of polarization "b" and "a", with some of the "b" state being converted to the "a" state. Polarization conversion now relies on conversion from reflections from the various elements, such as the back reflector layer 426 and residual birefringence of the various layers of the device 10 to output light 442 preferably of polarization state "a". The performance of this embodiment is shown in Table 4.

In a further embodiment in FIG. 35, the converting layer 422 and the interference layer 440 have been removed as compared to the embodiment of FIG. 33. This embodiment includes an unpolarized form of the light 402 input from the lamp cavity 404. This embodiment thus shows a polarization level of only about 6% above random with a high brightness direction being along the direction of propagation of the light in the base layer 400. The performance of this embodiment is shown in Table 4.

In another preferred embodiment shown in FIG. 36, the arrangement of layers is quite similar to the embodiment of FIG. 33 and generally results in processing the same family of light rays of particular polarization with the various polarization cavity elements. The principal distinction is the reflector layer is now a metallic back reflector layer 446 which is laminated to the converting layer 422 with no intervening air layer. Preferably this layer 446 comprises a commercially available, silver coated polymer film (Silverlux, for example, referred to hereinbefore) laminated to a substrate, such as aluminum or other suitable support. The performance of this embodiment is shown in Table 4.

In an additional preferred embodiment shown in FIG. 37, the arrangement is quite similar to the embodiment of FIG. 36 except the polarization splitting interference layer 411 is directly disposed onto the base layer 400. This layer 411 is preferably deposited by evaporation although any other conventional thin film deposition technique can be used to produce an operative layer. This layer 411 can also be obtained by lamination of reflective polymers or other polarization splitter layers which are of low loss and do not significantly attenuate light rays in the base layer 400. The relative performance of this embodiment is illustrated in Table 4.

In yet another embodiment shown in FIG. 38, the arrangement of layers is quite similar to that of FIG. 35 except the back reflector layer is the metallic back reflector layer 446. The light ray paths are also quite similar to those in FIG. 35. The degree of polarization is about 4% which is also very similar to the device 10 of FIG. 35. The performance of this embodiment of FIG. 38 is shown in Table 4.

In yet a further preferred embodiment in FIG. 39, the arrangement of layers is similar to that of FIG. 36 except that the converting layer 422 is laminated to the base layer 400 instead of being laminated to the metallic back reflector layer 446. Instead, there is an air layer 448 between the converting layer 422 and the metallic back reflector layer 446. The light ray paths are also quite similar to those of FIG. 36, except that additional polarization of unpolarized light occurs and polarization conversion also occurs before the light exits the base layer 400. These additional polarization and conversion steps will be described hereinafter in reference to the embodiment of FIG. 40. The resulting output is light 452 suitably controlled in angle by the redirecting layer 416. A portion of the light 450 has been reflected by the interference layer 411 as light 453 of polarization state "b" which is further processed and converted to the light 438 of state "a" and output. The performance of this embodiment of FIG. 39 is shown in Table 4.

In a yet another preferred embodiment in FIG. 40, a different polarization recycling and conversion arrangement is shown. In this embodiment, the polarization recycling cavity is formed by the base layer 400 and a laminated form of the converting layer 422 which confines light by total internal reflection (hereinafter, "TIR"). In this device 10, the input light 402 is continuously converted in polarization by the converting layer 422 as the light 402 travels down the diminishing thickness of the wedge shaped base layer 400. These components of the light 402 which are p-polarized ("a" state for this embodiment) with respect to the top surface 432 are then preferentially coupled from the base layer 400 due to the lower reflectivity of the "a" state light as compared to s-polarized ("b" state); and as the light ray angles pass $\theta_c$ (see discussion hereinbefore concerning critical angle), the light 402 begins to escape the base layer 400. Various example light ray paths are shown in the figure. In one case, the light 402 of polarization "a" and "b" is reflected from the top surface 432 and bottom surface 454 until $\theta_c$ has been achieved. The light 456 of polarization "a" is then output through the air layer 407 and through the redirecting layer 416 with a controlled angular range toward the viewer. A remaining component of light 458 of polarization state "b" is reflected and passes through the base layer 400, and the light 458 is coupled out into the converting layer 422. Upon reflection and traversal again of the layer 422, the light 458 has become light 460 of polarization state "a" and is output through the air layer 407 and the redirecting layer 416. A further example of the process is the light 458 passes once through the converting layer 422, is outcoupled into air layer 448, reflected by the metallic reflector layer 446, passes again through the converting layer 422 to become light 462 of polarization "a" which is then output toward the viewer. The generally preferred output is still, however, light of "a" polarization. Therefore, the difference between the reflectivities of the "a" and "b" states enables improved polarization efficiency. In addition, the resulting polarization produced was about thirteen percent. The performance of this embodiment is shown in Table 4.

In yet another embodiment shown in FIG. 41, the arrangement of layers is similar to FIG. 40, but the limited difference between reflectivities of the "a" and "b" states are further enhanced by depositing a polarization splitting layer 464 directly onto the top surface 432 of the base layer 400.

In another variation related to the embodiments of FIGS. 40 and 41, FIG. 42 shows a back reflector layer 466 directly coupled to the converting layer 422 which is also laminated to the bottom surface layer 454 of the base layer 400.

Figure 43:
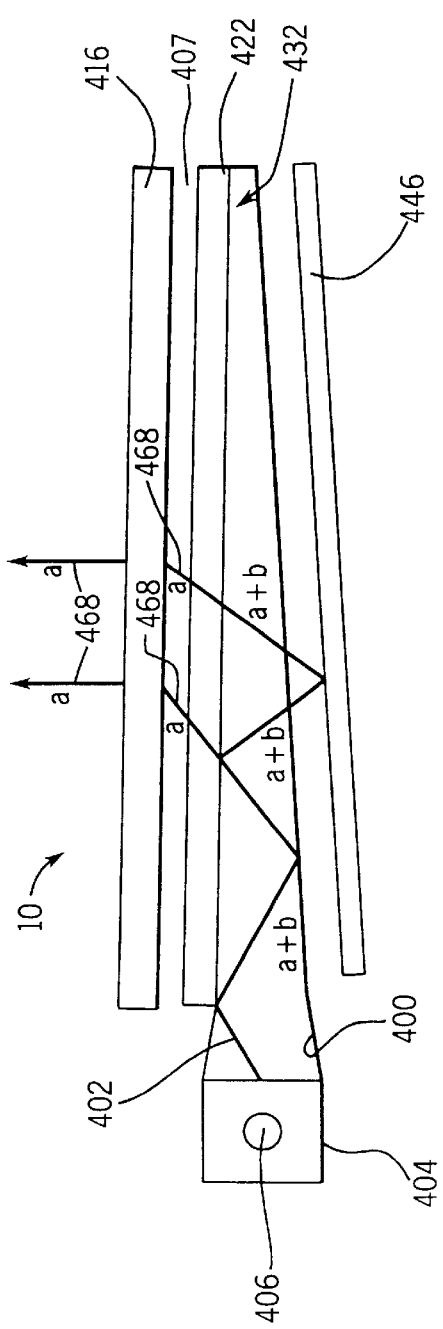
FIG. 43 illustrates a luminaire system having a polarization converting layer disposed above the top surface of the base layer.

In yet another embodiment shown in FIG. 43, the converting layer 422 can be disposed on the other side of the base layer 400 above the top surface 432. This arrangement also accomplishes the purpose of confining the light as it travels along the base layer 400. Several example light ray paths are shown with the primary difference being the light 402 of polarization state "a" and "b" is outcoupled from the top surface 432, and then the "b" state component is converted to light 468 of "a" state by the quarter wave plate converting layer 422.

Figure 44:
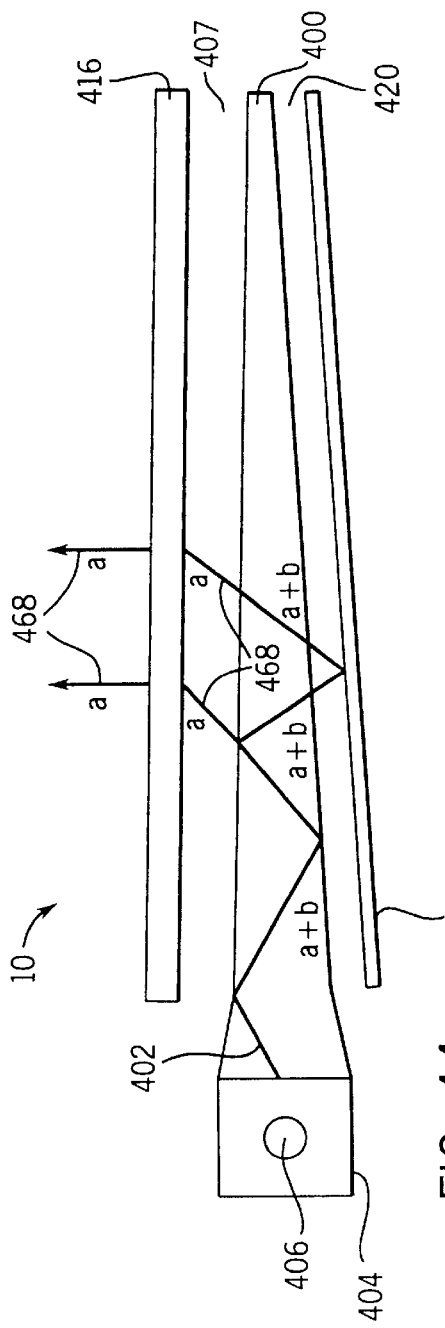
FIG. 44 illustrates a variation of FIG. 43 with the base layer made of a birefringent polarization converting material.

In a further variation on the embodiment of FIG. 43, the base layer 400 in FIG. 44 is made of a birefringement polarization converting material which functionally operates to include with the base layer 400 the polarization converting function of the converting layer 422 of FIG. 43. As shown in FIG. 44, the light 402 is outcoupled into the air layer 407 as the light 468 of polarization state "a".

In considering the performance measurements in Table 4, it was noted that increased polarization efficiency did not necessarily result in systematic gain increase. This was believed to arise from scattering and absorption losses from the type and quality of the adhesive bond used to couple various layers and also on the attached quarter wave film.

Figure 45:
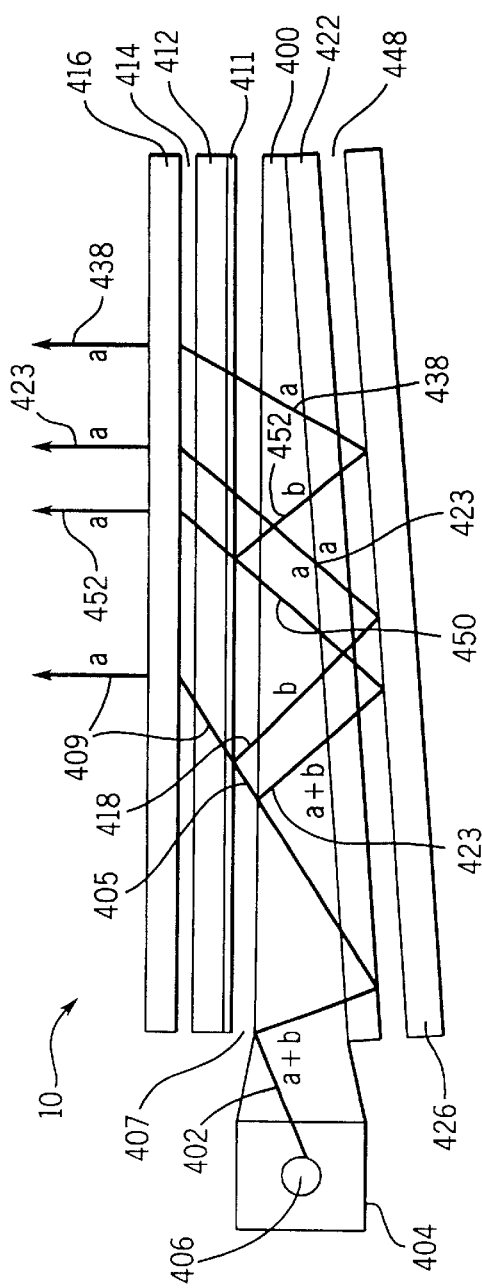
FIG. 45 illustrates a variation of FIG. 39 with the back reflector layer being a BEF type back reflector.

In a further variation on the embodiment of FIG. 39, the back reflector layer in FIG. 45 is the BEF type back reflector layer 426 rather than the metallic back reflector 446. The light ray paths between layers are quite similar, and the performance is shown in Table 4.

Figure 46:
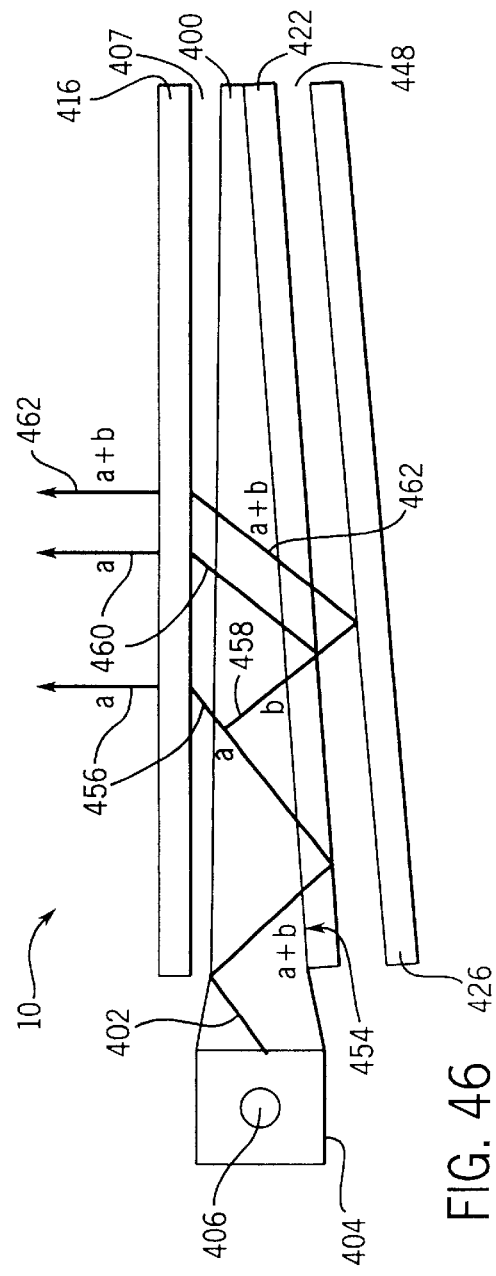
FIG. 46 illustrates a variation on FIG. 40 with the back reflector layer being a BEF type back reflector.

In a further variation on the embodiment of FIG. 40, the back reflector layer in FIG. 46 is the BEF type back reflector layer 426 rather than the metallic back reflector 446. The light ray paths are quite similar, and the performance is shown in Table 4.

Another form of the invention is shown in FIG. 47, in which a polarization splitting layer 470 is disposed at the input to the base layer 400. In this embodiment, the polarization recycling "cavity" is formed by the lamp cavity 404 and the polarization splitting layer 470. The input light 402 thus is processed by the light cavity 404 and the polarization splitting layer 470 to produce light 476 of polarization state "a". In order to achieve this result, the polarization splitting layer 470 most preferably is positioned to have its pass axis either substantially parallel, or perpendicular to the direction of the symmetry axis of the base layer 400. This arrangement keeps light in the base layer 400 substantially in one polarization state as it travels down the base layer 400. Therefore, the input light 402 (the light emitted by the lamp 406), leaves the lamp 406 in an unpolarized state and ultimately encounters the polarization splitting layer 470. A substantial part of the light 402 is transmitted as light 476 of polarization state "a", while the remainder of polarization state "b" is reflected or recycled back into the lamp cavity 404 for eventual conversion and output as the light 476 of polarization "a". The performance of this device 10 is shown in Table 4.

In a variation on the embodiment of FIG. 47, the arrangement of FIG. 48 further includes the feature of a polarization converting layer 478 on the lamp cavity side of the polarization splitting layer 470. The light ray paths in this embodiment are quite similar to the paths shown in FIG. 46. The performance results are shown in Table 4.

In another variation on the embodiment of FIG. 33, the device 10 of FIG. 49 does not include the redirecting layer 416, the base layer 400 is a textured light pipe, rather than one having optically smooth surfaces, and a film based reflective polarizer layer 480 is substituted for the interference layer 410 to split and reflect the light polarization states. The effect of the texture on (or equivalently within) the base layer 400 is to diffuse (or misdirect) the light 402 as it travels down the base layer 400 and also as it exits and is recycled through the base layer 400. The textured base layer 400 can, for example, be created by spraying a curable coating onto a smooth version of the base layer 400 or by using a textured mold to create the textured form of the base layer 400, or by dispersing submicron to micron size scattering centers within the layer 400. These textures operate such that any ray path undergoes small misdirection. This interaction involves a weak scattering event and while changed by this, the ray path is not changed drastically. In this context, the texture refers either to slope variations on In another form of the embodiment of FIG. 49, the device 10 of FIG. 50 does not include the textured form of the base layer 400 described previously. The comparative performance is shown in Table 6, and the light ray paths are quite similar to that of FIG. 49. It should be noted that the data of Tables 4 and 6 cannot directly be compared because a different reference architecture was used in each table. One can roughly compare the data of one table to another by multiplying the data of Table 4 by 1.17 to compare with Table 6 data.

Figure 51:
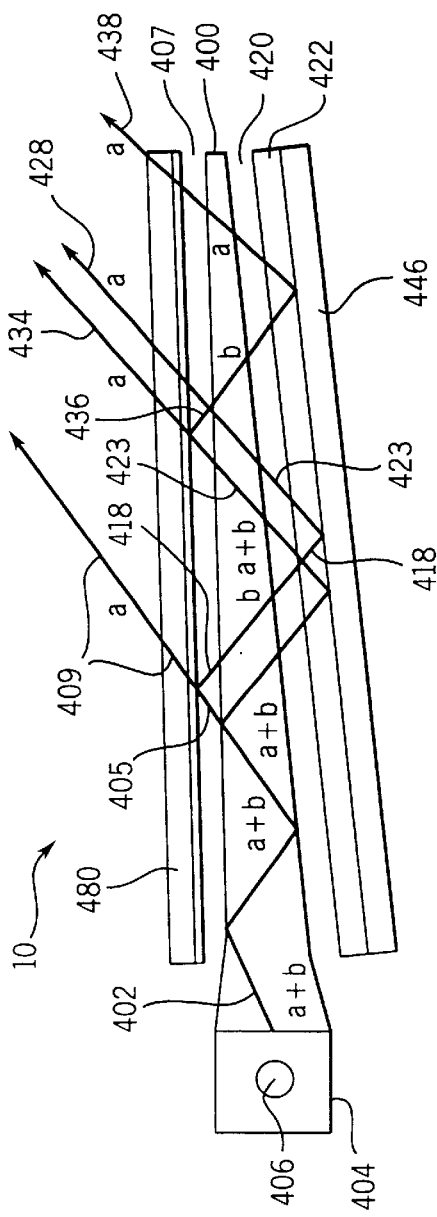
FIG. 51 illustrates a variation on FIG. 49 with the metallic back reflector substituted for the BEF type back reflector.

In another form of the embodiment of FIG. 49, the device 10 of FIG. 51 uses the metallic back reflector 446 rather than the BEF-type back reflector layer 426. In addition, the layer 426 is laminated to the converting layer 422 without an air layer. The light ray paths are quite similar to those in FIG. 49, and the comparative performance is shown in Table 6.

Figure 52:
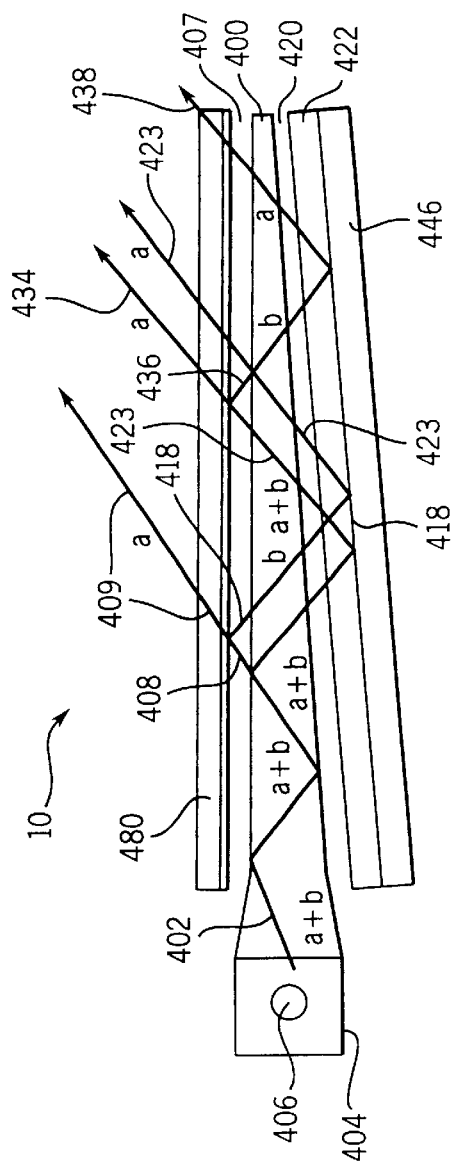
FIG. 52 illustrates a variation on FIG. 51 with the base layer not being textured.

In a variation on the embodiment of FIG. 51, the device 10 of FIG. 52 does not use a textured form of the base layer 400. The light ray paths are very similar, and the comparative performance is shown in Table 6.

In another form of the embodiment of FIG. 33, the device 10 of FIG. 53 uses the reflective polarizer layer 480 rather than the interference layer 411; and a textured form of the base layer 400 is used. The light ray paths are quite similar, and the comparative performance is illustrated in Table 6.

In another form of the invention shown in FIG. 54 the device 10 is similar to the one shown in FIG. 53 except the redirecting layer 416 is switched with the reflective polarizer layer 480 (a polarization splitter like the interference layer 411). As a result of this rearrangement, the light ray paths are quite

TABLE 6

Comparison of Various Architectures to Basic Tapered Luminare with a Structured Back Reflector.

| FIG. | Redirecting Layer | Base Layer (B. Layer) | Back Reflector | Reflective Polarizer | Rotator | g Luminance (Brightness Gain) | g Range (Range Gain) | g Total (Usable Gain) |
|---|---|---|---|---|---|---|---|---|
| 49 | No | Textured | Structured | Over B. Layer | Under B. Layer | 0.71 | 1.92 | 1.37 |
| 50 | No | Smooth | Structured | Over B. Layer | Under B. Layer | 0.68 | 2.02 | 1.38 |
| 51 | No | Textured | Specular | Over B. Layer | Under B. Layer | 0.67 | 2.41 | 1.62 |
| 52 | No | Smooth | Specular | Over B. Layer | Under B. Layer | 0.77 | 2.36 | 1.81 |
| 53 | Yes | Textured | Structured | Over B. Layer | Under B. Layer | 1.10 | 1.09 | 1.2 |
| 54 | Yes | Textured | Structured | Over Nfilm | Under B. Layer | 0.97 | 1.13 | 1.1 |
| 55 | Yes | Textured | Structured | Over B. Layer | Under Refle | 0.96 | 1.16 | 1.11 |
| 56 | Yes | Textured | Structured | Over B. Layer | Laminated to | 1.06 | 1.14 | 1.21 |
| 57 | Yes | Textured | Structured | None | None | 1.00 | 1.00 | 1.00 |
| 58 | Yes & Dfilm | Textured | Structured | Over Dfilm @ 45 | None | 1.08 | 1.1 | 1.19 |
| 59 | Yes & Dfilm | Textured | Structured | Over Nfilm @ 45 | None | 1.04 | 1.08 | 1.12 |
| 60 | Yes & Dfilm | Textured | Structured | Over Wedge @ 45 | None | 1.15 | 1.09 | 1.25 | its surface of the base layer 400 or refractive index variations on or within the base layer 400, either of which will deviate the ray path by an amount on the order of fractions of a degree to degrees from its path in the absence of such texture. This embodiment was directed to evaluation of the losses arising from the redirecting layer 416 processing broad angle illumination provided by the polarization elements of the device 10. As can be noted by reference to Table 6, the elimination of the redirecting layer 416 results in improved efficiency. The light ray paths followed are quite similar to the paths in FIG. 33 except the light rays exit the device 10 at wider angles without use of the redirecting layer 416.

different. The input light 402 to the base layer 400 can, as in the embodiment of FIG. 53, be coupled out through the top surface 432 of the base layer 400 with some of the light 405 of polarization "a" output through the redirecting layer 416 and the reflective polarizer layer 480. Some of the light 405 of polarization state "b" is reflected as light 482, passing through the base layer 400, the air layer 420, the converting layer 422, the air-layer 424 and is reflected by the BEF type back reflector layer 426. Upon return passage through the converting layer 422, the light 482 changes to light 484 of polarization state "a" and output to the viewer through the base layer 400, the redirecting layer 416 and the reflective polarizer layer 480. The exchanged position of the redirecting layer 416 and the reflective polarizer layer 480 also results in the redirecting layer 416 operating on wide angle light traveling in both the forward and reverse directions as shown in FIG. 54. The forward traveling light passes through the base layer 400 in a manner like that shown in FIG. 52, but the reverse traveling light passes backward through the base layer 400. Ultimately, some of this light will even recycle through the lamp cavity 409. Several example overlapping light paths are illustrated in FIG. 54, but numerous other light paths also exist. The performance of this device 10 is shown in Table 6.

In another variation on the embodiment of FIG. 53, the device 10 in FIG. 55 places the converting layer 422 above the base layer 400. The light ray paths are similar to those of FIG. 53 except the polarization conversion occurs above the base layer 400. For example, the light 402 is coupled out of the top surface 432 as the light 405 passes through the converting layer 422 to reverse polarization states, and the light 409 of polarization state "a" is output through the reflective polarizer layer 480 and the redirecting layer 416. Of more interest is light 482 of polarization state "b" reflected by the reflective polarizer layer 480 which passes through the air layer 407, the converting layer 422, the air layer 485, the base layer 400, the air layer 420, reflected by the BEF type back reflector layer 426 and returns through these layers to be converted by the converting layer 422 to light 484 of polarization state "a" for output. The comparative performance of the device 10 is shown in Table 6.

In another variation on the embodiment of FIG. 53, the device 10 of FIG. 56 has the converting layer 422 laminated to the base layer 400. The light ray paths are thus quite similar, and the performance of this embodiment is shown in Table 6.

In another form of the embodiment of FIG. 35, the device 10 of FIG. 57 uses a textured form of the base layer 400. The light ray paths are quite similar and the performance is shown in Table 6.

Figure 59:
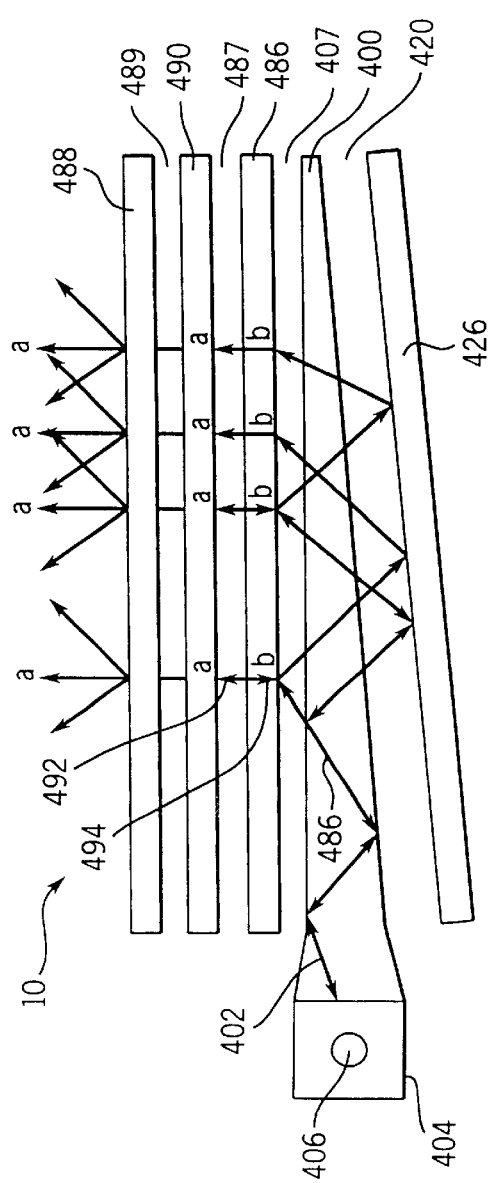
FIG. 59 illustrates a variation on FIG. 58 with the polarizer layer positioned below the redirecting/diffuser layer.
Figure 60:
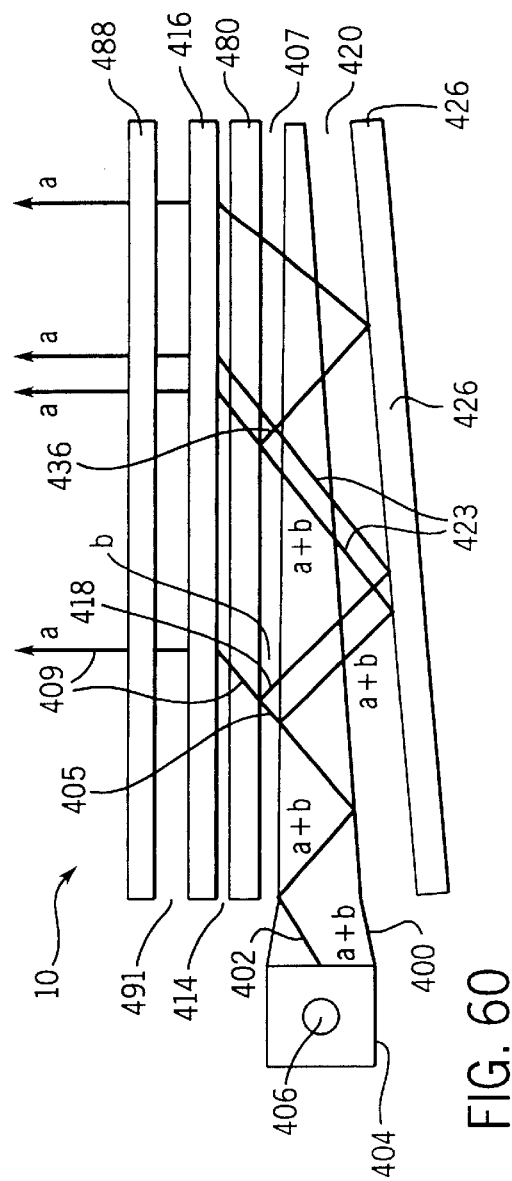
FIG. 60 illustrates a variation on FIG. 53 with polarization created by off-angle reflections.

In another form of the invention illustrated in FIGS. 58–60, operation of the device 10 as a polarized luminaire is shown without use of a separate form of the converting layer 422. This is accomplished by light reflection past the Brewster angle, polarization conversion upon off-angle metallic reflection events, polarization due to total internal reflection and internal birefringence in a stretched film base layer of the primitive redirecting layer 416 and the BEF type back reflector layer 426. Each of these mechanisms can contribute to polarization conversion when we position the reflective polarizer layer 480 at the same angle to the symmetry axis of the device 10. For simplicity, a 45° angle is chosen for the pass axis of the polarizer layer 480.

In FIG. 58 is shown the device 10 having substantially unpolarized light 486 traveling along the base layer 400 until its angle increases to exceed $\theta_c$ at one of the top surface 432 or the bottom surface 457. The light 486 then passes through the air layer 407, the prismatic redirecting layer 416 which changes the angle of the light 486; and after passing through air layer 487, another redirecting/diffuser layer 488 broadens the angular distribution of the light 486. The light 486 then passes through air layer 489 and encounters a reflective polarizer layer 490 which acts as a polarization splitting layer. This polarizer layer 490 is oriented so that the pass-axis is at 45° to the symmetry axis of the device 10 which in this particular case is the primary propagation direction of the device 10. The polarizer layer 490 splits the light 486 into two components: light 492 of one state "a" is preferably passed and light 494 of state "b" is preferably reflected. The light 494 is thus recycled back in a broad angular distribution by passing through the redirecting/diffuser layer 488. This broad angular distribution of the light 494 has a variety of recycling paths. For example, some of the light 494 will recycle through the redirecting/diffuser layer 488 in the general manner shown in FIG. 54. Polarization conversion in this case can occur by interaction through Fresnel reflection from the faces of the base layer 400, total internal reflections in the redirecting/diffuser layer 488, conversion due to birefringence in the redirecting/diffuser layer 488, metallic reflection effects and diffuse scattering in the lamp cavity 404. The light 494 traveling this path can ultimately recouple through the redirecting/diffuser layer 488 and back through the other components of the device 10. The wide variety of recycled rays ultimately reach the polarizer layer 490 with some polarization conversion accumulated resulting in system gain. The performance of this device 10 is shown in Table 6.

In a variation on the embodiments of FIG. 58, the device 10 in FIG. 59 has the polarizer layer 490 positioned below the redirecting/diffuser layer 488 so that light rays recycle in the general manner similar to those in the embodiment of FIG. 54 without the broad angle diffusion effects present in the embodiment of FIG. 58. This embodiment in FIG. 59 also takes advantage of off-angle reflections and scattering to convert polarization state of the light 486 rather than the explicit polarization converting layer 422 of FIG. 54. The performance of this embodiment is shown in Table 6.

In another embodiment similar to that of FIG. 53, the device 10 of FIG. 60 accomplishes polarization conversion by off-angle reflections since the reflective polarizer layer 480 is at a 45° angle relative to the symmetry axis of the device 10. The device 10 thus does not include the converting layer 422 and does add the redirecting/diffuser layer 488 with an intervening air layer 491. The performance of this device 10 is shown in Table 6.

Birefringent Layers in Luminaire Systems

A birefringent material can be used to advantage in the polarized light luminaire system 204 discussed hereinbefore. In the embodiment illustrated in FIG. 31A, the first layer 214 can be a birefringent material of index $n_2$ with two different optical indices $n_{2\alpha}$ and $n_{2\beta}$ for the light 212 of two different polarization states "a" and "b", both indices being less than one. This light 212 encounters the layer 214 near the respective critical angles for these two polarization states, $$\theta_{c\alpha} = \arcsin(n_{2\alpha}/n_1) \tag{15}$$

and $$\theta_{c\beta} = \arcsin(n_{2\beta}/n_1) \tag{16}$$

The conditions of Equation (10) must be satisfied for $n_2$ equal to both $n_{2\alpha}$ and $n_{2\beta}$, independently. The light 212 of both polarization states decreases its angle of incidence by an angle 2Φ for each cyclic reflection from the first surface 208 and the second surface 210 as described previously. In this embodiment $n_{2\alpha} > n_{2\beta}$ and therefore $\theta_{c\alpha} > \theta_{c\beta}$. As the incidence angle for both polarization states decreases, the light 212 of both polarization states can encounter the interface with the birefringent first layer 214 with the light having an incidence angle less than the first critical angle $\theta_{c\alpha}$, but exceeding the second critical angle $\theta_{c\beta}$. Therefore, light 218 of the first polarization state is at least partially transmitted through the birefringent first layer 214, while the light 220 of the second state is preferentially reflected by total internal reflection. This reflected second-state light 220 and the residual first-state light 218 continue to decrease their angles of incidence with successive reflections. The light 218 of the first polarization state is transmitted at each successive encounter with the interface between the first layer 214 and the base layer 206. The light 220 of the second state continues to undergo total internal reflection at this interface until its angle of incidence becomes less than the second critical angle θcβ, at which point this second-state light 220 also is at least partially transmitted through the birefringent first layer 214. By virtue of this mechanism and of the difference in indices $n_{2\alpha}$ and $n_2\beta$, the light exiting the birefringent first layer 214 has a different angle distribution for the two polarization states "a" and "b".

Birefringent materials can in general include crystalline materials having an anisotropic index of refraction. A preferred material is a stretched polymeric film such as stretched fluorinated film. The stretching orients the film and makes the index of refraction different along that direction. Elsewhere we give birefringence values of these stretched fluoropolymer film with Δn ranging from 0.030–0.054. Other films are PVA (Polyvinylalcohol). Polypropylene, Polyolefin or even Polyester (Mylar). Mylar is actually biaxial, but may still be used to rotate polarization. More traditional uniaxial birefringent materials are: Calcite and Quartz. These are not as practical as the stretched films. In practice the two polarization states are well-separated only if the two indices are sufficiently different. This condition may be expressed as, $$\theta_{c\alpha} \geq \theta_{c\beta} s\phi \tag{17}$$

where s must be at least 1 and is preferably greater than four. This condition may be achieved, for example, using uniaxially oriented fluoropolymer material for the birefringent layer, acrylic polymer for the base layer 206 and reasonable values of Φ (between one and one-and-a-half degrees is typical for notebook computer LCD backlighting).

FIG. 31B is like FIG. 31A, but the redirecting layer 224 has been added; and the preferred embodiment uses air for the layer 207 having index $n_3$. The light 218 and the light 220 are output from the system 204 at different angles.

FIG. 31C illustrates another variation on FIGS. 31A and B, but the redirecting layer 224 comprises a flat faceted reflective layer 340. The light 218 and also the light 220 are directed to a converting layer 346 which transmits the light 218 without substantially changing its polarization state; however, the converting layer 346 does convert the light 220 to the light 218 of the desired first polarization state. The converting layer 346 shown in FIG. 31C has a construction that operates to convert the light polarization only within the angular range occupied by the light 220. The converting layer 346 thus utilizes the schematically illustrated angular separation of the light 218 and the light 220 to carry out the conversion of the light 220 to the light 218 without converting the light 218 to the light 220.

Figure 31D:
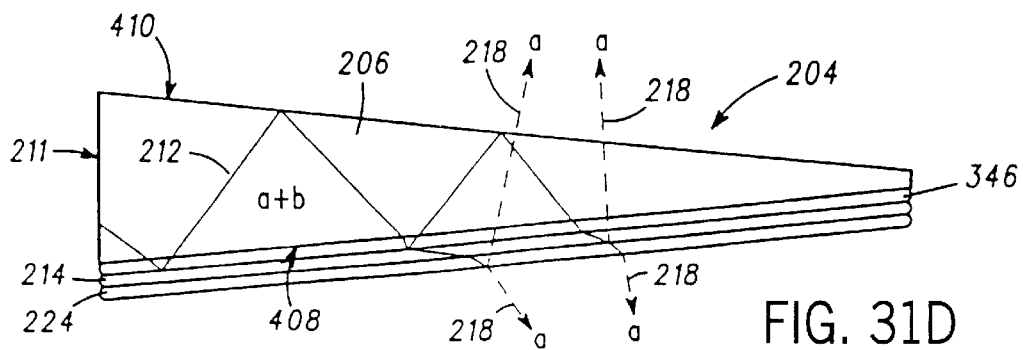
FIG. 31D is similar to FIG. 31C but the converting layer is on the same side of the base layer as the birefringent layer.
Figure 31E:
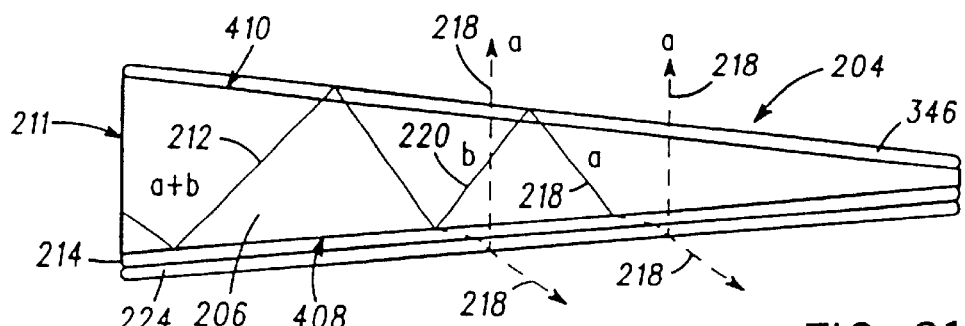
FIG. 31E illustrates a variation on FIG. 31C with the converting layer coupled directly to the base layer.

In the embodiments of FIGS. 31D and E, the reflected form of the light 220 is returned to the interface of the base layer 206 with the birefringent first layer 214. This is accomplished by virtue of total internal reflection of the light 220 together with passing at least twice through the converting layer 346, which results in at least partially converting the light 220 into the light 218 of the first polarization state. Since this light 218 has an incidence angle less than the first critical angle $\theta_{c\alpha}$, the light 218 is transmitted through the interface between the base layer 206 and the first layer 214. This light 218 can then be reflected or transmitted by the redirecting layer 224, depending on the particular nature of the redirecting layer 224. The alternatives of transmitted and reflected light are shown in phantom in FIGS. 31D and E. Further, in the embodiment of FIG. 31D, the converting layer 346 is on the same side of the base layer 206 as the birefringent first layer 214. The converting layer 346 is also disposed between the base layer 206 and the birefringent first layer 214. The embodiment of FIG. 31E shows another variation on FIG. 31D with the converting layer 226 and the birefringent first layer disposed on opposite sides of the base layer 206.

Figure 31F:
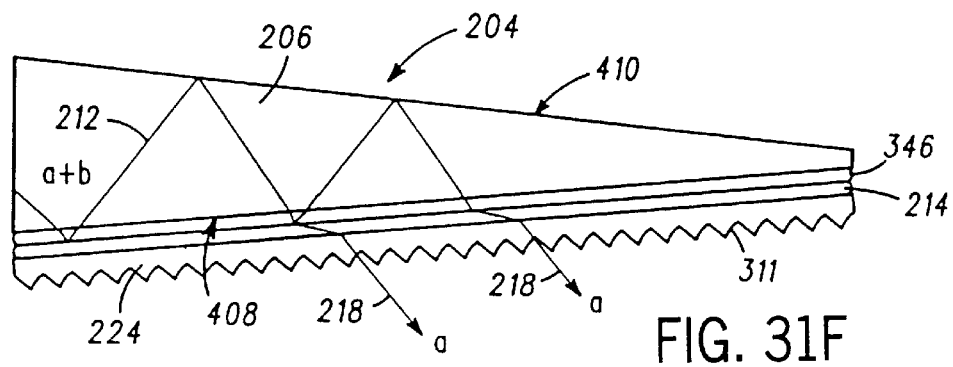
FIG. 31F is similar to FIG. 31D but the redirecting layer comprises a faceted layer.
Figure 31G:
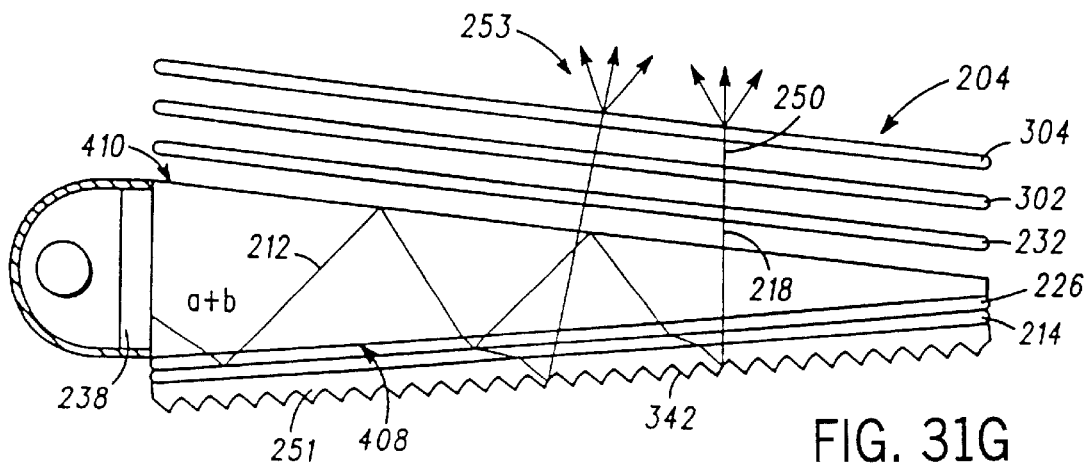
FIG. 31G is based on the embodiment of FIG. 31F but also includes a matching layer, an LCD layer and a diffuser layer.
Figure 31H:
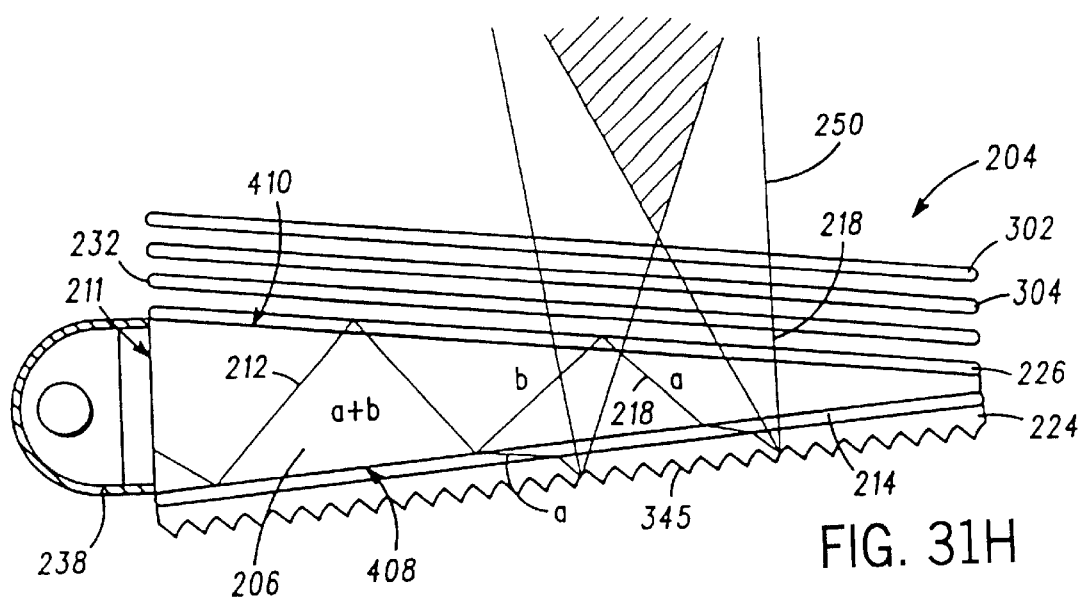
FIG. 31H is a variation on FIG. 31G.

In the embodiment of FIG. 31F the system 204 is similar to the embodiment of FIG. 31D, but the redirecting layer 224 comprises a layer of facets 311. In the embodiment of FIG. 31G, the system 204 further includes the LCD layer 302, the matching layer 232, and the diffuser layer 304 is disposed in a spatial position after the light 218 has passed through the LCD layer 302. The redirecting layer 224 comprises the layer of microprisms 251 having flat faces and a metallic coating 342 for high light reflectivity. Also shown is the angle transformer layer 238 to control the spatial distribution of the light 253 output from the system 204. The embodiment of FIG. 31H is similar to the embodiment in FIG. 31G, but the system 204 uses curved facets 345 for the redirecting layer 224 with facet angles adjusted at different spatial locations to focus the output light 250 onto a preferred viewing zone. The angle transformer 238 is illustrated as a CPC.

Light Diffuser After LCD Layer Processing

In the embodiments shown in FIGS. 12N and 12O the LCD display 216 or 236 provides an output light to the viewer. In a further improvement of these embodiments a post diffuser layer 350 is disposed in the path of the light 250 output from the LCD layer 302 (see FIG. 32A and B). In the preferred embodiments shown in these figures, the general operation is similar to the embodiments illustrated in FIGS. 26B, 28D and E; 29A and B and 31G, but without any of the polarization filter layers 216. As described hereinbefore, it is advantageous to provide light to the LCD layer 302 in a collimated angular range, preferably substantially perpendicular to the LCD layer 302 to optimize the image output therefrom. The use of the post diffuser layer 350 allows the output light 253 to provide an image to viewers over a wide angular range without compromising light contrast and color fidelity.

Figure 32A:
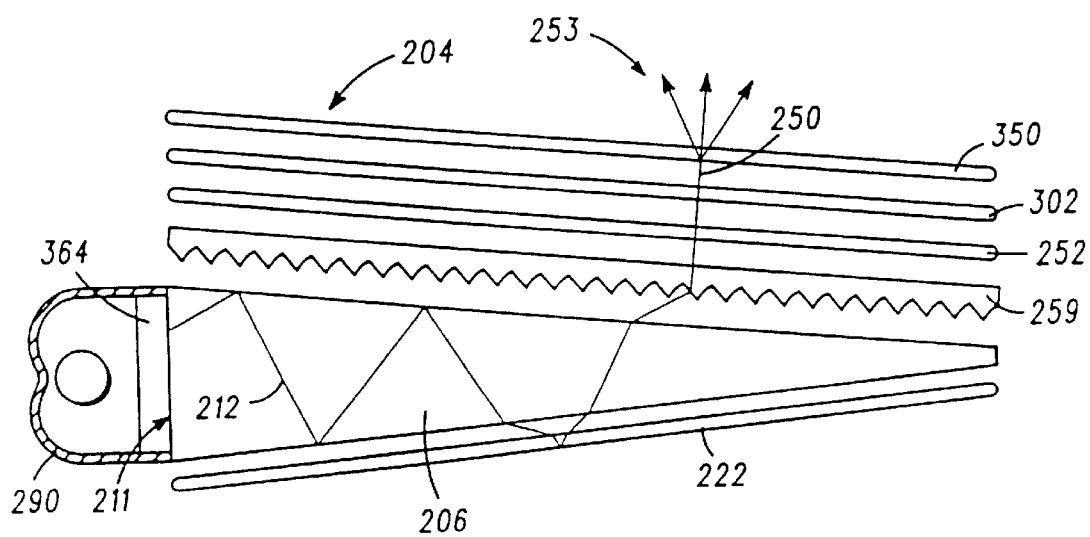
FIG. 32A illustrates a luminaire system including an LCD layer and a post LCD diffuser layer for processing unpolarized light.

One aspect which is preferably controlled in a system including the post diffuser layer 350 is the width in the xz-plane of the angular distribution transmitted through the LCD layer 302. The output angular distribution preferably has a full width less than $$\Delta\theta pd = 2n_{lcd}\left(\frac{1}{d}\right) \tag{18}$$

and a full width less than half of this value is even more preferred. In this equation $\Delta\theta_{pd}$ is in radians, $n_{LCD}$ is the average index within the LCD layer 302, □ is the repetition period of display pixel rows in the z-direction, and d is the thickness of the LCD layer 302. For a typical LCD used in notebook computers, $n_{LCD}$ is approximately 1.5, l=0.3 mm, and d=3 mm. For this example, $\Delta\theta_{pd}$ is preferably less than 18 degrees, and a full-width of nine degrees or less is even more preferred. By comparison, Equation (8) can be used to calculate the output angular width of the current invention using a flat-facet prismatic redirecting layer, such as is shown in FIG. 32A (layer 359) or in FIGS. 28B (layer 262). For a typical notebook computer backlighting system, Φ=1.3 degrees and n=1.49. In this example, Equation (8) gives an output angular distribution of eighteen degrees.

FIG. 32A shows a preferred arrangement of the system 204 having a parallel form of the post diffuser 350 disposed overlying the LCD layer 302. Also included is a holographic angle transformer 364 disposed on the back surface 211.

Figure 32B:
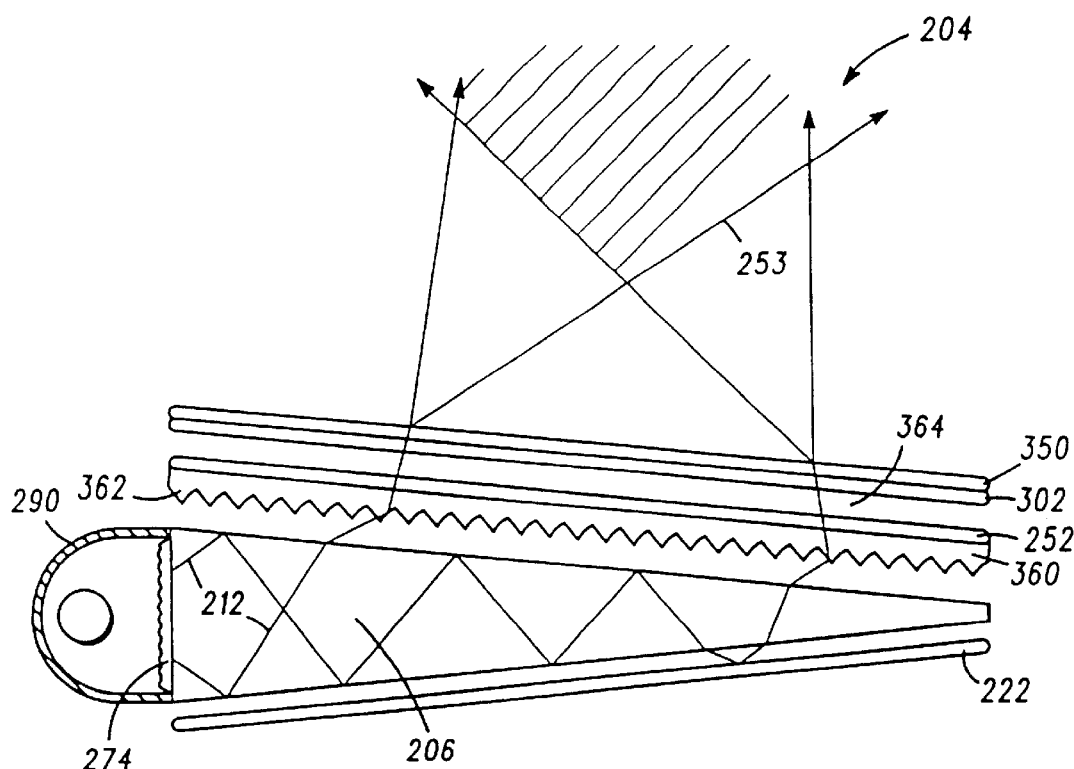
FIG. 32B is a variation on FIG. 32A.
Figure 32C:
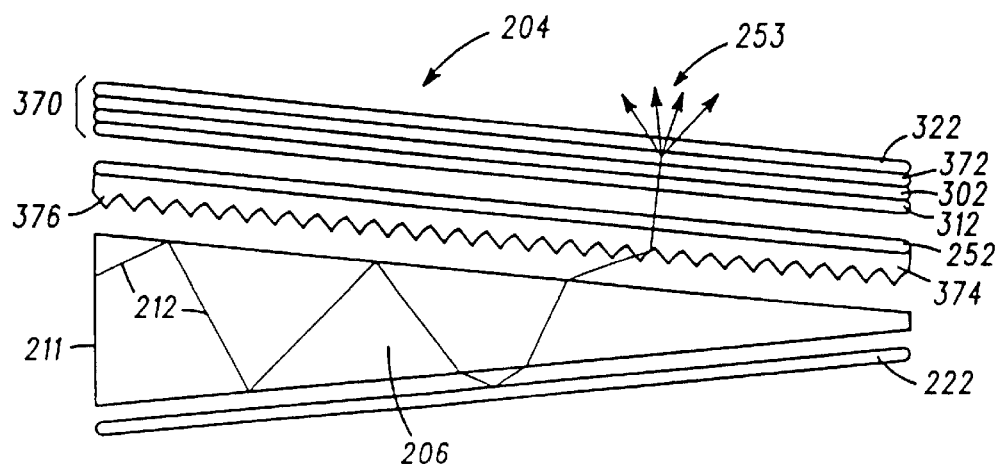
FIG. 32C is a variation on FIG. 32B.

In another embodiment shown in FIG. 32B a refracting/internally reflecting layer 360 includes curved facets 362 in order to narrow the angular distribution in the xz-plane of light 364 directed through the LCD layer 302, and thereby to improve image quality by reducing parallax at the post diffuser layer 350. The embodiment has the curved reflecting facets 362, but flat refracting facets can achieve the desired function as well, as shown in FIG. 32C. In either case, the curved facets 362 preferably have a focal length less than the repetition period between each of the facets 362. The angular distribution in the xz-plane is preferably narrowed beyond the width given in Equation (8), and is most preferably narrowed beyond the width given in the equation above. In addition, the facet angles of the redirecting layer 224 are arranged to focus the light output from different portions of the system 204 onto a preferred viewing zone. This figure also shows the micro-prismatic angle-transforming layer 274.

In FIG. 32C is shown a variation on the embodiment of FIG. 32B. In the system 204 an LCD layer arrangement 370 differs from the prior art LCD layer arrangement 310 illustrated in FIG. 30. In particular, a parallel light diffuser layer 372 (such as a holographic diffuser) is disposed between the LCD layer 302 (layer 316 in FIG. 30) and the second polarization filter layer 322 (layer 314 in FIG. 30). This arrangement enables the second polarization filter layer 322 to reduce the glare which can otherwise be caused by ambient light being reflected by the diffuser layer 372. FIG. 32C further shows a light redirecting layer 374 having curved refracting facets 376 which perform the same angle narrowing function as the curved reflecting facets 362 shown in FIG. 32B.

The following example illustrates a measurement system and method for various ones of the device 10.

EXAMPLE

The performance of the various devices 10 was quantified by introducing a concept of useful system gain. The light output distribution from the devices 10 can be approximated by the sum of a diffuse Lambertian background and a one dimensionally collimated beam consisting of a limited angle Lambertian distribution. In this model, the illuminance emitted into a limited angle ($I_{limited}$) from the luminaire device 10 can be expressed in terms of the peak luminance ($L_{max}$) of the toal distribution, fraction of the illuminance in the diffuse Lambertian background ($\alpha$), and the width of the limited angle Lambertian distribution specified by the limiting angles ($\theta^+, \theta^-$) in the form $$I_{Limited} = \frac{\sin[\theta^+] - \sin[\theta^-]}{1 + \frac{1}{2}\frac{\alpha}{(1-\alpha)}(\sin[\theta^+] - \sin[\theta^-])} L_{Max}$$

This is a useful quantity as it represents the total illuminance that can be redistributed using various redirecting layers, such as angle transforming films and diffusers. Although the fraction of the total illuminance in the diffuse background can be quite large, the majority of the peak brightness is typically due to the limited angle light emitted by the device 10 due to the much smaller solid angle covered by the illuminance in the limited angular range case.

This idea was applied to a real device 10 by assuming that the +/−angles specified in the formula were the half-luminance points measured using a spot-photometer 498.

Figure 61A:
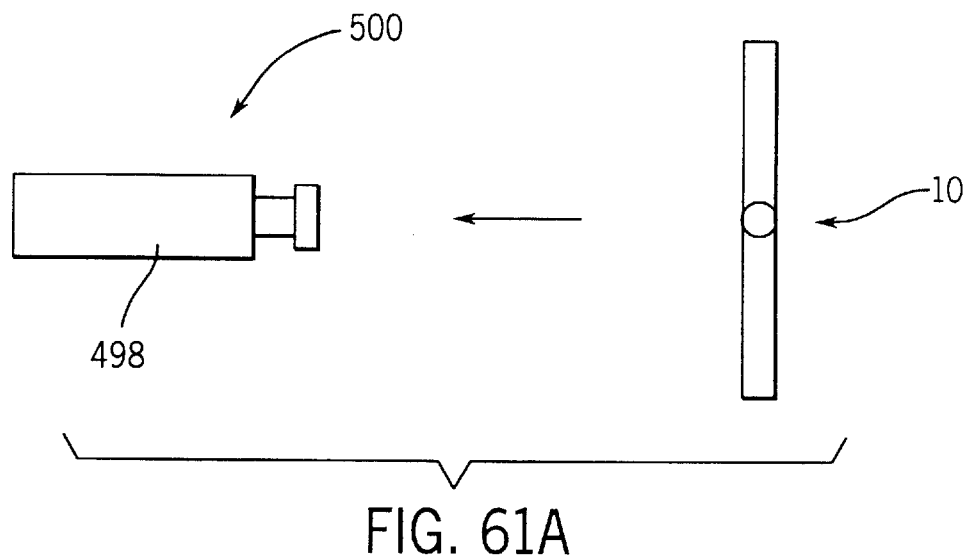
FIG. 61A illustrates a top view of a luminaire output measurement system and a luminaire device; and 61B illustrates two half luminaires.
Figure 61B:
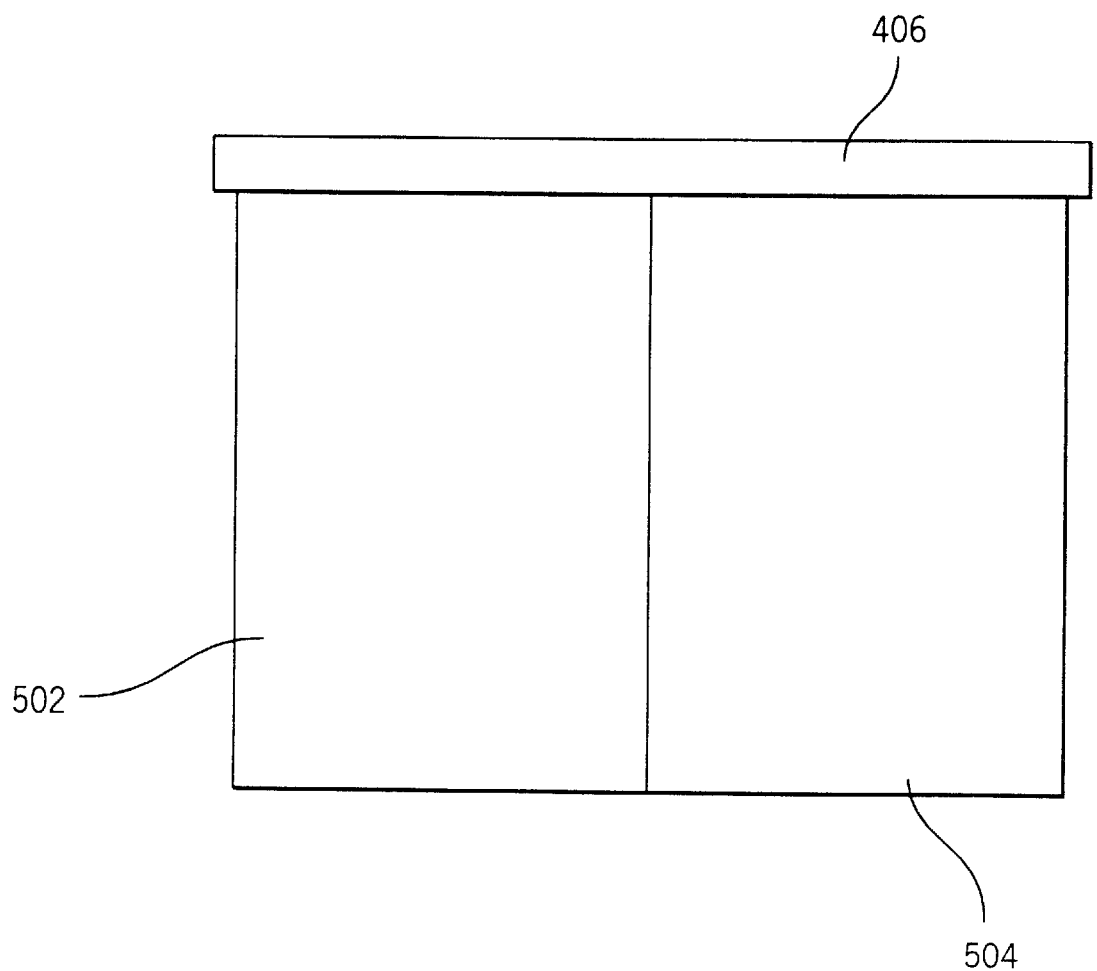
Figure 62:
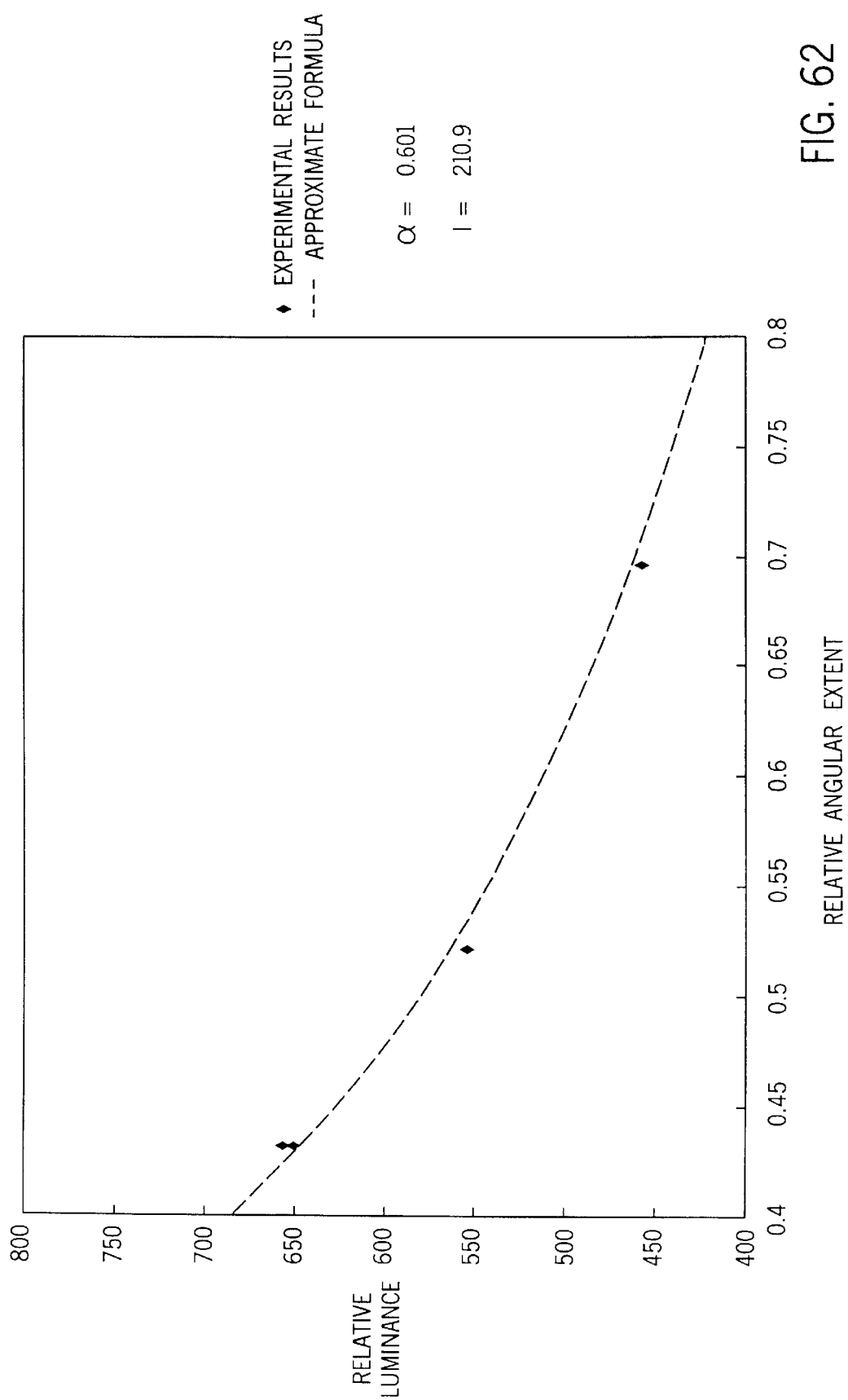
FIG. 62 illustrates a measured angle factor versus maximum brightness.
Figure 63:
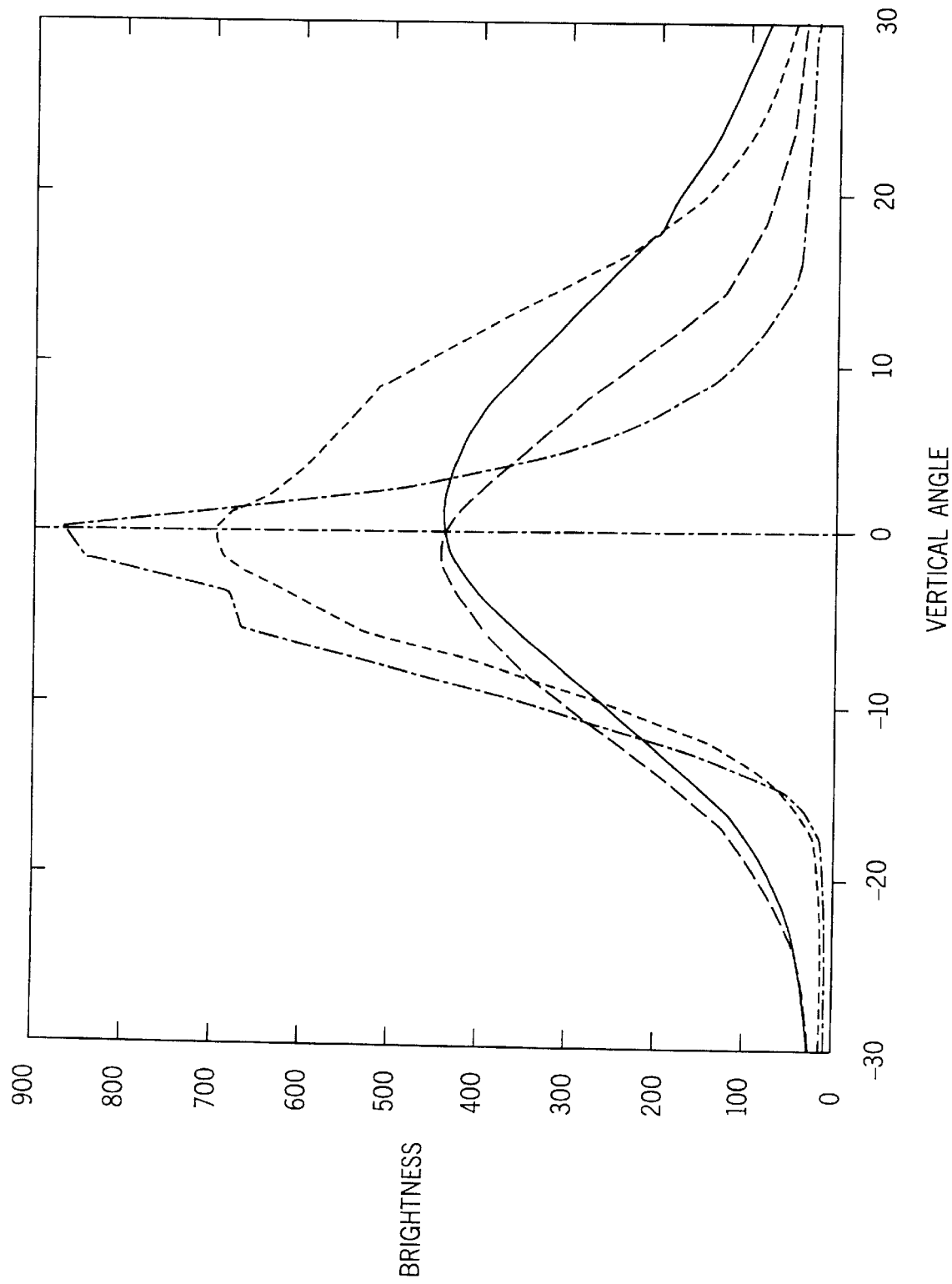
FIG. 63 illustrates typical vertical distributions from a polarized and unpolarized luminaire using a standard backlight and a backlight using a coated plate polarization beam splitter.

For each set of measurements we measured the maximum brightness, and the angular location of the half-luminance points. The system 500 used to perform the measurements is shown in FIGS. 61A and B. A few different diffusers were tried to vary location of the half-luminance points while maintaining the same illuminance. Fitting this model to the data yielded a value for the fraction of power in the diffuse background. We found this value to be 60.1% for the basic form of the device 10 used in our experimental work. FIG. 62 shows the measured data and fitted curves for a basic form of the device 10.

In the remainder of our work we quantified the performance of the device 10 by developing a set of gain factors based on the illuminance estimate above. These gain factors were the total system gain ($g_{total}$), the brightness gain ($g_{luminance}$), and the gain due to an increase in the solid angle of the illumination leaving the luminaire ($g_{range}$). These were given in terms of the measured luminance ($L_{ref}$), and an angular range factor ($R_u$) defined below. The highly restricted angle of illumination was only in a single direction of the device 10, so we used the one-dimensional formulas shown as the basis of our analysis. In particular we defined:

$$g_{total} = g_{luminance} \, g_{range}$$

$$g_{luminance} = \frac{L_{sample}}{L_{ref}}$$

$$g_{range} = \frac{R_{sample}}{R_{ref}}$$

$$R_u = \frac{\sin[\theta_u^+] - \sin[\theta_u^-]}{1 + \frac{1}{2}\frac{\alpha}{(1-\alpha)}(\sin[\theta_u^+] - \sin[\theta_u^-])}$$

Operationally, these measurements were made by dividing a luminaire device in two halves 502 and 504 (See FIG. 61B), both driven by the same CCFT lamp, and with the sample light-pipe. For those measurements that required coatings on or laminations to the light pipe, were laminated or coated only to half of the light-pipe. This method was adopted for stability reasons, especially stability in the output of the CCFT lamp. We believe that the effect, if any, of this half-luminaire measurement approach was to penalize our gain values. Since our goal was to demonstrate attainable gains, such a potential penalty was acceptable.

To obtain the final gain values reported in the tables, the observed values were collected by the gains measured by making both the half-luminaires 502 and 504 of the same construction. This was to correct for a small side to side dependence that we observed. These corrected gains ($g_{corrected}$) were calculated from gains of measured samples ($g_{measured}$) and calibration gains ($g_{calibration}$) measured with sides of the half-luminaire 502 in the reference configuration by just $$g_{corrected} = g_{measured}/g_{calibration}$$

Using this approach, a variety of luminaires were measured using a Photo Research Pritchard Spot Photometer. To do the measurement, the device 10 was placed on a stand equipped with a rotation stage aligned so that during the rotation our measurement spot was stationary (see FIG. 61A). Once the lamp in the luminaire at the center of each of the half-luminaires 502 and 504 (see FIG. 61B). For each measurement, a linear polarizer was used in front of the photometer 498 aligned to pass the maximum amount of light. For most of the measurements, this direction was horizontal or vertical with respect to the device 10 and instrument, so the internal polarizers were used in the instrument for these cases. For each of these halves, found the maximum brightness was formed and then the angular locations of the half-brightness points by rotating the device 10 about a rotation axis.

While preferred embodiments of the inventions have been shown and described, it will be clear to those skilled in the art that various changes and modifications can be made without departing from the invention in its broader aspects as set forth in the claims provided hereinafter.

What is claimed is:

1. An optical device for collecting light from a light source and outputting the light from the optical device, comprising:

a wedge-shaped layer of optical index of refraction $n_1$ with a first and second surface converging to define at least one angle of inclination, $\Phi$, the light exiting said base layer when the light being reflected therein decreases its angle relative to the normal to at least one of said first and second surfaces and achieves an angle of incidence less than a critical angle $\theta_c$ relative to a normal to said surfaces; and a first layer of index of refraction $n_2$ wherein said first layer is laminated to said wedge-shaped layer and has an optical index of refraction such that an effective optical dielectric interface is formed between said wedge layer and said laminated first layer and said interface has a higher critical angle $\theta_c$ than another critical angle $\theta_a$ characteristic of an ambient interface with said wedge-shaped layer to enable the light to enter said laminated first layer after output from said wedge-shaped layer when the light in said wedge-shaped layer achieves the angle of incidence less than the critical angle $\theta_c$ characteristic of the effective optical interface.

2. The optical device as defined in claim 1 further including a second layer of optical index $n_3$ disposed adjacent to said laminated first layer for operating on the light before the light is output from the optical device.

3. The optical device as defined in claim 2 wherein said second layer comprises a redirecting layer for acting on the light to change its direction of travel.

4. The optical device as defined in claim 2 wherein said second layer includes means for preferably transmitting light of a first polarization state compared to a second polarization state and for preferably reflecting light of the second polarization state.

5. The optical device as defined in claim 1 wherein said laminated first layer comprises a coated film and an adhesive layer.

6. The optical device as defined in claim 1 wherein said laminated first layer comprises a laminated film material selected from the group consisting of an extruded film and a cast film.

7. An optical device for collecting light and for selectively outputting light, comprising:

a base layer for receiving light and having an optical index of refraction $n_1$ and said base layer further having upper and lower surfaces and the light exiting said base layer when the light achieves an angle of incidence to one of said upper and lower surfaces which is less than a critical angle $\theta_c$ relative to a normal at the point of incidence of the light on one of said surfaces;

a laminant layer coupled to said base layer and said laminant layer having an index of refraction $n_L$;

a first layer having an optical index of refraction $n_2$ and coupled by said laminant layer to said bottom surface of said base layer, said first layer and said base layer forming an effective optical interface with a higher critical angle $\theta_c$ than a critical angle $\theta_a$ at an interface between said wedge layer and ambient such that light is received by said first layer from said base layer upon achieving the critical angle $\theta_c$ of inclination in said base layer; and a redirecting layer to output of the light into the ambient from said device.

8. The optical device as defined in claim 7 further including a second layer of optical index $n_3$ disposed adjacent to at least one of said first layer and said laminant layer for operating on the light before the light is output from the optical device.

9. The optical device as defined in claim 8 wherein said second layer comprises a section taken from a roll of film.

10. The optical device as defined in claim 7 wherein said laminant layer includes a selected shape for interacting with the light to control light output from the optical device.

11. The optical device as defined in claim 7 wherein said laminant layer comprises a polymeric material laminated to at least said first layer.

12. The optical device as defined in claim 7 wherein said base layer is selected from the group of a layer having a variable index of refraction, a variable angle between said base layer upper and lower surfaces, and a roughed surface for at least one of said upper and lower surfaces.

13. An optical device for collecting light from a light source and outputting the light from the optical device, comprising:

a wedge-shaped layer of optical index of refraction $n_1$ with a first and second surface converging to define at least one angle of inclination, $\Phi$, the light exiting said base layer when the light being reflected therein decreases its angle relative to the normal to at least one of said first and second surfaces and achieves an angle of incidence less than a critical angle $\theta_c$ relative to a normal to said surfaces;

a laminated film layer coupled to said wedge-shaped layer, the film layer having an index of refraction $n_L$ and a shape for collectively assisting in controlling light to be output from the optical device; and a laminant first layer of index of refraction $n_2$ relative to the laminated film layer having the index $n_L$ and at least one of said laminant first layer and said film layer having an optical index of refraction such that an effective optical dielectric interface is formed between said wedge layer and said laminant first layer and said interface has a higher critical angle $\theta_c$ than another critical angle $\theta_a$ at an ambient interface with said wedge-shaped layer to enable the light to enter at least one of said laminant first layer and said film layer after output from said wedge-shaped layer when the light in said wedge-shaped layer achieves the angle of incidence less than the critical angle $\theta_c$ characteristic of the effective optical interface.

14. The optical device as defined in claim 13 further including a second layer of optical index $n_3$ disposed adjacent to one of said laminant first layer and said laminated film layer for operating on the light before the light is output from the optical device.

15. The optical device as defined in claim 14 wherein said second layer comprises a redirecting layer for acting on the light to change its direction of travel.

16. The optical device as defined in claim 14 wherein said second layer includes means for preferably transmitting light of a first polarization state compared to a second polarization state and for preferably reflecting light of the second polarization state.

17. The optical device as defined in claim 13 wherein said laminated film layer comprises a coated film and an adhesive layer.

18. The optical device as defined in claim 13 wherein said film of said roll comprises a faceted film.

19. The optical device as defined in claim 13 wherein a coated film layer is coupled to said wedge-shaped layer using an adhesive layer.

20. The optical device as defined in claim 13 wherein said laminant first layer comprises a laminated film material selected from the group consisting of an extruded film and a cast film.

* * * * *

UNITED STATES PATENT AND TRADEMARK OFFICE
CERTIFICATE OF CORRECTION

PATENT NO. : 6,671,452 B2
DATED : December 30, 2003
INVENTOR(S) : Winston, Roland It is certified that error appears in the above-identified patent and that said Letters Patent is hereby corrected as shown below:

Title page,
Item [63], Related U.S. Application Data, delete "08/216,016" and insert -- 08/226,016 --, therefore.
Item [57], ABSTRACT,
Line 3, delete "referaction" and insert -- refraction --, therefore.
Line 11, delete "alight" and insert -- a light --, therefore.
Item [56], References Cited, OTHER PUBLICATIONS, "New Backlighting" reference, delete "flat" and insert -- Flat --, therefore.

Column 1,
Line 1, after "of" insert -- U.S. --.
Line 2, after "09/533,043" insert -- , --.
Line 2, after "2000" insert -- , --.
Line 3, after "of" insert -- U.S. --.
Line 4, after "08/999,149" insert -- , --.
Line 4, after "1997" insert -- , --.
Line 5, after "of" insert -- U.S. --.
Line 6, after "08/783,212" insert -- , --.
Line 6, after "1997" insert -- , --.
Line 10, delete "08/216,016" and insert -- 08/226,016 --, therefore.

Column 2,
Line 30, delete "tie" and insert -- the --, therefore.

Column 3,
Line 25, delete "FIG. 3 is a composite Figure including FIGS. 3A and 3B and".

Column 10,
Line 46, delete "($n_2$=1.05-1.35" and insert -- ($n_2$=1.05-1.35) --, therefore.

Column 13,
Line 9, delete "tan θ" and insert -- tan ϕ --, therefore.
Line 34, delete "$[1-L^2\tau^2]^{1/2}$" and insert -- $[1-L^2\sigma^2]^{1/2}$ --, therefore.

Column 14,
Line 27, after "Therefore" insert -- , --.
Line 44, delete "manner," and insert -- manner. --, therefore.

UNITED STATES PATENT AND TRADEMARK OFFICE
CERTIFICATE OF CORRECTION

Figure 4I:
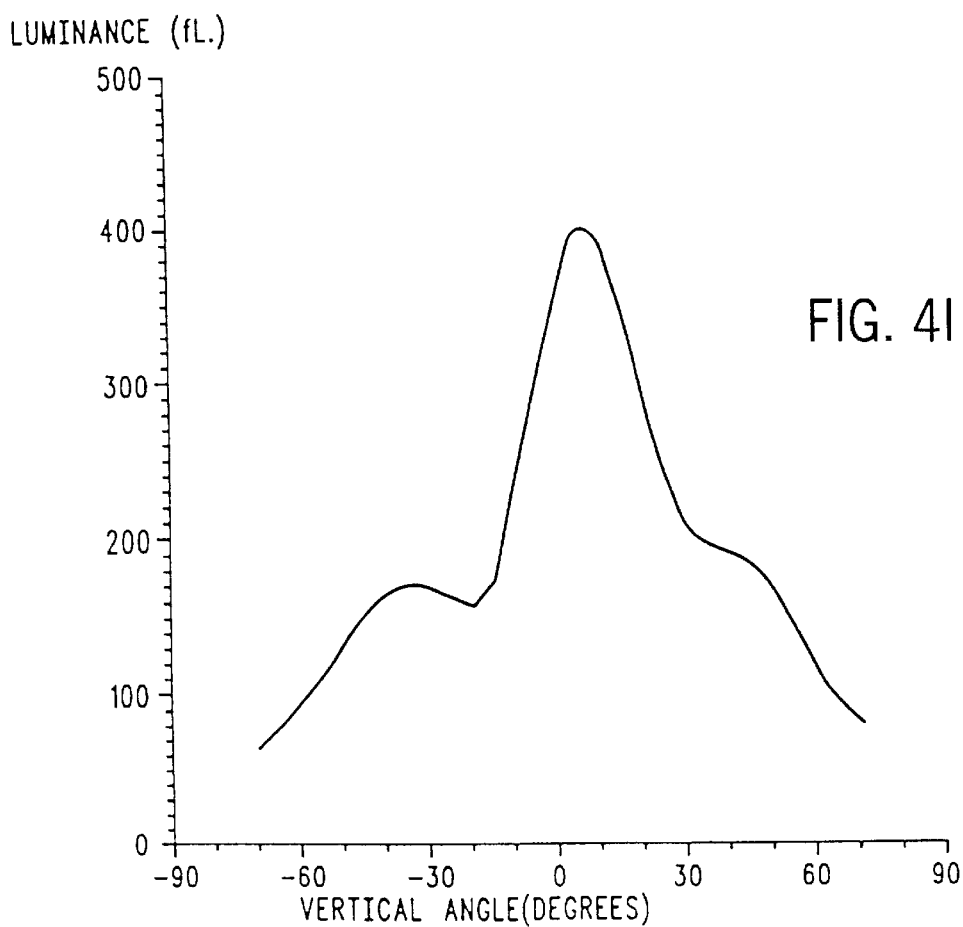
FIG. 4I illustrates an example of an output distribution with large "tails", measured using a diffuse reflective bottom redirecting layer and a refracting/internally-reflecting top redirecting layer.

PATENT NO. : 6,671,452 B2
DATED : December 30, 2003
INVENTOR(S) : Winston, Roland It is certified that error appears in the above-identified patent and that said Letters Patent is hereby corrected as shown below:

Column 16,
Line 34, delete "FIG. 41" and insert -- FIG. 4I --, therefore.

Column 19,
Line 19, delete "120" and insert -- 120 --, therefore.

Column 21,
Line 28, after "Therefore" insert -- , --.

Column 36,
Table 3, line 11, after "cos $\psi$" delete "+".
Table 3, line 12, before "cos $\theta$" insert -- + --.

Signed and Sealed this

Twelfth Day of October, 2004

JON W. DUDAS
*Director of the United States Patent and Trademark Office*